(12) United States Patent
Nix

(10) Patent No.: US 11,082,218 B2
(45) Date of Patent: **\*Aug. 3, 2021**

(54) KEY DERIVATION FOR A MODULE USING AN EMBEDDED UNIVERSAL INTEGRATED CIRCUIT CARD

(71) Applicant: Network-1 Technologies, Inc., New York, NY (US)

(72) Inventor: John A. Nix, Evanston, IL (US)

(73) Assignee: Network-1 Technologies, Inc., New York, NY (US)

( \* ) Notice: Subject to any disclaimer, the term of this patent is extended or adjusted under 35 U.S.C. 154(b) by 0 days.

This patent is subject to a terminal disclaimer.

(21) Appl. No.: 16/879,325

(22) Filed: May 20, 2020

(65) Prior Publication Data

US 2020/0280439 A1    Sep. 3, 2020

Related U.S. Application Data

(63) Continuation of application No. 16/201,401, filed on Nov. 27, 2018, now Pat. No. 10,700,856, which is a
(Continued)

(51) Int. Cl.
*H04L 9/08* (2006.01)
*H04W 4/70* (2018.01)
(Continued)

(52) U.S. Cl.
CPC ............ *H04L 9/0861* (2013.01); *G06F 21/33* (2013.01); *G06F 21/35* (2013.01); *H04J 11/00* (2013.01);
(Continued)

(58) Field of Classification Search
CPC ... H04L 9/0861; H04L 9/0662; H04L 9/0891; H04L 9/0844; H04L 9/0841;
(Continued)

(56) References Cited

U.S. PATENT DOCUMENTS 5,216,715 A * 6/1993 Markwitz ............. H04L 9/0822
380/273
5,319,710 A   6/1994 Atalla
(Continued)

FOREIGN PATENT DOCUMENTS

CA    2775853        12/2012
CA    2775853 A1    12/2012
(Continued)

OTHER PUBLICATIONS

3GPP, 3rd Generation Partnership Project; Technical Specification Group Core Network and Terminals; Non-Access-Stratum (NAS) protocol for Evolved Packet System (EPS); Stage 3, 3GPP TS 24.301 v12.2.0, Sep. 2013 pp. 1-6, 63-100.
(Continued)

*Primary Examiner* — David Garcia Cervetti
(74) *Attorney, Agent, or Firm* — Amster, Rothstein & Ebenstein

(57) ABSTRACT

A module with an embedded universal integrated circuit card (eUICC) can include a received eUICC profile and a set of cryptographic algorithms. The received eUICC profile can include an initial shared secret key for authentication with a wireless network. The module can receive a key K network token and send a key K module token to the wireless network. The module can use the key K network token, a derived module private key, and a key derivation function to derive a secret shared network key K that supports communication with the wireless network. The wireless network can use the received key K module token, a network private key, and the key derivation function in order to derive the same secret shared network key K derived by the module. The module and the wireless network can subsequently use the mutually derived key K to communicate using traditional wireless network standards.

15 Claims, 19 Drawing Sheets

Related U.S. Application Data continuation of application No. 15/680,758, filed on Aug. 18, 2017, now Pat. No. 10,187,206, which is a continuation of application No. 15/130,146, filed on Apr. 15, 2016, now Pat. No. 9,742,562, which is a continuation of application No. 14/084,141, filed on Nov. 19, 2013, now Pat. No. 9,319,223.

(51) Int. Cl.

| | | |
|---|---|---|
| *H04W 76/27* | (2018.01) | |
| *H04W 12/04* | (2021.01) | |
| *H04W 52/02* | (2009.01) | |
| *H04L 9/32* | (2006.01) | |
| *H04W 40/00* | (2009.01) | |
| *H04W 12/06* | (2021.01) | |
| *H04L 29/06* | (2006.01) | |
| *H04J 11/00* | (2006.01) | |
| *H04L 9/00* | (2006.01) | |
| *G06F 21/35* | (2013.01) | |
| *H04W 80/04* | (2009.01) | |
| *H04L 29/08* | (2006.01) | |
| *H04L 9/30* | (2006.01) | |
| *H04L 9/14* | (2006.01) | |
| *H04W 8/08* | (2009.01) | |
| *H04L 12/28* | (2006.01) | |
| *H04W 12/02* | (2009.01) | |
| *H04L 9/06* | (2006.01) | |
| *G06F 21/33* | (2013.01) | |
| *H04W 12/03* | (2021.01) | |
| *H04W 12/041* | (2021.01) | |
| *H04W 84/12* | (2009.01) | |
| *H04W 88/12* | (2009.01) | |

(52) U.S. Cl.
CPC ............ *H04L 9/006* (2013.01); *H04L 9/0662* (2013.01); *H04L 9/085* (2013.01); *H04L 9/088* (2013.01); *H04L 9/0816* (2013.01); *H04L 9/0841* (2013.01); *H04L 9/0844* (2013.01); *H04L 9/0891* (2013.01); *H04L 9/0894* (2013.01); *H04L 9/14* (2013.01); *H04L 9/30* (2013.01); *H04L 9/3066* (2013.01); *H04L 9/32* (2013.01); *H04L 9/321* (2013.01); *H04L 9/3247* (2013.01); *H04L 9/3249* (2013.01); *H04L 9/3263* (2013.01); *H04L 12/2854* (2013.01); *H04L 63/0272* (2013.01); *H04L 63/045* (2013.01); *H04L 63/0435* (2013.01); *H04L 63/0442* (2013.01); *H04L 63/06* (2013.01); *H04L 63/061* (2013.01); *H04L 63/0807* (2013.01); *H04L 63/123* (2013.01); *H04L 63/166* (2013.01); *H04L 67/04* (2013.01); *H04W 4/70* (2018.02); *H04W 8/082* (2013.01); *H04W 12/02* (2013.01); *H04W 12/03* (2021.01); *H04W 12/04* (2013.01); *H04W 12/041* (2021.01); *H04W 12/06* (2013.01); *H04W 40/005* (2013.01); *H04W 52/0216* (2013.01); *H04W 52/0235* (2013.01); *H04W 52/0277* (2013.01); *H04W 76/27* (2018.02); *H04W 80/04* (2013.01); *H05K 999/99* (2013.01); *G06F 2221/2105* (2013.01); *G06F 2221/2107* (2013.01); *G06F 2221/2115* (2013.01); *H04L 63/0464* (2013.01); *H04L 2209/24* (2013.01); *H04L 2209/56* (2013.01); *H04L 2209/72* (2013.01); *H04L 2209/80* (2013.01); *H04L 2209/805* (2013.01); *H04W 84/12* (2013.01); *H04W 88/12* (2013.01); *Y02D 30/70* (2020.08)

(58) Field of Classification Search
CPC ..... H04L 9/0894; H04L 9/085; H04L 9/3247; H04L 9/32; H04L 9/3249; H04L 9/088; H04L 9/0816; H04L 9/3263; H04L 9/3239; H04L 9/006; H04L 9/321; H04L 9/30; H04L 9/14; H04L 9/3066; H04L 63/06; H04L 63/0464; H04L 63/0435; H04L 63/0807; H04L 63/061; H04L 63/166; H04L 63/0272; H04L 63/123; H04L 63/0442; H04L 63/045; H04L 12/2854; H04L 2209/80; H04L 2209/56; H04L 2209/72; H04L 2209/805; H04L 2209/24; G06F 21/33; G06F 21/35; G06F 2221/2105; G06F 2221/2115; G06F 2221/2107; H04W 12/001; H04W 12/0401; H04W 12/04; H04W 12/02; H04W 12/06; H04W 84/12; H04W 88/12; H04W 8/205

See application file for complete search history.

(56) References Cited

U.S. PATENT DOCUMENTS

| | | | | |
|---|---|---|---|---|
| 5,642,420 | A * | 6/1997 | Kuroda | H04L 29/06 380/30 |
| 5,664,017 | A * | 9/1997 | Gressel | H04L 9/0833 380/285 |
| 5,852,665 | A * | 12/1998 | Gressel | H04L 9/0894 380/30 |
| 5,995,625 | A * | 11/1999 | Sudia | G06F 21/6209 705/51 |
| 6,038,322 | A | 3/2000 | Harkins | |
| 6,256,733 | B1 * | 7/2001 | Thakkar | H04L 9/0822 380/277 |
| 6,721,886 | B1 * | 4/2004 | Uskela | H04W 12/126 713/168 |
| 6,804,357 | B1 * | 10/2004 | Ikonen | H04N 7/1675 348/14.01 |
| 6,842,628 | B1 * | 1/2005 | Arnold | H04L 51/24 455/556.2 |
| 7,627,760 | B2 | 12/2009 | Lauter | |
| 7,921,292 | B1 | 4/2011 | Pauker et al. | |
| 7,957,532 | B2 | 6/2011 | Chen et al. | |
| 8,127,142 | B2 | 2/2012 | Cuppett | |
| 8,352,739 | B2 * | 1/2013 | Park | H04W 12/0471 713/169 |
| 8,434,139 | B1 | 4/2013 | Ortiz, Jr. | |
| 8,452,017 | B2 * | 5/2013 | Sherkin | H04L 9/3066 380/285 |
| 8,522,013 | B2 | 8/2013 | Zhang et al. | |
| 8,526,606 | B2 | 9/2013 | Muthaiah | |
| 8,555,067 | B2 | 10/2013 | Schell et al. | |
| 8,577,337 | B2 * | 11/2013 | O'Leary | H04W 8/22 455/411 |
| 8,590,028 | B2 | 11/2013 | Saxena et al. | |
| 8,713,320 | B2 | 4/2014 | Xu et al. | |
| 8,782,774 | B1 | 7/2014 | Pahl et al. | |
| 8,843,179 | B2 | 9/2014 | Li et al. | |
| 8,924,715 | B2 | 12/2014 | Schell | |
| 8,948,386 | B2 | 2/2015 | Campagna et al. | |
| 8,965,366 | B1 * | 2/2015 | Somayajula | H04W 60/00 455/435.1 |
| 9,002,018 | B2 | 4/2015 | Wilkins et al. | |
| 9,020,479 | B1 * | 4/2015 | Somayajula | H04W 48/18 455/418 |
| 9,100,175 | B2 | 8/2015 | Nix | |
| 9,118,464 | B2 | 8/2015 | Nix | |
| 9,253,643 | B2 | 2/2016 | Pattar et al. | |
| 9,270,653 | B2 * | 2/2016 | Maria | H04L 63/0442 |
| 9,276,740 | B2 | 3/2016 | Nix | |
| 9,300,473 | B2 | 3/2016 | Nix | |
| 9,319,223 | B2 | 4/2016 | Nix | |
| 9,332,129 | B2 * | 5/2016 | Li | H04M 3/543 |

(56) References Cited

U.S. PATENT DOCUMENTS

| | | | |
|---|---|---|---|
| 9,351,162 B2 | 5/2016 | Nix | |
| 9,408,012 B2 | 8/2016 | Li et al. | |
| 9,426,654 B2 | 8/2016 | Lee | |
| 9,572,016 B2* | 2/2017 | Cormier | H04W 8/183 |
| 9,596,078 B2 | 3/2017 | Nix | |
| 9,628,981 B2* | 4/2017 | Park | H04L 63/0853 |
| 9,641,327 B2 | 5/2017 | Nix | |
| 9,674,690 B2* | 6/2017 | Lee | H04L 63/205 |
| 9,698,981 B2 | 7/2017 | Nix | |
| 9,742,562 B2 | 8/2017 | Nix | |
| 9,794,775 B2* | 10/2017 | Huber | H04W 12/069 |
| 9,800,993 B2* | 10/2017 | Lee | H04W 8/205 |
| 9,807,605 B2* | 10/2017 | Gao | H04L 63/0428 |
| 9,923,724 B2* | 3/2018 | Lee | H04L 63/0869 |
| 9,961,060 B2 | 5/2018 | Nix | |
| 9,998,280 B2 | 6/2018 | Nix | |
| 9,998,281 B2 | 6/2018 | Nix | |
| 10,003,461 B2 | 6/2018 | Nix | |
| 10,057,059 B2 | 8/2018 | Nix | |
| 10,084,768 B2 | 9/2018 | Nix | |
| 10,764,066 B2 | 9/2020 | Li et al. | |
| 2001/0029581 A1 | 10/2001 | Knauft | |
| 2002/0018569 A1 | 2/2002 | Panjwani et al. | |
| 2003/0003895 A1 | 1/2003 | Wallentin et al. | |
| 2003/0211842 A1 | 11/2003 | Kempf et al. | |
| 2004/0162472 A1 | 8/2004 | Berson et al. | |
| 2004/0179684 A1 | 9/2004 | Appenzeller et al. | |
| 2004/0221163 A1 | 11/2004 | Jorgensen et al. | |
| 2005/0008159 A1 | 1/2005 | Grilli et al. | |
| 2005/0021875 A1 | 1/2005 | Bouthemy et al. | |
| 2005/0050323 A1 | 3/2005 | Mizrah | |
| 2005/0058294 A1* | 3/2005 | Chen | H04L 9/0847 |
| | | | 380/277 |
| 2005/0120202 A1 | 6/2005 | Cuellar et al. | |
| 2005/0138353 A1 | 6/2005 | Spies et al. | |
| 2005/0177723 A1 | 8/2005 | Huang et al. | |
| 2005/0193199 A1 | 9/2005 | Asokan et al. | |
| 2005/0246282 A1 | 11/2005 | Naslund et al. | |
| 2005/0278787 A1 | 12/2005 | Naslund et al. | |
| 2006/0021063 A1 | 1/2006 | Hori | |
| 2006/0056355 A1 | 3/2006 | Love et al. | |
| 2006/0059344 A1 | 3/2006 | Mononen | |
| 2006/0095771 A1 | 5/2006 | Appenzeller et al. | |
| 2006/0129848 A1* | 6/2006 | Paksoy | H04W 12/03 |
| | | | 713/193 |
| 2006/0206710 A1 | 9/2006 | Gehrmann | |
| 2006/0281442 A1 | 12/2006 | Lee et al. | |
| 2007/0033403 A1 | 2/2007 | Lauter | |
| 2007/0101400 A1 | 5/2007 | Freeman et al. | |
| 2007/0158439 A1 | 7/2007 | Connor et al. | |
| 2007/0206799 A1 | 9/2007 | Wingert et al. | |
| 2008/0016230 A1 | 1/2008 | Holtmanns et al. | |
| 2008/0022089 A1 | 1/2008 | Leedom | |
| 2008/0031204 A1 | 2/2008 | Sood | |
| 2008/0044032 A1* | 2/2008 | Lou | H04L 65/40 |
| | | | 380/284 |
| 2008/0107083 A1 | 5/2008 | Shirota et al. | |
| 2008/0114978 A1 | 5/2008 | Lehtovirta et al. | |
| 2008/0130879 A1 | 6/2008 | Heinonen et al. | |
| 2008/0165698 A1 | 7/2008 | Dalsgaard et al. | |
| 2008/0307218 A1 | 12/2008 | Logvinov | |
| 2009/0011320 A1 | 1/2009 | Senda | |
| 2009/0028341 A1 | 1/2009 | Hamachi | |
| 2009/0041110 A1 | 2/2009 | Malladi | |
| 2009/0060197 A1 | 3/2009 | Taylor et al. | |
| 2009/0077643 A1 | 3/2009 | Schmidt et al. | |
| 2009/0113203 A1 | 4/2009 | Tsuge et al. | |
| 2009/0116642 A1 | 5/2009 | Yang et al. | |
| 2009/0125996 A1 | 5/2009 | Guccione et al. | |
| 2009/0132806 A1 | 5/2009 | Blommaert et al. | |
| 2009/0183541 A1 | 7/2009 | Sadighi et al. | |
| 2009/0191857 A1 | 7/2009 | Horn et al. | |
| 2009/0209232 A1 | 8/2009 | Cha et al. | |
| 2009/0217348 A1 | 8/2009 | Salmela et al. | |
| 2009/0268909 A1 | 10/2009 | Girao et al. | |
| 2009/0274306 A1 | 11/2009 | Nolte | |
| 2009/0282246 A1 | 11/2009 | Gunther | |
| 2009/0313472 A1 | 12/2009 | Guccione et al. | |
| 2010/0023771 A1 | 1/2010 | Struik | |
| 2010/0031042 A1 | 2/2010 | Di Crescenzo et al. | |
| 2010/0062808 A1 | 3/2010 | Cha et al. | |
| 2010/0098253 A1 | 4/2010 | Delerablee | |
| 2010/0166167 A1 | 7/2010 | Karimi-Cherkandi et al. | |
| 2010/0195833 A1 | 8/2010 | Priestley | |
| 2010/0199334 A1 | 8/2010 | Ehrensvard et al. | |
| 2010/0211779 A1 | 8/2010 | Sundaram | |
| 2010/0223461 A1 | 9/2010 | Drader et al. | |
| 2010/0275028 A1 | 10/2010 | Takashima | |
| 2011/0016321 A1 | 1/2011 | Sundaram et al. | |
| 2011/0035584 A1 | 2/2011 | Meyerstein et al. | |
| 2011/0035604 A1* | 2/2011 | Habraken | G06F 21/34 |
| | | | 713/193 |
| 2011/0055553 A1 | 3/2011 | Lee et al. | |
| 2011/0158411 A1 | 6/2011 | Medvinsky et al. | |
| 2011/0167272 A1 | 7/2011 | Kolesnikov | |
| 2011/0213959 A1* | 9/2011 | Bodi | H04L 63/0435 |
| | | | 713/155 |
| 2011/0237281 A1 | 9/2011 | Busropan et al. | |
| 2011/0268022 A1* | 11/2011 | Xu | H04Q 3/0025 |
| | | | 370/328 |
| 2011/0269422 A1* | 11/2011 | Xu | H04M 15/8083 |
| | | | 455/411 |
| 2011/0269461 A1* | 11/2011 | Xu | H04W 8/183 |
| | | | 455/435.2 |
| 2011/0269472 A1* | 11/2011 | Xu | H04W 40/02 |
| | | | 455/445 |
| 2011/0270747 A1* | 11/2011 | Xu | H04M 15/51 |
| | | | 705/40 |
| 2011/0291803 A1 | 12/2011 | Bajic et al. | |
| 2011/0314287 A1 | 12/2011 | Escott et al. | |
| 2012/0011360 A1 | 1/2012 | Engels et al. | |
| 2012/0011362 A1* | 1/2012 | Lambert | G06F 21/34 |
| | | | 713/168 |
| 2012/0023336 A1 | 1/2012 | Natarajan | |
| 2012/0030461 A1 | 2/2012 | Willey et al. | |
| 2012/0033613 A1 | 2/2012 | Lin et al. | |
| 2012/0072732 A1 | 3/2012 | Canard et al. | |
| 2012/0084568 A1 | 4/2012 | Sarikaya et al. | |
| 2012/0087493 A1* | 4/2012 | Chidambaram | H04L 9/32 |
| | | | 380/44 |
| 2012/0089568 A1 | 4/2012 | Manley et al. | |
| 2012/0108205 A1 | 5/2012 | Schell et al. | |
| 2012/0117635 A1 | 5/2012 | Schell et al. | |
| 2012/0159153 A1 | 6/2012 | Shim et al. | |
| 2012/0170451 A1 | 7/2012 | Viswanathan et al. | |
| 2012/0190354 A1* | 7/2012 | Merrien | H04B 1/3816 |
| | | | 455/422.1 |
| 2012/0214444 A1 | 8/2012 | McBride et al. | |
| 2012/0260086 A1 | 10/2012 | Haggerty et al. | |
| 2012/0260090 A1 | 10/2012 | Hauck et al. | |
| 2012/0260095 A1 | 10/2012 | Von Hauck et al. | |
| 2012/0263298 A1* | 10/2012 | Suh | H04W 4/60 |
| | | | 380/255 |
| 2012/0272064 A1 | 10/2012 | Sundaram et al. | |
| 2012/0278490 A1 | 11/2012 | Sennett et al. | |
| 2012/0300932 A1 | 11/2012 | Cambridge et al. | |
| 2012/0331287 A1 | 12/2012 | Bowman et al. | |
| 2012/0331292 A1 | 12/2012 | Haggerty et al. | |
| 2012/0331298 A1 | 12/2012 | Xu et al. | |
| 2013/0007442 A1 | 1/2013 | Mao et al. | |
| 2013/0012168 A1* | 1/2013 | Rajadurai | H04W 8/265 |
| | | | 455/411 |
| 2013/0028184 A1 | 1/2013 | Lee et al. | |
| 2013/0091556 A1 | 4/2013 | Horn et al. | |
| 2013/0114810 A1 | 5/2013 | Kobayashi et al. | |
| 2013/0117824 A1 | 5/2013 | Naslund et al. | |
| 2013/0122864 A1* | 5/2013 | Haggerty | H04W 12/069 |
| | | | 455/411 |
| 2013/0145151 A1 | 6/2013 | Brown et al. | |
| 2013/0149996 A1 | 6/2013 | King et al. | |
| 2013/0157673 A1* | 6/2013 | Brusilovsky | H04W 12/06 |
| | | | 455/450 |
| 2013/0165073 A1 | 6/2013 | Madsen | |

(56) References Cited

U.S. PATENT DOCUMENTS

| | | | |
|---|---|---|---|
| 2013/0165075 A1 | 6/2013 | Rishy-Maharaj et al. | |
| 2013/0166915 A1 | 6/2013 | Desai et al. | |
| 2013/0173747 A1 | 7/2013 | Kim et al. | |
| 2013/0173926 A1 | 7/2013 | Morese et al. | |
| 2013/0179962 A1 | 7/2013 | Arial et al. | |
| 2013/0182586 A1 | 7/2013 | Paladugu et al. | |
| 2013/0183932 A1 | 7/2013 | Lemilainen et al. | |
| 2013/0212637 A1 | 8/2013 | Guccione et al. | |
| 2013/0227646 A1* | 8/2013 | Haggerty | H04W 12/35 726/3 |
| 2013/0231087 A1 | 9/2013 | O'Leary | |
| 2013/0283047 A1* | 10/2013 | Merrien | H04L 63/102 713/164 |
| 2013/0294602 A1* | 11/2013 | Huxham | H04W 12/02 380/255 |
| 2013/0305345 A1 | 11/2013 | Bugenhagen | |
| 2013/0322621 A1 | 12/2013 | Yoon et al. | |
| 2013/0331063 A1 | 12/2013 | Cormier et al. | |
| 2013/0340040 A1* | 12/2013 | Park | H04L 63/0823 726/3 |
| 2013/0344864 A1* | 12/2013 | Park | H04W 8/18 455/432.3 |
| 2014/0003604 A1* | 1/2014 | Campagna | H04W 12/069 380/247 |
| 2014/0040628 A1 | 2/2014 | Fort et al. | |
| 2014/0049653 A1 | 2/2014 | Leonard et al. | |
| 2014/0053241 A1 | 2/2014 | Norrman et al. | |
| 2014/0073375 A1 | 3/2014 | Li et al. | |
| 2014/0082358 A1* | 3/2014 | Nakhjiri | H04W 12/04 713/168 |
| 2014/0082359 A1* | 3/2014 | Nakhjiri | H04L 63/061 713/168 |
| 2014/0087790 A1 | 3/2014 | Babbage et al. | |
| 2014/0101444 A1 | 4/2014 | Lee et al. | |
| 2014/0108801 A1 | 4/2014 | McBride et al. | |
| 2014/0115335 A1 | 4/2014 | Jorden et al. | |
| 2014/0120874 A1* | 5/2014 | Kang | H04W 12/069 455/411 |
| 2014/0122878 A1 | 5/2014 | Cho et al. | |
| 2014/0140507 A1* | 5/2014 | Park | H04W 12/35 380/247 |
| 2014/0140509 A1 | 5/2014 | Chastain et al. | |
| 2014/0143534 A1 | 5/2014 | Chastain et al. | |
| 2014/0143826 A1 | 5/2014 | Sharp et al. | |
| 2014/0161113 A1 | 6/2014 | Cui et al. | |
| 2014/0165155 A1 | 6/2014 | Zhang | |
| 2014/0192976 A1 | 7/2014 | Yoon et al. | |
| 2014/0219447 A1* | 8/2014 | Park | H04W 12/08 380/247 |
| 2014/0219448 A1 | 8/2014 | Froels et al. | |
| 2014/0235210 A1* | 8/2014 | Park | H04W 12/35 455/411 |
| 2014/0237101 A1* | 8/2014 | Park | H04W 12/35 709/223 |
| 2014/0244994 A1 | 8/2014 | Yu | |
| 2014/0273913 A1 | 9/2014 | Michel et al. | |
| 2014/0281483 A1 | 9/2014 | Vigliaturo et al. | |
| 2014/0287725 A1* | 9/2014 | Lee | H04L 63/0823 455/411 |
| 2014/0308991 A1* | 10/2014 | Lee | H04W 4/60 455/558 |
| 2014/0329502 A1* | 11/2014 | Lee | H04W 12/04 455/411 |
| 2014/0337937 A1 | 11/2014 | Truskovsky et al. | |
| 2014/0351403 A1 | 11/2014 | Lin et al. | |
| 2014/0357229 A1* | 12/2014 | Lee | H04W 4/50 455/411 |
| 2015/0012743 A1 | 1/2015 | Holtmanns et al. | |
| 2015/0017910 A1 | 1/2015 | Li et al. | |
| 2015/0071139 A1 | 3/2015 | Nix | |
| 2015/0089214 A1 | 3/2015 | Dupre | |
| 2015/0092590 A1 | 4/2015 | Zhu et al. | |
| 2015/0095514 A1 | 4/2015 | Yu | |
| 2015/0095648 A1 | 4/2015 | Nix | |
| 2015/0113275 A1 | 4/2015 | Kim et al. | |
| 2015/0121495 A1* | 4/2015 | Gao | H04W 12/04 726/6 |
| 2015/0215126 A1 | 7/2015 | Ashdown | |
| 2015/0222604 A1 | 8/2015 | Vlonen et al. | |
| 2015/0222619 A1 | 8/2015 | Hughes et al. | |
| 2015/0281964 A1* | 10/2015 | Seo | H04W 8/183 726/9 |
| 2015/0350881 A1* | 12/2015 | Weiss | H04W 8/24 455/558 |
| 2016/0014112 A1 | 1/2016 | Gunning et al. | |
| 2016/0057725 A1* | 2/2016 | Suh | G06Q 50/30 455/435.1 |
| 2016/0088096 A1* | 3/2016 | Quiriconi | H04L 67/10 709/219 |
| 2016/0127132 A1* | 5/2016 | Lee | H04L 9/0819 713/156 |
| 2016/0149903 A1* | 5/2016 | Suh | H04L 63/0428 713/156 |
| 2016/0212617 A1 | 7/2016 | Koshimizu et al. | |
| 2016/0269386 A1 | 9/2016 | Nix | |
| 2016/0294829 A1 | 10/2016 | Angus | |
| 2017/0206532 A1 | 7/2017 | Choi | |
| 2017/0373845 A1 | 12/2017 | Nix | |
| 2018/0254897 A1 | 9/2018 | Nix | |
| 2018/0262329 A1 | 9/2018 | Nix | |
| 2018/0270059 A1 | 9/2018 | Nix | |

FOREIGN PATENT DOCUMENTS

| | | |
|---|---|---|
| EP | 1981 224 | 10/2008 |
| EP | 1981224 | 10/2008 |
| KR | 1020130026352 A | 3/2013 |
| KR | 1020130026958 A | 3/2013 |
| WO | 2011-138238 A1 | 11/2011 |
| WO | 2011138238 | 11/2011 |
| WO | 2011138238 A1 | 11/2011 |
| WO | 2013027085 | 2/2013 |
| WO | 2013027085 A1 | 2/2013 |
| WO | 2013066077 | 5/2013 |
| WO | 2013066077 A1 | 5/2013 |

OTHER PUBLICATIONS

3GPP, 3rd Generation Partnership Project;Technical Specification Group Services and System Aspects; 3GPP System Architecture Evolution (SAE); Security architecture, 3GPP TS 33.401 V12.9.0 (Sep. 2013) pp. 1-75.

A. Wander et al. Energy Analysis of Public-Key Cryptography on Small Wireless Devices, Sun Microsystems Laboratories, pp. 1-16.

Appenzeller et al., Identity-Based Encryption Architecture and Suporting Data Structures RFC 5408, 2009, pp. 1-30.

Baugher et al., Group Key Management Architecture, RFC Draft, 2001, pp. 1-20.

Ben Saied, Yosra; Olivereau, Alexis; Laurent, Maryline; "A Distributed Approach for Secure M2M Communications", 5th International Conference on New Technologies, Mobility and Security (NTMS), May 7-10, 2012, pp. 1-7.

Bender et al., Evolution of SIM provisioning towards a flexible MCIM provisioning in M2M vertical industries, 16th International Conference on Intelligence in Next Generation Networks, IEEE, 2012, pp. 57-64.

Boyen et al., Anonymous Hierarchical Identity-Based Encyrption (Without Random Oracles), 2006.

Boyen et al., Identity-Based Cryptography Standard (IBCS) #1: Supersingular Curve Implementations of the BF and BB1 Cryptosystems, RFC 5091, 2007, pp. 1-63.

C. Downey, Migrating Legacy M2M Systems to the Cloud, http://www.ecnmag.com/articles/2013/02/migratingegacy-m2m-systems-cloud, Feb 2013, pp. 1-2.

Cakulev et al., "An EAP Authentication Method Based on Identity-Based Authenticated Key Exchange," Aug. 2012, pp. 1-32.

Chang-Seop Park, On Certificate-Based Security Protocols for Wireless Mobile Communication Systems, Dankook University, IEEE Network Sep./Oct. 1997, pp. 50-55.

(56) References Cited

OTHER PUBLICATIONS

Chris Foresman, Embedded SIM could caus carrier conftict for Apple, Nov. 19, 2010, pp. 1-2.
CSMG, SMG, Reprogrammable SIMs: Technology, Evolution and Implications, Sep. 25, 2012, pp. 1-95.
D. Cooper, Internet X.509 Public Key Infrastructure Certificate and Certificate Revocation List (CRL) Profile, Internet Engineering Task Force RFC 5282, pp. 1-133.
D. McGrew et al, Fundamental Elliptic Curve Cryptography Algorithms, Internet Engineering Task Force RFC 6090, Feb. 2011, pp. 1-34.
Embedded UICC Remote Provisioning Discussion, Source: Rogers Wireless, Contact: Ed O'Leary (ed_oleary@rcirogers.com), George Babut (gbabut@rcLrogers_com), 3GPP/SA3-Ll#46, Quebec City, Canada, Jul. 17-19, 2012, pp. 1-39.
ETSI, Machine-to-Machine communications (M2M), mla, dla, and mid interfaces, TS 102.921 v1.1.1 Feb. 2012, pp. 1-538.
ETSI, Smart Cards; Embedded UICC; Requirements Specification, TS 103383 vl2.1.0, Jun. 2013, pp. 1-20.
ETSI, Smart Cards; UICC-TerminalInterfaces; Physical and Logical Characteristics, TS 102 221 v11.0.0 Jun. 2012, pp. 1-181.
ETSI, UMTS;L TE; SIM/USIM Internal and ExternalInterworking Aspects, TR 131 900 v.10.0.0, May 2011, pp. 1-41.
Eun-Jun Yoon, et al., Secure Deniable Authentication Protocol Based on ElGamal Cryptography, 2008 International Conference on Information Security and Assurance, pp. 36-39.
F. Qian et al., TOP: Tail Organization Protocol for Cellular Resource Allocation, 18th IEEE International Conference on Network Protocols (ICNP), 2010, pp. 285-298.
GlobalPlatform Inc., GlobalPlatform Card Specification, Version 2.2.1, Jan. 2011, pp. 1-303.
GlobalPlatform Inc., GlobalPlatform Card Security Upgrade for Card Content Management, Card Specification v 2.2—Amendment E, Version 1.0, Nov. 2011, pp. 1-35.
Gollmann, "Authentication—Myths and Misconceptions," Progress in Computer Science and Applied Logic, vol. 20, 2001, pp. 203-225.
GSM Association, Embedded SIM Task Force Requirements and Use Cases, Version 1.0, Feb. 21, 2011, pp. 1-38.
GSMA Launches Embedded SIM Initiative to Support the Connected Future, Nov. 18, 2010, pp. 1-4.
GSMA, Fast Dormancy Best Practices Version 1.0, Jul. 27, TS.18, pp. 1-23.
Harney et al., Group Key Management Protocol (GKMP) Architecture, 1994, pp. 1-19.
Hegland et al., "A Framework for Authentication in NBD Tactical Ad Hoc Networks," IEEE Communications Magazine, Oct. 2011, pp. 64-71.
International Search Report and Written Opinion for PCT/US2014/062435 dated Feb. 6, 2015.
International Search Report for PCT/US2014/068544 dated Feb. 13, 2015.
J. Huang et al, A Close Examination of Performance and Power Characteristics of 4G LTE Networks, Mobisys' 12, Jun. 25-29, 2012, pp. 1-14.
J. Jonsson et al, Public-Key Cryptography Standards (PKCS) #1: RSA Cryptography Specifications Version 2.1, Internet Engineering Task Force RFC 3447, Feb. 2003, pp. 1-72.
Jun Shao, et al., An Improved Deniable Authentication Protocol, Department of Computer Science and Engineering, Shanghai Jiao Tong University, Shanghai 200030, People's Republic of China, pp. 1-3.
Kiltz et al., CCA2 Secure IBE: Standard Model Efficiency through Authenticated Symmetric Encryption, 2008.
Kirk H.M. Wong et al., A Dynamic User Authentication Scheme for Wireless Sensor Networks, Proceedings of the IEEE International Conference on Sensor Networks, Ubiquitous, and Trustworthy Computing (SUTC'06), pp. 1-8.
Krylov, What is Kerberos Authtentication?, 2003, pp. 1-4.
L. Larzon, The Lightweight User Datagram Protocol (UDP-Lite), Internet Engineering Task Force RFC 3828, Jul. 2004, pp. 1-12.

M. Prasad, et al., Secure Authentication Key Agreement Protocol for Long Term Evolution—Advanced, Research Scholar, Associate Professor, Department of Computer Science & Engineering, Pondicherry Engineering College, Puducherry, India, Elsevier, 2012, pp. 158-162.
Martin, Introduction to Identity-Based Encryption, ISBN-13 978-1-59693-238-8, 2008.
Merrian-Webster, Network, 2014.
N. Chu et al. EXALTED: Expanding LTE for Devices, European Commission for Information Society and Media, Oct. 31, 2012, pp. 1-141.
Nicholson et al., "Mobile Device Security Using Transient Authentication," IEEE Transactions on Mobile Computing, vol. 5, No. 11, Nov. 2006, pp. 1489-1502.
Park et al., A New Practical Identity-Based Encryption System, 2003, pp. 1-27.
Park et al., Secure Profile Provisioning Architecture for Embedded UICC, 2013 International Conference on Availability, Reliability and Security, IEEE, 2013, pp. 297-303.
Pierre E. Abi-Char, et al., A Fast and Secure Elliptic Curve Based Authenticated Key Agreement Protocol for Low Power Mobile Communications, The 2007 International Conference on Next Generation Mobile Applications, Services and Technologies (NGMAST 2007), pp. 1-6.
Pietre-Cambacedes et al., Cryptographic key management for SCADA systems—issues and perspectives, 2008 International Conference on Information Security and Assurance, IEEE, pp. 156-161.
Schwaiger et al., "Smart Card Security for Fieldbus Systems," 2003, pp. 398-406.
Search Report and Written Opinion for PCT/US2014/068544.
Shih, Jie-Ren et al., "Securing M2M with Post-Quantum Public-Key Cryptography", IEEE Journal on Emerging and Selected Topics in Circuits and Systems, Mar. 7, 2013, pp. 106-116.
Sollmann, "Authentication—Myths and Misconceptions," Progress in Computer Science and Applied Logic, vol. 20, 2001, pp. 203-225.
Kirk H.M. Wong et aL, A Dynamic User Authentication Scheme for Wireless Sensor Networks, Proceedings of the EEE International Conference on Sensor Networks, Ubiquitous, and Trustworthy Computing (SUTC'06), pp. 1-8.
Chris Foresman, Embedded SIM could caus carrier conflict for Apple, Nov. 19, 2010, pp. 1-2.
Embedded UICC Remote Provisioning Discussion, Source: Rogers Wireless, 3GPP/SA3-Ll#46, Quebec City, Canada, Jul. 17-19, 2012, pp. 1-39.
CSMG, Reprogrammable SIMs: Technology, Evolution and Implications, Sep. 25, 2012, pp. 1-95.
Voltage Security, The Identity-Based Encryption Advantage, 2015.
Yang et al., Identity-Based Key Agreement and Encyrption for Wireless Sensor Networks, IJCSNS International Journal of Computer Science and Network Security, vol. 6, No. 5B, May 2006, pp. 182-189.
Youngblood, An Introduction to Identity-based Cryptography, 2005.
Zhu et al., Public Key Cryptography for Initial Authentication in Kerberos (PPKINIT), RFC 4556, 2006, pp. 1-42.
Wikipedia, RSA (algorithm), http://en.wikipedia.org/wiki/RSA_(algorithm), Sep. 9, 2013, pp. 1-12.
Wikipedia, Elliptic Curve Cryptography, http://en.wikipedia.org/wiki/Elliptic_curve_cryptography, Sep. 9, 2013, pp. 1-8.
Wikipedia, Digital Signature, http://en.wikipedia. orglwiki/Digital_Signature, Sep. 9, 2013, pp. 1-10.
Wikipedia, Elliptic Curve Dithe-Hellman, http://en.wikipedia.org/wiki/Elliptic_curve_Dithe%E2%80%93Hellman, Sep. 24, 2013, pp. 1-2.
V. Martinez et al, A Survey of the Elliptic Curve Integrated Encryption Scheme, Journal of Computer Science and Engineering, vol. 2, Aug. 2010, pp. 7-13.
T. Pornin, Deterministic Usage of the Digital Signature Algorithm (DSA) and Elliptic Curve Digital Signature Algorithm (ECDSA), Internet Engineering Task Force RFC 6979, Aug. 2013, pp. 1-79.
Tin et al., "Provably Secure Mobile Key Exchange: Applying the Canetti-Krawczyk Approach," Information Security Research Centre, Queensland University of Technology, Australia, 2003, pp. 166-179.

(56) References Cited

OTHER PUBLICATIONS

Harald Bender, et al. "Business transformation of the provisioning process for Machine-to-Machine," 2011 15th International Conference on Intelligence in Next Generation Networks, IEEE, 2011 (Year: 2011), pp. 175-180.
ANSI X9.63 Overview, Key Agreement and Key Transport Using Elliptic Curve Cryptography, Simon Blake-Wilson, Certicom (2000).
U.S. Appl. No. 17/249,242, filed Feb. 24, 2021, Application Dispatched from Preexam.
U.S. Appl. No. 16/843,107, filed Apr. 8, 2020, Docketed for examination.
U.S. Appl. No. 16/721,153, filed Dec. 19, 2019, Final Office Action dated Apr. 15, 2021.
U.S. Appl. No. 16/593,561, filed Oct. 4, 2019, Docketed for examination.
U.S. Appl. No. 16/453,682, filed Jun. 26, 2019, Response to Non-Final Office Action filed Mar. 18, 2021.
U.S. Appl. No. 16/271.455. filed Feb. 8, 2019, U.S. Pat. No. 10,594,679.
U.S. Appl. No. 16/721,428, filed Feb. 8, 2021, U.S. Pat. No. 10,523,432.
U.S. Appl. No. 16/201,401, filed Nov. 27, 2019, U.S. Pat. No. 10,700,856.
U.S. Appl. No. 16/200,118, filed Nov. 26, 2018, U.S. Pat. No. 10,498,530.
U.S. Appl. No. 16/110,804, filed Aug. 23, 2018, U.S. Pat. No. 10,382,422.
U.S. Appl. No. 16/036,506, filed Jul. 16, 2018, U.S. Pat. No. 10,530,575.
U.S. Appl. No. 15/983,957, filed May 18, 2018, U.S. Pat. No. 10,177,911.
U.S. Appl. No. 15/973,012, filed May 7, 2018, U.S. Pat. No. 10,250,386.
U.S. Appl. No. 15/972,914, filed May 7, 2018, U.S. Pat. No. 10,652,017.
U.S. Appl. No. 15/928,848, filed Mar. 22, 2018, U.S. Pat. No. 10,084,768.
U.S. Appl. No. 15/010,905, filed Jan. 29, 2016, U.S. Pat. No. 9,641,327.
U.S. Appl. No. 15/680,758, filed Aug. 18, 2017, U.S. Pat. No. 10,187,206.
U.S. Appl. No. 15/162,292, filed May 23, 2016, U.S. Pat. No. 10,362,012.
U.S. Appl. No. 14/751,119, filed Jun. 25, 2015, U.S. Pat. No. 9,961,060.
U.S. Appl. No. 15/457,700, filed Mar. 13, 2017, U.S. Pat. No. 9,998,281.
U.S. Appl. No. 15/583,968, filed May 1, 2017, U.S. Pat. No. 10,057,059.
U.S. Appl. No. 15/043,293, filed Feb. 12, 2016, U.S. Pat. No. 9,998,280.
U.S. Appl. No. 15/642,088, filed Jul. 5, 2017, U.S. Pat. No. 10,003,461.
U.S. Appl. No. 15/130,146, filed Apr. 5, 2016, U.S. Pat. No. 9,742,562.
U.S. Appl. No. 15/162.302. filed May 23, 2016, U.S. Pat. No. 9,698,981.
U.S. Appl. No. 14/789,255, filed Jul. 1, 2015, U.S. Pat. No. 9,596,078.
U.S. Appl. No. 14/139,419, filed Dec. 23, 2013, U.S. Pat. No. 9,351,162.
U.S. Appl. No. 14/136,711, filed Dec. 20, 2013, U.S. Pat. No. 9,300,473.
U.S. Appl. No. 14/099,329, filed Dec. 6, 2013, U.S. Pat. No. 9,100,175.
U.S. Appl. No. 14/084,141, filed Nov. 19, 2013, U.S. Pat. No. 9,319,223.
U.S. Appl. No. 14/064,618, filed Oct. 28, 2013, U.S. Pat. No. 9,118,464.
U.S. Appl. No. 14/055,606, filed Oct. 16, 2013, U.S. Pat. No. 9,276,740.
U.S. Appl. No. 14/039,401, filed Sep. 27, 2013, U.S. Pat. No. 9,288,059.
U.S. Appl. No. 14/023,181, filed Sep. 10, 2013, U.S. Pat. No. 9,350,550.
AU 2019246774, filed Oct. 8, 2019, Pending.
GB 1608573, filed Oct. 27, 2014, Published on Aug. 3, 2016.
GB 2100530, filed Oct. 27, 2014, Published on May 12, 2021.
CA 2,965,119, filed Oct. 27, 2014, Published on May 7, 2015.
HK 17101082.8, filed Oct. 27, 2014, Published on Oct. 20, 2017.
EU 14868381.6, filed Dec. 4, 2014, Published on Jan. 4, 2017.
CA 2,969,829, filed Dec. 4, 2014, Published on Jun. 11, 2015.
HK 17106540.3, filed Dec. 4, 2014, Published on Jan. 19, 2018.

\* cited by examiner

Figure 1j 283 bit Elliptic Curve Key with SHA 256 Signature ( "..." is long text removed)

```
                Certificate:
                    Data:
                        Version: 3 (0x2)
                        Serial Number: 1234931064 (0x499c6c20)
                        Signature Algorithm: SHA-256 ECDSA-256.         110
                        Issuer: OU=JNIX, CN=server01
                        Validity
                            Not Before: Feb 01 20:15:24 2009 GMT
126a  ─────►        Not After : Jul 01 20:15:24 2019 GMT
                        Subject: C=US, ST=Illinois, L=Chicago, O=Module Provider, OU=1122AABBFF00
111a ─────►           CN=456
                    Subject Public Key Info:
                        Public Key Algorithm: id-ecPublicKey
                            EC Public Key:
                                pub:
                                    a7:a0:8a:0e:27:8f:8f:67:7f:05:36:0c:7e:f4:18:
 111                                ...
                                    67:60:2d:57:87:8d:cd:0b:e1:f5:3f:ac:aa:81:ea:
126a ─────►           ASN1 OID: sect283r1
                    X509v3 extensions:
                        X509v3 Subject Key Identifier:
                            8D:F4:51:AB:B9:41:1F:FC:73:B3:DB:77:45:96:15:54:1A:52:85:25
                        X509v3 Authority Key Identifier:
                            keyid:FC:99:74:45:56:10:F1:87:AD:EA:56:70:67:A2:26:0E:3D:9E:D6:66
                            DirName:/OU=JNIX/CN=server41
                            serial:49:9C:6A:ED
                        X509v3 CRL Distribution Points:
                            Full Name:
                                URI:URI:http://www.inchargesys.com/ca/crl/ics_root_ca.crl
                        X509v3 Key Usage:
                            Digital Signature
                    Signature Algorithm: ECDSA with SHA256
                        83:08:20:2a:79:e3:c3:60:b0:2f:c2:89:d4:a2:b7:57:3e:b6:
 123                    ...
                        05:ce:d3:e4:34:cf:d2:e1:e3:c3:60:b0:2f:c2:25
                -----BEGIN CERTIFICATE-----
                BggqgRzXYwzjCCAYKgAwIBAgIESZxsIDKnnjw2CwL8KJ1K
                ...
                EBAQUAMCIxDTALMIIBegwggK3Vz62JQ==
                -----END CERTIFICATE-----
```

122

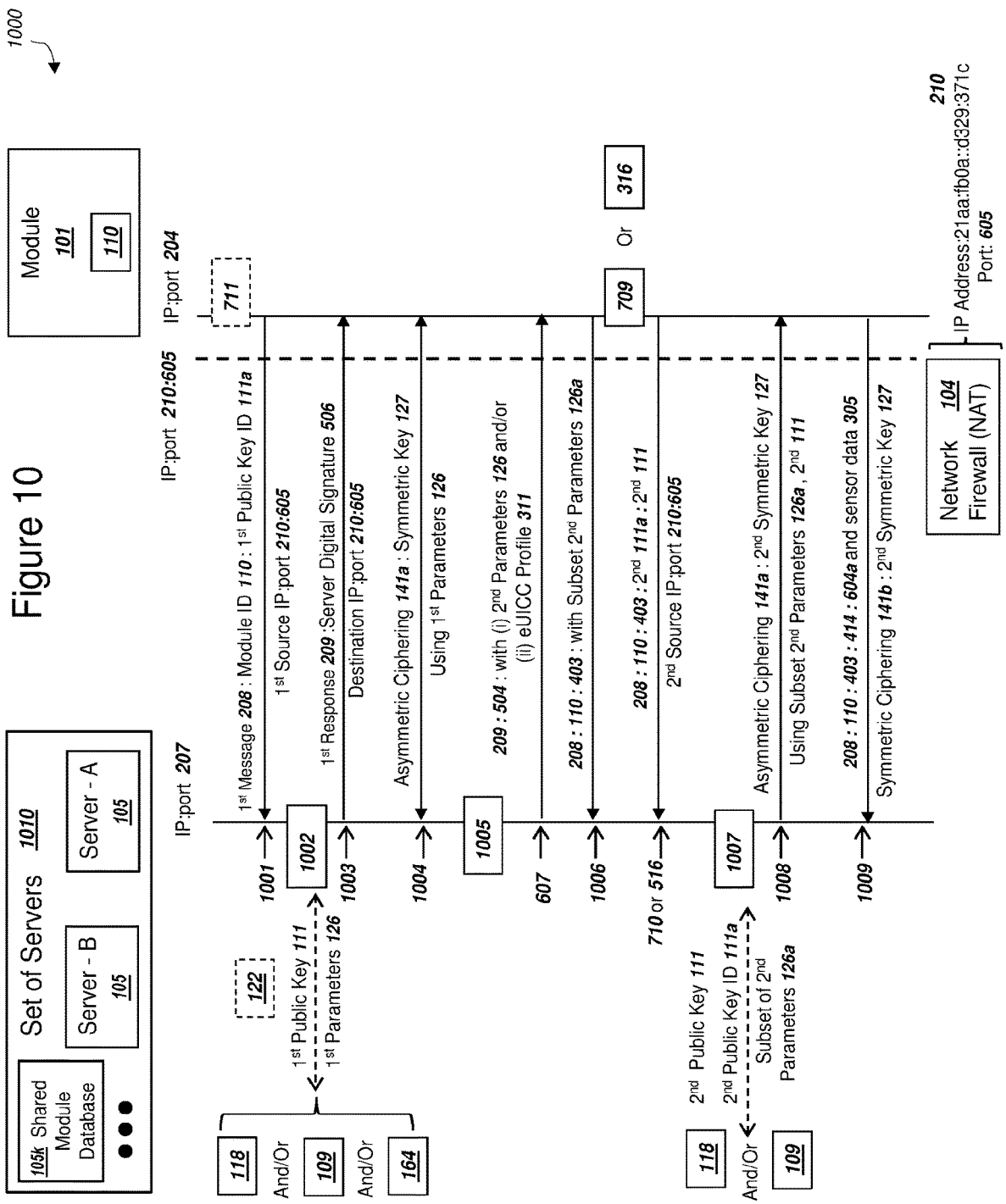

KEY DERIVATION FOR A MODULE USING AN EMBEDDED UNIVERSAL INTEGRATED CIRCUIT CARD

CROSS-REFERENCE TO RELATED APPLICATIONS

This is a continuation of U.S. patent application Ser. No. 16/201,401 filed Nov. 27, 2018, which is a continuation of U.S. patent application Ser. No. 15/680,758 filed Aug. 18, 2017, and which issued as U.S. Pat. No. 10,187,206, which is a continuation of U.S. patent application Ser. No. 15/130, 146 filed Apr. 15, 2016, and which issued as U.S. Pat. No. 9,742,562, which is a continuation of U.S. patent application Ser. No. 14/084,141 filed Nov. 19, 2013, and which issued as U.S. Pat. No. 9,319,223, each of which is fully incorporated by reference herein.

The subject matter of this application is related to the subject matter of U.S. patent application Ser. No. 14/023, 181, filed Sep. 10, 2013 in the name of John Nix, entitled "Power Management and Security for Wireless Modules in 'Machine-to-Machine' Communications," which is hereby incorporated by reference in its entirety.

The subject matter of this application is also related to the subject matter of U.S. patent application Ser. No. 14/039, 401, filed Sep. 27, 2013 in the name of John Nix, entitled "Secure PKI Communications for 'Machine-to-Machine' Modules, including Key Derivation by Modules and Authenticating Public Keys," which is hereby incorporated by reference in its entirety.

The subject matter of this application is also related to the subject matter of U.S. patent application Ser. No. 14/055, 606, filed Oct. 16, 2013 in the name of John Nix, entitled "Systems and Methods for 'Machine-to-Machine' (M2M) Communications Between Modules, Servers, and an Application using Public Key Infrastructure (PKI)," which is hereby incorporated by reference in its entirety.

The subject matter of this application is also related to the subject matter of U.S. patent application Ser. No. 14/064, 618, filed Oct. 28, 2013 in the name of John Nix, entitled "A Set of Servers for "Machine-to-Machine" Communications using Public Key Infrastructure," which is hereby incorporated by reference in its entirety.

BACKGROUND

Technical Field

The present methods and systems relate to communications for a module, and more particularly, to methods and systems for supporting an embedded universal integrated circuit card (eUICC) in a module, where the module can securely and efficiently derive keys for communicating with a server and a wireless network, including shared secret keys and key pairs for use with public key infrastructure (PKI).

Description of Related Art

The combination of "machine-to-machine" (M2M) communications and using low-cost sensors, Internet connections, and processors is a promising and growing field. Among many potential benefits, M2M technologies allow the remote monitoring and/or control of people, assets, or a location where manual monitoring is not economic, or costs can be significantly reduced by using automated monitoring as opposed to manual techniques. Prominent examples today include vending machines, automobiles, alarm systems, and remote sensors. Fast growing markets for M2M applications today include tracking devices for shipping containers or pallets, health applications such as, but not limited to, the remote monitoring of a person's glucose levels or heartbeat, monitoring of industrial equipment deployed in the field, and security systems. Many M2M applications leverage either wired Internet connections or wireless connections, and both types of connections continue to grow rapidly. M2M applications may also be referred to as "the Internet of things".

M2M communications can provide remote control over actuators that may be connected to a M2M device, such as, but not limited to, turning on or off a power switch, locking or unlocking a door, adjusting a speed of a motor, or similar remote control. A decision to change or adjust an actuator associated with an M2M device can utilize one or a series of sensor measurements. An M2M device may also be referred to as a "wireless module" or also simply a module. As one example, if a building or room is too cold, then temperature can be reported to a central server by an M2M device and the server can instruct the M2M device to turn on a switch that activates heat or adjusts a thermostat. As the costs for computer and networking hardware continue to decline, together with the growing ease of obtaining either wired or wireless Internet access for small form-factor devices, the number of economically favorable applications for M2M communications grows.

Many M2M applications can leverage wireless networking technologies. Wireless technologies such as, but not limited to, wireless local area networks and wireless wide area networks have proliferated around the world over the past 15 years, and usage of these wireless networks is also expected to continue to grow. Wireless local area network (LAN) technologies include WiFi and wireless wide area network (WAN) technologies include 3$^{rd}$ Generation Partnership Project's (3GPP) 3$^{rd}$ Generation (3G) Universal Mobile Telecommunications System (UMTS) and 4$^{th}$ Generation (4G) Long-term Evolution (LTE), LTE Advanced, and the Institute of Electrical and Electronics Engineers' (IEEE) 802.16 standard, also known as WiMax. The use of wireless technologies with "machine-to-machine" communications creates new opportunities for the deployment of M2M modules in locations less suitable for fixed-wire Internet access, but also creates a significant new class of problems that need to be solved.

One class of problems for using M2M modules with traditional wireless networks results from basic design considerations for the wireless networks, where many wireless wide-area networking standards were designed and optimized for mobile phones, including smart phones. A core element of traditional wireless WAN technologies such as 3GPP and ETSI standards over the past 20 years has included the use of a subscriber identity module (SIM) card within 2G networks and a related universal integrated circuit card (UICC) for 3G and 4G networks, including LTE networks. ETSI standards for a physical UICC as of 2013 include ETSI TR 102 216. Traditionally, these cards have been supplied by a mobile network operator (MNO) and contain a pre-shared secret key K in addition to a set of parameters for a mobile phone or user equipment to connect with the wireless network operated by the MNO. The parameters could include (i) an identity such as an IMSI, (ii) a set of frequencies for a mobile phone to scan in order to locate a beacon signal from the MNO, (iii) a preferred access list of other MNOs in order to support roaming in locations where the MM associated with the IMSI is not available, and (iv) many other related parameters as well. The physical media and cards in the form of a UICC can be appropriate or suitable for a mobile phone or mobile handset, where an end user can readily replace or "swap out" the physical card as the mobile phone changes geographical locations or due to other preferences for the subscriber or end-user. Distributors of either mobile handsets or mobile phone service can physically insert or change an appropriate UICC for the mobile phones as well.

However, the rapid growth for "machine-to-machine" applications has created significant challenges to the traditional model of utilizing physical media such as a UICC in order to provide data and parameters for a module's connectivity to a MNO. Exemplary reasons for potential difficulties with physical media such as a UICC in M2M applications include (i) the modules may be installed in remote locations that are difficult or expensive to reach after installation, such as, but not limited to, tracking devices on shipping containers that can move globally, (ii) a manufacturer or service provider may prefer for the module to be hermetically sealed for business or technical reasons, including the physical UICC may not be easily tampered with, and (iii) a module (such as a tracking device on a 40 foot shipping container) may move between several different countries, and the lowest costs for Internet or data connectivity through the wireless WAN may be through utilizing different UICC cards from different operators, but the cost of swapping the UICC card could be prohibitive.

Other needs for changing a preferred network or network credentials without physically changing a UICC exist as well. These needs have been one motivation for the industry, including ETSI and 3GPP standards bodies, to consider an embedded UICC, also known as an "eUICC". With an eUICC, the operation of an UICC can be essentially "virtualized", such that the data and algorithms within a UICC can be processed in software and distributed through electronic media (such as, but not limited to, a file transfer or file download). Exemplary benefits and technical considerations for using an eUICC in M2M applications as of November 2013 is outlined in ETSI TS 103 383 v12.1, entitled "Smart Cards; Embedded UICC; Requirements Specification," which is herein incorporated by reference in its entirety. Note that this published standard from September 2013, and the standard is primarily in the requirements definition phase, and many of the technical specifications for implementation and operation of an eUICC will be defined in the future.

Although the use of an embedded eUICC can solve many of the issues for distributing and managing physical media such as a UICC, many additional challenges remain. Many open and remaining challenges for a eUICC pertain to securely and electronically transferring a new set of MNO network access credentials (such as an IMSI and network key K) to a module in a secure and efficient manner. A need exists in the art for a module to securely obtain network access credentials. Another need exists in the art for the obtained credentials in a eUICC to be fully compatible with the significant installed and legacy base of networks that use a pre-shared secret key K, where the key K serves as the foundation for authentication and ciphering of data for a mobile phone or user equipment, including modules using conventional technology. A successful solution to these needs for M2M applications in the form of an eUICC can also provide a working solution of the needs for regular mobile phones as well, such that a consumer mobile phone could implement and utilize an eUICC in order to eliminate the costs and complexity of dealing with a physical UICC.

A need exists in the art for module and a mobile network operator to securely share a pre-shared secret key K without depending on physical distribution of the key K or electronic distribution of the key K through 3rd parties, even in an encrypted form. As currently contemplated in November of 2013 by eUICC standards discussed above, a pre-shared secret key K and related network access credentials are transmitted to a module in an encrypted form, including multiple potential layers of encryption and authentication. The pre-shared secret key K is also known as key K in 4G LTE and related networks and key Ki in 3G networks. The resulting security for the electronically transferred, pre-shared secret key K is no stronger than (i) the encryption on the channel used to transfer key K, and (ii) the security and chain of control for keys used to encrypt the communications channel transferring key K to a module or a mobile phone. The MNO using an electronically transferred key K for network access credentials is dependent on the communications channel for transferring key K, even though that communications channel may be outside the control of the MNO (such as at a time when key K is transferred using another MNO or a different network).

In addition, over an extended period of time such as several years, a mobile network operator could prefer for the key K to periodically rotate or change for an individual module or mobile phone in order to increase security. The continued and extended use of a single key K for all communications with a module or mobile phone can be a security risk, especially with a large volume of data transferred that could be subject to analysis for cryptographic weaknesses by potential attackers. Additionally, in the future a standard key length for key K may increase from today's current 128 bits to a longer key length such as an exemplary 256 bits. With conventional technology where key K is recorded in physical media such as a UICC, the only feasible way to change key K for a module or mobile phone is to physically distribute a new UICC card, with resulting costs and business complexities. A need exists in the art for a module, including a mobile phone, and a MNO to securely and efficiently support a change in network access credentials, including a key K for the module connecting to the MNO, without requiring a physical replacement of a UICC or equivalent physical media recording a key K.

And other needs exist in the art as well, as the list recited above is not meant to be exhaustive but rather illustrative.

SUMMARY

Methods and systems are provided for secure and efficient communication using a module to communicate with a server and a mobile operator network. The module can support "Machine to Machine" (M2M) communications, also known as "the Internet of things". The methods and systems contemplated herein can also support other applications as well, including mobile phone handsets connecting to a wireless network, where the wireless network can be associated with or the radio access portion of a mobile operator network. A module in the present invention can comprise a mobile phone such as a smartphone. An objective of the invention is to address the challenges noted above for securing the deployment of modules that can utilize an embedded universal integrated circuit card (eUICC) and/or also PKI algorithms and keys. The methods and systems contemplated herein can reduce the need for manual intervention with a module in order to automatically and remotely change network access credentials in order for the module to utilize new or different keys in order to connect and authenticate with a wireless network. By using an eUICC, such as an eUICC supporting the derivation of keys for secure communication of data between a module and a server, the value and usefulness of modules can be increased for a user and a mobile operator network.

Exemplary embodiments may take the form of methods and systems for a module. The module and a server associated with a wireless network or a mobile network operator can include a set of cryptographic algorithms for use in sending and receiving data. The cryptographic algorithms can include asymmetric ciphering algorithms, symmetric ciphering algorithms, secure hash algorithms, digital signature algorithms, key pair generation algorithms, a key derivation function, and a random number generator. The module can utilize a set of cryptographic parameters with the set of cryptographic algorithms. In exemplary embodiments, the module and the server can also include a shared secret algorithm and a secret ciphering algorithm.

The module can utilize the set of cryptographic algorithms and the set of cryptographic parameters to securely generate or derive module private keys and module public keys. A module private key and module public key can be generated either (i) upon manufacturing, distribution, installation, or an initial use of the module, or (ii) at subsequent times after initial use such as when a new set of key pairs are required or are useful for continued operation of the module. A module private key that is loaded into a module by a manufacturer, distributor, technician, or end user can comprise an initial module private key, and a private key that is derived by a module after installation or distribution can comprise a derived module private key. After deriving the module public key and module private key, the module private key can be preferably recorded in a nonvolatile memory within the module.

In a first embodiment, the module can connect with a wireless network operated by a module network operator. The wireless network could comprise a network based upon wireless wide area networking (WAN) standards such as a wireless network that utilizes Long-Term Evolution (LTE) standards, LTE Advanced, or related networks where authentication and encryption of data utilizes conventional technology with a pre-shared secret key K as defined in the wireless network standards. With conventional technology and these exemplary standards-based networks, the pre-shared secret key K is normally recorded in a universal integrated circuit card (UICC) that is distributed to end users for insertion into modules and mobile phones. This physical distribution of a UICC can create challenges and costs for modules supporting M2M applications. For example, with conventional technology the replacement of the UICC in order to connect with a different wireless network can be difficult or incur higher costs than the electronic generation and/or distribution of a profile for an eUICC. The profile can include data for (i) appropriate network access credentials and also (ii) network parameters for connecting a module with a wireless network associated with a mobile operator network. The MNO can process or create data or values in the profile for initial network access credentials and the network parameters. A first exemplary embodiment supports a module using a network module identity to securely change a key K used for authentication without either (i) receiving a new physical UICC or (ii) receiving a new eUICC profile.

In a first exemplary embodiment, the module can store an initial key K in at least one of a physical UICC or a "virtual" UICC in the form of an eUICC. The eUICC can record a profile with the initial key K. The module could receive the physical UICC or the profile for the eUICC with the initial key K from either (i) a manufacturer, distributor, installer, or end user, or (ii) via a network. In the case where the profile for the eUICC is received via a network (which could comprise a different wireless network than the wireless network for the module to use the eUICC profile), the network could be a prior network the module connects with before applying and using the profile for the eUICC. The profile for an eUICC can include the equivalent data that is recorded in a physical UICC, such that the eUICC operating with an activated eUICC profile can provide functionality to a module that is equivalent to a physical UICC. After recording the initial key K and related network access credentials and network parameters, the module can connect and authenticate with the wireless network using the initial key K. The authentication could comprise steps established in standards including sending a network module identity (which could be an IMSI or related identity), receiving a RAND value, inputting the RAND into the UICC or eUICC, receiving a RES value from the UICC or eUICC, and sending the RES to the wireless network.

Either before or after authentication with the wireless network using the initial key K, the module can use the set of cryptographic parameters and the set of cryptographic algorithms to derive a module private key and a module public key, which can comprise a module PKI key pair. The module PKI key pair could be processed according to a variety of cryptographic algorithms, including the use of RSA-based algorithms and elliptic curve cryptography (ECC) algorithms. In an exemplary embodiment, the module can derive the module PKI key pair with ECC algorithms in order to reduce the processing power and bandwidth required, where a similar level of security can be achieved with shorter key lengths using ECC algorithms compared to RSA algorithms. In another embodiment, RSA algorithms can be used to derive the module PKI key pair in order to support legacy software and systems that utilize RSA algorithms for public and private keys, and related cryptographic operations including signatures with the digital signature algorithm (DSA). The module can also derive a key K module token using the derived module private key. For embodiments where ECC algorithms are used to derive the module PKI key pair, the key K module token can comprise the module public key, although different values for the key K module token can be utilized as well.

Continuing with the first exemplary embodiment, after authentication with the wireless network using the initial key K, the module can send the derived key K module token to the wireless network. The module can send the key K module token to a server associated with or operated by the mobile network operator. The mobile network operator can record that the key K module token is associated with the network module identity, in order to track a plurality of modules and key K module tokens. The module can derive a secret shared network key K using a key derivation function. The key derivation function can use as input the derived module private key, the set of cryptographic parameters, and a key K network token. The key K network token and the set of cryptographic parameters for the key derivation function could be (i) recorded in the UICC or eUICC profile, or (ii) received by the module from the wireless network after connecting with the initial key K. The secret shared network key K can comprise a second key K, different than the initial key K, for the module to authenticate with the wireless network, and also encrypt/decrypt data with the wireless network. A server operated by a mobile network operator and associated with the wireless network can use the key K module token received from the module to also derive the secret shared network key K.

Continuing with the first exemplary embodiment, after both the module and the server have derived the secret shared network key K, the module can subsequently authenticate with the wireless network using the mutually derived secret shared network key K. The authentication could comprise steps established in standards, including sending the network module identity (including using the same network module identity as with initial key K, although the module could also change the network module identity), receiving a RAND value, inputting the RAND and the derived secret shared network key K into a set of cryptographic algorithms, calculating a RES value using the set of cryptographic algorithms, and sending the RES to the wireless network. Additional keys such as cipher keys, integrity keys, and symmetric ciphering keys can further be derived by both the module and the wireless network using the secret shared network key K and the RAND value. In this manner, a module and a mobile network operator can mutually derive a secret shared network key K instead of requiring the physical or electronic distribution of key K, thereby increasing security and flexibility for communications between a module and a wireless network.

A second exemplary embodiment can support a module changing a key K used to (i) authenticate with a wireless network and (i) cipher/decipher data with a wireless network. The module can change key K without requiring the manual exchange of a UICC or other physical intervention. The module can use an eUICC profile and change key K while using the same eUICC profile. The module, could also comprise a mobile phone such as, but not limited to, a smart phone. The module can include a module identity which is recorded into a read-only or protected address upon manufacturing or distribution of the module. The module can receive eUICC profiles from an eUICC subscription manager. The module can use the module identity to identify the module with the eUICC subscription manager and also an initial private key to authenticate and/or cipher data with the eUICC subscription manager. The eUICC subscription manager can use a server in order to communicate with the module. After connecting with a first network, which could comprise a first wireless WAN, wireless LAN, or wired connection, the module can receive a eUICC profile for an eUICC in the module, where the eUICC profile includes a network module identity and a first key K. The first key K can be a standards-based key K used with wireless networks, and be equivalent to a pre-shared secret key K recorded in physical UICC, and may also be similar or equivalent to an initial key K from the first exemplary embodiment outlined above.

Continuing with this second exemplary embodiment, the module can use the eUICC, the network module identity, and the first key K to authenticate with the wireless network. The authentication could comprise steps established in wireless networking standards including sending a network module identity (which could be an IMSI or related identity), receiving a RAND value, inputting the RAND into the eUICC, receiving a RES value from the eUICC (where the eUICC uses the first key K to calculate the RES), and sending the RES to the wireless network. After authenticating with the wireless network using the first key K, the module can send a key K module token to the wireless network. The key K module token can comprise a number or a string for a module network operator associated with the wireless network to utilize in a key derivation function. Data for the authentication and related steps in this second embodiment can be communicated between a module and a set of servers, where the set of servers are associated with the wireless network and mobile network operator. The wireless network can comprise the radio access portion or segment for the mobile network operator.

Continuing with this second embodiment, after authenticating with the wireless network using the first key K, the module can receive a set of cryptographic parameters. The module can use the received set of cryptographic parameters and a key derivation function in order to derive a second key K. A server associated with the mobile network operator can use the received key K module token, the set of cryptographic parameters, and the key derivation function in order to derive the same second key K. The second key K derived by the module can be recorded in the eUICC profile for the wireless network. The module can disconnect from the wireless network after attaching using the first key K, and then reconnect using the second key K which has now been mutually derived by both the module and the mobile network operator. The module can reconnect using the eUICC, the received eUICC profile, and either (i) the network module identity used with the first key K, or (ii) a second network module identity sent or received by the module after connecting with the first key K. In this manner, a module can change the key K used to authenticate and cipher/decipher data with a wireless network from a first key K to a second key K. This can increase flexibility of the system and reduce costs of physically distributing a new UICC to the module (or electronically sending new eUICC profiles) in order to change a key K. Also note that the second key K does not need to be transmitted, even in an encrypted form through third parties such as an eUICC subscription manager, and thus the security of a system using an eUICC can be increased as well.

A third exemplary embodiment can comprise a method for a module to securely and efficiently send sensor data to a server. The module can include a sensor for automatically collecting data regarding a monitored unit. The module can comprise a wireless module that connects to a wireless network, including a wireless WAN such as a public land mobile network (PLMN). The module and the network can use standards that include Internet Protocol (IP) at the network and transport layers of the open systems interconnection (OSI) stack. The module can record an initial module private key and a module identity in a non-volatile memory, and the initial module private key and module identity could be recorded by a module manufacturer, or the module identity could be recorded by a module manufacturer and a distributor or end user could record the initial module private key. An eUICC subscription manager could also provide the initial module private key. The module manufacturer, distributor, mobile network operator, and/or module provider could operate as an eUICC subscription manager. Upon connecting with a first network, the module can receive a set of cryptographic parameters and a profile for an eUICC from the eUICC subscription manager, and the module can decrypt the profile using the initial module private key.

Continuing with this third exemplary embodiment, the module can derive a module private key and a module public key using the set of cryptographic parameters and a set of cryptographic algorithms. The module can select the received eUICC profile, activate the profile, and authenticate and connect with a wireless network using the eUICC profile. The module can send a message with the derived module public key and the module identity to a server and the module can authenticate the message using the initial module private key. A server could record or have access to an initial module public key associated with the initial module private key, and the server can use the initial module public key to authenticate the message sent by the module. In this manner of a module using the initial module private key and the server using the initial module public key, the module can authoritatively send the derived module public key, such that a fraudulent or otherwise unauthorized module could not feasibly submit a public key for the module with the module identity. After sending and authenticating the derived module public key, the module can send a sensor measurement with a module identity in a message to the server, and the message could contain a module encrypted data. The module can use the derived module private key to encrypt the module encrypted data. The server can use the received, authenticated module public key to decrypt the module encrypted data. The server can record or forward the sensor data, and the module can repeat the process of collecting sensor data and using the derived module private key to send the sensor data.

In another embodiment, the module may be deployed within a wireless network such as, but not limited to, a 4G LTE network, a LTE Advanced network, or a WiFi network, and the module may comprise a wireless module. After being installed next to a monitored unit, the wireless module can (i) wake from a sleep or dormant state, (ii) utilize a sensor to collect data associated with a monitored unit, (iii) connect to the wireless network using Internet Protocol standards, and (iv) send the sensor data to a server. During an active state, the module can use a UDP IP:port number to both send a message to the server and receive a response to the server. The message as a UDP datagram can be a UDP Lite datagram and with a checksum only applied to the packet header. A UDP Lite datagram with sensor data can include channel coding for the body of the datagram to mitigate the effect of bit errors. In this embodiment, the wireless network can preferably support the UDP Lite protocol.

In exemplary embodiments, a module can use a first module private key and a server can use a first module public key to establish communication between the two nodes. The server can belong to a mobile network operator and be associated with a wireless network. The server can securely send the module a set of cryptographic parameters, where the set of cryptographic parameters includes values to define an equation for an elliptic curve. The values could comprise constants and variables such that the module can calculate an elliptic curve, and the elliptic curve can be different than standard, published curves. The set of cryptographic parameters could be sent from the server to the module in a server encrypted data, where the server encrypted data is decrypted by the module using any of (i) the first module private key, (ii) a symmetric key, and (iii) a shared secret key. The module can use the set of cryptographic parameters, a random number generator, and a key pair generation algorithm within a set of cryptographic algorithms in order to generate a new, second module key pair, which could comprise a second module public key and a second module private key. The module can securely and/or authoritatively send the second module public key to the server, where the steps to implement security for sending the second module public key can include using of the first module public key and/or the shared secret key.

In another embodiment, a module with a module identity can derive its own public and private keys after distribution of the module using a first set of cryptographic parameters. A module can send a message that includes a module identity, where the module identity can be verified using at least one of a module digital signature and a shared secret key. A set of servers can send the module with the module identity a second set of cryptographic parameters, which can be different than the first set of cryptographic parameters. Over time, the module can use at least a subset of the second set of cryptographic parameters to derive multiple pairs of module public and private keys. Over time, the module can (i) send a series of module public keys with the module identity and (ii) use a previous module public key in the series to verify and/or authenticate a message with a module public key sent by the module to the server.

In exemplary embodiments, the module can use a shared secret algorithm in order to derive a shared secret key without sending or receiving the shared secret key. A set of component parameters and an algorithm token can also be input into the shared secret algorithm. A server could record the same component parameters, the same shared secret algorithm, and also receive the algorithm token from the module. The server can derive the same shared secret key as the module. The module and the server can then use the same shared secret key as a symmetric key for symmetric ciphering algorithms, for authentication where both the module and a server mutually authenticate using a message digest and the shared secret key.

These as well as other aspects and advantages will become apparent to those of ordinary skill in the art by reading the following detailed description, with reference where appropriate to the accompanying drawings.

BRIEF DESCRIPTION OF THE DRAWINGS

Various exemplary embodiments are described herein with reference to the following drawings, wherein like numerals denote like entities.

FIG. 1*j* is an illustration of a certificate that includes a PKI public key, where the key comprises an elliptic curve cryptography (ECC) key, in accordance with exemplary embodiments;

FIG. 10 is a simplified message flow diagram illustrating an exemplary system with exemplary data transferred between a module and a set of servers, in accordance with exemplary embodiments;

DETAILED DESCRIPTION OF EXEMPLARY EMBODIMENTS OF THE INVENTION

FIG. 1*a*

Figure 1A:
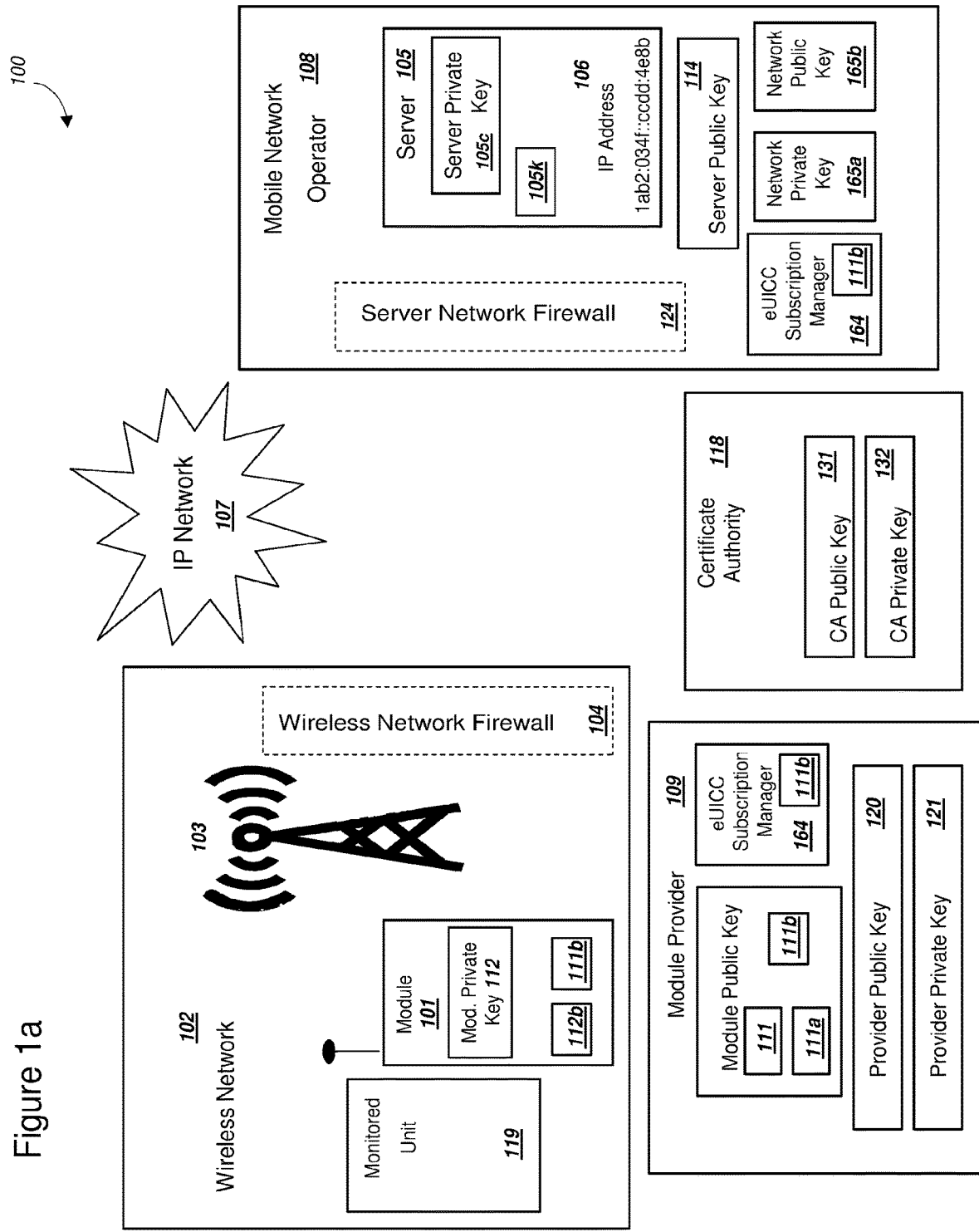
FIG. 1a is a graphical illustration of an exemplary system, where a server and a module connect using a wireless network, in accordance with exemplary embodiments.

FIG. 1*a* is a graphical illustration of an exemplary system, where a server and a module connect over a wireless network, in accordance with exemplary embodiments. The system 100 includes a module 101 operating within a wireless network 102. System 100 can also include a module provider 109, an IP Network 107, and a mobile network operator 108, a certificate authority 118, and a monitored unit 119. Mobile network operator (MNO) 108 can include a server 105. For embodiments where the MNO 108 uses 4G LTE and LTE Advanced networks, server 105 could comprise a home subscriber server (HSS). Server 105 could be a server with related functionality for a MNO 108 that uses different wireless network standards than those based on 4G LTE. System 100 is illustrated without specific packet transmissions between module 101 and mobile network operator 108. Examples of the communications and messages pertaining to the present invention will be illustrated in later Figures. As contemplated herein, machine-to-machine communications may comprise communication between a module 101 and a server 105, such that data can be transferred between the two with minimal manual intervention, although manual intervention can be required to set up system 100 and any occasional manual maintenance required. As contemplated herein, machine-to-machine communications may also be referred to as "the Internet of things" (IoT). Also note that module 101 may comprise a wireless module, such that module 101 can communicate with wireless network 102 using a radio and an antenna. A wireless or a wired configuration for module 101 can be utilized in the present invention.

If module 101 operates as a wireless module, module 101 and wireless network 102 can communicate using a base station 103. Module 101 and wireless network 102 can utilize a variety of wireless technologies to communicate, including WiFi, WiMax, a 2nd generation wireless wide area network (WAN) technology such as, but not limited to, General Packet Radio Services (GPRS) or Enhanced Data rates for GSM Evolution (EDGE), 3rd Generation Partnership Project (3GPP) technology such as, but not limited to, 3G, 4G LTE, or 4G LTE Advanced, and other examples exist as well. A wired module 101 can connect to the IP Network 107 via a wired connection such as, but not limited to, an Ethernet, a fiber optic, or a Universal Serial Bus (USB) connection (not shown).

Generally, the communication techniques described herein can be independent of the network technologies utilized at the physical and data-link layers, so long as the underlying network provides access to the IP Network 107 and supports Internet Protocols (IP). The IP Network 107 can be an IPv4 or an IPv6 packet-switched based network that utilizes standards derived from the Internet Engineering Task Force, such as, but not limited to, RFC 786 (User Datagram Protocol), RFC 793 (Transmission Control Protocol), and related protocols. The IP Network 107 can be the public Internet comprising globally routable IP addresses, or a private network that utilizes private IP addresses. IP Network 107 as illustrated in FIG. 1*a* could comprise the globally routable public Internet, or IP Network 107 could also be a private Internet that is (i) not globally routable and (ii) only accessible to authorized modules and servers. As one example of a private IP Network 107, IP Network 107 could use private IP addresses for nodes on the network, and in this case IP Network 107 could be referred to as an intranet or private network. Alternatively, IP Network 107 could be a private network layered on top of the publicly routable Internet via secured and encrypted connections. The specific numbers for IP addresses and port numbers shown in FIG. 1*a* and other figures are illustrative and any valid IP address or port number can be used, including an IPv4 and an IPv6 address. Server 105 within mobile network operator 108 can communicate with the module 101 using IP network 107, where IP network 107 can comprise a private network that utilizes Internet Protocol standards. Module 101 can access the public Internet after authenticating with the server 105 associated with the MNO 108.

When operating in a wireless network configuration, module 101 can access the IP Network 107 via the wireless network 102. In the wireless network configuration, module 101 can be a wireless handset, a cellular phone, a smartphone, a tablet computer, a laptop, a computer with a radio, a tracking device, or a circuit board with a radio that accesses wireless network 102. Examples of wireless modules that utilize a wireless WAN such as, but not limited to, 2G and 3G networking technologies include the Motorola® G24-1 and Huawei® MC323. Example manufacturers of wireless modules in 2012 include Sierra Wireless® and Telit®. Example leading manufacturers of mobile phones in 2013 include Apple® and Samsung®. In a wired configuration (not shown), module 101 can be a computer, security camera, security monitoring device, networked controller, etc. A more detailed depiction of exemplary components of a module 101 is included in FIG. 1b and FIG. 1c below. Module 101 could also comprise a "point of presence" payment terminal, such that a sensor 101f associated with module 101 could collect payment information such as, but not limited to, an account number from a credit card or similar payment card. Module 101 could communicate with the payment card via a magnetic reader or near-field wireless communications, and in this case the magnetic reader or antenna for near-field communications can function as a sensor. Module 101 could also operate as a "smartcard" such that an end user presents module 101 to merchants for payments.

Wireless network 102 may comprise either a wireless local area network (LAN) or a wireless WAN such as a public land mobile network (PLMN). Examples for technologies used in wireless LANs include an 802.11 WLAN, Bluetooth, or Zigbee among other possibilities. Module 101 operating in wireless mode could communicate with a base station 103 of a wireless network 102 using a radio and an antenna. Wireless network 102 could operate as a Mode II device according to FCC Memorandum Opinion and Order (FC-12-36) and related white space regulation documents. If module 101 supports IEEE 802.15.4, then wireless network 102 could be a Zigbee network, an ISA100.11a standards-based network, or a 6LoWPAN network as described by IETF RFC 4944. Other possibilities exist as well for the wireless technology utilized by a wireless network 102 and module 101, operating in a wireless mode, without departing from the scope of the present invention.

Module 101 can collect data regarding a monitored unit 119 and periodically report status to a mobile network operator 108 or a server 105. Examples of a monitored unit 119 can include a vending machine, an alarm system, an automobile or truck, a standard 40-foot or 20-foot shipping container, or industrial equipment such as, but not limited to, a transformer on an electrical grid or elevator in a building. Additional examples of a monitored unit 119 include can also include a pallet for shipping or receiving goods, an individual box of pharmaceuticals, a health monitoring device attached to a person such as, but not limited to, a pacemaker or glucose monitor, and a gate or door for opening and closing. Other examples exist as well without departing from the scope of the present invention. Module 101 can utilize a sensor to measure and collect data regarding a parameter of monitored unit 119 such as, but not limited to, temperature, physical location potentially including geographical coordinates from a Global Positioning System (GPS) receiver, radiation, humidity, surrounding light levels, surrounding RF signals, weight, vibration and/or shock, voltage, current, and/or similar measurements.

As illustrated in FIG. 1a, wireless network 102 may include a wireless network firewall 104 and mobile network operator 108 may include a server network firewall 124. These firewalls may be used to secure communication at the data link, network, transport, and/or application layers of communications using the IP Network 107. Firewalls 104 and 124 could perform network address translation (NAT) routing or operate as symmetric firewalls, and/or selectively filter packets received through IP Network 107 in order to secure system 100. The firewall functionality of firewalls 104 and 124 could be of many possible types, including a symmetric firewall, a network-layer firewall that filters inbound packets according to pre-determined rules, an application-layer firewall, or a NAT router, as examples. Firewalls 104 and 124 could also implement an IPSec tunnel between the two firewalls. Although a single firewall 104 and 124 is illustrated in wireless network 102 (or a wired network 102 or simply "network 102") and with mobile network operator 108, respectively, firewall 104 and 124 may each comprise multiple firewalls that operate in conjunction and the combined operation may be considered a single firewall 104 and 124, respectively.

According to a preferred exemplary embodiment, module 101 may preferably record a module private key 112. As described in additional figures below, module 112 can generate a key pair comprising a module private key 112 and a module public key 111, where module private key 112 resides within module 101 and may not be shared or transmitted to other parties. Alternatively, the present invention also contemplates that module 101 does not derive its own module private key 112, and rather module private key 112 can be securely loaded or transmitted to module 101, and in this case the loaded module private key 112 can comprise an initial module private key 112b. Module 101 may also be associated with a module provider 109. Module provider 109 could be a manufacturer or distributor of module 101, or may also be the company that installs and services module 101 or associates module 101 with monitored unit 119. Module provider 109 can record a module public key 111 and a certificate 122 (illustrated below in FIG. 1j) for module 101. Module public key 111 may be associated with a module public key identity 111a, which could be an identifier of module public key 111.

Either module provider 109 or mobile network operator 108 could function as a eUICC subscription manager 164, where an eUICC subscription manager 164 can manage the recording and secure distribution of eUICC profiles to a module 101. Other entities could operate as an eUICC subscription manager 164 as well. An eUICC subscription manager is described in ETSI TS 103 383 v12.1, entitled "Smart Cards; Embedded UICC; Requirements Specification," which is herein incorporated by reference in its entirety. An eUICC subscription manager 164 can also use a server 105 and record private keys and public keys for the server/subscription manager operation. In embodiments, eUICC subscription manager 164 can use a module public key 111 to cipher an eUICC profile (such as, but not limited to, a received eUICC profile 311 depicted and described in connection with FIG. 3b below), such that only module 101 with module public key 111 could reasonably decipher the eUICC profile. In this manner, the eUICC profile 311 can remain reasonably secured. The eUICC subscription manager 164 can use either symmetric ciphering 141b or asymmetric ciphering 141a to encrypt the eUICC profile. The module public key 111 used by an eUICC subscription manager 164 can comprise an initial module public key 111$b$, where the initial module public key 111$b$ can be derived outside module 101 and loaded into module 101. Or, the eUICC subscription manager 164 can use a module public key 111 derived by the module 101 (such that derived module public key 111 has been transferred to the eUICC subscription manager 164 in a secure and reliably manner).

In embodiments, a module 101 may utilize multiple module public keys 111 over the lifetime of module 101 (including multiple corresponding module private keys 112), and module public key identity 111$a$ can be used to select and/or identify the correct module public key 111. Module public key identity 111$a$ could be a string or sequence number uniquely associated with module public key 111 for a given module 101 (i.e. module public key identity 111$a$ does not need to be globally unique). As illustrated in FIG. 1$a$, module public key identity 111$a$ may preferably not be included in the string or number comprising module public key 111, but rather associated with the string or number comprising module public key 111, and in this case the two together (module public key identity 111$a$ and the string or number for module public key 111) can refer to module public key 111 as contemplated herein. In addition, module 101 can record an initial module private key 112$b$ and an initial module public key 111$b$. These initial keys can be different from a module private key 112 and a module public key 111 since the "initial" keys can be derived from an outside source and loaded into a module 101, and module private key 112 and module public key 111 can be derived by module 101.

The module public key 111 can optionally be signed by a certificate authority 118 in order to confirm the identity of module 101 and/or the identity of module provider 109. Module provider 109 can also function as a certificate authority 118 for module 101. Thus, the validity of module public key 111, possibly recorded in a certificate 122 (illustrated in FIG. 1$j$) could be checked with module provider 109, and the wireless module provider's 109 provider public key 120 could be checked against certificate authority 118. Other configurations for signing public keys and using certificates with public keys are possible as well without departing from the scope of the present invention.

Public keys and private keys as contemplated in the present invention, including module public key 111 and module private key 112 and additional keys described herein, may leverage established standards for Public Key Infrastructure (PKI). Public keys may be formatted according to the X.509 series of standards, such as, but not limited to, X.509 v3 certificates, and subsequent or future versions, and these keys may be considered cryptographic keys. The keys can support standards such as, but not limited to, the International Organization for Standardization (ISO) ISO/IEC 9594 series of standards (herein incorporated by reference) and the Internet Engineering Task Force (IETF) RFC 5280 titled "Internet X.509 Public Key Infrastructure Certificate and Certificate Revocation List (CRL) Profile" (herein incorporated by reference), including future updates to these standards.

Module public key 111 and module private key 112, as well as the other private and public keys described within the present invention, could be generated using standard software tools such as, but not limited to, Openssl, and other tools to generate public and private keys exist as well. Public and private keys as contemplated herein could be recorded in a file such as, but not limited to, a *.pem file (Privacy-enhanced Electronic Mail), a file formatted according to Basic Encoding Rules (BER), Canonical Encoding Rules (CER), or Distinguished Encoding Rules (DER), or as text or binary file. Other formats for public and private keys may be utilized as well, including proprietary formats, without departing from the scope of the present invention. As contemplated herein, a key may also comprise a public key, a private key, or a shared key including a secret shared key. A public key as contemplated herein may also be considered a certificate or a public certificate. A private key as contemplated herein may also be considered a secret key.

Server 105 can include a module database 105$k$, and server 105 will also be described in additional detail below in FIG. 1$k$ and FIG. 1$m$. Server 105 can operate as an HSS in 4G LTE networks, including recording network access credentials 314 (described in FIG. 3$b$ below) for a plurality of modules 101 in a module database 105$k$. Server 105 could be a plurality of individual computers operating in a coordinated manner through a network in order to function as a server 105. Server 105 can include a server public key 114 and a server private key 105$c$. Mobile network operator 108 can also include a network private key 165$a$ and a network public key 165$b$. Additional details regarding the various public and private keys illustrated in FIG. 1$a$ will be provided in Figures below.

Other configurations besides the one illustrated in FIG. 1$a$ are possible as well. Wireless network 102 could be included in mobile network operator 108. In many common commercial relationships for the operation of mobile phone service in the United States in 2013, wireless network 102 could represent a portion of the radio access network used by a mobile network operator 108. MNO 108 could outsource the operation and maintenance of a radio access network, such as a wireless network 102, to $3^{rd}$ parties. In this configuration, wireless network 102 could represent a network operated by a first company specializing in the operation of radio towers and BTS equipment. This first company could be contracted with the mobile network operator 108 in order to support mobile phone service or data services to modules 101.

In addition, server 105 could reside within wireless network 102 in a data center managed by wireless network 102. Wireless network 102 could also operate as a module provider 109. Although a single module 101, server 105, wireless network 102, and mobile network operator 108 are illustrated in FIG. 1$a$, system 100 could comprise a plurality of each of these elements. Module 101 could also record sensor data pertaining to a plurality of monitored units 119. Module 101 could be mobile, such as physically attached to a truck or a pallet, and module 101 could connect to a series of different wireless networks 102 or base stations 103 as module 101 moves geographically. Other configurations are possible as well for the elements illustrated in FIG. 1$a$ without departing from the scope of the present invention.

FIG. 1$b$

FIG. 1$b$ is a graphical illustration of hardware, firmware, and software components for a module, in accordance with exemplary embodiments. FIG. 1$b$ is illustrated to include many components that can be common within a module 101, and module 101 may also operate in a wireless configuration in order to connect with a wireless network 102. Module 101 may consist of multiple components in order to collect sensor data or control an actuator associated with a monitored unit 119. In a wireless configuration, the physical interface 101$a$ of module 101 may support radio-frequency (RF) communications with networks including a wireless network 102 via standards such as, but not limited to, GSM, UMTS, mobile WiMax, CDMA, LTE, LTE Advanced, and/ or other mobile-network technologies. In a wireless configuration, the physical interface 101a may also provide connectivity to local networks such as, but not limited to, 802.11 WLAN, Bluetooth, or Zigbee among other possibilities. In a wireless configuration, module 101 could use a physical interface 101a be connected with both a wireless WAN and wireless LAN simultaneously. In a wired configuration, the physical interface 101a can provide connectivity to a wired network such as, but not limited to, through an Ethernet connection or USB connection.

The physical interface 101a can include associated hardware to provide the connections such as, but not limited to, radio-frequency (RF) chipsets, a power amplifier, an antenna, cable connectors, etc., and additional exemplary details regarding these components are described below in FIG. 1c. Device driver 101g can communicate with the physical interfaces 101a, providing hardware access to higher-level functions on module 101. Device drivers 101g may also be embedded into hardware or combined with the physical interfaces. Module 101 may preferably include an operating system 101h to manage device drivers 101g and hardware resources within module 101. The operating systems described herein can also manage other resources such as, but not limited to, memory and may support multiple software programs operating on module 101 or server 105, respectively, at the same time. The operating system 101h can include Internet protocol stacks such as, but not limited to, a User Datagram Protocol (UDP) stack, Transmission Control Protocol (TCP) stack, a domain name system (DNS) stack, etc., and the operating system 101h may include timers and schedulers for managing the access of software to hardware resources. The operating system shown of 101h can be appropriate for a low-power device with limited memory and CPU resources (compared to a server 105). An example operating system 101h for module 101 includes Linux, Android® from Google®, Windows® Mobile, or Open AT® from Sierra Wireless®. Additional example operating systems 101h for module 101 include eCos, uC/OS, LiteOs, and Contiki, and other possibilities exist as well without departing from the scope of the present invention.

A module program 101i may be an application programmed in a language such as, but not limited to, C, C++, Java, and/or Python, and could provide functionality to support M2M applications such as, but not limited to, remote monitoring of sensors and remote activation of actuators. Module program 101i could also be a software routine, subroutine, linked library, or software module, according to one preferred embodiment. As contemplated herein, a module program 101i may be an application operating within a smartphone, such as, but not limited to, an iPhone® or Android®-based smartphone, and in this case module 101 could comprise the smartphone. The application functioning as a module program 101i could be downloaded from an "app store" associated with the smartphone. Module program 101i can include data reporting steps 101x, which can provide the functionality or CPU 101b instructions for collecting sensor data, sending messages to server 105, and receiving responses from server 105, as described in the present invention.

Many of the logical steps for operation of module 101 can be performed in software and hardware by various combinations of sensor 101f, actuator 101y, physical interface 101a, device driver 101g, operating system 101h, module program 101i, and data reporting steps 101x. When module 101 is described herein as performing various actions such as acquiring an IP address, connecting to the wireless network, monitoring a port, transmitting a packet, sending a message, receiving a response, or encrypting or signing data, specifying herein that module 101 performs an action can refer to software, hardware, and/or firmware operating within module 101 illustrated in FIG. 1b or FIG. 1c performing the action. Note that module 101 may also optionally include user interface 101j which may include one or more devices for receiving inputs and/or one or more devices for conveying outputs. User interfaces are known in the art and generally are simple for modules such as, but not limited to, a few LED lights or LCD display, and thus user interfaces are not described in detail here. User interface 101j could comprise a touch screen if module 101 operates as a smartphone or mobile phone. As illustrated in FIG. 1b, module 101 can optionally omit a user interface 101j, since no user input may be required for many M2M applications, although a user interface 101j could be included with module 101.

Module 101 may be a computing device that includes computer components for the purposes of collecting data from a sensor 101f or triggering an action by an actuator 101y. Module 101 may include a central processing unit (CPU) 101b, a random access memory (RAM) 101e, and a system bus 101d that couples various system components including the random access memory 101e to the processing unit 101b. The system bus 101d may be any of several types of bus structures including a memory bus or memory controller, a peripheral bus, and a local bus using any of a variety of bus architectures including a data bus. Note that the computer components illustrated for the module 101 in FIG. 1b may be selected in order to minimize power consumption and thereby maximize battery life, if module 101 includes a battery and is not attached to external power. In addition, the computer components illustrated for the module 101 in FIG. 1b may also be selected in order to optimize the system for both long periods of sleep or idle states relative to active communications and also may be optimized for predominantly uplink (i.e. device to network) communications with small packets or messages. The computer components illustrated for the module 101 in FIG. 1b may also be general-purpose computing components, and specialized components are not required in order to utilize many of the embodiments contemplated herein.

Module 101 may include a read-only memory (ROM) 101c which can contain a boot loader program. Although ROM 101c is illustrated as "read-only memory", ROM 101c could comprise long-term memory storage chipsets or physical units that are designed for writing once and reading many times. As contemplated within the present invention, a read-only address could comprise a ROM 101c memory address or another hardware address for read-only operations accessible via bus 101d. Changing data recorded in a ROM 101c can require a technician have physical access to module 101, such as, but not limited to, removing a cover or part of an enclosure, where the technician can subsequently connect equipment to a circuit board in module 101, including replacing ROM 101c. ROM 101c could also comprise a nonvolatile memory, such that data is stored within ROM 101c even if no electrical power is provided to ROM 101c. Although not illustrated in FIG. 1b, but illustrated in FIG. 1c below, module 101 could also include a flash memory 101w. Module program 101i, data reporting steps 101x, operating system 101h, or device driver 101g could be stored in flash memory 101w within module 101 when the module is powered off. These components and/or instructions could be moved from a flash memory 101w (not shown in FIG. 1b but shown in FIG. 1c) into RAM 101e when the module is powered on. Note that ROM 101c could be optionally omitted or included in a memory unit within CPU 101b (not shown).

Although the exemplary environment described herein employs ROM 101c and RANI 101e, it should be appreciated by those skilled in the art that other types of computer readable media which can store data that is accessible by a module 101, such as, but not limited to, memory cards, subscriber identity module (SIM) cards, local miniaturized hard disks, and the like, may also be used in the exemplary operating environment without departing from the scope of the invention. The memory and associated hardware illustrated in FIG. 1b provide nonvolatile storage of computer-executable instructions, data structures, program modules, module program 101i, and other data for computer or module 101. Note the module 101 may include a physical data connection at the physical interface 101a such as, but not limited to, a miniaturized universal serial bus adapter 101v (illustrated in FIG. 1c), firewire, optical, or other another port. The computer executable instructions such as, but not limited to, module program 101i, data reporting steps 101x, operating system 101h, or device driver 101g can be initially loaded into memory such as, but not limited to, ROM 101c or RAM 101e through the physical interface 101a before module 101 is given to an end user, shipped by a manufacturer to a distribution channel, or installed by a technician. In addition, the computer executable instructions such as, but not limited to, module program 101i, data reporting steps 101x, operating system 101h or device driver 101g could be transferred wirelessly to module 101. In either case (wired or wireless transfer of computer executable instructions), the computer executable instructions such as module program 101i, data reporting steps 101x, operating system 101h, or device driver 101g could be stored remotely on a disk drive, solid state drive, or optical disk (external drives not shown).

A number of program modules may be stored in RAM 101e, ROM 101c, or possibly within CPU 101b, including an operating system 101h, device driver 101g, an http client (not shown), a DNS client, and related software. Further, the module program 101i and/or data reporting steps 101x can perform the various actions described in the present invention for the module 101 through instructions module program 101i and/or data reporting steps 101x provide to the CPU 101b. A user may enter commands and information into module 101 through an optional user interface 101j, such as a keypad, keyboard (possibly miniaturized for a mobile phone form-factor), and a pointing device. Pointing devices may include a trackball, an electronic pen, or a touch screen. A user interface 101j illustrated in FIG. 1b can also comprise the description of a user interface 101j within U.S. patent application Ser. No. 14/039,401, filed Sep. 27, 2013 in the name of John Nix, which is herein incorporated in its entirety.

The module 101, comprising a computer, may operate in a networked environment using logical connections to one or more remote computers, such as the server 105 illustrated in FIG. 1a. Server 105 can also function as a general purpose server to provide files, programs, disk storage, remote memory, and other resources to module 101 usually through a networked connection. Additional details regarding server 105 are provided in FIG. 1k and FIG. 1m below. Additional remote computers with which module 101 communicates may include another module 101 or mobile device, an M2M node within a capillary network, a personal computer, other servers, a client, a router, a network PC, a peer device, a base station 103, or other common network node. It will be appreciated that the network connections shown throughout the present invention are exemplary and other means of establishing a wireless or wired communications link may be used between mobile devices, computers, servers, corresponding nodes, and similar computers.

The module program 101i and data reporting steps 101x operating within module 101 illustrated in FIG. 1b can provide computer executable instructions to hardware such as CPU 101b through a system bus 101d in order for a module 101 to (i) collect data from a sensor, (ii) change the state of an actuator 101y, and (iii) send or receive packets with a server 105, thus allowing server 105 to remotely monitor or control a monitored unit 119. The module program 101i and/or data reporting steps 101x can enable the module 101 to transmit or send data from sensor 101f or module 101 by recording data in memory such as RAM 101e, where the data can include sensor data, a destination IP:port number, a packet or packet header value, an encryption or ciphering algorithm and key, a digital signature algorithm and key, etc. The data recorded in RAM 101e can be subsequently read by the operating system 101h or the device driver 101g. The operating system 101h or the device driver 101g can write the data to a physical interface 101a using a system bus 101d in order to use a physical interface 101a to send data to a server 105 using the IP Network 107. Alternatively, the module program 101i and/or data reporting steps 101x can write the data directly to the physical interface 101a using the system bus 101d.

The module program 101i and/or data reporting steps 101x, or operating system 101h can include steps to process the data recorded in memory such as, but not limited to, encrypting data, selecting a destination address, or encoding sensor data acquired by (i) a sensor 101f or (ii) through a physical interface 101a such as, but not limited to, a thermocouple, shock or vibration sensor, light sensor, or global positioning system (GPS) receiver, etc. The module 101 can use the physical interface 101a such as, but not limited to, a radio to transmit or send the data from a sensor to a base station 103. For those skilled in the art, other steps are possible as well for a module program 101i or operating system 101h to collect data from a sensor 101f and send the data in a packet without departing from the scope of the present invention.

Conversely, in order for module 101 to receive a packet or response from server 105, the physical interface 101a can use a radio to receive data from a base station 103. The received data can include information from a server 105 and may comprise a datagram, a source IP:port number, a packet or header value, an instruction for module 101, an acknowledgement to a packet that module 101 sent, a digital signature, and/or encrypted data. The operating system 101h or device driver 101g can use a system bus 101d and CPU 101b to record the received data in memory such as RAM 101e, and the module program 101i or operating system 101h may access the memory in order to process the received data and determine the next step for the module 101 after receiving the data. The steps within this paragraph may also describe the steps a module program 101i or data reporting steps 101x can perform in order to receive a packet or a response 209 below. For those skilled in the art, other steps are possible as well for a module program 101i, data reporting steps 101x, or module 101 to receive a packet or response from a server 105 within the scope of the present invention.

Moreover, those skilled in the art will appreciate that the present invention may be implemented in other computer system configurations, including hand-held devices, netbooks, portable computers, multiprocessor systems, microprocessor based or programmable consumer electronics, network personal computers, minicomputers, mainframe computers, and the like. The invention may also be practiced in distributed computing environments, where tasks are performed by remote processing devices that are linked through a communications network. In a distributed computing environment, program modules may be located in both local and remote memory storage devices. In addition, the terms "mobile node", "mobile station", "mobile device", "M2M module", "M2M device", "networked sensor", or "industrial controller" can be used to refer to module 101 or its functional capabilities of (i) collecting sensor data regarding a monitored unit 119, (ii) changing state of an actuator 101y associated with monitored unit 119, and/or (iii) communicating the data associated with a monitored unit 119 with a wireless network 102. The function of module 101 and sensor 101f could be integrated, and in this case module 101 could also be referred to as a "sensor", "intelligent sensor", or "networked sensor". Further, the term "module" or "monitoring device" can be used to refer to the module program 101i when module program 101i provides functional capabilities such as reporting data from a sensor 101f to a server 105 or receiving instructions for an actuator 101y from a server 105. Other possibilities exist as well for the configuration or combination of components illustrated in FIG. 1b without departing from the scope of the present invention.

FIG. 1c

Figure 1C:
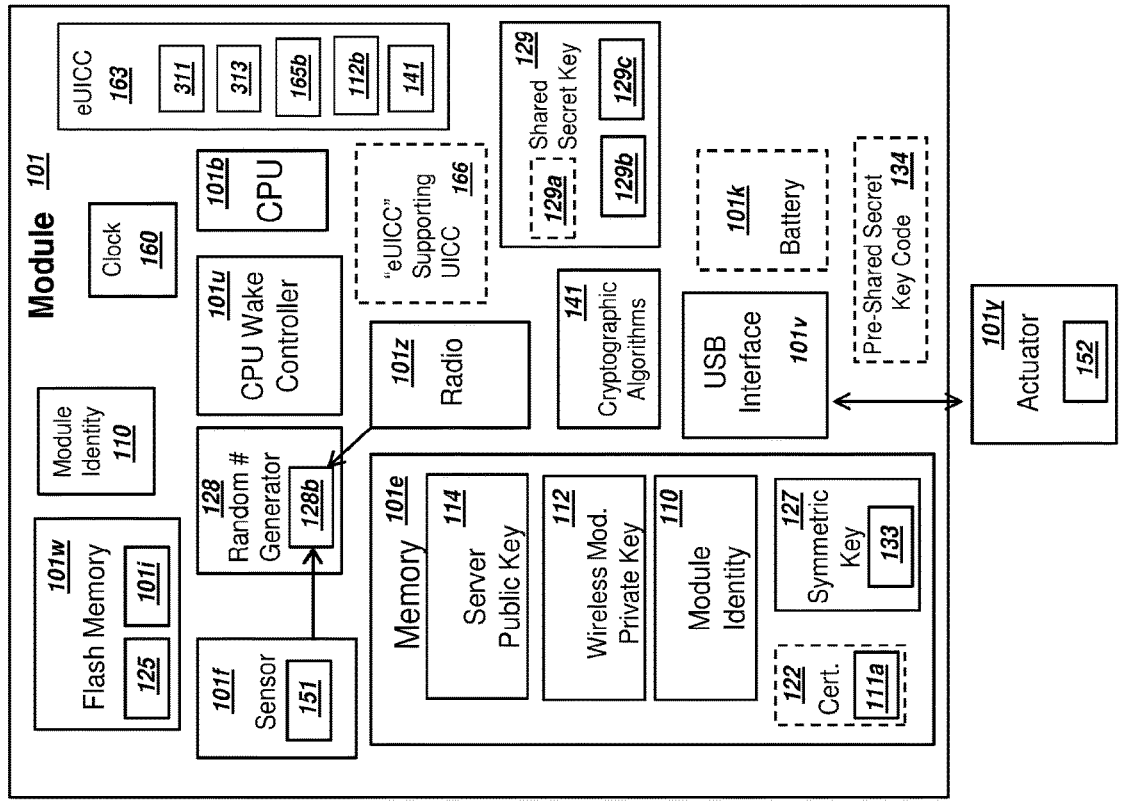
FIG. 1c is a graphical illustration of components within a module, in accordance with exemplary embodiments.
Figure 1B:
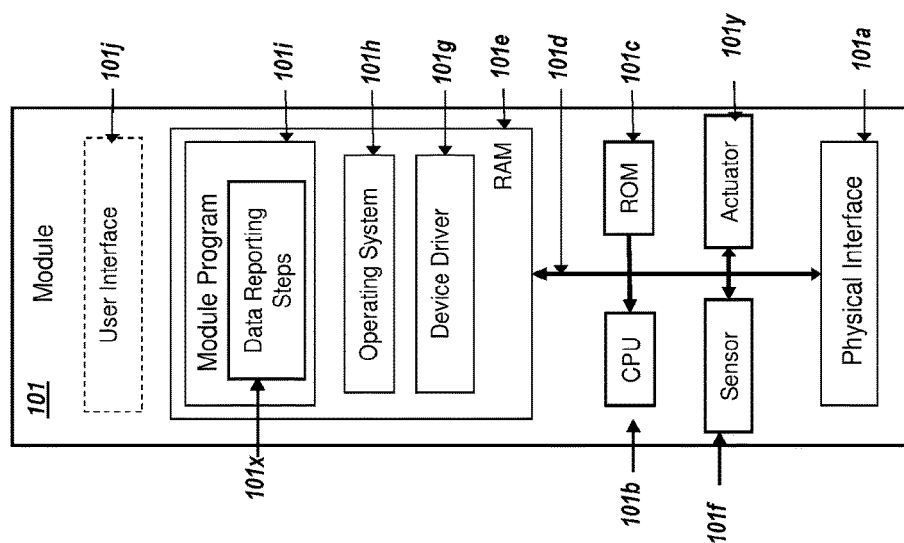
FIG. 1b is a graphical illustration of hardware, firmware, and software components for a module, in accordance with exemplary embodiments.

FIG. 1c is a graphical illustration of components within a module, in accordance with exemplary embodiments. FIG. 1c is illustrated to show a combination of components useful for leveraging the efficient and secure communication techniques described in the present invention. In addition to the components illustrated in FIG. 1b above, module 101 can include a an eUICC 163, a battery 101k, a server public key 114, a wireless module private key 112, a connection to an actuator 101y, a USB interface 101v, a CPU wake controller 101u, a flash memory 101w, a symmetric key 127, a pre-shared secret key 129, a random number generator 128, cryptographic algorithms 141, a radio 101z, and other components illustrated in FIG. 1c. Not all of the components illustrated in FIG. 1c are required for many exemplary embodiments, and some of the components illustrated in FIG. 1c may also be optionally omitted in some exemplary embodiments.

The CPU 101b can comprise a general purpose processor appropriate for the low power consumption requirements of a module 101, and may also function as a microcontroller. A CPU 101b and a CPU wake controller 101u are depicted and described in connection with FIG. 1b of U.S. patent application Ser. No. 14/055,606, filed Oct. 16, 2013 in the name of John Nix, entitled "Systems and Methods for 'Machine-to-Machine' (M2M) Communications Between Modules, Servers, and an Application using Public Key Infrastructure (PKI)," which is hereby incorporated by reference in its entirety. Clock 160 can comprise a crystal oscillator generating sine or square wave outputs at a frequency to drive a system bus 101d, CPU 101b, and RAM 101e, in addition to other functionality. In exemplary embodiments, clock 160 can comprise a temperature-compensated crystal oscillator (TCXO), a voltage-controlled crystal oscillator (VCXO), or a voltage-controlled temperature-compensated crystal oscillator (VCTCXO), and other possibilities exist as well. Clock 160 could include circuits and logic to keep time while module 101 is both in an active state and a dormant state.

An eUICC 163 within module 101 can comprise an embedded universal integrated circuit card 163. An eUICC 163 can provide the equivalent functionality as physical UICC, where definitions for a physical UICC are included in ETSI TR 102 216 and ETSI TS 102 221 V11.0.0. An eUICC 163 in FIG. 1c can support exemplary requirements for an eUICC outlined in ETSI TS 103 383 v12.2, entitled "Smart Cards; Embedded UICC; Requirements Specification," which is herein incorporated by reference in its entirety. An eUICC 163 as illustrated in FIG. 1c can be implemented within module 101 in several different ways, including (i) as a module program 101i recorded in a nonvolatile memory, such as, but not limited to, either flash memory 101w or ROM 101c, (ii) firmware within CPU 101b or another specialized processing unit within module 101, (iii) a physical UICC within module 101 that contains the eUICC 163, or (iv) a specialized circuit within a surface mount package that is soldered directly onto a circuit board of the module 101, including an 8-lead small outline non-leaded (SON-8) package. For the embodiment where an eUICC 163 comprises a module program 101i, the eUICC 163 could be loaded and installed within nonvolatile memory 101w in module 101 using the steps and procedures described for a module program 101i in FIG. 1b. Other possibilities exist as well for the physical implementation of an eUICC 163 within a module 101 without departing from the scope of the present invention. An eUICC 163 may also be referred to as an "electronic UICC", an "electronic SIM" (eSIM), or an "embedded SIM" (also eSIM).

For embodiments where an eUICC 163 can be loaded into a RAM 101e or flash 101w memory, a CPU 101b could designate the RAM 101e or flash 101w memory containing the instructions and data for an eUICC 163 to be a protected memory. When (i) loaded with appropriate data (such as, but not limited to an activated eUICC profile 313 described in FIG. 3b below), and (ii) a profile for a MNO 108 is selected and activated, then an eUICC 163 can provide the equivalent functionality of a physical UICC. The eUICC 163, using an activated eUICC profile 313, can provide the module 101 with (i) network access credentials 314, and (ii) network parameters 310 in order to connect with wireless network 102. The eUICC 163, using an activated eUICC profile 313, can record a secret shared network key K (described in FIGS. 9b and 11 below and related Figures) and also a network module identity 110b (described in FIG. 3b below and related Figures). The eUICC 163 can support standard steps by module 101 for network authentication contemplated in 3GPP TS 33.401 V12.9.0 and related standards, including inputting a RAND 912 (depicted and described in FIG. 9b) and outputting an RES 913 (also depicted and described in FIG. 9b).

According to an exemplary embodiment, an eUICC 163 can be recorded and operate within a "eUICC supporting" physical universal integrated circuit card (UICC) 166 within module 101. This "eUICC supporting", physical UICC 166 can include a processing unit, RAM memory, ROM memory, EEPROM memory, a bus, and a physical interface in order to support a profile activation 316 of multiple different received eUICC profiles 311 (where profile activation 316 and profile 311 are in FIG. 3b below). The processing unit, RAM memory, ROM memory, EEPROM memory, and bus in an "eUICC supporting" UICC 166 could comprise smaller versions with similar or equivalent functionality of the CPU 101b, RAM 101e, ROM 101c, flash memory 101w, and bus 101d, respectively, depicted and described in FIG. 1b below for a module 101. In other words, a module 101 could include a connection and slot for a physical UICC card, and (i) a manufacturer, distributor, or end user could load an "eUICC supporting" UICC 166 into the slot, and (ii) the eUICC 163 could operate on the physical UICC.

The physical form-factor for an "eUICC supporting" UICC 166 could be identical to a UICC, and a difference between the two may not even be apparent upon visual inspection without special markings on the card. The physical form-factor for an "eUICC supporting" UICC 166 could comprise a "micro-SIM" or a "nano-SIM" as defined in ETSI TS 102 221 V11.0.0, which is herein incorporated by reference. When the module 101 detects a "eUICC supporting" UICC 166, the module 101 could send received eUICC profiles 311 to the "eUICC supporting" UICC 166, and also select, deselect, activate, and deactivate the different received eUICC provides 311 recorded in the "eUICC supporting" UICC 166. When a module 101 detects that a regular UICC (i.e. not an "eUICC supporting" UICC 166) has been loaded into a slot for UICCs, the module 101 could access the UICC in a regular manner implemented by mobile phones and modules for connecting to existing wireless networks in 2013, such as LTE or 3G networks.

Figure 3B:
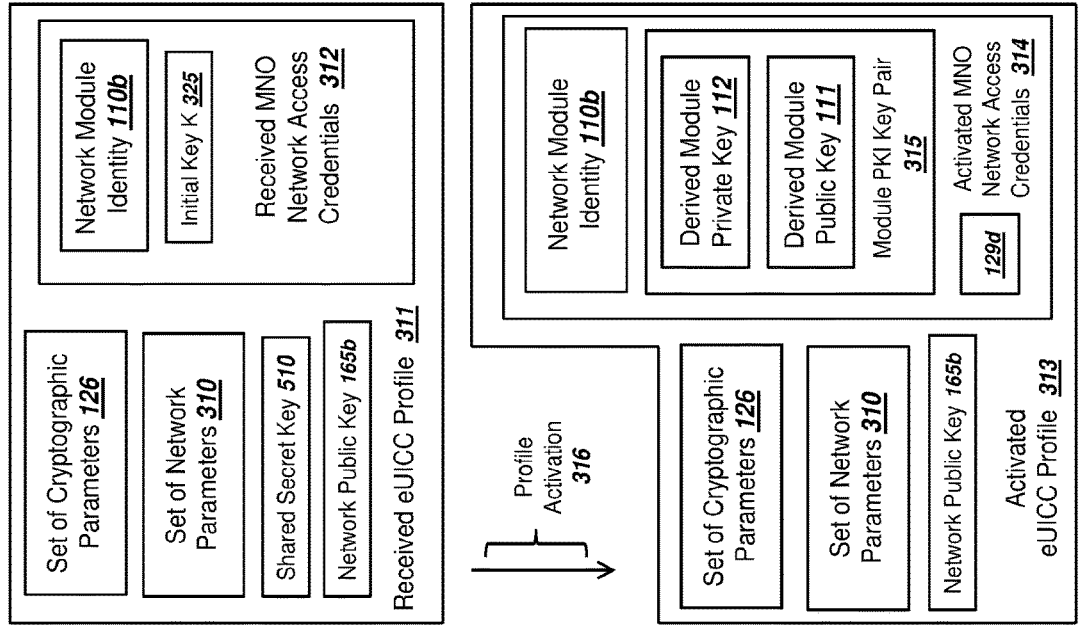
FIG. 3*b* is a graphical illustration of components within a received profile and an activated profile for an embedded universal integrated circuit card (eUICC), in accordance with exemplary embodiments.

In addition to recording a received profile 311 and an activated profile 313, an eUICC 163 can record an initial module private key 112*b* and a network public key 165*b*. An eUICC 163 can also record a plurality of received eUICC profiles 311. As illustrated in FIG. 3*b* below, the network public key 165*b* could be recorded in the received eUICC profile 311, where different profiles 311 and different network public keys 165*b* can be associated with different wireless networks 102. The initial module private key 112*b* can be associated with an initial module public key 111*b*, as illustrated in FIG. 1*a* above. An eUICC subscription manager 164 could use the initial module public key 111*b* to encrypt the eUICC profile 311, and a module 101 could use the initial module private key 112*b* to decrypt the eUICC profile received from the subscription manager 164. The eUICC subscription manager 164, assuming the eUICC subscription manager 164 is associated with MNO 108, could sign the eUICC profile 311 using the network private key 165*a* (such as creating a server digital signature 506 as described in FIG. 5*a* below), and module 101 could verify the server digital signature 506 with the network public key 165*b*. The network public key 165*b* could be recorded in either (i) the eUICC 163 directly, and/or (ii) within the profile 311. In either case, the initial module private key 112*b*, initial module public key 111*b*, an network PKI keys 165*a* and 165*b* (as illustrated in FIG. 1*a*) can be useful for module 101 to authoritatively and securely receive eUICC profiles 311.

Sensor 101*f* could be a device to collect environmental data or data regarding a monitored unit 119. Sensor 101*f* could collect data such as, but not limited to, temperature, humidity, pressure, visible light levels, radiation, shock and/or vibration, voltage, current, weight, pH levels, orientation/motion, or the presence of specific chemicals. Sensor 101*f* could also be a microphone. Sensor 101*f* could be a magnetic strip reader for credit cards and similar cards, or an antenna for either near-field RF communications, such as, but not limited to, reading an RF identity tag. An antenna for a sensor 101*f* could also collect longer-range RF signals, such as, but not limited to, reading long-range radio frequency identity tags. Sensor 101*f* could also collect biometric data such as, but not limited to, heart rate, glucose levels, body temperature, or other health measurements and in this case monitored unit 119 could be a person. The sensor 101*f* can provide data to the CPU 101*b* in the form of analog or digital data, which can be communicated via a system bus 101*d* or physical interface 101*a* and other electrical interfaces are possible as well. A sensor measurement can comprise the analog or digital data collected by CPU 101*b* from sensor 101*f*. A sensor measurement can include processing of the analog or digital data input CPU 101*b* by sensor 101*f*, such as, but not limited to, averaging over time, using mathematic formulas to convert the raw data from sensor 101*f* into a usable form. Module 101 may also collect sensor data or sensor values using a sensor 101*f* and CPU 101*b*, where the data or values are derived from electrical signals output by a sensor 101*f*. A sensor measurement can comprise the sensor data or sensor values. If module 101 comprises a "point of presence" payment terminal, then a sensor measurement could comprise data read from a payment card.

As contemplated herein, the terms "sensor measurement" and "sensor data" can be used interchangeably, and can also be considered functionally equivalent. Although a single sensor 101*f* is shown in FIG. 1*c*, a module 101 could include multiple sensors. Each of the multiple sensors 101*f* could include a sensor identity 151, which could comprise a number or string to identify the sensor 101*f*. A sensor 101*f* could be external to module 101, and also a plurality of sensors 101*f* may be used and they also can connect to module 101 when module 101 uses radio 101*z* as a base station for a WiFi network. An exemplary embodiment where sensor 101*f* connects to module 101 using a radio 101*z* is also depicted and described in connection with FIG. 1*e* of U.S. patent application Ser. No. 14/055,606, filed Oct. 16, 2013 in the name of John Nix, which is hereby incorporated by reference in its entirety.

Actuator 101*y* could be a device to control a parameter or state for a monitored unit 119, such as, but not limited to, changing a voltage or current, activating a switch or relay, turning on or off a microphone or speaker, activating or deactivating a light, and other examples are well known in the art. Actuator 101*y* could also be a speaker. Actuator 101*y* could be controlled by module 101 via a digital or analog output from CPU 101*b*, which could also be transmitted or sent via system bus 101*d* or a physical interface 101*a*. Although actuator 101*y* is illustrated as external to wireless module 101 in FIG. 1*c*, actuator 101*y* could also be internal to module 101, and module 101 could include multiple actuators 101*y*. The use of multiple actuators 101*y* each with an actuator identity 152 is also depicted and described in connection with FIG. 1*e* of U.S. patent application Ser. No. 14/055,606, filed Oct. 16, 2013 in the name of John Nix, which is hereby incorporated by reference in its entirety. Sensors and actuators are well known to those of ordinary skill in the art, and thus are not described in additional detail herein.

Module 101 can include a Universal Serial Bus (USB) interface 101*v*. In accordance with an exemplary embodiment, module 101 can comprise a wireless module and include a radio 101*z*. Note that the use of a radio 101*z* is not required for module 101, which could also obtain a connection to the IP Network 107 via a wired line such as Ethernet. Although not illustrated, radio 101*z* could include antennas for reception and transmission of RF signals, and even multiple antennas could be used. Although a single radio 101*z* is illustrated in module 101, module 101 could also contain multiple radios 101*z*. Radio 101*z* can support wireless LAN standards such as, but not limited to, WiFi, Bluetooth, and Zigbee, or similar wireless LAN standards. Radio 101*z* illustrated in FIG. 1*c* can comprise a radio 101*z* depicted and described in connection with FIG. 1*d* of U.S.

patent application Ser. No. 14/039,401, filed Sep. 27, 2013 in the name of John Nix, the contents of which are herein incorporated in their entirety.

Note that module 101 may also operate as a base station in a wireless LAN, such as, but not limited to, an 802.11 base station. When module 101 operates a wireless LAN, radio 101z can function as either a client/node and/or a base station 103 to support communication from other wireless nodes in physical proximity, such as, but not limited to, other nodes within an exemplary 50 meters. The other wireless nodes could comprise a sensor 101f and/or actuator 101y, and in this case a sensor could be referred to as a "networked sensor" and an actuator could be referred to as a "networked actuator". Radio 101z functioning as a base station is depicted and described as a base station 103 is depicted and described in connection with FIG. 1d of U.S. patent application Ser. No. 14/039,401, filed Sep. 27, 2013 in the name of John Nix, the contents of which are herein incorporated in their entirety.

In accordance with exemplary embodiments, module 101 can store module private key 112, server public key 114, and module identity 110, and a symmetric key 127 in memory/RAM 101e during operation, such as when CPU 101b is active and the module 101 is connected to a network such as a wireless network 102 during data transmissions. Module private key 112 preferably is recorded in nonvolatile memory such as, but not limited to, flash memory 101w, so that module 101 has access to its private key 112 after the private key has been derived or loaded, including times when a battery 101k has been fully drained or removed from module 101 (if module 101 does not utilize a persistent power source such as land-line power).

Symmetric key 127 can be a secure, shared private key for use with symmetric encryption or symmetric ciphering algorithms 141b (in FIG. 1g below). Symmetric key 127 can be derived by using module public key 111 and/or server public key 114, possibly through the use of a key derivation function 141f (described in FIG. 1d below). Symmetric key 127 can be used for both encryption and decryption with symmetric cryptographic algorithms 141b described in FIG. 1d below, where a shared secret key can be used to encrypt/cipher and/or decrypt/decipher. Symmetric key 127 may also include an expiration time 133, such that symmetric key 127 may only be used by module 101 and/or server 105 during a limited period of time, such symmetric key 127 remaining only valid for a day, or a week, or during a session (where the session comprises multiple messages and/or responses between a module 101 and a server 105), etc. Module 101 can also derive symmetric key 127 according the Elliptic Curve Integrated Encryption Scheme (ECIES) and/or ECDH 159, discussed in FIG. 1d below, using module public key 111, server public key 114, and a random number 128a from random number generator 128. ECIES could be included in cryptographic algorithms 141. A summary of ECIES shared key derivation is described the Wikipedia article "Integrated Encryption Scheme" from Sep. 18, 2013 (herein incorporated by reference). Other possibilities for shared key derivation function using public keys are possible as well, including a Diffie-Hellman key exchange. Using a derived symmetric key from the exemplary key derivation function ECIES, module 101 and/or server 105 could derive a second symmetric key 127 after the expiration time 133 of the first symmetric key 127 had transpired. As contemplated herein, a symmetric key 127 can also comprise a session key, or the use of a "session key" with a symmetric ciphering algorithm 141b can comprise a symmetric key 127.

In an exemplary embodiment, a key derivation function 141f using public keys is not required to generate a shared symmetric key 127, and alternatively a shared symmetric key 127 could be generated by any of module 101, server 105, module provider 109, mobile network operator 108, or wireless network 102. If module 101 generates shared symmetric key 127 for symmetric ciphering 141b within a cryptographic algorithms 141, then module 101 can send shared symmetric key 127 to server 105 using an asymmetric ciphering depicted and described in connection with FIG. 4 below. In accordance with a preferred exemplary embodiment, module 101 preferably uses a random number generator 128 to generate a random number 128a (illustrated in FIG. 1d) for input into cryptographic algorithms 141, and the seed 128b in random number generator 128 could utilize data from a sensor 101f in order to generate a random number 128a with high entropy in the creation of symmetric key 127. Random number generator 128 and random number 128a are also depicted and described in connection with FIG. 1d of U.S. patent application Ser. No. 14/039,401, filed Sep. 27, 2013 in the name of John Nix, the contents of which are herein incorporated in their entirety.

Module identity 110 is preferably a unique identifier of module 101, and could comprise a number or string such as, but not limited to, a serial number, an international mobile subscriber identity number (IMSI), international mobile equipment identity (IMEI), or an Ethernet media access control (MAC) address. According to an exemplary embodiment, module identity 110 can also comprise a serial number or string that is written into hardware of module 101 upon manufacturing or distribution of module 101 (also depicted and described in connection with a step 511 in FIG. 5b below). In this case, module identity 110 could be recorded in a read only memory 101c, where read only memory 101c could not be easily erased or otherwise tampered with. Read only memory 101c could also comprise a protected memory and the address for accessing the module identity 101 within the ROM 101c could comprise a protected address. A protected address can comprise an address accessible to a CPU 101b and readable by CPU 101b where the data within the protected address is not modified, changed, or updated by a CPU 101b under normal operating conditions. Also note that the protected address can comprise one form of a nonvolatile memory, where a memory records data. Or, module 101 could read module identity 110, which could be written into hardware by a manufacturer, distributor, or module provider 109, by using a device driver 101g that reads a hardware address containing the module identity 110 using the system bus 101d. In this case, the hardware address can comprise a protected address, as contemplated herein. Module 101 can read the module identity 110 by accessing a read-only address using the bus 101d. In either case, in many embodiments module identity 110 may preferably be permanently or persistently associated with the physical hardware of module 101, which can be helpful for the security procedures contemplated herein. Module identity 110 can function as a basic identifier for services from mobile network operator 108, wireless network 102, eUICC subscription manager 164, and/or server 105 in order to properly identify module 101 among a plurality of modules. Module private key 112 and module public key 111 could be unique to module 101 and uniquely associated with module identity 110, according to a preferred embodiment.

As contemplated herein, a module identity 110 can also have more than one use. A first module identity 110 could comprise a serial number for the physical hardware of module 101, as described in the paragraph above. A second module identity 110 could also comprise a session identifier, for data sessions between module 101 and server 105, where the session identifier can be uniquely associated by a server 105 to module 101. A third module identity 110 could comprise a network module identity 110*b* within a set of network access credential 314 described in FIG. 3*b* below. A fourth module identity 110 can be associated with the eUICC 163. In embodiments where module identity 110 has more than one use, format, or representation, the module identity 110 associated with or written into hardware of module 101 (and potentially read from a read-only address in module 101) may preferably comprise the module identity 110 used in a certificate 122. Since a module 101 may utilize multiple module public keys 111 and module private keys 112 over its lifetime, a certificate 122 for module 101 can preferably include both (i) the module identity 110 (such as, but not limited to, a serial number for the physical hardware of module 101) and (ii) a module public key identity 111*a* in order to specify the particular module public key 111 associated with certificate 122. The use of a module public key identity 111*a* in a certificate 122 is also depicted and described in connection with FIG. 1h of U.S. patent application Ser. No. 14/055,606, filed Oct. 16, 2013 in the name of John Nix. Since a module 101 may also have multiple public keys 111 for different purposes (such as, but not limited to, one for creating digital signatures, another for asymmetric ciphering, another for use with a second wireless network 102, etc.), then module 101 may also potentially have multiple valid certificates 122 concurrently each with different module public key identities 111*a*.

Further, as contemplated herein, a module identity 110 could also comprise more than one physical string or number, such as, but not limited to, a first string when module 101 connects with a first mobile network operator 108 or first wireless network 102, and module identity 110 could comprise a second string when module 101 connects with a second mobile network operator 108 or second wireless network 102. The first mobile network operator 108 or first wireless network 102 may have a first requirement or specification for the format, length, structure, etc. of module identity 110, and the second mobile network operator 108 or second wireless network 102 may have a second requirement or specification for the format, length, structure, etc. of module identity 110. In this manner, even though more than one string or number is used to identify a module 101, the two different strings or numbers could comprise a module identity 110.

Server public key 114 in module 101 could be obtained from downloading the key over the IP Network 107, or optionally also written into nonvolatile memory of module 101 upon manufacture or distribution. Server public key 114 could be obtained using a domain name or Internet address that is recorded in nonvolatile memory upon the configuration of module 101, such as, but not limited to, during installation or distribution, and module 101 could fetch the server public key 114 upon connecting to a wireless network 102 or other connection to the IP Network 107. Additional elements besides those depicted in FIG. 1*c* could also be recorded in volatile memory 101*e*, which could comprise a RAM 101*e*. For example, cryptographic algorithms 141, the shared secret keys 129, and the pre-shared secret key code 134 could also be recorded in RAM 101*e* as well. Note that values and related data can also be recorded in both RAM 101*e* and nonvolatile memory 101*w* at the same time, such that data in nonvolatile memory 101*w* allows module 101 to access the data after a shutdown state, but moving the same data into RAM 101*e* during an active state allows module 101 to more quickly perform operations using a CPU 101*b*. Other possibilities exist as well for the storage location of various values and data elements illustrated in FIG. 1*e* without departing from the scope of the present invention.

Module 101 may also contain cryptographic algorithms 141, which may comprise a suite of algorithms or subroutines that can be utilized for (i) deriving a pair of keys comprising a public key and a private key, (ii) encrypting data using public keys, (iii) decrypting data using private keys, (iv) processing secure hash signatures using private keys, and (v) verifying secure hash signatures using public keys, and related software, firmware, or subroutines for implementing a cryptographic system, including symmetric ciphering algorithms. Cryptographic algorithms 141 (also described below in FIG. 1*d*) could utilize publicly available software libraries within tools such as, but not limited to, OpenSSL maintained by The OpenSSL Project (http://www.openssl.org/), libgcrypt maintained by The Free Software Foundation (http://www.gnu.org/software/libgcrypt/), and similar libraries such as, but not limited to, libmcrypt and Crypto++. Note that cryptographic algorithms 141 could also use proprietary cryptographic libraries as well. In addition to implementing asymmetric encryption/ciphering, such as, but not limited to, used with RSA and ECC cryptography, cryptographic algorithms 141 can provide symmetric ciphering where a shared private key is utilized to both encrypt and decrypt, such as, but not limited to, with the Advanced Encryption Standard (AES) cipher suite.

As illustrated in FIG. 1*c*, module 101 may also contain a random number generator 128. Random number generator 128 may contain a seed 128*b*. The creation of random numbers with a high degree of entropy may be important the use of cryptographic algorithms 141. A plurality of the data as a source for a random number seed 128*b* could be appended together into a "module random seed file" 139 (illustrated in FIG. 1*d*) with a combined series or list of states (i.e. a plurality of sensor 101*f* measurements, radio 101*z* measurements, clock 160 times or values, memory 101*e* or memory 101*w* states, operating system 101*h* states, actuator 101*y* states, and/or hardware 101*a* or 101*d* states). Note that values or data for each of the elements listed in the previous sentence could be utilized in a "module random seed file" 139 instead of or in addition to a state. The "module random seed file" is also depicted and described in connection with FIG. 1e of U.S. patent application Ser. No. 14/055,606, filed Oct. 16, 2013 in the name of John Nix, which is hereby incorporated by reference in its entirety Note that the term "public key" as contemplated herein includes a key that may be shared with other elements, where the other elements may not be under the direct control of the same entity that holds the corresponding private key. However, the term "public key" as used herein does not require that the public key is made available to the general public or is publicly disclosed. An additional layer of security may be maintained in the present invention by preferably only sharing public keys on a confidential basis with other entities. For example, module public key 111 may be created by module 101 when generating module private key 112, and module 101 may share module public key 111 with mobile network operator 108 in order to record module public key 111 in server 105, but module 101 could choose to not (i) share module public key 111 with other entities, such as module provider 109 or (ii) provide a certificate 122 with module public key 111 publicly available on the IP Network 107. The benefits of confidentially sharing module public key 111 with server 105 are also further described below.

Although a single public key and private key for module 101 is illustrated in FIG. 1c, both module 101 and server 105 may each utilize several different pairs of public keys and private keys. As one example, module 101 may record a first private key 112 used for creating a digital signature and a second private key 112 for decryption using asymmetric ciphering algorithms 141a. In this example, a server 105 could utilize a first module public key 111 to verify the digital signature, and a second module public key 111 could be utilized to encrypt messages sent to module 101. Similarly, either module 101 or server 105 may use private key 112 or 105c, respectively, to derive secondary shared keys such as, but not limited to, a derived shared key 129b below. Thus, one key pair could be used with digital signatures, a second key pair used for asymmetric ciphering, and a third key pair to derive shared secret keys. Each of the three illustrated pairs of keys could comprise a set of keys, and each of the illustrated pairs of keys could also use a different set of cryptographic parameters 126 (illustrated in FIG. 1g below), although the cryptographic parameters 126 for the various pairs of keys could also be the same.

In addition, module 101 could utilize a first set of keys to communicate with a first MNO 108 and a second set of keys to communicate with a second MNO 108. The first set of keys could use or be associated with a first set of cryptographic parameters 126 and the second set of keys could use or be associated with a second set of cryptographic parameters 126. According to exemplary embodiments, module 101 may also include a pre-shared secret key 129a. Pre-shared secret key 129a can comprise a secret key that is shared between module 101 and server 105 before module 101 begins (i) communicating with server 105 and/or a certificate authority 118, (ii) or utilizing PKI-based encryption and authentication to communicate with mobile network operator 108. As illustrated in FIG. 1f below, server 105 could also record the pre-shared secret key 129a, and a pre-shared secret key 129a can be associated with each module 101 using a module identity 110. A pre-shared secret key 129a is also depicted and described in connection with U.S. patent application Ser. No. 14/055,606, filed Oct. 16, 2013 in the name of John Nix, which is hereby incorporated by reference in its entirety. In an exemplary embodiment, once the pre-shared secret key 129a has been utilized to authenticate or verify a module public key 111 with a server 105 (such as, but not limited to, using subsequent steps 517 in FIG. 5b below), then that particular pre-shared secret key 129a may be "discarded" and not used again for security purposes contemplated herein.

Note that the use of a pre-shared secret key 129a and pre-shared secret key code 134 is also optional, such that a module program 101i could cipher of obfuscate the initial submission of a derived module public key 111 and module identity to a server 105, so that server 105 could be reasonably assured only a valid module 101 submitted the module public key 111. According to a preferred exemplary embodiment, module 101 can derive its own module private key 112 and module public key 111, and utilize pre-shared secret key 129a in order to securely and/or authoritatively communicate the derived module public key 111 with server 105 and/or a certificate authority 118. The use of pre-shared secret key 129a can be particularly useful if module 101 has already been deployed with a monitored unit 119 and connects to server 105 though the IP Network 107 for the very first time. Server 105 could preferably utilize pre-shared secret key 129a in order to confirm that a received module public key 111 and module identity 110 from module 101 authoritatively belong to module 101, as opposed to being an unauthorized or even fraudulent submission of module public key 111 and module identity 110.

Server 105 could utilize a pre-shared secret key 129a and the steps depicted and described in connection with FIG. 4 below in order to securely receive module public key 111 and module identity 110 from module 101, including the first time module 101 sends module public key 111 to server 105. As one example, pre-shared secret key 129a could be utilized as a symmetric ciphering 141b key, described in FIG. 1d below. After the first submission of module public key 111 to server 105, any subsequent submissions of new module public keys 111 derived by module 101 could either (i) continue to use the pre-shared secret key 129a, or (ii) use a symmetric key 127 derived after the first module public key 111 has been received. Securing the submission of module public key 111 with server 105, including both the first submission and subsequent submissions, is also depicted and described in connection with FIG. 5b below.

FIG. 1d

Figure 1D:
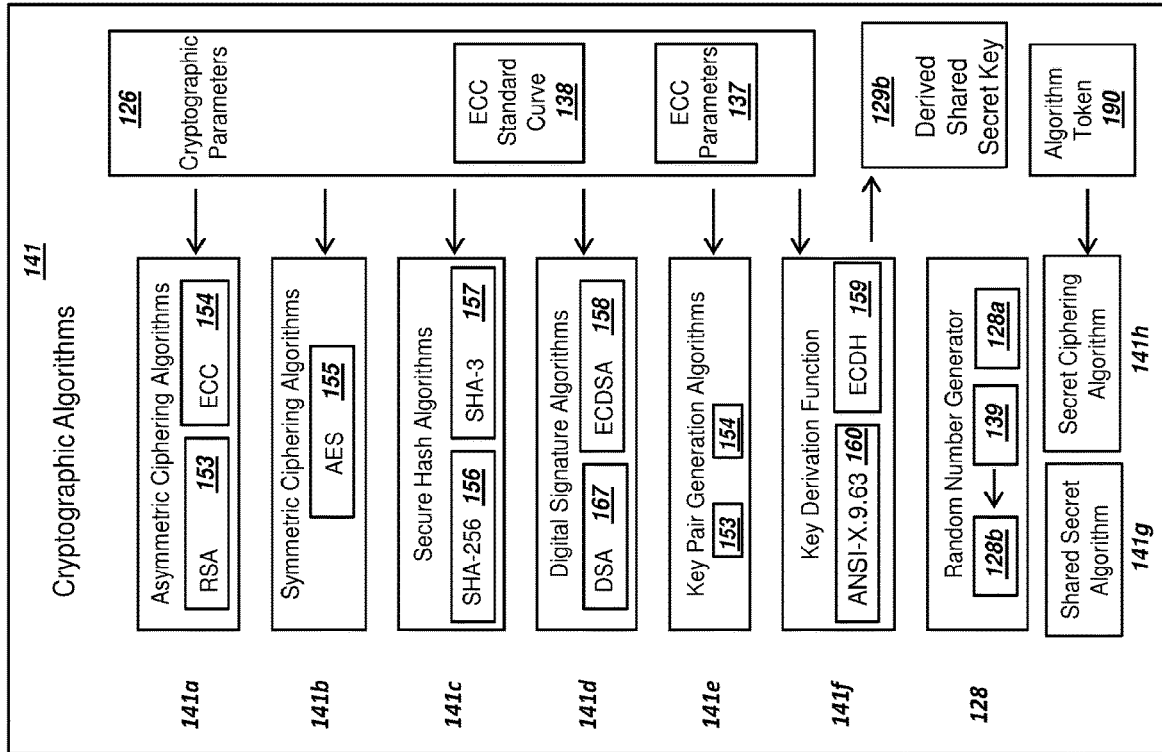
FIG. 1d is a graphical illustration of components in a set of cryptographic algorithms, in accordance with exemplary embodiments.

FIG. 1d is a graphical illustration of components in a set of cryptographic algorithms, in accordance with exemplary embodiments. As contemplated herein, communications with module 101 can be secured by using cryptographic algorithms 141. The cryptographic algorithms 141 used by module 101, server 105, or other servers can comprise a set of steps, procedures, or software routines for accomplishing steps to cipher, decipher, sign, and verify messages, including the generation of public keys, private keys, and derived shared keys, including symmetric keys. Cryptographic algorithms 141 can be implemented in software or firmware operating on (i) module 101 in the form of a module program 101i or an eUICC 163, (ii) server 105 in the form of a module controller 105x, or (iii) wireless network 102 or MNO 108 in the form of a server 105, where server 105 generates tokens for the authentication of a module 101 and mobile phones connecting with wireless network 102. Example software for a cryptographic algorithms 141 includes the libraries within the openssl, libmcrypt, and/or and Crypto++ discussed in FIG. 1c. Other possibilities for the location of cryptographic algorithms 141 within a module 101, server 105, or wireless network 102 exist as well, including possibly module operating system 101h and a server operating system 105h (described in FIG. 1k below).

In addition, cryptographic algorithms 141 may be implemented in hardware or firmware on any of module 101, server 105, or MNO 108. Note that module 101, server 105 and MNO 108 could each utilize a different set of cryptographic algorithms 141, although the sets of algorithms should preferably be fully interoperable (i.e. ciphering with a first symmetric ciphering algorithm 141b and a symmetric key 127 on module 101 could be deciphered by a second symmetric ciphering algorithm 141b on server 105 using the symmetric key 127, etc.). As illustrated in FIG. 1d, cryptographic algorithms 141 may comprise an asymmetric ciphering algorithm 141a, a symmetric ciphering algorithm 141b, a secure hash algorithm 141c, a digital signature algorithm 141d, a key pair generation algorithm 141e, a key derivation function 141f, a random number generator 128, and the other algorithms depicted in FIG. 1d.

Asymmetric ciphering algorithms 141a can comprise algorithms utilizing public key infrastructure (PKI) techniques for both (i) encrypting with a public key and (ii) decrypting with a private key. Example algorithms within asymmetric algorithms 141a include the RSA algorithms 153 and the Elliptic Curve Cryptography (ECC) algorithms 154, and other asymmetric algorithms could be utilized as well. For example, either the ECC algorithms 154 or RSA algorithms 153 can be used for encryption and decryption, including (i) encryption step 402 discussed below in FIG. 4, as well as (ii) decryption step 514 discussed below in FIG. 5a. A set of cryptographic parameters 126 can include input into asymmetric ciphering algorithms 141a, such as, but not limited to, specifying key lengths, elliptic curves to utilize (if ECC), modulus (if RSA) or other parameters or settings required. As contemplated herein and described in additional detail below, the algorithms illustrated in FIG. 1d can perform both ciphering and deciphering, using the appropriate keys. Although RSA algorithms 153 and ECC algorithms 154 are illustrated within an asymmetric ciphering algorithm 141a, a RSA algorithm 153 and ECC algorithm 154 could also be associated with a key pair generation algorithm 141e and other elements within a set of cryptographic algorithms 141, and thus not exclusively used within a set of cryptographic algorithms 141 by an asymmetric ciphering algorithm 141a.

The use and application of RSA algorithms and cryptography are described within IETF RFC 3447 titled "Public-Key Cryptography Standards (PKCS) #1: RSA Cryptography Specifications Version 2.1", herein incorporated by reference, among other published standards for the use of RSA algorithms 153. The use of an RSA algorithm 153 for encryption and decryption, including with cryptographic algorithms 141 and other description of encryption or decryption algorithms, can also be processed according to the description of the RSA algorithm according to the Wikipedia entry for "RSA (algorithm)" as of Sep. 9, 2013, which is incorporated by reference herein.

The use and application of ECC algorithms 154 for asymmetric ciphering algorithms 141a within cryptographic algorithms 141 are described within IETF RFC 6090 titled "Fundamental Elliptic Curve Cryptography Algorithms" (herein incorporated by reference), among other published standards using ECC. ECC algorithms 154 can also utilize elliptic curve cryptography algorithms to the Wikipedia entry for "Elliptic curve cryptography" as of Sep. 9, 2013, which is incorporated by reference herein. ECC algorithms 154 may utilized according to exemplary preferred embodiments in order to maintain high security with smaller key lengths, compared to RSA, thereby helping to comparably reduce the message lengths, radio frequency spectrum utilization, and processing power required by module 101. Thus, the use of ECC algorithms 154 within various steps requiring ciphering or digital signatures may help conserve battery life of module 101 while maintaining the objective of securing system 100 and other systems illustrated herein. Note that as contemplated herein, other algorithms besides with ECC algorithms 154 and RSA algorithms 153 may be also be used in asymmetric algorithms 141a and also a key pair generation algorithm 141e.

Cryptographic algorithms 141 may also include a set of symmetric ciphering algorithms 141b. Symmetric ciphering algorithms 141b can utilize a symmetric key 127 by one node such as a module 101 to encrypt or cipher data, and the encrypted data can be decrypted or deciphered by server 105 also using the symmetric key 127. Examples of symmetric ciphers include Advanced Encryption Standard 155 (AES), as specified in Federal Information Processing Standards (FIPS) Publication 197, and Triple Data Encryption Standard (Triple DES), as described in NIST Special Publication 800-67 Revision 1, "Recommendation for the Triple Data Encryption Algorithm (TDEA) Block Cipher (Revised January 2012)". Cryptographic parameters 126 input into symmetric ciphering algorithms 141b can include symmetric key 127 length, such as, but not limited to, the selection of 128, 192, or 256 bits with AES 155 symmetric ciphering, and cryptographic parameters 126 could also select a symmetric ciphering algorithm in a collection of symmetric ciphering algorithms 141b. Other examples of symmetric ciphering algorithms 141b may be utilized as well within cryptographic algorithms 141. Also note that as contemplated herein, the term "symmetric ciphering" contemplates the use of a symmetric key 127 in order to encrypt or cipher data with a symmetric ciphering algorithm 141b, and "asymmetric ciphering" contemplated the use of an asymmetric ciphering algorithm 141a to encrypt or cipher data with a public key, such as module public key 111 or server public key 114.

Cryptographic algorithms 141 may also include a set of secure hash algorithms 141c in order to compute and output a secure hash value or number based on a string or file input into the secure hash algorithms 141c. Example secure hash algorithms include SHA256 156 (also known as SHA-2) and SHA-3 157. SHA256 156 is specified in the National Institute of Standards and Technology (NIST) Federal Information Processing Standards Publication (FIPS PUB) 180-2 titled "Secure Hash Standard". SHA-3 157 is scheduled to be published in FIPS PUB 180-5. Cryptographic parameters 126 input into secure hash algorithms 141c can include the selection of the length of the secure hash, such as, but not limited to, using 224, 256, or 512 bits with either SHA-2 or SHA-3, and other possibilities exist as well.

Cryptographic algorithms 141 may also include a set of digital signature algorithms 141d, in order to sign and verify messages between (i) module 101 and server 105 or (ii) server 105 and wireless network 102. Digital signature algorithms 141d can also verify signatures such as, but not limited to, comparing that (i) a first secure hash value in the form of a digital signature in a certificate (not shown) using a certificate authority public key matches (ii) a second secure hash value in the certificate (not shown). Digital signature algorithms 141d can utilize algorithms in National Institute of Standards (NIST) "FIPS 186-4: Digital Signature Standard", or IETF RFC 6979 titled "Deterministic Usage of the Digital Signature Algorithm (DSA) and Elliptic Curve Digital Signature Algorithm (ECDSA)". The use of ECDSA algorithm 158 within a set of digital signature algorithms 141d may be preferred if keys such as, but not limited to, module public key 111 and server public key 114 are based on elliptic curve cryptography. The use of the Digital Signature Standard can comprise a DSA algorithm 167. Other PKI standards or proprietary techniques for securely verifying digital signatures may be utilized as well in digital signature algorithms 141d. Cryptographic parameters 126 input into digital signature algorithms 141d can include the selection of a secure hash algorithms 141c to utilize with digital signature algorithms 141d, or the algorithm to utilize, such as, but not limited to, ECDSA 158 shown or an RSA-based alternative for digital signatures is possible as well. Cryptographic parameters 126 input into digital signature algorithms 141d can also include a padding scheme for use with a digital signature algorithms 141d. Digital signature algorithms 141d could also include an RSA digital signature algorithm for use with RSA-based public and private keys.

Cryptographic algorithms 141 may also include key pair generation algorithms 141e, a key derivation function 141f, and a random number generator 128. Key pair generation algorithms 141e can be utilized by module 101, server 105, or network 102 to securely generate private and public keys. The key pair generation algorithms 141e can also use input from a cryptographic parameters 126, such as, but not limited to, the desired key lengths, or a value for an ECC curve if the public key will support ECC algorithms 154. According to an exemplary preferred embodiment, module 101 can derive a pair of module public key 111 and module private key 112 using key pair generation algorithms 141e. Software tools such as, but not limited to, openssl and libcrypt include libraries for the generation key pairs, and these and similar libraries can be used in a key pair generation algorithm 141e.

Key derivation function 141f can be used by module 101, server 105, and/or wireless network 102 in order to determine a common derived shared secret key 129b, using at least two numbers as input. In exemplary embodiments, one of the two numbers as input can comprise one of (i) a private key, or (ii) a secret shared key 129. The other of the two numbers input into a key derivation function 141f could comprise at least one number from (i) a set of cryptographic algorithms 126 or (ii) a random number 128 that is commonly shared between two nodes utilizing a key derivation function 141f in order to process or obtain the same derived shared secret key 129b. A key exchange to share a common symmetric key 127 can be performed using a key derivation function 141f and cryptographic parameters 126, in addition to using public and/or private keys in some embodiments. In exemplary embodiments, three values comprising (i) a private key, (ii) a token such as a public key or a random number, and (iii) values from a set of cryptographic parameters 126 can be input into the key derivation function 141f in order to output a derived shared secret key 129b.

An exemplary algorithm within a key derivation function 141f can be the Diffie-Hellman key exchange, which is used by tools such as, but not limited to, secure socket layer (SSL) with RSA algorithms 153. When using ECC algorithms 154, module 101 and server 105 can utilize Elliptic Curve Diffie-Hellman (ECDH) algorithms 159, and a summary of ECDH is included in the Wikipedia article titled "Elliptic Curve Diffie-Hellman" (http://en.wikipedia.org/wiki/Elliptic_curve_Diffie % E2%80%93Hellman from Sep. 24, 2013, which is herein incorporated by reference. Other algorithms to derive a shared secret key 129b using public keys, private keys, and tokens may also be utilized in a key derivation function 141f, such as, but not limited to, the American National Standards Institute (ANSI) standard X-9.63 160. Cryptographic parameters 126 used with key derivation function 141f with elliptic curve cryptography can include a common base point G for two nodes using the key derivation function 141f and public keys. The base point G in a cryptographic parameters 126 can be transmitted or sent from a module 101 to a server 105 in a message 208, and the base point G can be sent from a server 105 to a module 101 in a response 209, and other possibilities exist as well, including recording the base point G within a received eUICC profile 311. Cryptographic parameters 126 can also include other or additional information for using a key derivation function 141f in order to derive either (i) a commonly shared symmetric key 127, or (ii) a commonly shared secret key 129b. The use of a key derivation function 141f with a Diffie Helmman key exchange is also depicted and described in connection with FIG. 11 below. Other possibilities for a key derivation function 141f exist as well without departing from the scope of the present invention.

Cryptographic parameters 126 input into key pair generation algorithms 141e can include the type of asymmetric ciphering algorithms 141a used with the keys, the key length in bits, an elliptic curve utilized for ECC, a time-to-live for a public key that is derived, and similar settings. Additional cryptographic parameters 126 for a public key can include a supported point formats extension, where the supported point formats extension could comprise uncompressed, compressed prime, or "compressed char2" formats, as specified in ANSI X-9.62. In other words, an ECC public key can have several formats and a set of cryptographic parameters 126 can be useful to specify the format. Although a set of cryptographic parameters 126 is illustrated in FIG. 1d as internal to cryptographic algorithms 141, parameters 126 could be recorded in other locations in a module 101 or a system 100. As one example, a set of cryptographic parameters 126 could be recorded in a server 105 and downloaded by module 101 using the IP Network 107. The various algorithms within cryptographic algorithms 141 may utilize a random number generator 128, which is also depicted and described in connection with FIG. 1c above. As contemplated herein, the term "cryptographic parameters" 126 may be considered equivalent to a "set of cryptographic parameters" 126, and also use of the terms "parameters" 126 and "set of parameters" 126 can both refer to the cryptographic parameters 126 illustrated in FIG. 1d and FIG. 1i. Cryptographic parameters 126 are also further depicted and described in connection with FIG. 1i below.

According to a preferred exemplary embodiment, cryptographic parameters 126 can include values to define an elliptic curve and/or use ECC algorithms 154. A set of ECC parameters 137 could comprise values or numbers for an elliptic curve defining equation. ECC parameters 137 are also depicted and described in FIG. 1g of U.S. patent application Ser. No. 14/055,606, filed Oct. 16, 2013 in the name of John Nix, which is hereby incorporated by reference in its entirety. Cryptographic parameters 126 could also include an ECC standard curve 138, which could comprise a name and/or values for a standardized curve, such as, but not limited to, the list of named curves included in section 5.1.1 of IETF RFC 4492 titled "Elliptic Curve Cryptography (ECC) Cipher Suites for Transport Layer Security (TLS)."

As contemplated herein, a set of cryptographic algorithms 141 may operate using either strings or numbers, and cryptographic parameters 126 could include either strings or numbers as well. As contemplated herein (i) a collection, sequence, and/or series of numbers could comprise a string, (ii) a string can include a mixture of numbers and characters, or (iii) a string can comprise a collection, sequence, and/or series of characters or bits. The processing of cryptographic algorithms 141 within a module 101 can take place within a CPU 101b, or module 101 could also process cryptographic algorithms in a cryptographic processing unit (not shown) connected to the system bus 101d. An eUICC 163 could also include a set of cryptographic algorithms 141, in addition to a separate set of cryptographic algorithms 141 being recorded in a flash memory 101w for module 101. According to an exemplary embodiment, a module 101 or a server 105 could include a cryptographic processing unit (not shown) separate from the CPU 101b or CPU 105b in order to increase efficiency or security for supporting the use of cryptography through a system 100. An eUICC 163 could comprise the separate cryptographic processing unit. Alternatively, in exemplary embodiments cryptographic algorithms 141 can be implemented entirely in software within a module 101 and/or server 105, and also utilized by a module controller 105x and network controller 101i.

A shared secret algorithm 141g is depicted and described in connection with FIG. 1f below. In an exemplary embodiment, a shared secret algorithm 141g can comprise an algorithm to accept input from (i) a set of component parameters 101t and (ii) an algorithm token 190, which are both depicted and described in connection with FIG. 1e and FIG. 1*f*, and the shared secret algorithm 141*g* can output a shared secret key 129*c*. A secret ciphering algorithm 141*h* is depicted and described in connection with FIG. 1*g* below. In an exemplary embodiment, a secret ciphering algorithm 141*h* can comprise an algorithm to accept input from (i) a module identity 110 and (ii) an algorithm token 190 as a key, which are both depicted and described in connection with FIG. 1*f*, and the secret ciphering algorithm 141*h* can output an encrypted module identity 110*a*. A secret ciphering algorithm 141*h* can also be used as a symmetric ciphering algorithm 141*b*, where the logic and/or steps for using a key such as, but not limited to an algorithm token 190, remain secret and/or are not publicly shared. In an exemplary embodiment, a secret ciphering algorithm 141*h* can be similar to AES 155, but with a different and confidential series of steps for mixing and substituting data input in order to output encrypted data. A server 105 or other servers can use a secret ciphering algorithm 141*h* and input of a ciphertext and a key to derive or process plaintext. In an exemplary embodiment, a server 105 or other servers can use a secret ciphering algorithm 141*h* and input of (i) ciphertext of an encrypted module identity 110*a* and (ii) an algorithm token 190 in order to output a module identity 110.

FIG. 1*e*

Figure 1E:
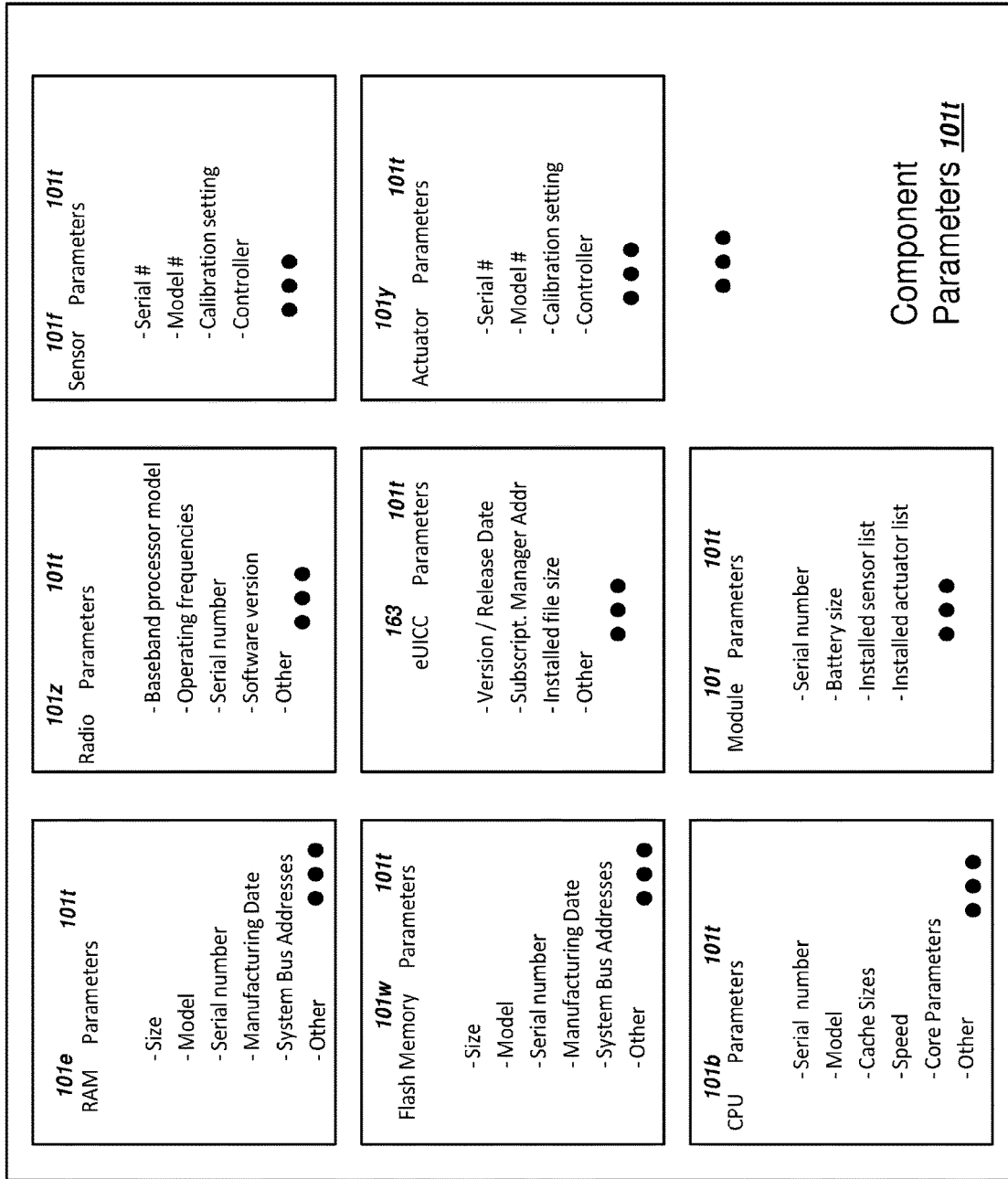
FIG. 1e is a graphical illustration of a set of components for a module and a set of component parameters, in accordance with exemplary embodiments.
Figure 1F:
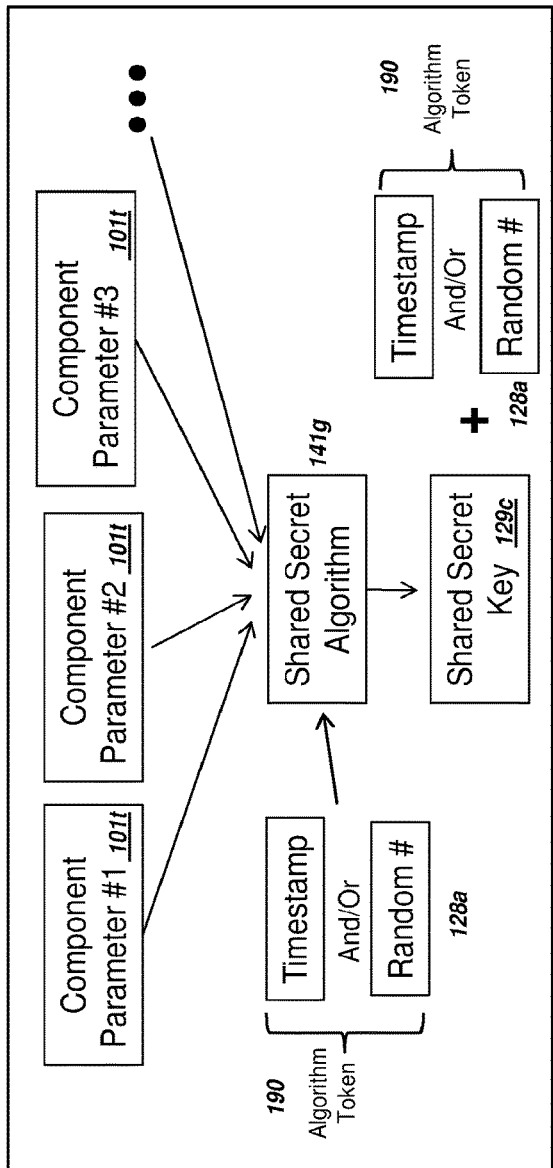
FIG. 1f is a graphical illustration for deriving a shared secret key using a shared secret algorithm, an algorithm token, and component parameters, in accordance with exemplary embodiments.

FIG. 1*e* is a graphical illustration of a set of components for a module and a set of component parameters, in accordance with exemplary embodiments. A module 101 can comprise a plurality of hardware and software components for operating in a system 100 and other exemplary systems illustrated herein. The hardware components can be manufactured and assembled into a housing or enclosure for distribution to module providers 109 and/or distributors or end users of a module 101. Hardware components illustrated in FIG. 1*e* can include a RAM 101*e*, a flash memory 101*w*, a CPU 101*b*, a radio 101*z*, an eUICC 163, a sensor 101*f*, and an actuator 101*y*. Software and/or firmware components can include operating system 101*h* and also a module program 101*i* (not shown). Module 101 can also include a plurality of any of these components. Any of the components can include a set of component parameters 101*t*, including a model number, size or capacity, a serial number, a manufacturing date (or release date), a system bus 101*d* address, a speed or capacity, an operating frequency, a software or firmware version for the component, a file size, an associated battery size 101*k*, and/or a list of values, etc. The overall assembled and/or manufactured module 101 can include component parameters 101*t* as well, including a serial number, version number, list of supported sensors and/or actuators, etc. Component parameters 101*t* are depicted in FIG. 1*e* as illustrative as opposed to being limiting, and other component parameters can be utilized as well for a set of component parameters 101*t*, in addition to the use of different components than those illustrated in FIG. 1*e*.

In exemplary embodiments, component parameters 101*t* can include many values that remain persistent over the lifetime of a module 101, although in some embodiments a component for a module 101 could be changed after manufacturing. As one example, a technician could change a memory unit such as a RAM 101*e* for upgrade or other purposes, and the new RAM 101*e* could subsequently utilize different component parameters 101*t*. In exemplary embodiments other entities besides the module 101 could record or store a set of component parameters 101*t* for a module 101, including module provider 109, mobile network operator 108, and/or a server 105. A server 105 or the other entities could record a set of component parameters 101*t* in a database with a module identity 110, and the database that includes component parameters 101*t* for the module 101 could be updated if the component parameters 101*t* change after manufacturing. As contemplated herein, a set of component parameters 101*t* can comprise any of the component parameters 101*t* for each of the hardware and/or software elements within a module 101, including component parameters 101*t* for the overall module 101. A set of component parameters can comprise either numbers or strings, including a mix of numbers and strings. As contemplated herein, the term "set of component parameters" 101*t* can also refer to component parameters 101*t*. Since each module 101 in a plurality of modules 101 can be different, such as using different serial numbers for individual components, a set of component parameters 101*t* for a module 101 can be unique in exemplary embodiments. Other possibilities exist as well for a set of component parameters 101*t* to be unique for a module 101 without departing from the scope of the present invention.

FIG. 1*f*

FIG. 1*f* is a graphical illustration for deriving a shared secret key using a shared secret algorithm, an algorithm token, and component parameters, in accordance with exemplary embodiments. A module 101 and/or server 105 can use a shared secret algorithm 141*g* to process or derive a shared secret key 129*c* using as input (i) a set of component parameters 101*t* and an algorithm token 190. A set of component parameters 101*t* for a module 101 are depicted and described in connection with FIG. 1*e* above. The component parameters 101*t* for a module 101 can include a list of values input into the shared secret algorithm 141*g* such as one or more component or system serial numbers, system bus 101*d* addresses, component model numbers, component sizes, date or time values for component manufacturing or release dates, and/or other similar data. In an exemplary embodiment, the set of parameters 101*t* input into a shared secret algorithm 141*g* can be persistent or relatively long-lived, such that the list of values from a set of component parameters 101*t* do not frequently change. In another embodiment, the list or values for a module 101 comprising a set of component parameters 101*t* can change over time, and in this case, both module 101 and a server 105 (or other servers using the shared secret algorithm 141*g*) would also record any updated or changed values for a set of component parameters 101*t* in order to utilize the same input. In other words, a set of component parameters 101*t* used by a module 101 and a server 105 (or other servers associated with server 105) can keep the set of component parameters 101*t* for a module 101 synchronized.

An algorithm token 190 input into a shared secret algorithm 141*g* can comprise a temporary value or a number or a string that may preferably only be used once in exemplary embodiments. As illustrated in FIG. 1*f*, an algorithm token 190 can comprise a timestamp and/or a random number 128*a*. The timestamp can be calculated using a clock 160 and the random number 128*a* may comprise a random number 128*a* processed with a random number generator 128. The random number generator 128 could use a "module random seed file" 139 in order to populate a seed 128*b* with a number or value that comprises a high level of "noise" or information entropy. As contemplated herein, a random number 128*a* can comprise a pseudo-random number such that the number output by a random number generator 128 may not completely mathematically random, but for the purposes contemplated herein a pseudo-random number can comprise a random number 128*a*. In an exemplary embodiment, an algorithm token 190 can comprise a time value, a random number 128*a* alone, or a combination of a time value and a random number 128*a*. In an exemplary embodiment, the time value and/or random number 128 may preferably have a sufficient number of digits or resolution such that the probability of using the same random number 128*a* and/or time value as an algorithm token 190 input into a shared secret algorithm 141*g* would be sufficiently small or negligible. Note that other values besides a time value or a random number 128*a* could be used in an algorithm token 190, where the other values also have a low probability of being reused and/or also contain a high level of information entropy. As contemplated herein, an algorithm token 190 can also be used with other algorithms in a set of cryptographic algorithms 141 in addition to a shared secret algorithm 141*g*, including a secret ciphering algorithm 141*h* depicted and described in connection with FIG. 1*g* below.

Shared secret algorithm 141*g* can use the algorithm token 190 and set of component parameters 101*t* as input and output a shared secret key 129*c*. Another element in a system 100 besides a module 101 can obtain or process the same shared secret key 129*c* using an equivalent value for an algorithm token 190 and set of component parameters 101*t*. Consequently in preferred embodiments module 101 and the other element such as, but not limited to server 105, could determine the same or equivalent value for an output shared secret key 129*c* without having to send or receive the shared secret key 129*c* output from the shared secret algorithm 141*g*. Shared secret algorithm 141*g* could use logic or a set of programmatic steps for taking the values input and generating the output of a shared secret key 129*c*. In an exemplary embodiment, shared secret algorithm 141*g* could select, mix, and append values from the series of component parameters 101*t* and the time value and/or random number 128*a* into a string or number. A shared secret algorithm 141*g* could also use data from the algorithm token 190 to determine or process data from the set of component parameters 101*t* in order to output at least one shared secret key 129*c*.

In an exemplary embodiment, a string or number resulting from processing the set of component parameters 101*t* and algorithm token 190 could be input into a secure hash algorithm 141*c* with a shared secret algorithm 141*g*, and the output of the secure hash algorithm 141*c* could be used for a shared secret key 129*c*. Other possibilities for the logic of a shared secret algorithm 141*g*, including using a set of component parameters 101*t* and an algorithm token 190 to create a shared secret key 129*c*, are possible as well without departing from the scope of the present invention. Although a single algorithm token 190 and single shared secret key 129*c* are illustrated in FIG. 1*f*, a module 101 and server 105 could use a plurality of single algorithm tokens 190 with a shared secret algorithm 141*g*. In an exemplary embodiment, shared secret algorithm 141*g* could also output a plurality of shared secret keys 129*c*, and other logic could specify the use of one or several of the plurality of shared secret keys 129*c* output by a shared secret algorithm 141*g*. In an exemplary embodiment, the values from the series of component parameters 101*t* and the algorithm token 190, such as, but not limited to a time value and/or random number 128*a*, both (i) input into a shared secret algorithm 141*g* and (ii) including possibility using a secure hash algorithm 141*c* with a shared secret algorithm 141*g*, can be longer (or comprise more bits) than the output of a shared secret algorithm 141*g*. The logic for processing the set of component parameters 101*t* and algorithm token 190 as input into the shared secret algorithm 141*g* can include rules, steps, and/or logic for selecting subsets of the input data, mixing the input data, and ordering the input data. In an exemplary embodiment, the rules, steps, and/or logic for processing the input data in a shared secret algorithm 141*g* may preferably remain confidential or not publicly shared, in order for the output of shared secret key 129*c* to reasonably remain "secret" and not reasonably obtainable by third parties who might also have the set of component parameters 101*t* and the algorithm token 190.

Figure 6:
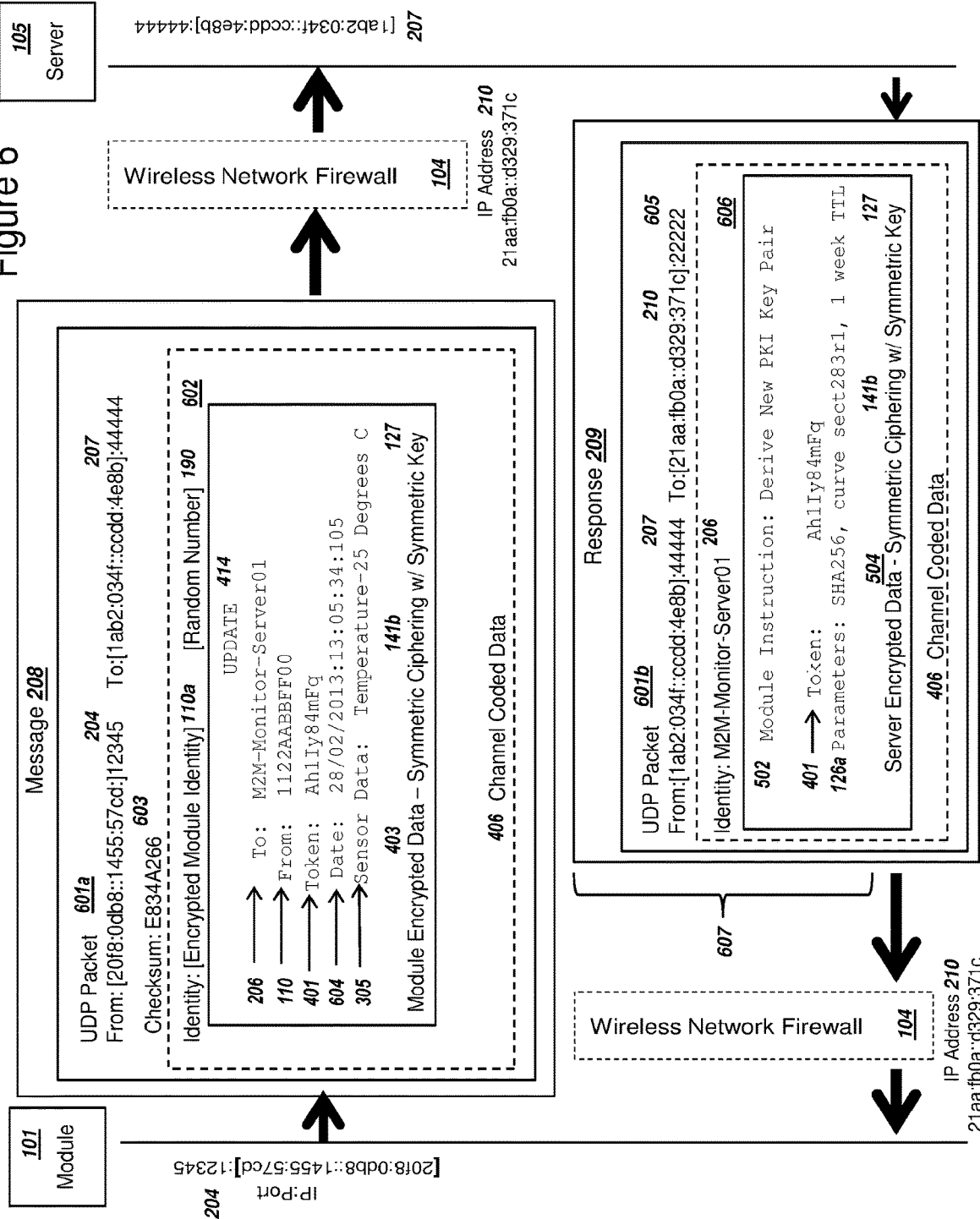
FIG. 6 is a simplified message flow diagram illustrating an exemplary message sent by a module, and an exemplary response received by the module, in accordance with exemplary embodiments.

In exemplary embodiments where a secure hash algorithm 141*c* is used in or with a shared secret algorithm 141*g*, a processed subset of the output from the secure hash algorithm 141*c* could be used for the shared secret key 129*c*. For example, if (A) the secure hash algorithm 141*c* outputs 256 bits, but a smaller key is needed such as an exemplary 128 bits for a shared secret key 129*c* that comprises a symmetric key 127 for use with AES ciphering 155, then (B) shared secret algorithm 141*g* could also contain logic to select or derive the shared secret key 129*c* of the appropriate length from the output of a secure hash algorithm 141*c*, including truncating, parsing, or selecting a subset the output from a secure hash algorithm 141*c*. Multiple instances or rounds of one or many of a secure hash algorithm 141*c* could also be used with a shared secret algorithm 141*g* such that data input is processed in a shared secret algorithm 141*g* using a secure hash algorithm 141*c* more than once. In exemplary embodiments, as described below in FIG. 1*g*, the algorithm token 190 for a shared secret algorithm 141*g* can be shared by module 101 with other parties or nodes, including a server 105, in order for the server 105 to calculate the same shared secret key 129*c* using the shared secret algorithm 141*g* and the same set of recorded component parameters 101*t*. In these embodiments mentioned in the previous sentence, the module 101 could send the algorithm token to a server 105 in a message 208, as illustrated in FIG. 6 below.

As contemplated herein, a shared secret key 129*c* output from a shared secret algorithm 141*g* may have multiple different uses, where a first shared secret key 129*c* can be used in a module identity string ciphering algorithm 161 (FIG. 1*g* below) and a second shared secret key 129*c* could be used as a symmetric key 127. Also, a shared secret algorithm 141*g* can comprise one embodiment of a key derivation function 141*f*, where the shared secret key 129*c* can also comprise a derived shared secret key 129*b*. Other possibilities exist as well without departing from the scope of the present invention.

FIG. 1*g*

Figure 1G:
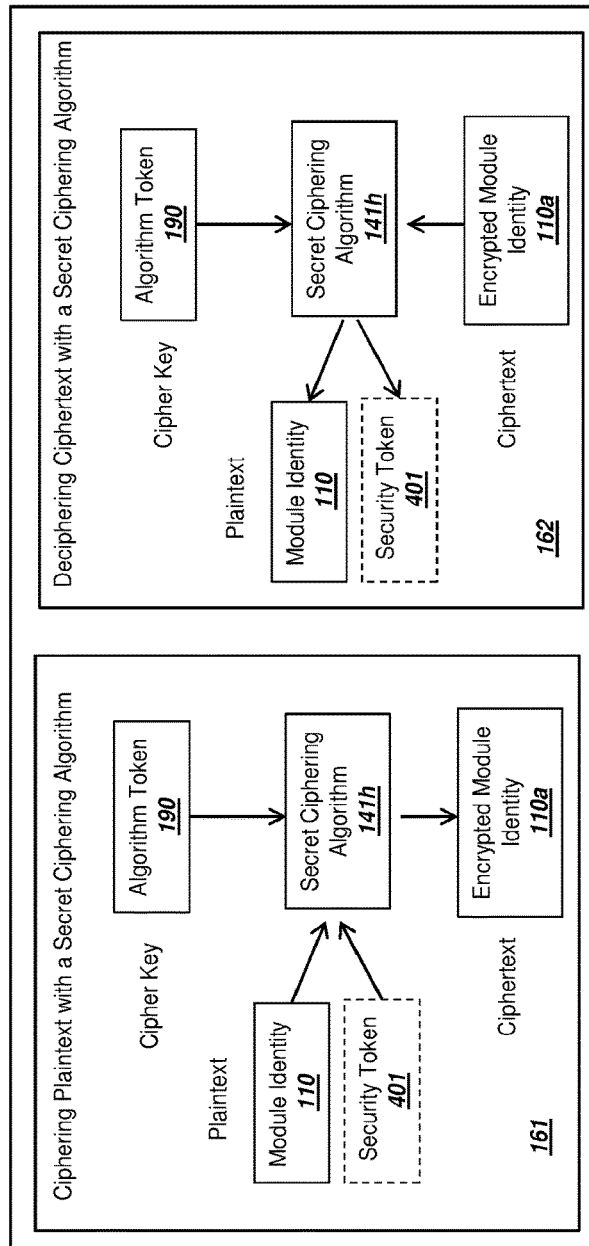
FIG. 1g is a graphical illustration for ciphering and deciphering plaintext using a secret ciphering algorithm with input of ciphertext and a key, in accordance with exemplary embodiments.

FIG. 1*g* is a graphical illustration for ciphering and deciphering plaintext using a secret ciphering algorithm with input of ciphertext and a key, in accordance with exemplary embodiments. FIG. 1*g* illustrates an exemplary secret ciphering algorithm ciphering 161 and an exemplary secret ciphering algorithm deciphering 162. In the exemplary secret ciphering algorithm ciphering 161, a secret ciphering algorithm 141*h* can process or derive output of ciphertext as encrypted module identity 110*a* using input of (i) an algorithm token 190 as a cipher key and (ii) plaintext in the form of a module identity 110. In the exemplary secret ciphering algorithm deciphering 162, a secret ciphering algorithm 141*h* can process or derive plaintext output of a module identity 110 using input of (i) an algorithm token 190 as a cipher key and (ii) ciphertext in the form of an encrypted module identity 110*a*. As contemplated herein, a secret ciphering algorithm 141*h* as one form of a symmetric ciphering algorithm 141*b* can also process other ciphertext and plaintext besides an encrypted module identity 110*a* and a module identity 110, respectively. In addition, a secret ciphering algorithm 141*h* can use a different key besides an algorithm token 190 as a cipher key, such as, but not limited to, a random number 128*a* as a cipher key.

The communication of a module identity 110 in a system 100 and other systems illustrated herein can include the transmission of an encrypted module identity 110a with the cipher key in the form of an algorithm token 190. The transmission of an encrypted module identity 110a with the cipher key in the form of an algorithm token 190 can remain reasonably secure, since the symmetric ciphering algorithm 141b used in a secret ciphering algorithm 141h to process ciphertext transmitted can remain secret or confidential. The secret symmetric ciphering algorithm 141b can comprise a secret ciphering algorithm 141h. A secret ciphering algorithm 141h is also depicted and described in connection with FIG. 1d. In an exemplary embodiment, secret ciphering algorithm 141h, and other cryptographic algorithms 141, can be included in a module program 101i and a program, library, or subroutine in a server 105.

In an exemplary embodiment, in order for the secret ciphering algorithm 141h to remain reasonably secure and/or confidential, the secret ciphering algorithm 141h can either (i) not be transmitted across a network such as, but not limited to, the IP Network 107 and recorded in module 101 upon manufacturing and/or distribution, or (ii) transmitted across a network such as, but not limited to, the IP Network 107 in an encrypted or ciphered format. In exemplary embodiments, a cipher key used in a secret ciphering algorithm ciphering 161 and a secret ciphering algorithm deciphering 162 can also comprise any of a shared secret key 129c, a symmetric key 127, a derived shared key 129b, or a pre-shared secret key 129a. With the use of a cipher key such as a shared secret key 129c, a symmetric key 127, a derived shared key 129b, or a pre-shared secret key 129a, these keys may optionally not be transmitted with the ciphertext output of secret ciphering algorithm 141h, when the other node also can derive or obtain the cipher key through secure means. Other possibilities exist as well, in order for a module 101 and a server 105 to use the same cipher key with a secret ciphering algorithm 141h to decrypt or resolve the ciphertext possibly in the form of an encrypted module identity 110a into plaintext possibly in the form of a module identity 110. A secret ciphering algorithm 141h could select, mix, and append values from the cipher key and the plaintext in a secret or confidential manner in a plurality of rounds, such that an observer with the cipher key and the ciphertext would not reasonably be able to read or determine the plaintext.

In exemplary embodiments, a module identity 110 can be sent or transmitted in the form of an encrypted module identity 110a in order to protect the identity of module 101 from third parties along the path of communications between a module 101 and a server 105. The algorithm token 190 sent with the encrypted module identity 110a can be a cipher key used by a secret ciphering algorithm 141h to decipher the encrypted module identity 110a into a module identity 110. A module 101 can use a secret ciphering algorithm ciphering 161 to convert a module identity 110 into an encrypted module identity string 110a with an algorithm token 190 as a cipher key. In a secret ciphering algorithm ciphering 161, the module identity 110 and the algorithm token 190 as a cipher key can be input in to a secret ciphering algorithm 141g in order to output a encrypted module identity 110a string or number. The algorithm token 190 can comprise or use a random number 128a. A module 101 sending a message with an encrypted module identity 110a and an algorithm token 190 is depicted and described in connection with FIG. 6 below. In an exemplary embodiment, the plaintext can include a security token 401 in order to prevent replay or reuse of the encrypted module identity 110a, where a security token 401 is depicted and described in connection with FIG. 4 below. Note that the use of a security token 401 is optional and may be omitted, and replay or reuse of an encrypted module identity 110a can also be implemented by changing the algorithm token 190 used as a cipher key.

A node such as a server 105 could use a secret ciphering algorithm deciphering 162 in order to read plaintext from a received ciphertext and also a received algorithm token 190. When used with an encrypted module identity 110a, a server 105 could process or input the encrypted module identity 110a into a secret ciphering algorithm 141h, along with inputting the algorithm token 190, in order to extract the plaintext. A secret ciphering algorithm deciphering 162 can comprise the reverse or inverse operation of secret ciphering algorithm ciphering 161. Note that the plaintext could include a security token 401 in order to prevent replay or reuse of the ciphertext, and a security token 401 is depicted and described in connection with FIG. 4 below and could comprise a random number or string. In order to decrypt an encrypted module identity 110a, a server 105 would preferably use the same secret ciphering algorithm 141h implemented by the module 101 sending the encrypted module identity 110a. The module 101 can use a secret ciphering algorithm ciphering 161 to cipher or encrypt the module identity 110 as the encrypted module identity 110a. The server 105 can also receive the algorithm token 190 along with a message that contains the encrypted module identity 110a. Although illustrated in FIG. 6 below as both encrypted module identity 110a and algorithm token 190 being received by a server 105 in the same message, the two values could be sent in separate messages.

Figure 1H:
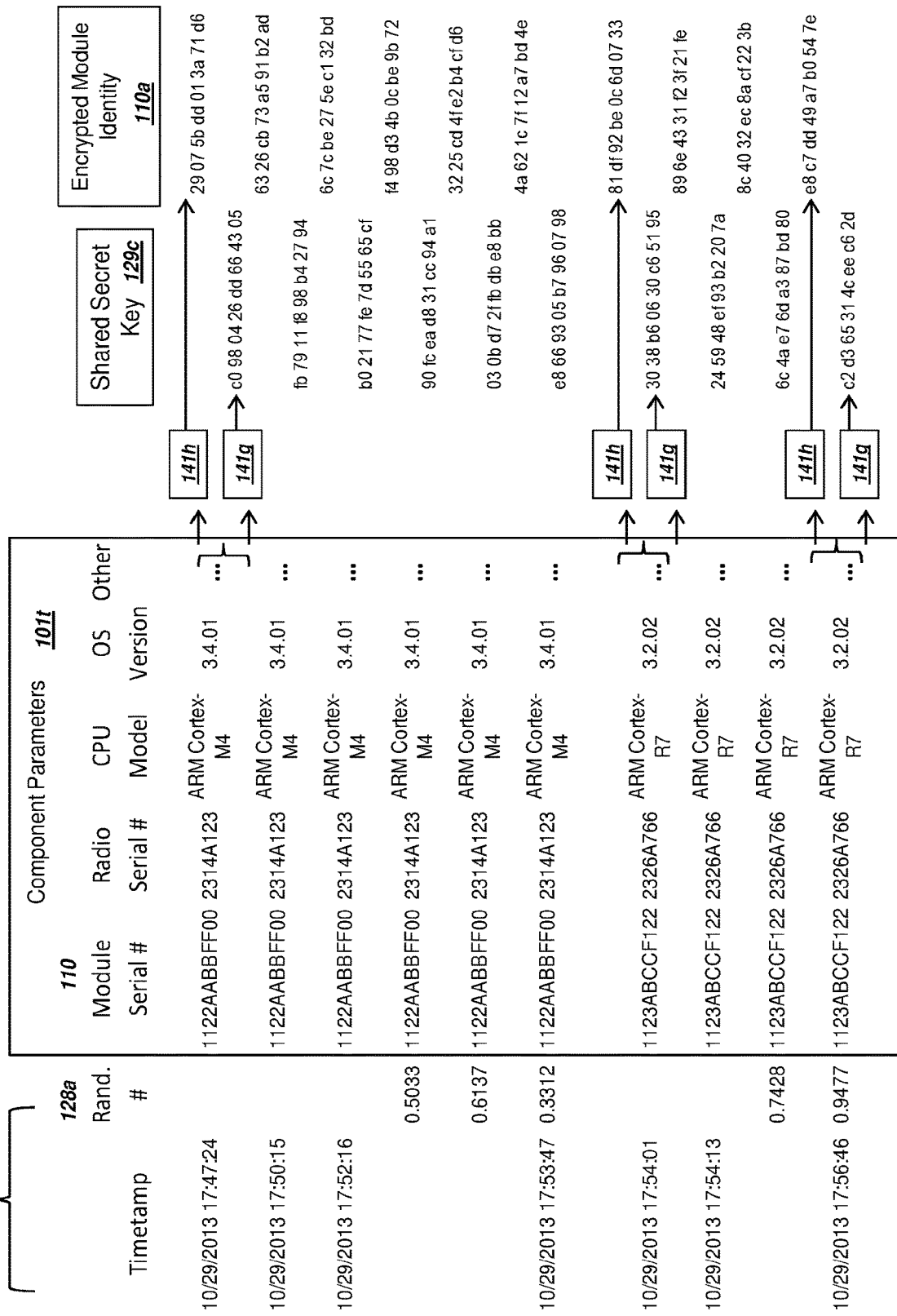
FIG. 1h is a graphical illustration for deriving a shared secret key and an encrypted module identity, in accordance with exemplary embodiments.

An algorithm token 190 as a cipher key input into a secret ciphering algorithm 141h can comprise a temporary value or a number or a string that may preferably only be used once in exemplary embodiments, and can include a random number 128a. As illustrated in FIG. 1h, an algorithm token 190 for a secret ciphering algorithm 141h can comprise a timestamp and/or a random number 128a. The timestamp can be calculated using a clock 160 and the random number 128a may comprise a random number 128a processed with a random number generator 128. The random number generator 128 could use a "module random seed file" 139 in order to populate a seed 128b with a number or value that comprises a high level of "noise" or information entropy. In an exemplary embodiment, an algorithm token 190 can comprise a time value alone, a random number 128a alone, or a combination of a time value and a random number 128a. In an exemplary embodiment, the time value and/or random number 128 may preferably have a sufficient number of digits or resolution such that the probability of using the same random number 128a and/or time value as an algorithm token 190 input into a secret ciphering algorithm 141h would be sufficiently small or negligible. Note that other values besides a time value or a random number 128a could be used in an algorithm token 190, where the other values also have a low probability of being reused and also contain a high level of information entropy.

In an exemplary embodiment, for a system 100 with a plurality of modules 101, different modules 101 could utilize different secret ciphering algorithms 141h. Other identifying information besides a module identity 110 within a module encrypted data 110a could be used by a set of servers 105 in order to determine which secret ciphering algorithm 141h is used for any given module 101. A first set of modules 101 using a first secret ciphering algorithm 141h, possibly to encrypt a module identity 110, could send data to a first IP address or port number. The receipt of data at the port number or address by the server could signal or determine for the server 105 which secret ciphering algorithm 141*h* was used to encrypt the plaintext, thereby allowing the server 105 to select the appropriate secret ciphering algorithm 141*h* in order to decrypt the received ciphertext. Or, module 101 could send a value in a message that would specify which secret ciphering algorithm 141*h* is used with ciphertext sent by module 101, such as an encrypted module identity 110*a*. Other possibilities exist as well for the use of a plurality of secret ciphering algorithms 141*h* as well, without departing from the scope of the present invention.

In exemplary embodiments, where a module identity 110 may be obfuscated or encrypted in an encrypted module identity 110*a* sent to a server 105 in a message, the packet may also contain other encrypted data such as a module encrypted data 403 depicted and described below in FIG. 4. The packet can also include the algorithm token 190. A module encrypted data 403 can be ciphered with a symmetric key 127 and a different symmetric ciphering algorithm 141*b* than secret ciphering algorithm 141*h*. A server 105 receiving a packet containing a module encrypted data 403 should preferably be able to select a symmetric key 127 using a module identity 110 in order to decrypt the module encrypted data 403. Since the module identity 110 may be transmitted as an encrypted module identity 110*a*, the server 105 can use the algorithm token 190 and a secret ciphering algorithm deciphering 162 in order to read the plaintext module identity 110. Upon reading the plaintext module identity 110, the server can select the symmetric key 127 from a module database 105*k* in order to decrypt the module encrypted data 403 into plaintext.

FIG. 1*h*

FIG. 1*h* is a graphical illustration for deriving a shared secret key and an encrypted module identity, in accordance with exemplary embodiments. As depicted and described in connection with FIG. 1*f*, a shared secret key 129*c* can be calculated or derived by a shared secret algorithm 141*g*, where the shared secret algorithm 141*g* can use input from a set of component parameters 101*t* and an algorithm token 190. The set component parameters 101*t* depicted in FIG. 1*h* are shown as illustrative as opposed to limiting, and other component parameters 101*t* could be utilized as well by a shared secret algorithm 141*g*. The values for a set of component parameters 101*t* could be encoded in different formats than plaintext as well. The algorithm token 190 can also comprise different data, such as a random number 128*a* in the form of binary or hexadecimal data and also with a longer set of digits than those shown in FIG. 1*h*. A timestamp can be in other formats, such as, but not limited to, a number corresponding to unix epoch time. A module 101 and a server 105 could calculate the same or equivalent shared secret key 129*c* using the same or equivalent input from the algorithm token 190 and the set of component parameters 101*t*. The module 101 and server 105 could use the same share secret algorithm 141*g* to determine the same shared secret key 129*c*. The server 105 could record the set of component parameters 101*t* in a module database 105*k*, and the server 105 could select the set of component parameters 101*t* using a module identity 110 received in a message. A shared secret key 129*c* could also comprise a number longer than the number illustrated in FIG. 1*h*, such as an exemplary 128 bits for use as a symmetric key 127 with a symmetric ciphering algorithm 141*b* that requires a key of 128 bits, and other possibilities exist as well.

In order to output shared secret key 129*c*, shared secret algorithm 141*g* can use the logic and/or steps for a shared secret algorithm 141*g* depicted and described in connection with FIG. 1*f* to process the input data from the set of component parameters 101*t* and the algorithm token 190 in order to calculate the shared secret key 129*c*. Different values for a shared secret key 129*c* could be calculated using different values for the set of component parameters 101*t* and the algorithm token 190. As illustrated in FIG. 1*h*, a first module 101 associated with a first module identity 110 could use a first set of component parameters 101*t* and different values for an algorithm token 190 in order to obtain different shared secret keys 129*c* over time, and a server 105 could calculate the same shared secret keys 129*c* by receiving the algorithm token 190 in a message. As illustrated in FIG. 1*h*, a second module 101 associated with a second module identity 110 could use a second set of component parameters 101*t* and different values for an algorithm token 190 in order to obtain different shared secret keys 129*c* associated with the second module 101 over time. A server 105 could calculate the corresponding shared secret keys 129*c* for the second module 101 by receiving the algorithm token 190 in a message, and use the second set of component parameters 101*t*.

Encrypted module identity 110*a* can be calculated by a module 101 using a secret ciphering algorithm ciphering 161 and a key in the form of an algorithm token 190. The algorithm token 190 can preferably include a random number 128*a* in an exemplary embodiment. As illustrated in FIG. 1*h*, a set of component parameters 101*t* can also be used in a ciphering key in a secret ciphering algorithm ciphering 161, but the use of component parameters 101*t* with a secret ciphering algorithm ciphering 161 can optionally be omitted, and in this case the ciphering key for a secret ciphering algorithm ciphering 161 can comprise an algorithm token 190. The encrypted module identity 110*a* and algorithm token 190 could be sent to a server 105 in an exemplary message illustrated in FIG. 6 below. A server 105 or set of servers 1010 (illustrated in FIG. 10) could receive the encrypted module identity 110*a* and algorithm token 190, and the server 105 could use a secret ciphering algorithm deciphering 162 and the algorithm token 190 to decrypt the encrypted module identity 110*a* in order to read the plaintext module identity 110. By using different values for the algorithm token 190 with a secret ciphering algorithm ciphering 161, a module 101 can calculate different values for encrypted module identity 110*a* over time.

FIG. 1*i*

Figure 1I:
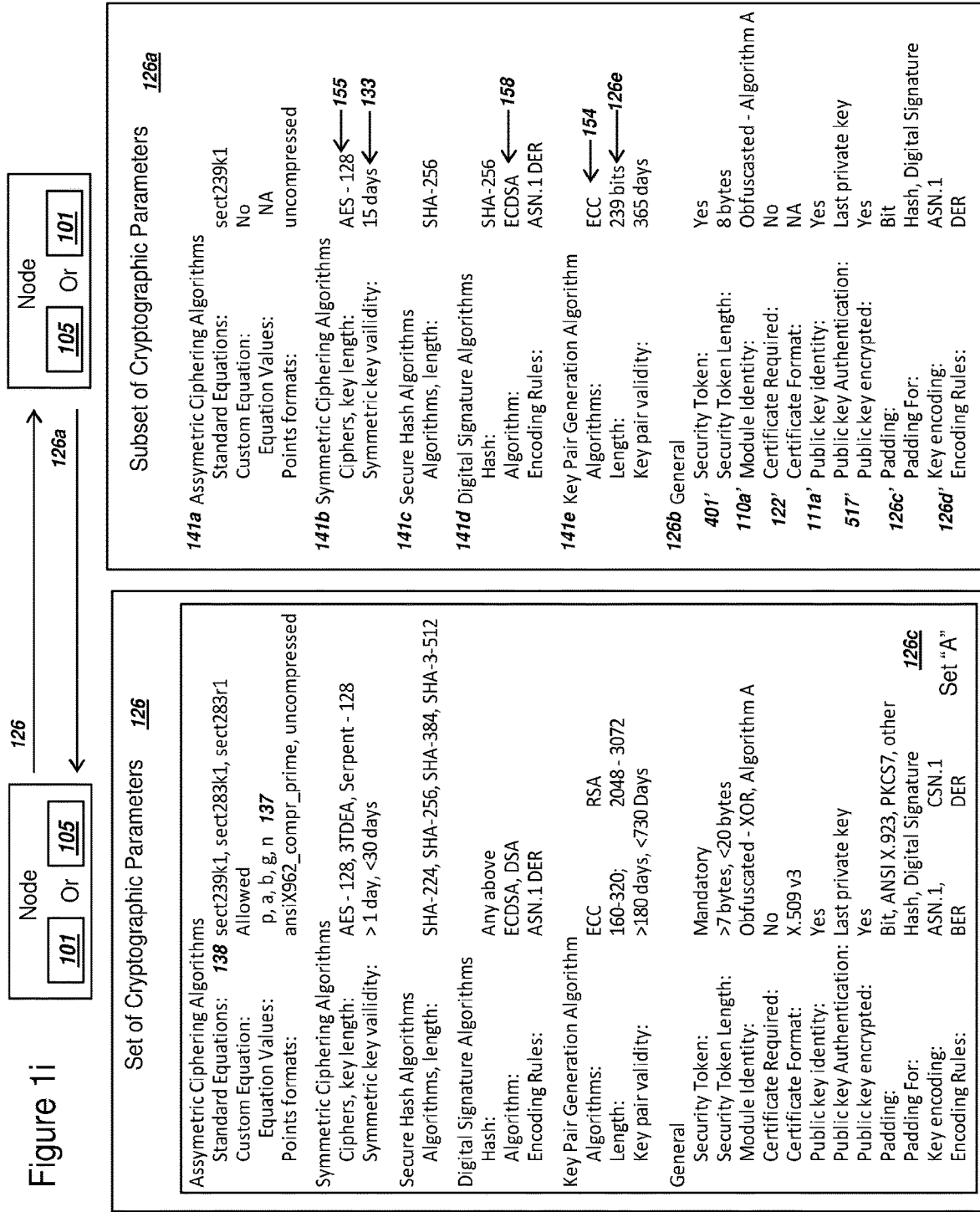
FIG. 1i is a graphical illustration of an exemplary system, where a module and a server exchange a set of cryptographic parameters and a subset of the set of cryptographic parameters, in accordance with exemplary embodiments.

FIG. 1*i* is a graphical illustration of an exemplary system, where a module and a server exchange a set of cryptographic parameters and a subset of the set of cryptographic parameters, in accordance with exemplary embodiments. In exemplary embodiments, a first node can send a set of cryptographic parameters 126 to a second node, and the second node can send a subset of cryptographic parameters 126*a* to the first node. In an exemplary embodiment, a server 105 can send the set of cryptographic parameters 126 to a module 101, and the module 101 can send the subset of the cryptographic parameters 126*a* to the server 105. The module can select the subset of cryptographic parameters 126*a* according to the capabilities of a module program 101*i* and/or a set of cryptographic parameters 141 recorded in the module 101. In another exemplary embodiment, a module 101 can send the set of cryptographic parameters 126 to a server 105 (or a set of servers 1010 illustrated in FIG. 10), and the server 105 can send the subset of the cryptographic parameters 126*a* to the module 101.

In this manner, using the steps illustrated in FIG. 1*i*, the two nodes can select and agree on a subset of cryptographic parameters 126*a* for use with a set of cryptographic algorithms 141. The exemplary values for a set of cryptographic parameters 126 are shown in FIG. 1i to be illustrative as opposed to limiting, and other values or fields for a set of cryptographic parameters 126 are possible as well without departing from the scope of the present invention. As contemplated herein, a subset of cryptographic parameters 126a can also comprise a set of cryptographic parameters 126. Although not illustrated in FIG. 1i, a node receiving a subset of cryptographic parameters 126a could send an acknowledgement upon receipt to signal the subset of cryptographic parameters 126a had been properly received in a valid or acceptable format and also implemented in communication with the other node.

In addition, both the set of cryptographic parameters 126 and the subset of cryptographic parameters 126a can be transmitted in a ciphertext form in order to increase security. In an exemplary embodiment, server 105 can send the set of cryptographic parameters 126 in a server encrypted data 504 (depicted and described in connection with FIG. 5a below), and the module 101 can respond with a subset of cryptographic parameters 126a in a module encrypted data 403 (depicted and described in connection with FIG. 4 below). The set of cryptographic parameters 126 or 126a could be encrypted with a symmetric key 127, where in an exemplary embodiment the symmetric key 127 could comprise a pre-shared secret key 129a depicted and described in connection with FIG. 1d of U.S. patent application Ser. No. 14/039,401, filed Sep. 27, 2013 in the name of John Nix, which is incorporated by reference in its entirety. Or, the symmetric key 127 for encrypting a set of cryptographic parameters 126 or 126a could comprise a shared secret key 129c as described in FIG. 1f and FIG. 1h herein.

In exemplary embodiments, module 101 and server 105 could pre-agree to a base set of cryptographic parameters 126 different than the set of cryptographic parameters 126 illustrated in FIG. 1i, and the pre-agreed base set of cryptographic parameters 126 could be used with a set of cryptographic algorithms 141 to establish a symmetric key 127 in order to encrypt the set of cryptographic parameters 126 or 126a. In addition, the set of cryptographic parameters 126 or 126a could be ciphered using an asymmetric ciphering algorithm 141a and a public key of the other node, and sent to the receiving node to decrypt using the private key of the receiving node. The algorithms used to cipher a set of cryptographic parameters 126 in an asymmetric ciphering algorithm 141a could be pre-agreed, and a different set of asymmetric ciphering algorithms 141a could be selected after processing the received set of cryptographic parameters 126. Other possibilities for encrypting a set of cryptographic parameters 126 or 126a exist as well without departing from the scope of the present invention. Alternatively, the set of cryptographic parameters 126 and/or 126a could be sent between two nodes as plaintext within an IP packet.

The set of cryptographic parameters 126 can include a list of available options for a set of asymmetric ciphering algorithms 141a, symmetric ciphering algorithms 141b, secure hash algorithms 141c, digital signature algorithms 141d, a key pair generation algorithm 141e, and also general cryptographic parameters 126b. Although not illustrated in FIG. 1i, a set of cryptographic parameters 126 could also include parameters for a key derivation function 141f, a shared secret algorithm 141g, and a secret ciphering algorithm 141h. In an exemplary embodiment, the list of available options for a set of asymmetric ciphering algorithms 141a could comprise a list of ECC standard curves 138 and also ECC parameters 137 which could comprise a list of numbers or values for an elliptic curve defining equation. A module 101 and a server 105 could utilize a custom or non-standard elliptic curve defining equation by sending and/or receiving a set of ECC parameters 137 in a set of cryptographic parameters 126. Or, as illustrated in FIG. 1i, a node could select an ECC standard curve 138 from a list in a set of cryptographic parameters 126. A set of cryptographic parameters 126 could include a private key length 126e for deriving a module private key 112. A node could take similar steps for selecting an option from a list of available options for other fields as well in a set of cryptographic parameters 126 such as, but not limited to, symmetric ciphering algorithms 141b, secured hash algorithms 141c, etc. as illustrated in FIG. 1i, in order to derive a subset of cryptographic parameters 126a.

General parameters 126b can include a list of values that can be utilized in a set of cryptographic algorithms 141. General parameters 126 could specify values for using and/or the format of (i) a security token 410, (ii) an algorithm for processing an encrypted module identity string 110a, (iii) a certificate 122, (iv) a public key identity 111a, (v) the authentication means of a derived public key 111 in a step 517 depicted and described below in connection with FIG. 5b, (vi) a padding scheme 126c for the set of cryptographic algorithms 141, and/or (vii) key encoding rules 126d. Key encoding rules 126d can specify the format for sending and receiving a public key, such as the format of a derived module public key 111 sent to a server 105 in a step 516 depicted and described in connection with FIG. 5b below. Numerals depicted in FIG. 1i with a general parameters 126b include a "'" so show an association with the fields shown, as opposed to comprising the elements themselves. For example, the value of "security token length: 8 bytes" in a general parameters 126b with a label of "401'" illustrates the value of "security token length: 8 bytes" is associated with a security token 401 as opposed to being an exemplary the value for a security token 401. Likewise, the value of "Public Key Identity: yes" with a label of 111a' illustrates that a general parameters 126b can specify a value for using a public key identity 111a as opposed to a public key identity 111a comprising a value of "Public Key Identity: yes", etc.

Within a general parameters 126b in a set or subset of a cryptographic parameters 126, a field associated with module identity 110, illustrated as "110'", can specify an algorithm to use for ciphering or obfuscating a module identity 110. A general parameters 126b could specify the use of a secret ciphering algorithm ciphering 161 for encrypting a module identity 110. In an exemplary embodiment, the general parameters 126b can specify the method of authentication for a derived module public key 111, where the module 101 could use a step 517 below. Exemplary values in a general parameters 126b for the authentication of a derived module public key 111 include, but are not limited to, message digest with a secret key, ciphering with a symmetric key 127, authenticating with a pre-shared public key, and module 101 sending a module digital signature 405 depicted and described in connection with FIG. 4 below. In accordance with preferred exemplary embodiments, a set of cryptographic parameters 126, possibly in a set of general parameters 126b, can include both (i) values for a module 101 to use with a set of cryptographic parameters 141 for deriving a new module public key 111 and new module private key 112, and (ii) steps or values for a module 101 to authenticate the new, derived module public key 111 with a server 105.

The set of cryptographic parameters 126 illustrated in FIG. 1i for a module 101 and the subset of cryptographic parameters 126a may be different than conventional technology, since the module 101 can select appropriate parameters or values for deriving its own module public key 111 and module private key 112, as well as changing the parameters or values over time for the generation of subsequent or new module public keys 111 and module private keys 112. Although not illustrated in FIG. 1i, general parameters 126b could also include a time value for module 101 to refresh the set of cryptographic parameters 126 with server 105, such as periodically checking for a change in a preferred set of cryptographic parameters 126. In order to minimize bandwidth and also power consumption for a module 101, an exemplary time value for module 101 to check with server 105 for a new set of cryptographic parameters 126 could be an exemplary every 30 days. In another embodiment, server 105 could simply send a new set of cryptographic parameters 126 to module 101 each time new values may applicable.

As contemplated herein, a module 101 may be deployed with a monitored unit 119 for an extended period such as several years or longer, and a module public key 111 with a limited validity date could expire. In this case, after an extended period such as years, a preferred set of cryptographic parameters 126 could change, such as movement to longer private key lengths 126e, or the use of a new set of ECC standard curves 138. In this case, when a new module public key 111 is required, possibly due to the expiration of a prior module public key 111, module 101 could receive a new set of cryptographic parameters 126 and send a subset of the cryptographic parameters 126a before deriving a new module private key 112 and a new module public key 111 using the subset of cryptographic parameters 126a and a set of cryptographic algorithms 141. In exemplary embodiments, a set of cryptographic parameters 126 or subset of cryptographic parameters 126a used by a module 101 can change over time.

A set of cryptographic parameters 126 could specify additional information to the exemplary data shown in FIG. 1i. Within a set of general parameters 126b, a name or address of a certificate authority 118 could be included, where module 101 could send a module public key 111 derived using a step 515 depicted and described in connection with FIG. 5b. A set of cryptographic parameters 126 could include other names and addresses of servers, such as a first server 105 in a set of servers 1010 where module 101 would first authenticate module identity 110 and obtain a symmetric key 127, and module 101 could then communicate with a second server 105 using the symmetric key 127. A set of cryptographic parameters 126 could specify that the source of new module private key 112 and module public key 111 could be internally derived by module 101, as opposed to module 101 seeking a new module private key 112 from a local source, such as via a local network or a physical interface such as USB interface 101v. In addition, a set of cryptographic parameters 126 could include values for a random number generator 128, such as specifying the use of a seed 128b, or a module seed file 139, or the minimum length of a random number 128a. In addition, a plurality of different shared secret algorithms 141g and secret ciphering algorithms 141h could be used by a module 101 and a server 105, and specific shared secret algorithms 141g and secret ciphering algorithms 141h can be selected in a set of cryptographic parameters 126.

In exemplary embodiments, although not illustrated in FIG. 1i, a set of cryptographic parameters 126 or 126a can specify the use of multiple module private keys 112 and module public keys 111 concurrently. In an exemplary embodiment, a module 101 could use a first module private key 111 with asymmetric ciphering algorithms 141a for receiving symmetric keys 127, and a second module private key 111 for deriving or calculating a module digital signature 405 (in FIG. 4 below). Further, a module 101 could communicate with a plurality of servers 105, where a first server 105 could use a first set of cryptographic parameters 126 and a second server could use a second and different set of cryptographic parameters 126. In order to maintain compatibility with the different servers 105, a module 101 could use (i) a first module private key 112 and first module public key 111 that was derived using the first set of cryptographic parameters 126 for communicating with the first server 105, and (ii) a second module private key 112 and second module public key 111 that was derived using the second set of cryptographic parameters 126 for communicating with the second server 105. In order to keep track of potentially multiple sets of cryptographic parameters 126 and/or subsets of cryptographic parameters 126a, a module 101 and/or a server 105 could implement a set of cryptographic parameters token 126c. The token 126c, illustrated as an exemplary "Set A" in FIG. 1i, can be a value to represent a collection of cryptographic parameters 126, and subsequently either module 101 or server 105 could refer to the set of cryptographic parameters 126 using the set of cryptographic parameters token 126c instead of communicating the full set of cryptographic parameters 126.

As contemplated herein, a set of cryptographic parameters 126 could also include values for a module 101 to authenticate or communicate with one or multiple wireless networks 102. In an embodiment, a wireless network 102 could require a specific symmetric ciphering algorithm 141b, and also a specific key derivation function 141f for generating derived shared keys 129b, and the specific values needed for module 101 to communicate with a wireless network 102 could be sent in a set of cryptographic parameters 126. Other possibilities exist as well to those of ordinary skill in the art without departing from the scope of the present invention.

FIG. 1j

FIG. 1j is an illustration of a certificate that includes a PKI public key, where the key comprises an elliptic curve cryptography key, in accordance with exemplary embodiments. Public and private keys in system 100 and other systems contemplated herein can utilize PKI techniques other than RSA, such as the elliptic curve cryptography (ECC) public key 111 illustrated in FIG. 1h. One benefit of using ECC is that an equivalent level of security can be obtained for a much smaller key length. Also, energy may be conserved using ECC algorithms 154 compared to RSA algorithms 153. An analysis of the energy conserved for ciphering, deciphering, signing, and verifying messages using ECC versus RSA is included in the paper titled "Energy Analysis of Public-Key Cryptography on Small Wireless Devices" by Wander et al (herein incorporated by reference). Smaller key lengths save bandwidth, memory, processing resources, and power, which are all valuable for a module 101 to conserve a battery 101k and usage of radio-frequency spectrum. For example, an ECC key length of 283 bits provides security similar to an RSA key length of approximately 2048 bits. Module public key 111 can comprise an ECC key in an X.509 certificate, as illustrated in FIG. 1g.

Certificate 122 could include a signature 123, where signature 123 can be signed using ECC signature techniques, such as the Elliptic Curve Digital Signature Algorithm (ECDSA) 158 with a secure hash such as SHA256 156. A signature 123 in a certificate 122 containing an elliptic public key 111 could also be signed using a DSA algorithm 167. In order to generate signature 123, the private key associated with either CA 118 or module provider 109 may also be an ECC-based private key (for ECDSA 158). Note that the public key 111 in a certificate 122 could use a different asymmetric ciphering algorithm 141a than the algorithm used for signing, such that the public key 111 can be an ECC key, while the signature 123 could be generated with RSA algorithm 153 and/or key. Certificate 122 may also include a subset of cryptographic parameters 126a (or "parameters 126a"), where parameters 126a can specify an elliptic curve utilized with the module public key 111. Parameters 126a could also include the start and end times for the validity of either public key 111 or certificate 122. Other parameters 126a can be utilized in a certificate 122 as well, including parameters 126a recording a modulus for an RSA algorithm 153.

Certificate 122 illustrated in FIG. 1g also illustrates an exemplary embodiment of the present invention. Over the lifetime of a module 101, which could be a decade or longer, multiple module public keys 111 may be utilized. Exemplary reasons for the potential use of multiple different module public keys 111 include (i) the expiration of a certificate 122 (including expiration of a public key associated with a certificate authority 118 used in signature 123), (ii) a need to change an elliptic curve specified in a parameters 126, (iii) adding a new public/private key pair for connection with a different wireless network 102, (iv) as increasing a key length utilized in a public/private key pair, (v) the transfer of ownership or control of module 101, and/or (vi) module 101 connecting to a new server 105 that utilizes a different asymmetric ciphering algorithm (i.e. RSA instead of ECC). Other possibilities exist as well for reasons a module to derive a new module public key 111. Note that the multiple module public keys 111 may also be utilized concurrently, such that (i) a first module public key 111 in a first certificate 102 can be utilized with a first server 105, and (ii) a second module public key 111 (possibly derived using a different set of parameters 126 including using a different elliptic curve or asymmetric ciphering algorithm) can be utilized with a second server 105 and/or wireless network 102.

In either case of (i) module 101 using multiple module public keys 111 concurrently, or (ii) module 101 using different module public keys 111 in sequence, a certificate 122 can preferably include a module public key identity 111a to specify the module public key 111 utilized in a certificate 122. As illustrated in FIG. 1j, the module public key identity 111a could be included in the CN field, and the module identity 110 can be included in the OU field. Alternatively, the module public key identity 111a and module identity 110 can be appended together and used in the CN field. In this manner and according to preferred exemplary embodiments, a module public key identity 111a is utilized with both a module identity 110 and a module public key 111 within a certificate 122. Also, as noted previously herein, the use of a certificate 122 may optionally be omitted, such that module 101 and server 105 share public keys without using certificates 122, or a server 105 could use a certificate 122 and module 101 may omit a certificate 122 and other possibilities exist as well.

FIG. 1k

Figure 1M:
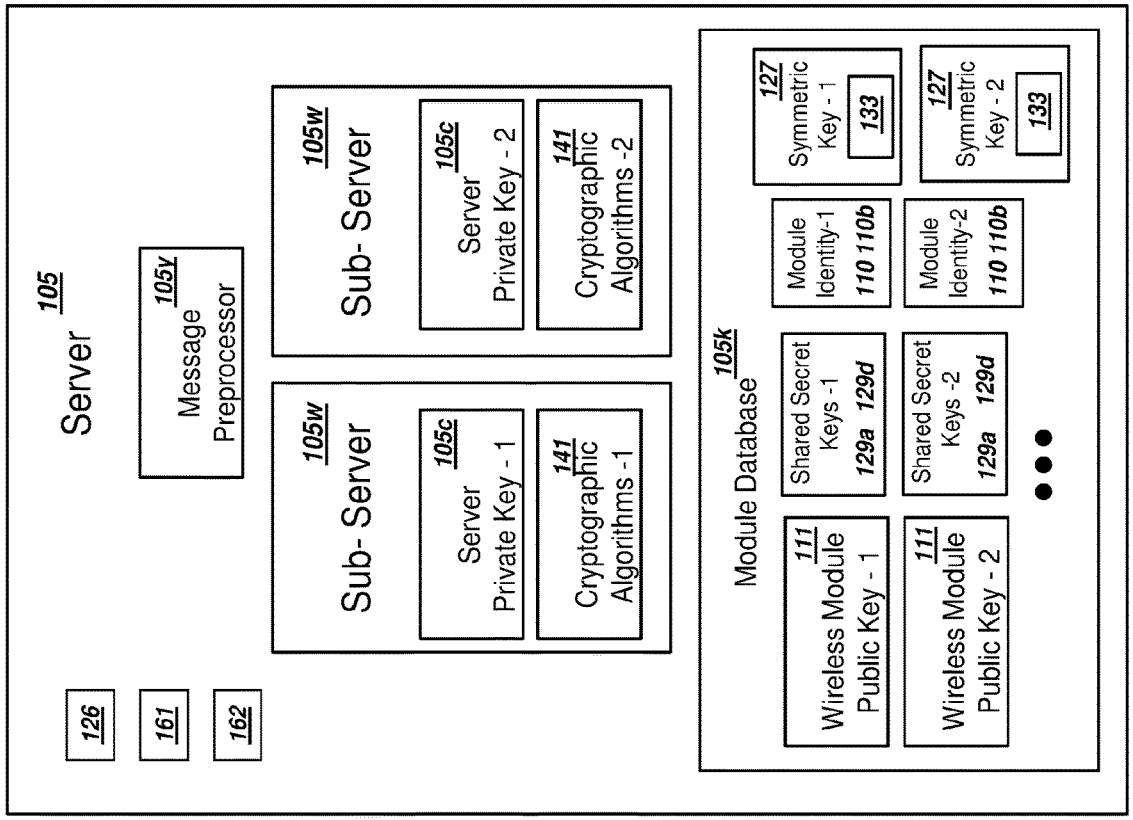
FIG. 1*m* is a graphical illustration of components within a server, in accordance with exemplary embodiments.
Figure 1K:
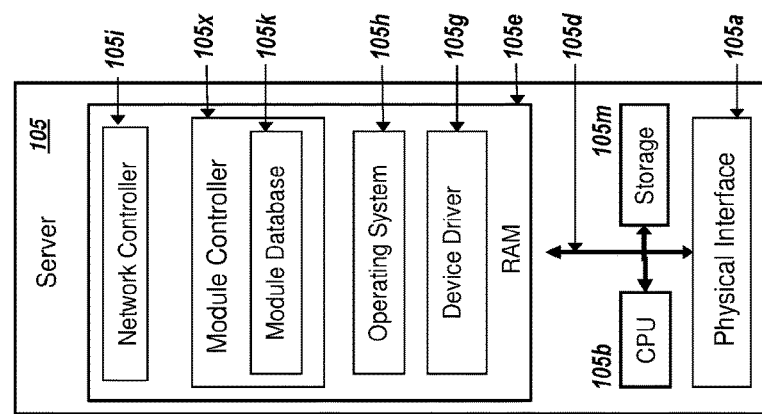
FIG. 1*k* is a graphical illustration of hardware, firmware, and software components for a server, in accordance with exemplary embodiments.

FIG. 1k is a graphical illustration of hardware, firmware, and software components for a server, in accordance with exemplary embodiments. The illustrated components for the server 105 in FIG. 1k include a central processing unit (CPU) 105b, a random access memory (RAM) 105e, a system bus 105d, storage 105m, an operating system 105h, and a module controller 105x. These elements can provide functions equivalent to the central processing unit (CPU) 101b, RAM 101e, system bus 101d, flash memory 101w, and an operating system 101h described above in FIG. 1b, respectively. In general, a server 105 can have higher-end components such as, but not limited to, a larger CPU 105b and greater RANI 105e in order to support communications with a plurality of modules 101. Server 105 can comprise a general purpose computer such as, but not limited to, a rack mounted server within a data center or rack, or could also comprise a desktop computer or laptop. Server 105 could also be a specialized computer, with hardware and software selected for supporting a plurality of modules 101 connecting and communicating simultaneously. Operating system 101h can comprise an operating system appropriate for a server such as, but not limited to, Linux, Solaris®, or Windows® Server. Server 105 can preferably include at least one wired Ethernet connection with high bandwidth that is persistently connected to the IP Network 107, while the IP Network 107 connection for module 101 may be transient as module 101 changes between sleep and active states. Module controller 105x can provide the server-side logic for managing communications and controlling module 101 using a module database 105k. Network controller 105i can provide functionality for communicating with external servers or nodes, such as, but not limited to, a wireless network 102 illustrated in FIG. 1a.

A module controller 105x and network controller 105i may be applications programmed in a language such as, but not limited to, C, C++, Java, or Python and could provide functionality to support authentication and communication with modules 101, including M2M applications such as, but not limited to, remote monitoring of sensors and remote activation of actuators. Module controller 105x and network controller 105i could also be software routines, subroutines, linked libraries, or software modules, according to preferred embodiments. Many of the logical steps for operation of server 105, module controller 105x, and/or network controller 105i can be performed in software and hardware by various combinations of physical interface 105a, system bus 105d, device driver 105g, and operating system 105h. A module controller 105x and network controller 105i can also access a set of cryptographic algorithms 141 (in FIG. 1d above) in order (i) to encrypt and decrypt data, and also (ii) process or generate a digital signature and verify received digital signatures, including message digest authentication. When server 105 is described herein as performing various actions such as, but not limited to, acquiring an IP address, monitoring a port, transmitting or sending a packet, receiving a message, or encrypting or signing a message, specifying herein that server 105 performs an action can refer to software, hardware, and/or firmware operating within server 105 performing the action. As contemplated herein, when a server 105 is described as performing an action such as, but not limited to, sending a response, receiving a message, verifying a digital signature, decrypting data, etc., in some embodiments a set of servers 1010 (illustrated in FIG. 10) can perform the actions for the server 105. In this case, a server 105 could be a member of the set of servers 1010.

The server 105 may store computer executable instructions such as, but not limited to, module controller 105x or network controller 105i on storage 105m. Storage 105m may comprise a disk drive, a solid-state drive, an optical drive, or a disk array. Module controller 105x (i) can manage communications with module 101 or a plurality of modules 101 and (ii) may be downloaded and installed on the server 105. As noted previously and elsewhere herein, module program 101*i* and module controller 105*x* can preferably interoperate with each other in order to collect sensor data and control an actuator associated with a monitored unit 119.

The network controller 105*i* and/or module controller 105*x* operating within server 105 illustrated in FIG. 1*k* can provide computer executable instructions to hardware such as CPU 105*b* through a system bus 105*d* in order to (i) receive a message from the module 101 and (ii) send a response, wherein the message can include sensor 101*f* data and the response can include an acknowledgement of the message and/or an instruction to the module 101. The module controller 105*x* can enable the server 105 to send a response to a message from module 101 by recording data associated with module 101 in memory such as RAM 105*e*, where the data can include an instruction from module 101, a destination IP:port number, a packet or packet header value, and the data can be processed using an encryption or ciphering algorithm or key, a digital signature algorithm or key, etc. The operating system 105*h* or the device driver 105*g* can write the data from RAM 105*e* to a physical interface 105*a* using a system bus 105*d* and an Ethernet connection in order to send the data via the IP Network 107 illustrated in FIG. 1*a*. Alternatively, the software program 105*i* and/or module controller 105*x* can write the data directly to the physical interface 105*a* using the system bus 105*d*.

The server 105 can utilize the physical interface 105*a* to receive data from a module 101 and/or wireless network 102 using a local area network such as Ethernet, although the physical interface 105*a* of server 105 could also utilize a wireless connection. The server 105 can listen or monitor for data from the IP Network 107 using port number and/or a TCP/UDP socket. The received data from a module 101 can be a message formatted according to an Internet packet or datagram or series of datagrams inside Ethernet packets and include information from a module 101 such as, but not limited to, a source IP address and port number, an identity of the module, sensor data that may be encrypted, and/or a digital signature of the module. The received data from wireless network 102 can comprise a series of datagrams formatted according to Internet Protocol and/or datagrams inside Ethernet packets. The received data or message from wireless network 102 can include information regarding wireless network 102 and/or server 105, such as a source IP address and port number associated with wireless network 102, an identity of the server, actuator instructions or commands for a module 101 that may be encrypted, and a digital signature associated with the wireless network 102.

When server 105 receives messages or data, the operating system 105*h* or device driver 105*g* can record the received data from module 101 or wireless network 102 via physical interface 105*a* into memory such as RAM 105*e*. The network controller 105*i* or operating system 105*h* may subsequently access the memory in order to process the data received. The network controller 105*i* and/or module controller 105*x*, or operating system 105*h* can include steps to process the data recorded in memory and received from the module 101 or wireless network 102, such as, but not limited to, parsing the received packet, decrypting data, verifying a digital signature with a key, or decoding sensor data included in a message from the module.

The server 105 and/or network controller 105*i* may communicate with wireless network 102 by sending and receiving packets over a LAN or the IP Network 107, using a physical interface 105*a* and a wired connection such as Ethernet or possibly a wireless connection as well. The server 105 can use the physical interface 105*a* such as an Ethernet connection to send and receive the data from the IP Network 107. For those skilled in the art, other steps are possible as well for an network controller 105*i* or operating system 105*h* within a server 105 to (i) send/receive a packet or message to/from a module 101 and (ii) send/receive a packet or message to/from an wireless network 102 without departing from the scope of the present invention. Network controller 105*i* and module controller 105*x* may optionally be combined within a server 105, or alternatively distributed across different physical computers and function in a coordinated manner using a network.

The device drivers 105*g*, operating systems 105*h*, and/or module controller 105*x* could also optionally be combined into an integrated system for providing the server 105 functionality. Although a single physical interface 105*a*, device-driver set 105*g*, operating system 105*h*, module controller 105*x*, and network controller 105*i* are illustrated in FIG. 1*k* for server 105, server 105 may contain multiple physical interfaces, device drivers, operating systems, software programs, module programs, and/or user interfaces. Server 105 may operate in a distributed environment, such that multiple computers operate in conjunction through a network to provide the functionality of server 105. Also, server 105 may operate in a "virtualized" environment, where server 105 shares physical resources such as a physical CPU 105*b* with other processes operating on the same computer. And other arrangements could be used as well, without departing from the invention.

FIG. 1*m*

FIG. 1*m* is a graphical illustration of components within a server, in accordance with exemplary embodiments. Server 105 can include a module database 105*k*, a sub-server 105*w*, and a message preprocessor 105*y*. Server 105 can also include one or many sets of cryptographic parameters 126, a secret ciphering algorithm ciphering 161, and a secret ciphering algorithm deciphering 162. In an exemplary embodiment, the elements illustrated within a server 105 in FIG. 1*m* may be stored in volatile memory such as RAM 105*e*, and/or storage 105*m*, and may also be accessible to a processor CPU 105*b* via a system bus 105*d*. In another exemplary embodiment, the module database 105*k*, sub-server 105*w*, and message processor 105*y* can comprise separate computers. Module database 105*k*, sub-server 105*w*, and message preprocessor 105*y* could represent either different processes or threads operating on a server 105, or physically separate computers operating in conjunction over a network to perform the functions of a server 105. Since server 105 can preferably support communications with a plurality of modules 101, server 105 can utilize module database 105*k* to store and query data regarding a plurality of modules 101, monitored units 119, and the overall M2M service. The server 105 can store a plurality of module public keys 111 associated with each of a plurality of devices in the module database 105*k*. The server 105 can also store a plurality of shared secret network keys K 129*d* associated with each of a plurality of modules, where secret shared network key K 129*d* is also depicted and described in connection with FIGS. 9*b* and 11. The server 105 can use a module identity 110, possibly in the form of a network module identity 110*b*, for a module 101, received in a message to query the module database 105*k* and select the public key 111, secret shared network key K 129*d*, a symmetric key 127, and other data associated with the module 101.

Although not illustrated in FIG. 1*m*, module database 105*k* can also record a pre-shared secret key code 134, a set of cryptographic parameters 126 or 126*a*, and a module identity 110 for each module 101, along with the pre-shared secret key 129a shown in FIG. 1m. In embodiments where server 105 functions as a home subscriber server (HSS), module database 105 could record authentication triplets of a RAND 912, an RES 913 (both described in FIG. 9b below), and also a network authentication token. Examples of module database 105k could include MySQL, Oracle®, SQLite, hash tables, distributed hash tables, text files, etc. Module database 105k could reside within RAM 105e or storage 105m. Server 105 may also record a symmetric key 127, where the symmetric key 127 can be associated with an expiration time 133. Symmetric key 127 can also be recorded in a module database 105k or a sub-server 105w.

Message preprocessor 105y can process incoming packets and route them to an appropriate sub-server 105w using information contained in an incoming message, such as, but not limited to, a module identity 110 or 110b, a server identity 206 illustrated in FIG. 2 below, and/or a destination IP address. Sub-server 105w can include a server private key 105c and cryptographic algorithms 141. A plurality of sub-servers 105w can be utilized by a server 105 in order to support communication with a plurality of modules 101. The server private key 105c and module public key 111 can be utilized by module 101 to secure communication with server 105, including the steps depicted and described in connection with FIG. 4 and FIG. 5a below. Cryptographic algorithms 141 may comprise a suite of algorithms or subroutines and are depicted and described in connection with FIG. 1d.

Server 105 may also comprise a collection of individual computers, where the individual computers could be either centrally located or geographically dispersed, but the individual computers may function in a coordinated manner over a network to operate as a server 105. Server 105 may be a "virtualized" server, with computing resources shared with other processes operating on a computer. A server 105 as illustrated in FIG. 1k and FIG. 1m may also be operated by a wireless network 102. Wireless network 102 could belong to or be associated with a mobile network operator 108. The mobile network operator (MNO) could control and/or own a public land mobile network (PLMN), and exemplary large MNOs in the United States in 2013 include AT&T® and Verizon®. The wireless network 102 as illustrated in FIG. 1a could comprise the radio access portion of a mobile network operator's network, and a server 105 as illustrated in FIG. 1k and FIG. 1m could reside within the network portion for a mobile network operator. In the embodiments where server 105 is located on a mobile network operator's 108 network, the firewall 104 could optionally be omitted, such that a server 105 can directly communicate with module 101 when module 101 is attached or connected to, or attempts to attach or connect to wireless network 102. Other possibilities exist as well for a server 105 to reside within a mobile network operator's 108 network without departing from the scope of the present invention.

FIG. 2

Figure 2:
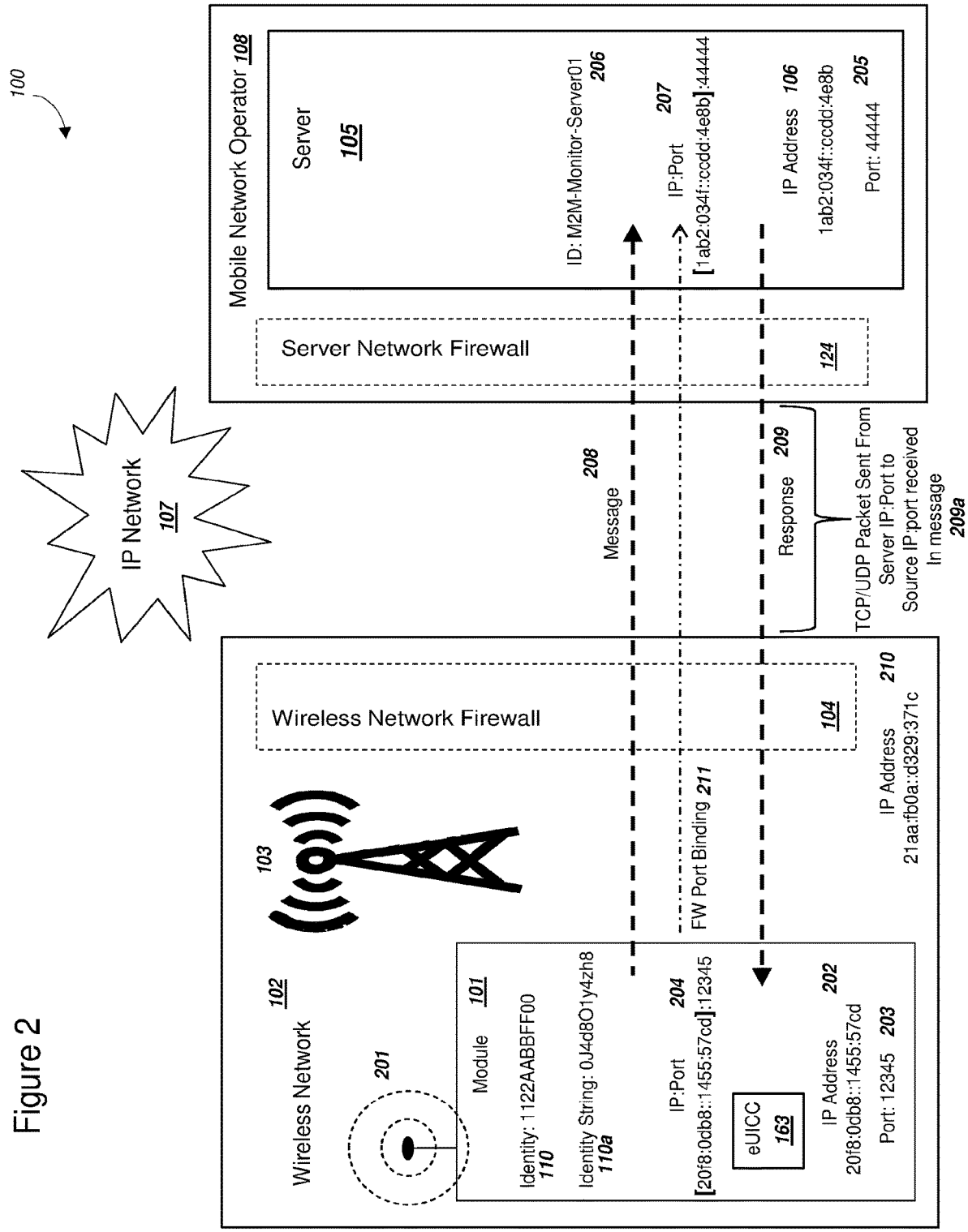
FIG. 2 is a graphical illustration of an exemplary system, where a module sends a message to a server, and where the module receives a response to the message, in accordance with exemplary embodiments.

FIG. 2 is a graphical illustration of an exemplary system, where a module sends a message to a server, and where the module receives a response to the message, in accordance with exemplary embodiments. Module 101 as depicted and described in FIG. 2 can operate as a wireless module 101, although a wired connection to the IP Network 107 could alternatively be utilized. System 100 as illustrated in FIG. 2 includes RF signals 201, module IP address 202, port number 203, module IP:port 204, server port number 205, server ID 206, server IP:port number 207, message 208, response 209, wireless network firewall address 210, and firewall port binding packet 211. Many of the elements illustrated within system 100 in FIG. 2 are also depicted and described in connection with FIG. 2 of U.S. patent application Ser. No. 14/039,401 (the contents of which are hereby incorporated by reference in their entirety). As contemplated herein, a wireless module 101 can comprise a module 101, or in other words a wireless module 101 may be a module 101 that is wireless. Functions described as being performed by a wireless module 101 may also be performed by a wired module 101 (where connection to a wired network would be used instead of connection to a wireless network 102). Also as contemplated herein and illustrated in FIG. 2, the wording "module 101 sends a message 208" can also be considered equivalent to "server 105 receives a message 208". Likewise, the wording "server 105 sends a response 209" can be considered equivalent to "module 101 receives a response 209".

A wireless module 101 can wake from a dormant state in order perform (i) remote and automated monitoring and (ii) control functions such as, but not limited to, collecting a sensor 101f measurement, communicating with server 105, and controlling an actuator 101y. If module 101 is connected to land-line power or a long-lasting external power source such solar power, then module 101 may remain in an active state and bypass a dormant state, although transmitting RF signals 201 may preferably only be utilized when communicating with wireless network 102 or sending data to and receiving data from wireless network 102 and/or mobile network operator 108. The wireless module 101 can acquire an IP address 202 from the wireless network 102. IP address 202 is illustrated as being an IPv6 address, but IP address 202 could also be an IPv4 address.

In order to transmit or send data from wireless module 101 to server 105, a wireless module 101 can use module program 101i to collect data from a sensor 101f in order to update server 105. Module program 101i can request a port number 203 from operating system 101h in order to have a source IP:port for sending data using IP protocols such as, but not limited to, TCP and UDP. The terminology "IP:port" as described herein refers to combining an IP address with a port number. Wireless module IP address 202 and port number 203 can be combined to form IP:port number 204. IP:port number 204 can be utilized as a source IP:port number for packets transmitted from wireless module 101, as well as a destination IP:port number for packets received by wireless module 101, when communicating with server 105.

In order to utilize IP Network 107, module 101 may also need a destination IP address and port number in order to send packets to server 105. Before sending data to server 105, wireless module 101 preferably retrieves server IP address 106 and server port number 205 from RAM 101e. Server IP address 106 could be recorded in RAM 101e via (i) a DNS query using server name 206 or (ii) queries to mobile network operator 108 or wireless network 102. CPU 101b may copy server IP address 106 and server port number 205 from nonvolatile memory into volatile memory such as, but not limited to, a register for processing to send a packet to server 105. Server name 206 could also be a server identity. (A) Server IP address 106 or server name 206 and (B) server port number 205 could be recorded in a nonvolatile memory such as, but not limited to, flash memory 101w and/or an eUICC 163 so that wireless module 101 can store the proper destination of packets transmitted or sent even when wireless module is dormant or shutdown.

Server IP address 106 and server port number 205 can be combined into a server IP:port number 207.

After collecting data from a sensor, module 101 can send a packet from IP:port 204 to IP:port 207, and the packet could comprise a message 208 that may include the data from a sensor 101f. Note that message 208 does not need to include sensor data, and message could potentially be a periodic registration message or keep-alive message. As contemplated herein, the term "sensor measurement" can refer to data associated with or derived from a sensor 101f. A sensor measurement, can comprise a string containing data regarding a parameter of a monitored unit 119 and collected by a sensor 101f. The sensor measurement as sent in a message 208 can also represent a string (alphanumeric, binary, text, hexadecimal, etc.), where the string comprises a transformation or processing of sensor data collected by a CPU 101b, such including formatting, compressing, or encrypting, encoding, etc. of sensor data. A "sensor measurement" could comprise a plurality of data from a sensor 101f.

In order to minimize bandwidth and time required for RF signals 201 to be active, module 101 can send the message 208 as a single UDP datagram in accordance with a preferred exemplary embodiment. The single UDP datagram in this embodiment can preferably be the only packet sent from module 101 to server 105 or mobile network operator 108 during a wake state for the module 101 when the radio 101z is active and transmitting, such as, but not limited to, in a radio resource control (RRC) connected state. In other words, according to this preferred exemplary embodiment, the message 208 sent by module 101 can preferably be the only message or packet sent by the wireless module to the server 105 between dormant periods of module 101. By sending message 208 as a single UDP datagram, both a battery 101k is conserved and utilization of valuable RF spectrum is reduced. Message 208 could also comprise a series of associated UDP messages.

Also, as contemplated herein, message 208 could comprise a related series of packets, so that message 208 could comprise multiple datagrams. As one example, if TCP is utilized as the transport protocol for message 208, then the series of TCP messages including the initial handshake, one or more packets of payload data, and the closing of the connection could together comprise message 208. As another example, if UDP or UDP Lite is utilized for the transport protocol, and payload data exceeds a maximum transmission unit (MTU) size for the UDP packet and the payload data is spread across multiple packets, then the multiple packets would comprise a message 208. Further, a related series of packets comprising a message 208 could be identified by using the same source IP:port number as either (i) received by server 105 or (ii) sent by module 101. In addition, a related series of packets comprising a first message 208 could be identified as a series of packets sent by module 101 before receiving a response 209 from a server, and packets sent after receiving a response 209 could comprise a second message 208. Other possibilities for a message 208 to comprise multiple packets or datagrams may exist without departing from the scope of the present invention.

The UDP datagram for message 208 could also be formatted according to the UDP Lite protocol, as specified in IETF RFC 3828, which is also incorporated by reference herein. The term "UDP Lite" described in the present invention may also refer to any connectionless protocol widely supported on IP Network 107 where checksums may be partially disabled, thereby supporting the transfer of bit errors within a datagram. The advantages of UDP over TCP is that UDP can be quickly sent, while TCP requires a "handshake" with the server which requires more time and bandwidth, which would utilize more energy from battery 101k. According to an exemplary embodiment, both message 208 and response 209 can be TCP messages. In this exemplary embodiment, message 208 and response 209 could each comprise a series of TCP messages that can include a TCP SYN, SYN ACK, ACK, ACK w/data, FIN ACK, etc.

According to an exemplary embodiment, module 101 sends (and server 105 receives) the same sensor data in multiple copies of the same UDP packet. Each of the multiple copies of the same UDP packet can also optionally be formatted according to the UDP Lite protocol. As one example, wireless module sends three identical copies of the UDP or UDP Lite packet that include the same sensor data. The benefit of sending three copies of UDP Lite include (i) the RF signals 201 received by the base station 103 could include bit errors, which could result in a regular (RFC 768) UDP packet being dropped, since a bit error could result in a UDP checksum mismatch, as received and processed by wireless network 102. Note that the use of checksums is mandatory in IPv6, and thus checksums cannot be fully disabled in IPv6. With UDP Lite packets transmitted by wireless module 101, where the mandatory checksum for IPv6 can cover the packet header, wireless network 102 can forward all packets received, potentially including bit errors, to server 105 over the IP Network 107.

Server 105 can receive the multiple copies of the UDP or UDP Lite packets, which could include bit errors received, and server 105 could compare or combine the multiple copies or each individual UDP Lite packet in order to remove bit errors. Note that UDP Lite is not required, and wireless module 101 could send the message 208 using a single UDP packet, or multiple copies of a regular UDP (i.e. non UDP Lite) packet. However, using UDP Lite with multiple packets sent can provide benefits such as if the sensor data is encrypted in the packet, then a single bit error would normally break the receiver's ability to decipher the data using a cryptographic key, unless the encrypted data was channel coded and the channel coding could recover from the bit error in order to present an error-free input of the encrypted data to a deciphering algorithm.

Further, between periods of sleep when a wireless module 101 becomes active and transmits RF signals 201, module 101, which may also comprise a wireless module 101, could send the sensor data in a single UDP Lite packet where the packet includes channel coding, which can also be referred to forward error correction. Forward error correction could also be implemented by sending multiple copies of the same UDP packet. Note that since large segments of message 208 could include encrypted or hashed data, those segments may not be appropriate for compression since the data is often similar to random strings which are not readily compressed. Channel coding techniques for the data in message 208 could include block codes and convolution codes. Block codes could include Reed-Solomon, Golay, BCH, Hamming, and turbo codes. According to a preferred exemplary embodiment, data within message 208 is sent as a UDP Lite packet using a turbo code to correct multiple bit errors within a packet or datagram sent by module 101 and received by server 105.

In system 100 illustrated in FIG. 2, server 105 can use IP:port 207 to receive the packet from wireless module 101 and sent from source IP:port 204 to IP:port 207, and the packet could comprise a message 208 that may include the data from a sensor associated with module 101 or monitored unit 119. As contemplated herein, a message 208 illustrated in FIG. 2 does not need to include sensor data and other data could be transmitted or sent, such as, but not limited to, a server instruction 414 (described in FIG. 4 below), or other data pertaining to module 101 or a monitored unit 119. Note that server 105 can use IP:port 207 to receive a plurality of messages 208 from a plurality of wireless modules 101. Server 105 preferably listens for UDP packets on IP:port 207 or monitors IP:port 207, although TCP packets could be supported as well. If server 105 receives multiple copies of the same UDP packet from module 101, server 105 preferably includes a timer to drop duplicate packets received outside a timer window such as, but not limited to, an exemplary 5 seconds.

After receiving the message 208 and processing the message according to the techniques described below such as, but not limited to, in FIG. 4, server 105 can send a response 209. Since module 101 may belong to a wireless network 102 which includes a firewall 104, the source IP:port of the message 208 received by server 105 could be different from the source IP:port 204 utilized by wireless module 101. The source IP:port in message 208 could be changed if firewall 104 performs network address translation (NAT), as one example. Server 105 may not readily know if a NAT translation has been performed on the message 208. Alternatively, firewall 104 may not perform NAT, but could still block data from the IP Network 107 which does not properly match the firewall rules. As one example, firewall 104 could be a symmetric firewall (but without NAT functionality), where only packets from IP:port 207 to IP:port 204 are allowed to pass the firewall after message 208 has been sent by module 101.

In either case, where firewall 104 may or may not perform NAT routing, server 105 preferably sends the response 209 from the server IP:port 207 to the source IP:port it receives in message 208. According to a preferred exemplary embodiment, response 209 is a UDP packet sent from server 105 with (i) a source IP:port 207 and (ii) a destination IP:port equal to the source IP:port received in message 208, as illustrated in packet 209a. The example use of source and destination IP:ports in message 208 and response 209 are also illustrated in FIG. 6a below. In this manner, the UDP packet can traverse a firewall 104, if firewall 104 is present. If firewall 104 is present and performs NAT routing, then firewall 104 can receive the response 209 and change the destination IP address and port within response 209 to equal IP:port 204.

According to exemplary preferred embodiments, module 101 may also obtain power from a land-line source, such as, but not limited to, a traditional 120 volt wall socket, or possibly power over Ethernet, and other non-transient power sources could be utilized as well. In this case, module 101 may remain persistently connected to the Internet through either a wireless network 102 or a wired connection such as, but not limited to, Ethernet. In other words, module 101 may omit entering periods of sleep or dormancy where inbound packets from the Internet would not be received due to the sleep state of module 101. Consequently in an exemplary embodiment, module 101, which does not sleep for periods longer than a minute, may preferably periodically send a firewall port binding packet 211 from IP:port 204 to IP:port 207 in order to keep ports and addresses within a firewall 104 and/or firewall 124 open to communications between module 101 and server 105. Firewall port binding packet 211 can comprise a packet that is sent periodically using a timer interval that is shorter than the port-binding timeout period 117 on a firewall 104 and firewall 124.

Continuing with this exemplary embodiment where module 101 does not sleep for periods longer than approximately one minute, if UDP is utilized for message 208 and response 209, then a small UDP packet comprising firewall port binding packet 211 can be sent periodically such as, but not limited to, every 45 seconds. If TCP is utilized for message 208 and response 209, then a small TCP packet comprising firewall port binding packet 211 can be sent periodically such as, but not limited to, every 4 minutes. Other possibilities for the timing of sending firewall port binding packet 211 are possible as well. By sending firewall port binding packet 211 periodically, server 105 can send module 101 a response 209, (i) which could include a module instruction 502 as explained in FIG. 5a, at (ii) time intervals between message 208 and response 209 that are longer than the firewall port binding timeout values 117 of firewall 104 and/or firewall 124. Without firewall port binding packet 211, if (A) a response 209 sent from server 105 at an exemplary 180 seconds after receiving message 208, such as, but not limited to, after a firewall port binding timeout value 117 of firewall 104 of an exemplary 60 seconds transpired, then (B) response 209 would be dropped by firewall 104 and the response 209 would not be received by module 101.

FIG. 3a

Figure 3A:
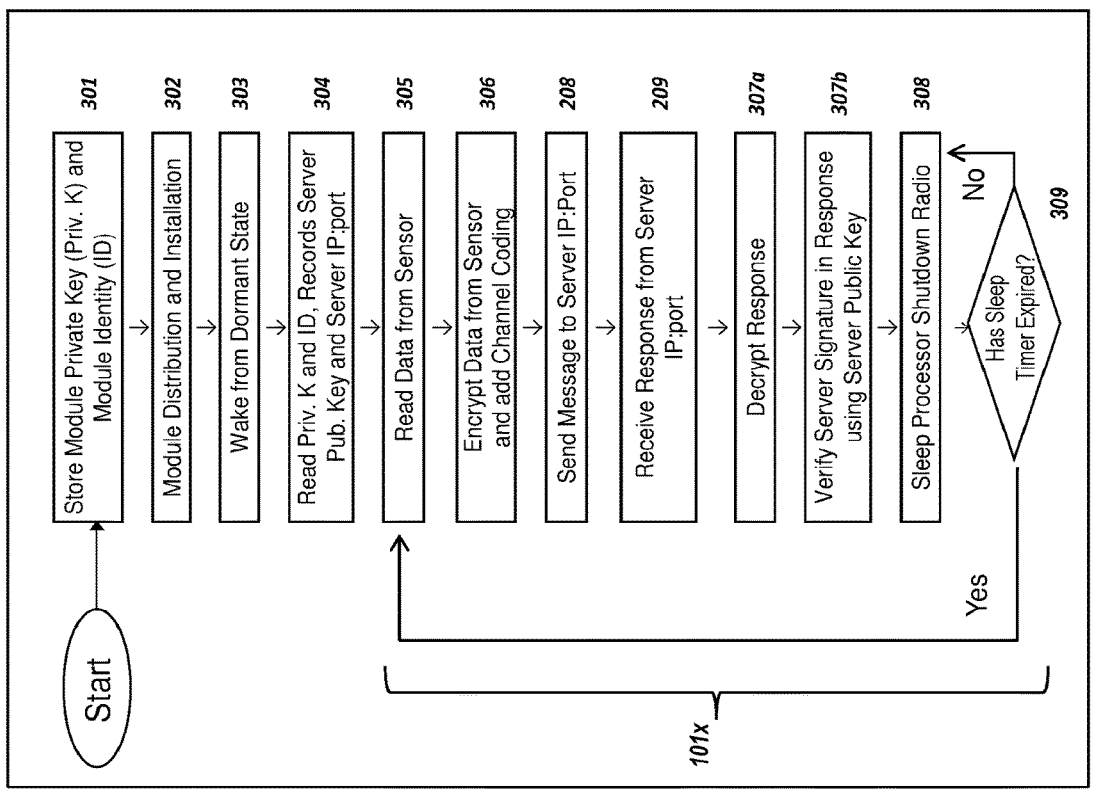
FIG. 3*a* is a flow chart illustrating exemplary steps for a module to send sensor data to a server, in accordance with exemplary embodiments.

FIG. 3a is a flow chart illustrating exemplary steps for a module to send sensor data to a server, in accordance with exemplary embodiments. As illustrated in FIG. 3a, FIG. 3a may include the data reporting steps 101x used by a module 101 in a module program 101i, where data reporting steps 101x and a module program 101i are depicted and described in connection with FIG. 1b above. The processes and operations, including data reporting steps 101x, described below with respect to all of the logic flow diagrams may include the manipulation of signals by a processor and the maintenance of these signals within data structures resident in one or more memory storage devices. For the purposes of this discussion, a process can be generally conceived to be a sequence of computer-executed steps leading to a desired result. These steps usually require physical manipulations of physical quantities. Usually, though not necessarily, these quantities take the form of electrical, magnetic, or optical signals capable of being stored, transferred, combined, compared, or otherwise manipulated. It is convention for those skilled in the art to refer to representations of these signals as bits, bytes, words, information, elements, symbols, characters, numbers, points, data, entries, objects, images, files, or the like. It should be kept in mind, however, that these and similar terms are associated with appropriate physical quantities for computer operations, and that these terms are merely conventional labels applied to physical quantities that exist within and during operation of the computer.

It should also be understood that manipulations within the computer are often referred to in terms such as listing, creating, adding, calculating, comparing, moving, receiving, determining, configuring, identifying, populating, loading, performing, executing, storing etc. that are often associated with manual operations performed by a human operator. The operations described herein can be machine operations performed in conjunction with various input provided by a human operator or user that interacts with the computer.

In addition, it should be understood that the programs, processes, methods, etc. described herein are not related or limited to any particular computer or apparatus. Rather, various types of general purpose machines may be used with the following process in accordance with the teachings described herein.

The present invention may comprise a computer program or hardware or a combination thereof which embodies the functions described herein and illustrated in the appended flow charts. However, it should be apparent that there could be many different ways of implementing the invention in computer programming or hardware design, and the invention should not be construed as limited to any one set of computer program instructions.

Further, a skilled programmer would be able to write such a computer program or identify the appropriate hardware circuits to implement the disclosed invention without difficulty based on the flow charts and associated description in the application text, for example. Therefore, disclosure of a particular set of program code instructions or detailed hardware devices is not considered necessary for an adequate understanding of how to make and use the invention. The inventive functionality of the claimed computer implemented processes will be explained in more detail in the following description in conjunction with the remaining Figures illustrating other process flows.

Further, certain steps in the processes or process flow described in all of the logic flow diagrams below must naturally precede others for the present invention to function as described. However, the present invention is not limited to the order of the steps described if such order or sequence does not alter the functionality of the present invention. That is, it is recognized that some steps may be performed before, after, or in parallel other steps without departing from the scope and spirit of the present invention.

The processes, operations, and steps performed by the hardware and software described in this document usually include the manipulation of signals by a CPU or remote server and the maintenance of these signals within data structures resident in one or more of the local or remote memory storage devices. Such data structures impose a physical organization upon the collection of data stored within a memory storage device and represent specific electrical or magnetic elements. These symbolic representations are the means used by those skilled in the art of computer programming and computer construction to most effectively convey teachings and discoveries to others skilled in the art.

At step 301, before final distribution of the module to a sales channel, equipment distributors, or end users, a module private key 112 and module identity 110 could be recorded in non-volatile memory 101*w* of the module 101. The module private key 112 could be a private key formatted according to the X.500 series of standards published by the International Organization for Standardization (ISO) in ISO/IEC 9594 or similar and subsequent standards, or alternatively according to another format including a propriety format. The module private key 112 could be formatted using RSA encryption algorithms or ECC encryption algorithms, and other possibilities exist as well for the format of encryption and/or decryption keys without departing from the scope of the present invention. Note that step 301 contemplates an alternative to the case where a module 101 derives its own public and private keys using key pair generation algorithms 141*e*. Thus, the present invention also contemplates that a module private key 112 is derived outside module 101 and loaded into nonvolatile memory 101*w*. Note that in this case, where module private key 112 is loaded from an external source to module 101, that module 101 could still utilize other features contemplated herein, such as if module 101 needed to derive public and private keys in the future after the initial step 301.

Module identity 110 can be a unique identifier associated with module 101, and can represent a number or a string. The module private key 112 and module identity 110 could be recorded in non-volatile memory 101*w* by the manufacturer, or a service provider. Alternatively, the module private key 112 and module identity 110 could be recorded in non-volatile memory 101*c* by the end users. At step 302, the module is distributed and installed in physical proximity to a monitored unit 119. Although step 301 is illustrated as occurring before step 302 according to an exemplary embodiment, step 301 can take place after step 302 or concurrently with step 302, and other possibilities exist as well without departing from the scope of the present invention.

After installation of the module 101, module 101 can wake from a dormant state in step 303. The dormant state can comprise a state of low power usage as described in FIG. 1*c*, in order to conserve battery life and wired bandwidth or wireless spectrum resources. As noted in FIG. 1*c*, module 101 can utilize a bootloader program 125 in order to initiate operations from a sleep or dormant state. At step 303, the module private key 112, module identity 110, server identity 206, and/or server address 106 could be moved from non-volatile memory 101*w* into RAM 101*e*. At step 304, the module 101 can read the module private key 112 and module identity 110 recorded in RAM 101*e*, and also record the server public key 114 and server IP:port 207. The server public key 114 and server IP:port 207 could also be either locally stored previous to step 304 in a non-volatile memory 101*w*, or obtained through the IP Network 107 via a query to mobile network operator 108. As one example, module 101 could obtain the server public key 114 by establishing an Internet connection through a network such as a wireless network 102 and downloading the server public key 114 from server 105.

If module 101 utilizes a sleep or dormant state (according to exemplary sleep or dormant states depicted and described in connection with FIG. 1*c* of U.S. patent application Ser. No. 14/023,181, which is herein incorporated by reference) in order to conserve power consumption or energy utilization, then according to a preferred exemplary embodiment at step 304, after waking, module 101 can preferably read from nonvolatile such as a flash memory 101*w* each of (i) module private key 112, (ii) module identity 110, (iii) the server public key 114, (iv) server IP:port 207, and (v) data reporting steps 101*x*. The location of server 105 could be obtained via a DNS query using the server identity 206. Although not illustrated in FIG. 3*a*, server identity 206 and server IP:port 207 could also be recorded in non-volatile memory at step 301. Other means are possible as well for module 101 to obtain server public key 114 and server IP:port 207.

At step 305, the module 101 can read data from a sensor 101*f*. The data can comprise information regarding a monitored unit 119, as illustrated in FIG. 1*a*. As referenced herein, the data collected at step 305 may comprise a sensor measurement 305 or sensor data 305. At step 306, the module can utilize cryptographic algorithms 141 to (i) encrypt the data from sensor 101*f* using the server public key 114 and (ii) sign the encrypted data using the module private key 112. Note that a symmetric ciphering algorithm 141*b* may be used at step 306, but since the symmetric key 127 may be derived using the server public key 114, the sensor data 305 can be encrypted using the server public key (indirectly) at step 306. According to a preferred exemplary embodiment, the module can add channel coding to the data resulting from the steps taken in the previous sentence, although the channel coding can optionally be omitted. A more detailed description of the steps for encrypting and signing data from the sensor are included in FIG. 4a below.

After encrypting and signing sensor data, the module can send the data to the server 105 in message 208, where message 208 is formatted and sent according to a either a TCP or UDP packet. An exemplary format of message 208 is also depicted and described in connection with FIG. 6 below. Message 208 could be sent using the UDP Lite protocol, although the message could also be sent in a TCP datagram, after completing the initial TCP "handshakes" with server 105. Message 208 in the form of a UDP or TCP datagram can be sent from the module IP:port 204 to the server IP:port 207. Message 208 can also comprise sending the sensor data in multiple datagrams, including two or more copies of the same data. Although not illustrated in FIG. 3a, upon the first communication with a server 105, according to an exemplary embodiment, module 101 can send a certificate 122 to server 105, where certificate 122 would normally include module public key 111. Server 105 could utilize a certificate 122 to verify a module identity 110.

As illustrated in FIG. 3, the module 101 can then receive reply from server 105 to the message 208 in the form of a response 209. Response 209 can be encrypted with the module public key 111 and signed with the server private key 105c, as depicted and described in connection with FIG. 5a below. An exemplary format of the response 209 is also depicted and described in connection with FIG. 6 below. The module 101 can receive the encrypted response 209 to message 208 in a datagram 209a that is sent from server IP:port 207 and received at module IP:port 204.

At step 307a, the module 101 can process the response 209 by decrypting the response 209 using the module private key 112 and cryptographic algorithms 141. At step 307b, module 101 can verify a digital signature of response 209 using the server public key 114 and cryptographic algorithms 141. Additional details regarding step 307a and 307b are depicted and described in connection with FIG. 5a below. Note that encryption of response 209 may be optionally omitted and a digital signature in response 209 may also be optionally omitted. Although not shown in FIG. 3a, if the module 101 cannot decrypt the response 209 or verify the digital signature of response 209, then the module 101 can drop the response 209 and optionally send message 208 again.

After the module 101 successfully processes response 209 in steps 307a and 307b, as shown in step 308, the module 101 can sleep the CPU 101b and/or shutdown the radio 101z. Step 308 could comprise the module 101 entering the "radio off" state 505a as depicted and described in connection with FIG. 6b of U.S. patent application Ser. No. 14/023,181 (the contents of which are hereby incorporated by reference in their entirety), and/or entering the "CPU off" state 505b as described in FIG. 6c of U.S. patent application Ser. No. 14/023,181. Step 308 could also comprise the module 101 sending a detach message to a wireless network 102 as depicted and described in connection with FIG. 6a of U.S. patent application Ser. No. 14/023,181. Thus, according to a preferred exemplary embodiment, module 101 can omit sending or receiving any further radio resource control messages after processing the encrypted and/or signed response 209, when completing step 308.

After entering the sleep state in step 308, the module can then periodically check a sleep timer at step 309, and wake from sleep if the timer has expired and report subsequent data from a sensor 101f to a server 105 by returning to step 305.

FIG. 3b

FIG. 3b is a graphical illustration of components within a received profile and an activated profile for an embedded universal integrated circuit card (eUICC), in accordance with exemplary embodiments. The need for supporting M2M applications, where swapping out a SIM card or UICC card may not be practical, supports the use of an alternative embedded universal integrated circuit card (eUICC). Note that the development of an eUICC for M2M applications could extend to mobile phones and smart phones generally in the future, such that a SIM card or UICC would not need to be distributed to end users for insertion into mobile phones or M2M devices, thereby reducing costs and increasing the flexibility of modules 101 to quickly and easily connect with different wireless networks 102. In September of 2013, ETSI published an outline of the requirements for an eUICC specification in ETSI TS 103 383 v12.2.0, while many of the implementation details remain under study and review as of November 2013. ETSI technical specification TS 103 383 v12.2.0 is herein incorporated by reference in its entirety.

A primary feature of an eUICC 163 can be the automated and remote handling of network access credentials. An eUICC 163 can support subscriber and user equipment access a wireless network 102 such as a PLMN that supports ETSI standards such as LTE and future mobile operator networks. The electronic distribution of network access credentials such as the traditional Ki or K pre-shared secret key in mobile networks faces significant security challenges in the form of a profile for an eUICC 163. FIG. 3b illustrates an exemplary embodiment, where the internal derivation of a module private key 112 and a module public key 111 in the present invention can provide in a secure and flexible manner either (i) essential network access credentials directly (where network access credentials can use a module private key 112 and module public key 111), or (ii) the support of the derivation of a secret shared network key K 129d (thereby allowing network access credentials to remain both secure and fully compatible with deployed wireless networks reliant on key K).

A received eUICC profile 311 could provide information for connecting to a wireless network 102. A received eUICC profile 311 can include much or all of the same information available to a module 101 from a traditional physical SIM card or UICC. The received eUICC profile 311 can comprise a profile for the eUICC 163 that is received by module 101. The module 101 can receive the profile 311 via a radio 101z or a network interface 101a such as a usb interface 101v (in embodiments where a manufacturers, distributor, module provider 109, or end user load an initial received profile 311). An eUICC 163 can support multiple profiles in order for a module 101 to connect with multiple different wireless networks 102 that support ETSI and similar standards for wireless WANs. A received eUICC profile 311 could also comprise a file or a set of data that is encrypted using any of a symmetric ciphering algorithm 141b, an asymmetric ciphering algorithm 141a, or potentially a secret ciphering algorithm 141h. The file or set of data which includes network access credentials 312 for a wireless network 102 can comprise a received eUICC profile 311. The encryption of a received eUICC profile 311 is not illustrated in FIG. 3b, and for clarity the received eUICC profile 311 is illustrated in FIG. 3b in plaintext form. As contemplated herein, received eUICC profile 311 may be referred to as profile 311, and activated eUICC profile 311 may be referred to as profile 313. Profile 311 can be a file or set of data that is (i) received by module 101 and (ii) includes network access credentials 312. Profile 313 can be a file or set of data that is (i) selected and/or activated by module 101 in a profile activation step 316, and (ii) includes network access credentials 314.

In addition, according to a preferred exemplary embodiment, a received eUICC profile 311 is encrypted with a symmetric ciphering algorithm 141$b$ and a derived shared secret key 129$b$ as a symmetric key 127 for the symmetric ciphering algorithm 141$b$. The derived shared secret key 129$b$ could be derived using a key derivation function 141$f$ and input of at least an initial module private key 112$b$. The key derivation function 141$f$ could comprise an ECDH 159 key exchange, such that the network public key 165$b$ could also be input into the key derivation function, where the cryptographic parameters for an ECDH 159 comprise a base point G. Consequently, in an exemplary embodiment, module 101 can receive the profile 311 and decrypt the profile 311 using the initial module private key 112$b$. In other words, the initial module private key 112$b$ can be input into an ECDH 159, and the resulting derived shared secret key 129$b$ (which would be mutually derived by a server 105) could be used with a symmetric ciphering algorithm 141$b$ for a module 101 to decrypt the received profile 311. In another embodiment, the initial module private key 112$b$ could comprise a symmetric ciphering key 127, such that module 101 can decrypt the profile 311 directly using the initial module private key 112$b$ and a symmetric ciphering algorithm 141$b$ (and a server 105 associated with an eUICC subscription manager 164 could encrypt the profile 311 using the initial module private key 112$b$.

In exemplary embodiments, the received eUICC profile 311 can include a shared secret key 510, where the shared secret key 510 can be used to authenticate a derived module public key 111 in a set of activated mobile network operator (MNO) network access credentials 314 after a profile activation step 316. A shared secret key 510 is also depicted and described in further detail in connection with FIG. 5$b$ below. A shared secret key 510 within a received eUICC profile 311 may be optionally omitted, and an initial key K 325 could be used by module 101 to securely and/or authoritatively send a derived module public key 111 (and/or a key K module token 1103) to a wireless network 102, as depicted and described in FIG. 5$b$, FIG. 7, and FIG. 9$b$ below.

In exemplary embodiments, the received eUICC profile 311 can include an initial key K 325, which could comprise a standard shared secret key K for accessing wireless network 102 (such as a key K contemplated in 3GPP TS 33.401 V12.9.0 FIGS. 6.2-1 and related standards). The initial key K 325 with network module identity 110$b$ can be used by module 101 to initially connect with wireless network 102. Upon or after the initial connection from module 101, wireless network 102 can receive cryptographic data from module 101 such as, but not limited to, a derived module public key 111 and/or a key K module token 1103 (depicted and described in connection with FIG. 11 below). After sending the cryptographic data using the initial key K 325, module 101 and mobile network operator 108 could mutually derive the new secret shared network key K 129$d$ illustrated in FIG. 3$b$ (using steps depicted and described in connection with FIG. 9$b$ and FIG. 11 below). Module 101 and mobile network operator 108 could subsequently (i) record the derived, secret shared network key K 129$d$ recorded by a module 101 within an activated eUICC profile 313 in an eUICC 163, and (ii) use the derived, secret shared network key K 129$d$ with the network module identity 110$b$ as a set of activated mobile network operator network access credentials 314. Additional details for using a module private key 112, module public key 111, and a key K module token 1103 in order to derive a mutually shared secret shared network key K 129$d$ is depicted and described in additional Figures below.

As contemplated herein, a received eUICC profile 311 and an activated eUICC profile 313 can comprise versions or subsets of profiles for an eUICC contemplated in ETSI specification TS 103 383 v12.2.0 and related standards. Also as contemplated herein, a received eUICC profile 311 can be referred to as a "received profile", and likewise an activated eUICC profile 313 below can be referred to as an "activated profile". A received eUICC profile 311 can include a set of cryptographic parameters 126, a set of network parameters 310, and a received mobile network operator (MNO) network access credentials 312. The received MNO network access credentials 312 could include a network module identity 110$b$, and the network module identity 110$b$ could comprise an IMSI number or similar network identifier. In an exemplary preferred embodiment, the received MNO network access credentials 312 does not include a module private key 112 and corresponding module public key 111, and these keys can be derived by a module 101 and subsequently included in an activated eUICC profile 313 below. The received MNO network access credentials 312 can include an initial key K 325 for initial communication with a wireless network 102 for a mobile network operator 108. A set of cryptographic parameters 126 are depicted and described in connection with FIG. 1$d$ and FIG. 1$i$ and other Figures herein.

The set of network parameters 310 could comprise a list of values and settings for a module 101 to utilize in connecting with a mobile network 101. The settings could include a list of numbers or strings for values such as (i) allowed frequencies or frequency bands to scan, (ii) preferred access lists for roaming onto other wireless networks, (iii) criteria for a module 101 to select base stations in idle mode, (iv) support for emergency services, (v) supported languages or character encoding, etc. While a received eUICC profile 311 is activated, the network module identity 110$b$ can be uniquely associated with a module identity 110, and thus a network module identity 110$b$ could comprise a module identity 110, in order to identify module 101 with a wireless network 102. A received eUICC profile 311 could also include a network public key 165$b$, which could provide functionality equivalent for a server public key 114, with additional differences between a network public key 165$b$ and a server public key 114 could be (i) network public key 165$b$ can be associated with entities such as MNO 108 or eUICC subscription manager 164, and (ii) network public key 165$b$ can be associated with network private key 165$a$. Network public key 165$b$ could also be associated with a plurality or collection of servers 105, such as the set of servers 1010 illustrated in FIG. 10, while a server public key 114 could be associated with a particular server 105. As illustrated in FIG. 1$c$, the network public key 165$b$ can be recorded in the eUICC 163 directly instead of within a received eUICC profile 313, and other possibilities exist as well without departing from the scope of the present invention.

In exemplary embodiments, a received eUICC profile 311 could be stored or recorded in a nonvolatile memory of module 101 such as, but not limited to, a flash memory 101$w$. An initial, first received eUICC profile 311 could be loaded into an eUICC 163 of module 101 by a manufacturer during manufacturing of module 101, a distributor during distribution of module 101, or a technician or end-user upon installation or receipt of module 101. The initial, first received eUICC profile 311 could also be recorded in a nonvolatile memory such as a ROM 101c, and a manufacturer or module provider 109 could write the initial, first received eUICC profile into the ROM 101c before distribution, and other possibilities exist as well. Note that and additional, second received eUICC profile 311 (or a plurality of received eUICC profiles 311) could be received by a module 101 after connection to an initial wireless network 102 using the initial, first received eUICC profile 311. Other possibilities exist as well for a module 101 to receive and record a received eUICC profile 311 without departing from the scope of the present invention. The second, received eUICC profile 311 could be received by a module 101 from an eUICC subscription manager 164 (such as in a response 209 from a server 105 operated by a subscription manager 164).

A module 101 could convert a received eUICC profile 311 into an activated eUICC profile 313, after waking from a dormant state in order to connect with an initial wireless network 102 using a profile activation 316 step. For a profile activation 316 step, a module 101 could populate or provide the received MNO network access credentials 312 with a derived module private key 112 and a derived module public key 111. In this manner, a profile activation step 316 can take a step to convert a received eUICC profile 311 into an activated eUICC profile 313, and other steps for activation of a received eUICC profile 311 may be required as well. Within a profile activation step 316, a module 101 could use the set of cryptographic parameters 126 within the received eUICC profile 311 and a set of cryptographic algorithms 141, including a key pair generation algorithm 141e and a random number generator 128 in order to derive the module private key 112 and a corresponding module public key 111. The processing, generation, and/or derivation by a module 101 of a module PKI key pair 315 in a profile activation step 316 is also depicted and described in further detail along with a step 515 in FIG. 5b below.

The derived module private key 112 and derived module public key 111 could comprise a first derived module PKI key pair 315. By populating or associating the received MNO network access credentials 312 with a derived module private key 112 and a corresponding module public key 111 in a profile activation step 316, the module 101 can convert, transform, or process the received MNO network access credentials 312 into an activated MNO network access credentials 314 within an activated eUICC profile 313, whereby the activated eUICC profile 313 can include or be associated with the derived module private key 112 and a corresponding module public key 111. Within an activated eUICC profile 313, the derived module private key 112 and a corresponding module public key 111 could be recorded or associated with a set of activated MNO network access credentials 314. The activated eUICC profile 313 could be recorded in an eUICC 163. In another exemplary embodiment, the recording by a module 101 of a derived module private key 112 and a corresponding module public key 111 can occur at a separate time than a profile activation step 316, although the module PKI key pair 315 may preferably be recorded by a module 101 before module 101 completes a connection to a wireless network 102. For example, the module 101 could potentially "pre-populate" or "pre-associate" the received MNO network access credentials 312 with a derived module PKI key pair 315 before a profile activation step 316. Note that a derived module private key 112 and a corresponding module public key 111 may optionally not be recorded directly within an activated eUICC profile 313, but rather can be separately associated by a module 101 or an eUICC 163 with an activated eUICC profile 313.

In exemplary embodiments, the first activated eUICC profile 313 could be deactivated and continued to be recorded by a module 101, along with the first derived module PKI key pair 315, for potential later use. The module 101 could subsequently activate a second received eUICC profile 311, including populating or associating the second received eUICC profile 311 with a second, different, derived module PKI key pair 315 (i.e. different than the first derived module PKI key pair 315) in order to connect with a second wireless network 102 for a second mobile network operator 108 using a second activated MNO network access credentials 314 with the second, different, derived module PKI key pair 315. In other words, a module 101 could use a profile activation step 316 a second time with the second received eUICC profile 311, resulting a second activated eUICC profile 313 where the first activated eUICC profile 313 had been deactivated. Although not illustrated in FIG. 3b, an activated eUICC profile 313 can optionally continue to record the initial key K 325 from the received eUICC profile 311 before a profile activation step 316.

Upon reactivation of the first activated eUICC profile 313 (which could be deactivated in order to use the second received eUICC profile 311 as described in the paragraph above) in order to connect with the initial wireless network 102 a second time, the module 101 could either (i) reuse the first derived module PKI key pair 315, or (ii) derive a new derived module PKI key pair 315. Thus, a profile activation step 316 could populate a received eUICC profile 311 with a derived module PKI key pair 315 if the received eUICC profile 311 does not already include a derived module PKI key pair 315, but a profile activation step 316 could reuse an existing derived module PKI key pair 315 for reactivating a previously used (but deactivated) activated eUICC profile 313. In another embodiment, a profile activation step 316 could repopulate a previously used (but deactivated) activated eUICC profile 313 with a new derived module PKI key pair 315.

In exemplary embodiments, a module 101 and a wireless network 102 could perform many additional steps in order for a module 101 to utilize a received eUICC profile 311 and an activated eUICC profile 313, including: populating an activated eUICC profile 313 with other data, encrypting and decrypting a received eUICC profile 311, providing access to a wireless network 102 to control or update an activated eUICC profile 313 or a received eUICC profile 311, implementing policies for the remote management of an eUICC 163, installing or loading an eUICC profile, deleting an eUICC profile. Profiles received and activated by a module 101 using an eUICC 163 could be provided and managed by an eUICC subscription manager 164, in addition to many other steps and procedures. These additional steps and procedures for the utilization of an eUICC 163, other than steps and elements described in FIG. 3b including (i) the use of a derived module PKI key pair 315, (ii) deriving a secret shared network key K 129d, and (iii) using an initial key K 325 but then subsequently the secret shared network key K 129d, are known to those of ordinary skill in the art and thus are not described in additional detail herein. Additional steps related to a module 101 using a profile activation 316 step to derive and utilize a module PKI key pair 315 as a basis for (i) network access credentials, (ii) the secure authentication and verification of a module identity 110 (possibly comprising a network module identity 110b), and (iii) encryption or ciphering of data transmitted from or received by a module 101, are depicted and described in additional Figures below.

FIG. 4

Figure 4:
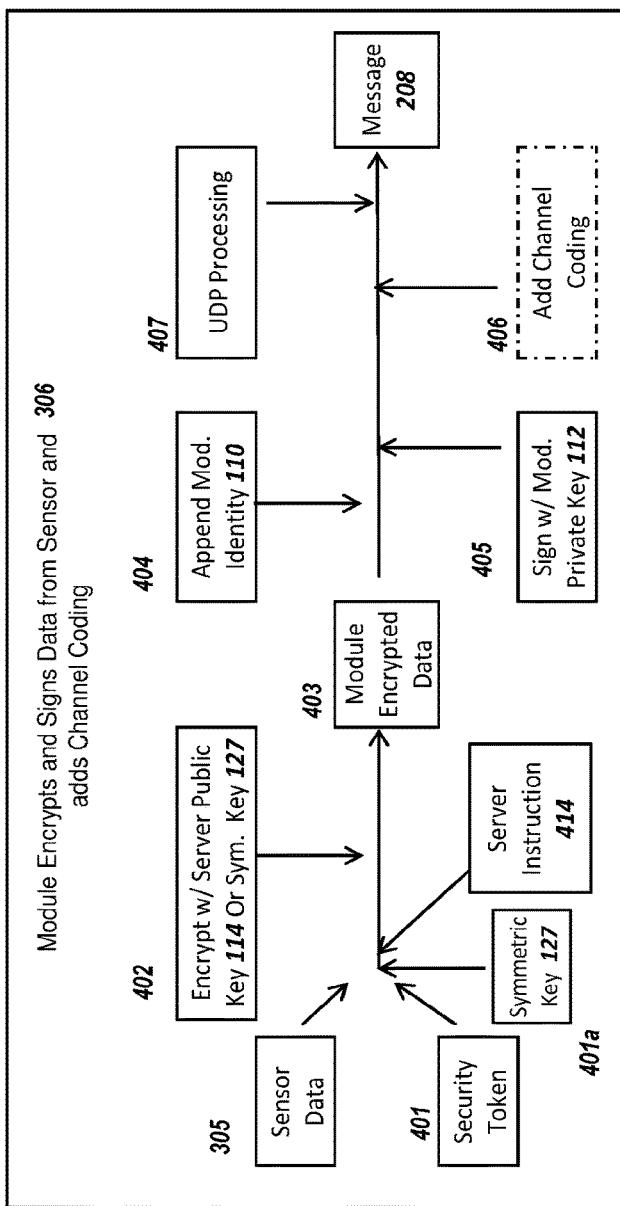
FIG. 4 a is a flow chart illustrating exemplary steps for a module to process a message, including encrypting sensor data and sending a digital signature, in accordance with exemplary embodiments.

FIG. 4a is a flow chart illustrating exemplary steps for a module to process a message, including encrypting sensor data and sending a digital signature, in accordance with exemplary embodiments. The steps illustrated in FIG. 4 may comprise step 306 illustrated in FIG. 3a above. Since message 208 and response 209 may traverse the wireless network 102 and IP Network 107, according to an exemplary preferred embodiment, a module 101 and a server 105 can take additional steps in order to maintain security of a system 100. Since module 101 could connect from a wide variety of networks, such as LAN, wireless LAN, wireless WAN, etc., server 105 may optionally support module 101 connecting from any valid IP address, including addresses outside of a mobile network operator's 108 wireless network 102. Module 101 can process a message 208 using the sequence of steps illustrated in FIG. 4. For additional clarification, an exemplary format of a message 208, using the exemplary steps of FIG. 4, is illustrated in FIG. 6 below. Note that the security methods described herein are optional, and message 208 and response 208 can be sent without the additional security steps described herein, but the use of these security steps may be preferred. FIG. 4 can contain the messages and steps shown within step 306 of FIG. 3a, where a module 101 processes message 208 before sending it to server 105 through the wireless network 102 and IP Network 107.

As illustrated in FIG. 4, in preparing a message 208 to send to server 105, module 101 can utilize a sensor measurement 305, where the sensor measurement 305 comprises sensor data acquired by a sensor 101f associated with module 101. A sensor measurement 305 is also depicted and described in connection with FIG. 1c above, and may comprise a string or number containing data regarding a parameter of a monitored unit 119. Sensor measurement 305 can also comprise a plurality of measurements or processed sensor measurements 305 such as an average value over time, high and low values, etc. Sensor measurement 305 could be either raw or processed data collected by a sensor 101f. As illustrated in FIG. 4, module 101 could also include a server instruction 414, which could be a command for server 105 such as an update, query, or notification. A server instruction 414 could also be used by module 101 as input into step 402 below, where the server instruction 414 can be encrypted.

Module 101 may optionally add a security token 401, which could also be a random number, or a randomly generated text, binary, or hexadecimal string. Security token 401 could be created using random number generator 128 and included in message 208 in order to make each message 208 unique and thus avoid any replay attacks when message 208 traverses wireless network 102 and IP Network 107 in order to securely reach server 105. A random number in security token 401 could be processed by module 101 using a seed 128b in a random number generator 128, where the seed utilizes data from sensor 101f as input into the seed, as illustrated in FIG. 1c above. Security token 401 could alternatively be a non-random number used to make message 208 unique, such as a timestamp with significant digits to milliseconds or microseconds, and other possibilities for security token 401 exist as well. In other words, the use of security token 401 can ensure to a high level of certainty that each message 208 will be different and thus the same data within message 208 would not be sent more than once (other than a short timeframe such as within a few seconds where the same UDP packet for a message 208 could be intentionally sent more than once in order to implement and support forward error correction).

At step 401a, if (i) module 101 is sending message 208 to server 105 for the first time, or (ii) expiration time 133 for a previous symmetric key 127 has transpired, then module 101 may preferably include a symmetric key 127 within message 208, where the symmetric key 127 would be encrypted using an asymmetric ciphering algorithm 141a with the module private key 112 at step 402. In this case of (i) or (ii) in the previous sentence, module 101 can securely send the symmetric key 127 to server 105, which could then utilize symmetric key 127 in a symmetric ciphering algorithms 141b at later steps. As noted in FIG. 1d, symmetric key 127 could be derived using cryptographic algorithms 141 and a random number from random number generator 128. If (a) module 101 has already sent a message 208 to server 105, or (b) expiration time 133 for a symmetric key 127 has not transpired (and thus symmetric key 127 would remain valid), then module 101 can omit including symmetric key 127 at step 401a.

At step 402, module 101 could utilize the sensor data 305, security token 401, server public key 114, server instruction 414 (not shown) and the cryptographic algorithms 141 to encrypt the sensor data 305 and security token 401. A step 402 could utilize either a symmetric ciphering algorithm 141b with a symmetric key 127 or an asymmetric ciphering algorithm 141a with the server public key 114. Symmetric ciphering 141b may be used to encrypt sensor data 305, and asymmetric ciphering 141a may be used to encrypt a symmetric key 127. The output of step 402 can be module encrypted data 403. If a symmetric key 127 is included within message 208, then module 101 preferably utilizes asymmetric ciphering 141a with server public key 114 at step 402. The asymmetric ciphering 141a at step 402 may be processed according to RSA algorithms 153, elliptic curve cryptography (ECC) algorithms 154, or other asymmetric ciphering algorithms for either public key cryptography or proprietary methods.

Note that if (A) a symmetric key 127 is utilized for symmetric ciphering 141b between module 101 and server 105 at step 402, such utilizing as a symmetric key 127 which could be derived using ECDH 159, then (B) AES 155, Triple DES, or other symmetric ciphering algorithms 141b can be used at step 402 to generate module encrypted data 403. If symmetric ciphering 141b is utilized in step 402, exemplary symmetric ciphers AES 155 and Triple DES are depicted and described in connection with FIG. 1d above. If symmetric ciphering 141b with ECIES is utilized in step 402, then step 402 could utilize the steps outlined in FIG. 2, titled "ECIES Encryption Functional Diagram" in "A Survey of the Elliptic Curve Integrated Encryption Scheme" by Martinez et al in the Journal of Computer Science and Engineering, Volume 2, August 2010, page 10, (herein incorporated by reference). The use of (i) symmetric ciphering algorithms 141b, such as with AES 155, Triple DES, and similar secure symmetric ciphers, with (ii) symmetric key 127 may be preferred at step 402, if symmetric key 127 is available.

After processing module encrypted data 403, module 101 can add or append a module identity 110. Module identity 110 is illustrated in FIG. 4 as being added after the module 101 processes module encrypted data 403, although module identity 110 may optionally only be included in module encrypted data 403 if symmetric ciphering 141b with cryptographic algorithms 141 and symmetric key 127 is utilized, (i.e. module identity 110 could be included before step 402, where module identity could be included as an input into step 402 as opposed to being added after step 402). By including module identity 110, possibly in the form of an encrypted module identity 110a, as external to module encrypted data 403 as illustrated in FIG. 4 at step 404, server 105 can use the module identity 110 to pre-process or route a message before decrypting module encrypted data 403. For example, server 105 could utilize a message preprocessor 105y and module identity 110 outside of module encrypted data 403 to select a sub-server 105w. By including module identity 110, possibly in the form of an encrypted module identity 110a, as external to module encrypted data 403, server 105 can use the module identity 110 to select either (i) a module public key 111 or (ii) a symmetric key 127 from a database 105k in order to decrypt module encrypted data 403 or verify a digital signature. The exemplary message 208 illustrated in FIG. 6 below shows one example of a message 208 where module identity 110 in the form of an encrypted module identity 110a is included as external to module encrypted data 403, which is also illustrated in FIG. 4.

Module identity 110 in a message 208 can represent the use of multiple unique strings or numbers over time that are uniquely associated with module 101, such as a first string for module identity 110 as recorded by module 101 and a second string for module identity 110 as recorded by a server 105. Module identity 110 could also comprise a session identifier, where the session identifier is uniquely associated with module identity 110 for a limited period of time, and a new session identifier is periodically generated by either module 101 or server 105. Thus, the use of a module identity 110 in a message 208 may comprise a different format or string than the module identity 110 preferably read from hardware, where the module identity 110 read from hardware could be a serial number, Ethernet MAC address, IMEI, etc. However, both can be utilized to uniquely identify a module 101 and thus are referred to herein as a "module identity" 110.

For cases where module 101 either (i) uses asymmetric ciphering 141a in a step 402, such as sending a symmetric key 127, or (ii) sends data without symmetric ciphering 141b (i.e. sends plaintext) module 101 can generate a module digital signature 405 for the message 208 using the module private key 112. The module digital signature 405 can be processed according to public key infrastructure (PKI) standards such as the National Institute of Standards (NIST) "FIPS 186-4: Digital Signature Standard" (which is hereby incorporated herein by reference), or IETF RFC 6979 titled "Deterministic Usage of the Digital Signature Algorithm (DSA) and Elliptic Curve Digital Signature Algorithm (ECDSA)" (which is hereby incorporated herein by reference). The use of a module digital signature 405 can be processed according to the description of a digital signature according to the Wikipedia entry for "Digital Signature" as of Sep. 9, 2013, which is incorporated by reference herein in its entirety. Module digital signature 405 may also comprise a Message Authentication Code (MAC) or tag. Also note that other uses of a digital signature as contemplated within the present invention may refer to the above three references and related standard techniques for processing and creating digital signatures.

Other PKI standards or proprietary methods for securely generating a module digital signature 405 may be utilized as well. According to a preferred exemplary embodiment, ECC algorithms for generating module digital signature 405 may be utilized in order to minimize the key length compared to RSA algorithms. Module digital signature 405 may comprise a secure hash signature using a secure hash algorithm 141c related to the secure hash algorithm 1 (SHA-1), or subsequent standards such as SHA-2 156 and SHA-3 157, and other possibilities exist as well. Module digital signature 405 is illustrated in FIG. 4 as being processed after module encrypted data 403, but module digital signature 405 may also optionally be included in module encrypted data 403. However, since module digital signature 403 can represent a secured hash signature that can contain limited useful information to a potential eavesdropper, module processing resources and energy can be conserved by including module digital signature 405 after and external to module encrypted data 403 (i.e. the benefits of encrypting module digital signature 405 may be limited). Also note that module digital signature 405 and the other secure digital signatures contemplated herein may be calculated with input from either (i) the plaintext in an encrypted message such as module encrypted data 403 or (ii) the ciphered data before conversion to plaintext, such as module encrypted data 403 before decryption at step 413.

Module 101 can then continue processing message 208 by including channel coding 406. Channel coding techniques for channel coding 406 could include block codes and convolution codes. Block codes could include Reed-Solomon, Golay, BCH, Hamming, and turbo codes. According to a preferred exemplary embodiment, channel coding 406 can utilize a turbo code, so that server 105 can correct bit errors received by server 105 in message 208. Alternatively, module 101 could implement channel coding by simply transmitting the same packet more than once and the use of block codes or convolution codes could be bypassed. Or, module 101 could implement channel coding by both transmitting the same packet more than once and also using a block code or convolution code in the body of the packet. The use of channel coding 406 can be preferred, since any bit errors received by server 105 within module encrypted data 403 or module digital signature 405 in message 208 could break a decryption or signature verification algorithm such as cryptographic algorithms 141 used by server 105. Thus, the use of channel coding 406 (with a transport protocol that supports the transmission of bit errors such as UDP with checksums disabled in IPv4 or UDP Lite) can ensure the decryption of message 208 is robust to bit errors. Bit errors may potentially generated by intermediate network links and nodes as message 208 traverses a wireless network 102 or IP Network 107. Channel coding 406 may optionally be omitted.

As illustrated in FIG. 4, module 101 can then format message 208 according to a transport protocol such as UDP within UDP processing 407 to create message 208. Other options besides the UDP processing illustrated in FIG. 4 are available as well, including TCP formatting, but UDP formatting may be preferred in order to minimize the number of packets transmitted as well as TCP overhead. Note that TCP overhead when using IPv6 can be significant, since the full series of TCP messages to establish a TCP session and transmit the message 208 may include about 4-6 packets, where each packet in the message includes a TCP header and a full 128 bit address for both the source IP address and the destination IP address. In contrast, UDP may preferably require only a single packet for message 208 and a single packet for response 209, thus significantly reducing the overhead and conserving either (i) a battery 101k life or (ii) energy usage by module 101 by reducing the data transmitted and received by module 101.

According to a preferred exemplary embodiment, UDP formatting 407 can be formatted according to the UDP Lite protocol (IETF RFC 3828) with IPv6, whereby UDP checksums can be partially disabled and channel coding 406 can be included in the UDP datagram to correct for bit errors. Note that the UDP and UDP Lite protocols may be updated in the future with subsequent standards, but the UDP formatting 407 may preferably continue to include both (i) partially or fully omitted packet checksums within the packet header and (ii) channel coding within the packet body. Also note that if IPv4 is utilized by module 101 and server 105, regular UDP (i.e. according to RFC 768) formatting may be utilized with channel coding 406 and checksums in the packet header may be disabled.

As illustrated in FIG. 4, after adding UDP formatting 407, module 101 may record a fully formatted message 208. As illustrated in FIG. 2, message 208 can be sent by module 101 using a physical interface 101a such as radio 101z and a wireless network 102 and the IP Network 107. Additional details regarding the structure of message 208 after taking exemplary steps in FIG. 4 are shown in FIG. 6 below. The security and efficiency features of message 208 can be useful for module 101 to efficiently balance potentially competing priorities of conserving battery life/bandwidth utilization/energy while maintaining security.

FIG. 5a

Figure 5A:
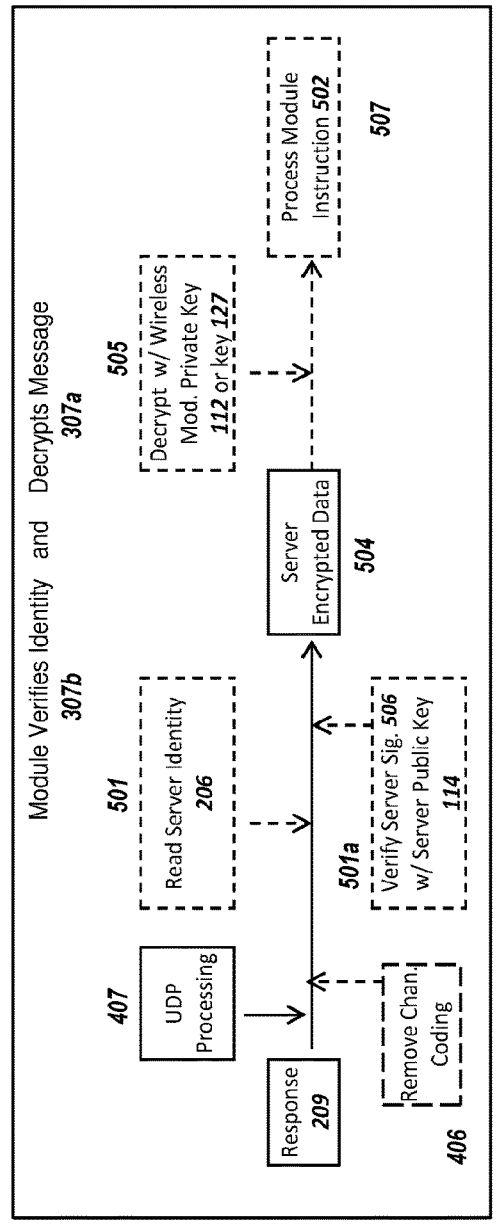
FIG. 5*a* a is a flow chart illustrating exemplary steps for a module to process a response from the server, including verifying a server's identity and decrypting instructions, in accordance with exemplary embodiments.

FIG. 5a a is a flow chart illustrating exemplary steps for a module to process a response from the server, including verifying a server's identity and decrypting instructions, in accordance with exemplary embodiments. Module 101 can perform the steps illustrated in FIG. 5a in order to securely and efficiently process a response 209 from server 105. The steps illustrated in FIG. 5b may comprise steps 307a and 307b illustrated in FIG. 3. Module 101 can receive response 209 using IP:port 204, as illustrated in FIG. 2. Response 209 can be formatted according to the UDP protocol or UDP Lite protocol, although other possibilities exist as well for the transport layer formatting of response 209, including TCP.

At step 407, module 101 can process the packet using the appropriate transport layer protocol, such as UDP. In this step 407, the body of the packet comprising response 209 can be extracted, and a checksum, if any, can be calculated to verify the integrity. An exemplary format of response 209 is depicted and described in connection with FIG. 6 below. Note that if the UDP Lite protocol is utilized, the checksum may optionally only apply to the packet header. At step 406, module 101 can process and remove channel coding, if channel coding is present in response 209. Note that if a wireless network 102 comprises a IEEE 802.15.4 network, then UDP Lite may preferably utilized, and UDP Lite may preferably be utilized if wireless network 102 is a PLMN mobile network and the PLMN mobile network supports UDP Lite protocol. Channel coding techniques utilized in step 406 could include block codes and convolution codes, and can use related algorithms as used in channel coding 406 in FIG. 4. By processing channel coding in step 406, module 101 can correct potential bit errors received in response 209. As noted above, the use of channel coding 406 can be preferred, since any bit errors received within server encrypted data 504 in response 209 could break (i) a cryptographic algorithms 141 used by module 101 at subsequent step 514, and/or (ii) the verification of a server digital signature 506 at step 501a.

At step 501, module 101 can read and record the server identity 206. Server identity 206 may preferably be a string that is external to server encrypted data 504 within response 209, as illustrated in FIG. 6 below. The server identity 206 can preferably match a server identity 206 used in message 208. The server identity 206 could also comprise the source IP address 106 of response 209, or a domain name resolving to the source IP address 106, or a domain name associated with IP address 206. Server identity 206 may also be uniquely associated with an identity in the "Common Name" (CN) field of a certificate 122 for server 105. Receiving or processing a server identity within a response 206 may optionally be omitted, if module 101 can select the appropriate server public key 114 without first obtaining server identity 206. At step 501a, module 101 can validate and verify the server identity 206 using the server digital signature 506 inserted by server 105 in response 209. Server digital signature 506 can comprise a secure hash signature, where server 105 generated the hash signature using as input into a digital signature algorithms 141d (i) the server private key 105c and (ii) at least a portion of the server encrypted data 504. Module 101 can utilize the server public key 114 recorded in memory to securely validate the server digital signature 504, also by using digital signature algorithms 141d.

The server digital signature 504 can be verified according to public key infrastructure (PKI) standards such as the National Institute of Standards (NIST) "FIPS 186-4: Digital Signature Standard", or IETF RFC 6979 titled "Deterministic Usage of the Digital Signature Algorithm (DSA) and Elliptic Curve Digital Signature Algorithm (ECDSA)". Other PKI standards or proprietary methods for securely verifying a server digital signature 504 may be utilized as well. Also, server digital signature 506 could optionally be included in server encrypted data 504, where step 501a could take place after step 505. But, since server digital signature 506 may comprise a secure hash signature, any benefits from ciphering the secure hash may be small while requiring additional processor resources.

Note that if module 101 had previously received server digital signature 506 in a previous response 209, then steps 501 and 502 may optionally be omitted within a subsequent response 209. In other words, after module 101 receives a valid server digital signature 504, server 105 may then transmit a subsequent server digital signature 506 periodically according to rules based upon the security requirements of the application. As one example, if (a) after sending a symmetric key 127 in a message 208 to server 105 and receiving a response 209 to the message 208 with (i) a valid server digital signature 506 and (ii) a server encrypted data 503 using symmetric key 127, then (b) module 101 can subsequently have reasonable assurance that subsequent responses 209 using symmetric key 127 are also from server 105. According to a preferred exemplary embodiment, when module 101 sends a new symmetric key 127 using an asymmetric ciphering algorithms 141b, the response 209 from server 105 with server encrypted data 504 (where the server encrypted data 504 was created using the new symmetric key 127) can preferably include or be associated with a server digital signature 506 in either the response 209 or another packet from server 105.

Figure 5B:
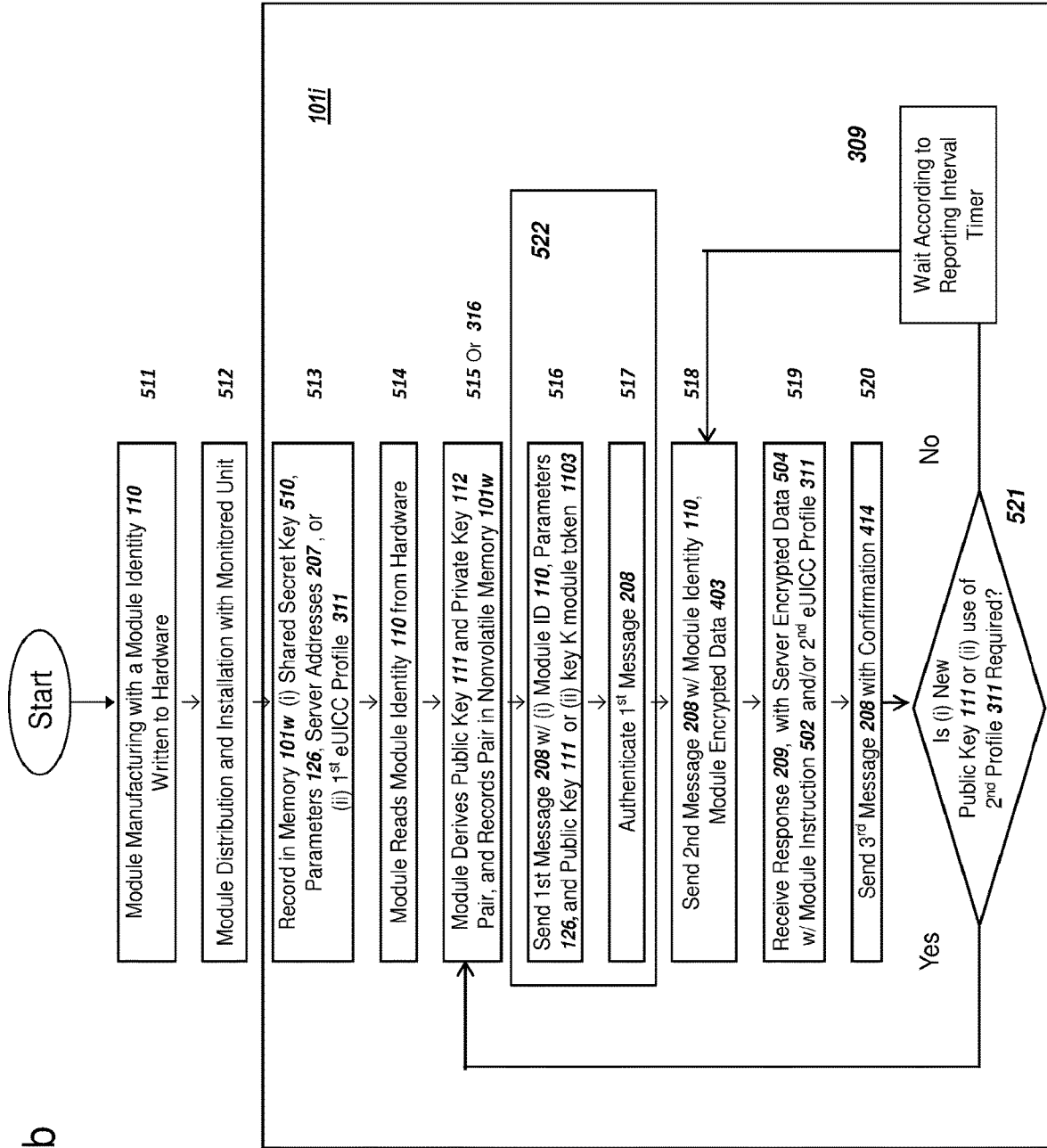
FIG. 5*b* is a flow chart illustrating exemplary steps for a module to communicate with a server, including the module deriving public and private keys, in accordance with exemplary embodiments.

Although not illustrated in FIG. 5b, upon completing step 501a, module 101 may also optionally verify the server identity 206 of server 105 using a certificate 122 associated with server 105 and the public key of a certificate authority 118. Module 101 could request a certificate 122 associated with server 105 and calculate a secure hash signature 123 using cryptographic algorithms 141 and a certificate authority public key 131 (illustrated in FIG. 1a). Other possibilities exist as well for module 101 to verify the identity of server 105 without departing from the scope of the present invention. As one alternative, module 101 could utilize Domain Name System Security Extensions (DNSSEC), as specified in multiple IETF RFCs including RFC 4033, 4034, and 4035 to securely resolve server identity 206 into IP address 106. For example, module 101 could verify that the source IP address within response 209 matches a DNSSEC record for server name 206.

After verifying server digital signature 506 in step 501a, module 101 can record an authenticated server encrypted data 504 from server 105. Authenticated server encrypted data 504 may comprise an acknowledgement that server 105 received message 208. Authenticated server encrypted data 504 may be useful if the UDP or UDP Lite protocol is used to send message 208, since UDP is a connectionless protocol and module 101 may need confirmation that server 105 received message 208. Note that if steps 501 and 501a are omitted, then authenticated server encrypted data 504 may comprise a simple acknowledgement that server 105 received message 208. Although not illustrated in FIG. 5a, if module 101 does not receive response 209 or server encrypted data 504 before a timer expires, such as within an exemplary duration of 2 seconds, then module 101 can resend message 208.

At step 505, module 101 can decrypt server encrypted data 504 using either (i) module private key 112 as a decryption key if asymmetric ciphering 141a is utilized to process server encrypted data 504, or (ii) symmetric key 127 if symmetric ciphering 141b is utilized to process server encrypted data 504. Module 101 can utilize cryptographic algorithms 141 and the key in order to decrypt the server encrypted data 504 at step 505. Module 101 can utilize techniques to decrypt server encrypted data 504 that are described in connection with creating module encrypted data 403 described in FIG. 4 above. If server encrypted data 504 uses an asymmetric ciphering, the cryptographic algorithms 141 used in step 505 may be processed according to RSA algorithms 153, elliptic curve cryptography (ECC) algorithms 154, or other algorithms for public key cryptography, as described previously herein. ECC algorithms 154 may be preferred with asymmetric ciphering in order to maintain high security with small key lengths, compared to RSA, in order to minimize the message lengths, radio frequency spectrum utilization, and processing power required by wireless module 101. If server encrypted data 504 uses symmetric ciphering 141b, the cryptographic algorithms 141 can use symmetric key 127 to decrypt server encrypted data 504 at step 505.

Module 101 and server 105 could utilize a pre-agreed protocol in order to select the use of asymmetric ciphering 141a or symmetric ciphering 141b in a response 209. According to an exemplary embodiment, module 101 and server 105 (i) utilize asymmetric ciphering 141a when transmitting symmetric keys 127 or other keys such as pre-shared secret keys, new private keys, etc., and (ii) utilize symmetric ciphering 141b at other times (i.e. when not sending/receiving a key). Since the exemplary response 209 illustrated in FIG. 6 does not contain a symmetric key, module 101 can utilize symmetric ciphering 141b in a step 505 with symmetric key 127 to decrypt server encrypted data 504 at step 505.

Response 209 may include a module instruction 502. By including module instruction 502 in server encrypted data 504 and response 209, the module instruction 502 can be read and processed by device 101 at step 507, after the server encrypted data 504 is decrypted at step 505. Module 101 can subsequently perform the module instruction 502 in step 507. Note that server encrypted data 504 may optionally include an acknowledgement that message 208 was received by server 105. In this manner, an "ACK" response to message 208 can be securely transmitted by server 105 and received by module 101. Additional details for exemplary module instruction 502 and the processing of a module instruction 502 by module 101 are depicted and described in connection with FIG. 4 of U.S. patent application Ser. No. 14/064,618, filed Oct. 28, 2013 in the name of John Nix, entitled "A Set of Servers for "Machine-to-Machine" Communications using Public Key Infrastructure," which is hereby incorporated by reference in its entirety. Upon completion of the processing of response 209 illustrated in FIG. 5b, module 101 can perform functions such entering the sleep or dormant states illustrated at step 308 in FIG. 3a, thus conserving battery life (if present in module 101) or energy while maintaining a secure, robust, and highly scalable system 100.

FIG. 5b

FIG. 5b is a flow chart illustrating exemplary steps for a module to communicate with a server, including the module deriving public and private keys, in accordance with exemplary embodiments. In order to utilize communications secured with PKI techniques such as, but not limited to, private keys, public keys, certificates, and identities, a module 101 may preferably obtain or generate the keys and utilize a module identity 110 and/or a certificate 122 in a secure manner. Given that a plurality of modules 101 may be deployed in potentially remote places or inconvenient locations for manually changing a SIM card or UICC card, also potentially without frequent contact with end users and/or technicians, the use of secure PKI techniques for a module 101 can create a significant set of challenges for the generation of module public key 111 and module private key 112, as well as properly and securely obtaining a certificate 122 with an module identity 110. Using conventional technology, significant challenges and costs can be incurred when (i) module 101 has already been deployed, such as collecting data from a monitored unit 119, and (ii) module 101 needs to utilize a new set of module private key 112 and module public key 111. The steps depicted and described for a module 101 to securely derive and implement module PKI keys may also be used with an eUICC 163 in order to for an eUICC 163 to securely establish a derived module private key 112 and derived module public key 111 within an activated eUICC profile 313, as depicted in FIG. 3b above.

Exemplary embodiments that include derivation or processing of a new module private key 112 and module public key 111 may utilize the particular steps and procedures contemplated herein, in order to minimize any potential human intervention (with related costs) while continuing to maintain or also enhance security, compared either (i) externally generating module private key 112, and/or (ii) continuing to use the same module private key 112 for the lifetime of module 101. Over a long period of operating time for a module 101, such as, but not limited to, several years or longer, there may be many reasons module 101 may need a new pair of PKI keys, such as, but not limited to, (i) expiration of a certificate 122, or the certificate 122 of a parent signature authority, (ii) the transfer of ownership or control of module 101, where the prior ownership could have direct or indirect access to the module private key 112, (iii) supporting a new server 105 that has different security requirements or a different set of cryptographic parameters 126 (longer keys, different ECC curves, different cryptographic algorithms 141, etc.), (iv) revocation of a public key in a chain of signatures associated with a certificate 122, (v) in the event of a "factory reset" condition or similar circumstances where a prior key pair previously recorded in a nonvolatile memory may no longer be available, and (vi) the use of a module PKI key pair 314 within network credentials 314 for activated eUICC profiles 313, where (a) the network credentials 314 are used to access a wireless network 102, and (b) module 101 may prefer to connect with multiple different wireless networks 102 over time using different network credentials 314. In the case of (ii) above, new ownership of module 101 may require a module 101 to utilize a new module private key 112 since the old ownership may have access to an old module private key 112. In the case of (iii) above, a new server 105 may require a pair of public/private keys incompatible with a prior set of public/private keys utilized by module 101 and/or a certificate 122 for module 101.

Other possibilities exist as well for reasons why a module 101 and/or server 105 may prefer for a module 101 to utilize a new module public key 111 and new module private key 112. In an exemplary embodiment, module 101 may generate a new public/private key periodically in order to enhance the security of a system 100. A benefit of a system 100 supporting periodic generation of keys by module 101 is that the key length can be shortened in order to obtain a similar level of security, and the processing power and energy consumption, with energy possibly supplied by a battery 105k, can be reduced through the use of shorter key lengths. In other words, over time such as, but not limited to, several months or years, the use of a plurality of different pairs of public/private keys for module 101 with shorter key lengths can be both more secure and energy efficient than using a single pair of public/private keys with a longer key length for the lifetime of module 101. Shorter key lengths may also be more compatible with processing power constraints of a module 101. Or, a longer key length for public/private keys could also be utilized and periodically rotated for increased security. In exemplary embodiments, module 101 and/or server 105 may prefer for module 101 to periodically generate new public and private keys. In addition, a mobile network operator 108 may prefer for a module 101 with an eUICC to periodically rotate, change, or lengthen a key K for accessing a wireless network 102, and the periodic generation of a new module PKI key pair 315 can support a periodic derivation of a new secret shared network key K 129d (as described in FIG. 9b and FIG. 11), which could be used to connect with wireless network 102.

The general approach adopted by most mobile phone networks over the past two decades has been founded upon the use of a pre-shared secret key (i.e. a "PSK") recorded in subscriber identity module (SIM) or UICC cards, such as the Ki pre-shared secret key in 2G or 3G networks, secret key K in 4G LTE networks, and specified in related standards. The use of a pre-shared secret key recorded in transferred physical media may work or be sufficient for mobile phones, where the SIMs can often be easily replaced, but the use of a pre-shared secret key K or Ki in a SIM or UICC may not be suitable for a module 101 and mobile network operator 108 for many circumstances. As one example, significant costs may be incurred by swapping out a SIM card for already deployed modules 101, especially if they are in remote locations or continually moving such as, but not limited to, a tracking device on a container, pallet, truck, or automobile. In an exemplary embodiment, a module 101 may preferably record multiple pairs of public/private keys 111/112 for various and different functions, such as, but not limited to, connecting to different servers 105, connecting to different wireless networks 102, using different module PKI key pairs 315 for different network access credentials 315 in different activated eUICC profiles 313, etc. As contemplated herein, recording more than one public/private key 111/112 can comprise module 101 recording a plurality of pairs of module public keys 111 and module private keys 112. Also as contemplated herein the module private key 112 for a module 101 can be different than a private key in a Diffie-Hellman key exchange, since the module private key 112 can be used to process a module digital signature 405, where a receiving node for a message with a module digital signature 405 can verify the signature using a module public key 111. In exemplary embodiments, one pair comprising a first module public key 111 and a first module private key 112 can be identified or selected from a different pair comprising a second module public key 111 and a second module private key 112 using a module public key identity 111a.

The number of pairs of public/private keys useful to a module 101 concurrently could be several, such as, but not limited to, an exemplary three or more actively used public/private keys, although other possibilities exist as well. Manually trying to change or add a new SIM card each time a new security key is required may not be efficient or feasible. Or in another exemplary embodiment, the multiple pairs of private and public keys could be used in sequence, such that module 101 with server 105 or wireless network 102 utilizes a single module public key 111 and module private key 112 at any given point in time. In the case where module 101 with a module identity 110 derives or generates more than one module private key 112 and module public key 111 during the lifetime of module 101 and sends the derived module public keys 111 over time to a set of servers 1010 (illustrated in FIG. 10 below) or a wireless network 102, this case may be considered a module 101 sending a series of module public keys for a module identity 110. The various PKI key pairs in the series may also use either different sets of cryptographic parameters 126 or the same set of cryptographic parameters 126. A first pair of PKI keys could be associated with a mobile network operator 108 and a second pair of PKI keys could be associated with a wireless network 102. The series of module public keys 111 (with corresponding module private keys 112) can be processed, generated, calculated, and/or derived by a CPU 101b with key pair generation algorithms 141e and a random number generator 128. The random number generator 128 can use input from a sensor 101f, a radio 101z, a clock 160, and/or a temporary random seed file 139.

In exemplary embodiments, module 101 can use a module public key 111 for sending a module encrypted data 403 or receiving a server encrypted data 504 by sending the module public key 111 to a server 105 in order to support (i) the module encrypted data 403 to be decrypted (such as, but not limited to, using a step 413 as depicted and described in connection with FIG. 4 of U.S. patent application Ser. No. 14/064,618, filed Oct. 28, 2013 in the name of John Nix), or (ii) the server encrypted data 504 to be encrypted (such as, but not limited to, using a step 503 as depicted and described in connection with FIG. 5a of U.S. patent application Ser. No. 14/064,618, filed Oct. 28, 2013 in the name of John Nix). In addition, a server 105 can use a module public key 111 for sending a module encrypted data 403 or receiving a server encrypted data 504 by inputting the module public key 111 into a key derivation function 141f in order to derive or process a derived shared secret key 129b, which could be used with a symmetric key 127. Other possibilities exist as well for module 101 to use its own module public key 111 with cryptographic algorithms for communicating with a server 105.

FIG. 5b illustrates exemplary steps that can be performed with module 101, including using a module program 101i, for generating, deriving, and/or updating a module public key 111 and module private key 112. The steps illustrated in FIG. 5b include both (i) an "initial" or "startup" case where module 101 has not previously derived keys (or keys not internally derived may not have been loaded), and (ii) a subsequent or "follow on" time where module 101 can generate or derive keys after keys were initially obtained or derived. Note that efficient and secure methods and systems contemplated herein, including in FIG. 5b, may also be utilized with a regular consumer mobile phone, or smartphone, as a module 101. Mobile phones as module 101 can benefit from (i) deriving a module public key 111 and a module private key 112, (ii) sending module encrypted data 403 in a message 208 using the derived keys, and (iii) receiving a server encrypted data 504 in a response 209 also using the derived keys.

Figure 9B:
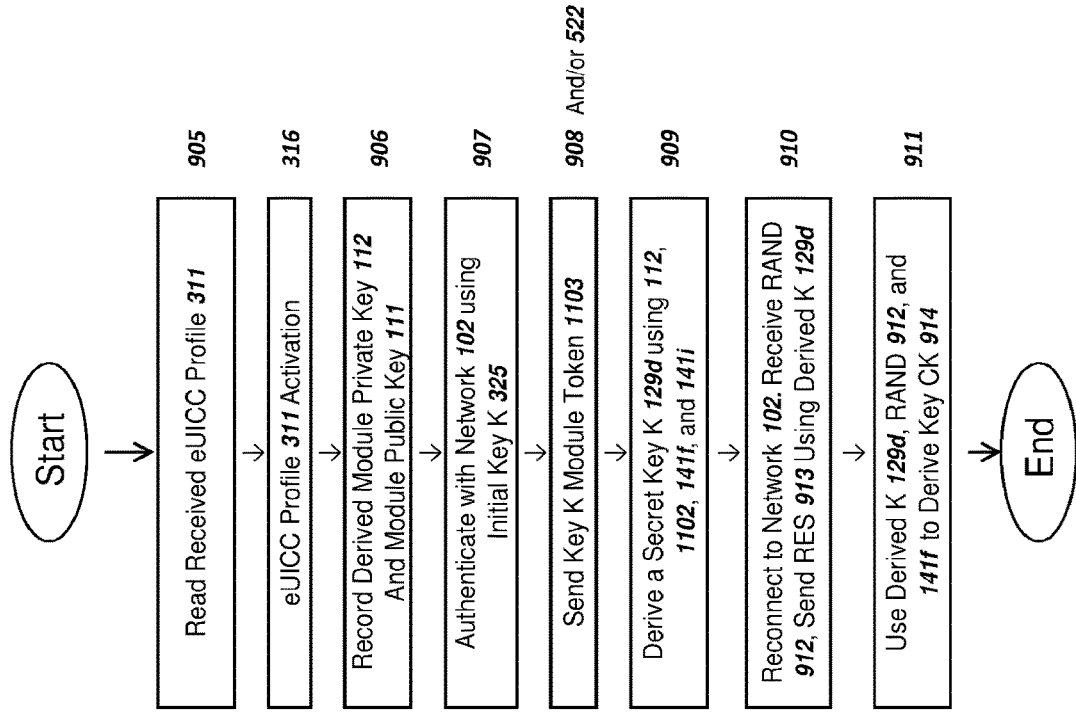
FIG. 9*b* is a flow chart illustrating exemplary steps for a module to derive a shared secret key K using a derived module PKI key, in accordance with exemplary embodiments.
Figure 11:
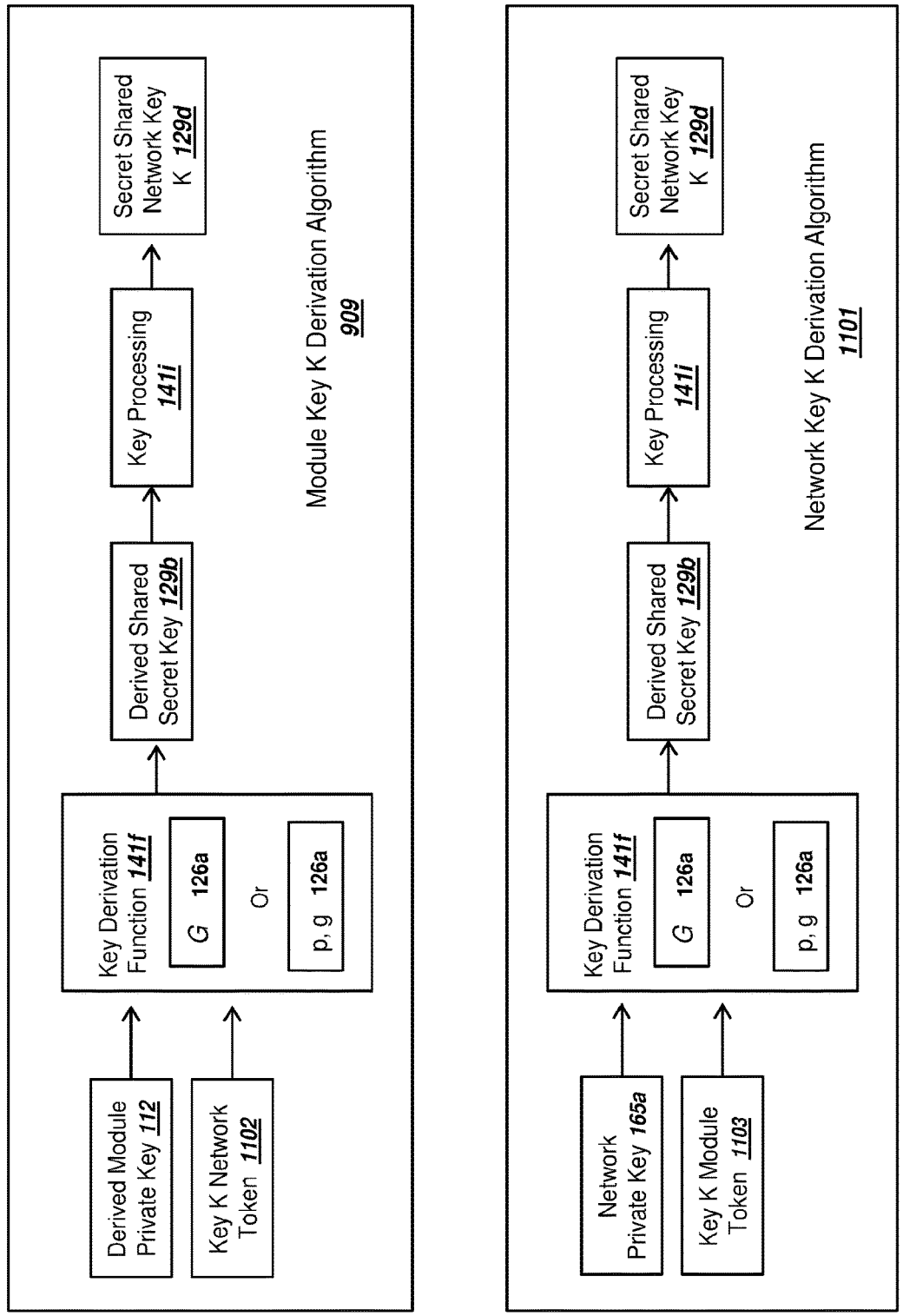
FIG. 11 is a graphical illustration for a module and a network to mutually derive a shared secret key K, in accordance with exemplary embodiments.

In exemplary embodiments where module 101 comprises a mobile phone, then sensor 101f may comprise a microphone and actuator 101y may comprise a speaker, and other possibilities exist as well to those of ordinary skill in the art for module 101 to comprise a mobile phone. In addition, a mobile phone as a module 101 could utilize an eUICC 163, and the derived module public key 111 and module private key 112 could be used for network credentials 314 in an activated eUICC profile 313. In other words, an embodiment illustrated in FIG. 5b contemplates that an eUICC 163 can use a derived module PKI key pair 315 as network access credentials 314 in future wireless networks 102 and related standards, such that the mobile operator network 108 does not depend on, or require a pre-shared secret key K for access to the wireless network 102. Alternatively, and as illustrated in FIG. 9b and FIG. 11, a derived module PKI key pair 315 could be used in an eUICC 163 to derive a secret shared network key K 129d, which could be used as the primary key for authenticating with a wireless network 102. The present invention contemplates both embodiments discussed in the previous two sentences, including an eUICC 163 with a first activated eUICC profile 313 where the network access credentials 314 use a module PKI key pair 315, and a second activated eUICC profile 313 where the network access credentials 314 use a derived secret shared network key K 129d. The first activated eUICC profile 313 could be used by a module 101 for connecting with a first wireless network 102 (which could comprise a WiMAX network that utilizes a module PKI key pair 315 for authentication), and the second eUICC profile 313 could be used by a module 101 for connecting with a second wireless network 102 (which could comprise an LTE Advanced network that utilizes a shared secret key K for authentication).

At step 511, during manufacturing of module 101, including manufacturing of sub-components such as, but not limited to, a circuit board, assembly of hardware components illustrated in FIG. 1c, etc., a module identity 110 could be written into the hardware, and could comprise a serial number, International Mobile Equipment Identity (IMEI) number, Ethernet MAC address, or a similar persistent identification for a module 101. An IEMI number may be used with a mobile phone as module 101, in a preferred embodiment. For security purposes, the module identity 110 may preferably be written into a read-only location or protected location or protected memory or protected address, such as, but not limited to, a readable location on a system bus 101d, which could also comprise a ROM 101c. Recording and utilizing module identity 110 is also depicted and described in connection with FIG. 1c, FIG. 2, and elsewhere herein. Alternatively, module identity 110 could be recorded in a non-volatile memory such as, but not limited to, a flash memory 101w.

At step 512, module 101 can be distributed to end users and also installed with a monitored unit 119. If module 101 is a mobile phone, then monitored unit 119 could be a person that carries the mobile phone. Also note that a monitored unit 119 could be omitted, and a module 101 could use the techniques contemplated herein. At step 513, a shared secret key 510, parameters 126, and a server address 207 can be recorded in a nonvolatile memory 101w. As depicted in FIG. 5b at a step 513, in an exemplary embodiment a first received eUICC profile 311 could alternatively be recorded in a nonvolatile memory 101w, and the first received eUICC profile 311 could include the shared secret key 510, the set of cryptographic parameters 126, and the server address 207. As contemplated herein, for an embodiment that utilizes an eUICC 163 for module 101, the shared secret key 510 in a received eUICC profile 311 can comprise an initial key K 325 for connecting with a wireless network 102.

Parameters 126 may comprise settings for a cryptographic algorithms 141 as illustrated in FIG. 1i and FIG. 1d, including (i) key lengths, (ii) algorithms to utilize for key generation or ciphering, such as, but not limited to, selecting RSA algorithms 153 or ECC algorithms 154, (iii) a specific secure hash algorithm 141c to utilize, such as, but not limited to, SHA-256 or SHA-3, (iv) an expiration date of the module public key 111, (v) a maximum time value for an expiration time 133 associated with a symmetric key 127, (vi) a ECC parameters 137 or an ECC standard curve 138 as parameters 126 in FIG. 1h of U.S. patent application Ser. No. 14/055,606, filed Oct. 16, 2013 in the name of John Nix, (vii) the specification of or values for a padding scheme for use with a digital signature algorithms 141d, and/or similar or related values for using cryptographic algorithms 141d. Although not illustrated in FIG. 5b, at step 513 a configuration file could also be loaded into non-volatile memory, where the configuration file includes a plurality of fields specifying the operation of module 101. The shared secret key 510, parameters 126, and server address 207 could be included in a configuration file.

Continuing at step 513, server identity 206 could be utilized in place of or in addition to server address 207, and in this case module 101 can later perform a DNS or DNSSEC lookup using server identity 206 in order to obtain server address 207 for use in a message 208, such as the destination address. Shared secret key 510 and server address 207 (or server identity 206) could also be recorded in a ROM 101c at step 513. Step 513 may also be performed concurrently with step 511 or step 512. According to an exemplary embodiment, a manufacturer may perform step 513 and in this case step 513 could take place concurrently with step 511. A manufacturer or distributor could load an initial eUICC profile into an eUICC 163 of module 101, such as a first received eUICC profile 311 illustrated at step 513 in FIG. 5b, and in this case step 513 could take place before step 512. In another embodiment, a distributor of module 101 could perform step 513 and in this case step 513 could take place concurrently with step 512. Alternatively, step 513 may be performed by a technician or end user after manufacturing and distribution and before module 101 begins collecting sensor data with a monitored unit. Other possibilities exist as well for the sequence of steps 511 through 513 illustrated in FIG. 5b without departing from the scope of the present invention. In general, the order of steps illustrated in various exemplary flow charts contemplated herein can be changed if the revised order or sequence of steps can obtain the same or equivalent end result for the sequence of steps in the exemplary flow charts.

Note that step 513 may take place multiple times during the lifetime of a module 101, and in this case (a) the first time step 513 is conducted, step 513 could be conducted concurrent with steps 511 or 512, and (b) a subsequent time step 513 is conducted, step 513 could be conducted after the receipt of a response 209, where the response 209 includes either (i) a second shared secret key 510, server address 207, and also potentially a new module identity 110 or (ii) a new received eUICC profile 311. In other words, although not illustrated in FIG. 5*b*, a module 101 could return to step 513 from later steps upon the equivalent of a "factory reset", or similar command where flash memory 101*w* and other nonvolatile memory would be cleared. In an exemplary embodiment where step 513 takes place a second time may potentially be the transfer of ownership or control of module 101, or a another embodiment where step 513 takes place a second time could be the upload of new firmware that is incompatible with a previous configuration file. In any case, (i) shared secret key 510 can preferably be uniquely associated with module 101 (i.e. any given shared secret key 510 may belong only to an individual module 101), or (ii) a module 101 could record another received eUICC profile 311 a second time that a step 513 could occur during the lifetime of a module 101.

Shared secret key 510 may comprise a pre-shared secret key 129*a*, as described in FIG. 1*c*. Shared secret key 510 may be recorded in a received eUICC profile 311 if an eUICC 163 and related profiles are utilized, but the use of an eUICC 163 is not required in some embodiments of the present invention. In an exemplary embodiment, a module 101 could also utilize a eUICC 163 for connection to a wireless network 102, but a module 101 (*i*) does not need to use any keys associated with the eUICC 163 in order to communicate with a server 105 or set of servers 1010 and (ii) can separately utilize the techniques, module PKI keys, and other aspects of various embodiments contemplated herein. In other words, for some embodiments of the present invention contemplated herein, a module 101 can use an eUICC 163 for the purposes of connecting with a wireless network 102 (possibly without deriving a module PKI key pair 315 for an activated eUICC profile 313), but the module 101 can separately and independently use steps illustrated in FIG. 5*b* and other Figures to communicate with a server 105. If (A), (i) module 101 has already derived a module private key 112 and module public key 111 and (ii) a module 101 is not utilizing an eUICC 163 and related profiles (including times when step 513 is being conducted at a second or additional time as contemplated in the previous paragraph), then (B) shared secret key 510 may comprise (i) a key received in a server encrypted data 504 including possibly a symmetric key 127, or (ii) a derived shared secret key 129*b*. Derived shared secret key 129*b* could be obtained by server 105 from using a key derivation function 141*f* such as ECDH 159 and module public key 111 and server private key 105*c*, using a module public key 111 that has already been derived or used by module 101 (such as if at least one module private key 112 and module public key 111 had already been used or derived before step 513).

As contemplated herein in an exemplary embodiment where an eUICC 163 is not being utilized by a module 101 for encrypting data with a server 105 (but an eUICC 163 could be used for access to a wireless network 102), an initial module private key 112*b* and initial module public key 111*b* could be derived outside module 101 and loaded into a nonvolatile memory such as flash memory 101*w* at a prior time before step 513, and the shared secret key 510 could be received by module 101 using the initial module private key 112*b* and initial module public key 111*b* (such as, but not limited to, receiving the shared secret key 510 in a server encrypted data 504 using the initial module private key 112*b* which had been loaded). Step 513 could then comprise a later time after the server encrypted data 504 has been received that includes the shared secret key 510, where module 101 may (i) prefer to begin utilizing keys that module 101 internally derives using cryptographic algorithms 141 at a subsequent step 515 or step 316 instead of (ii) continuing to use the initial module public key 111*b* and initial module private key 112*b* that were derived outside of the module 101, such as, but not limited to, possibly loaded into a nonvolatile memory from an external source. In other words, module 101 could begin operation with PKI keys that are initially loaded, but then change to using PKI keys derived by module 101.

In the embodiment where (i) shared secret key 510 has not been received by module 101 in a server encrypted data 504, and (ii) a module 101 is not utilizing an eUICC 163 for the purposes of communicating with a server 105 (but could use an eUICC 163 for separate purposes of gaining access to a wireless network 102), shared secret key 510 for a step 513 could be obtained and loaded by a distributor, installer, or end user into a nonvolatile memory such as, but not limited to, flash memory 101*w* in the form of a pre-shared secret key 129*a*, where pre-shared secret key 129*a* was obtained using a module identity 110 and pre-shared secret key code 134 as depicted and described in connection with FIG. 1*e* of U.S. patent application Ser. No. 14/055,606, filed Oct. 16, 2013 in the name of John Nix. Module 101 could also utilize a first pre-shared secret key 129*a*, including a first pre-shared secret key 129*a* entered by potentially a distributor, installer, or end-user described in FIG. 1*e*, to derive shared secret key 510. Other possibilities exist as well for shared secret key 510 in a step 513, and shared secret key 510 can be useful for the proper identification and/or authentication of module 101 upon module 101's generation of a private key 112 and public key 111, as described below including step 517.

If module 101 is a mobile phone, as contemplated herein, shared secret key 510 could be loaded by a distributor or company selling or servicing the mobile phone, or shared secret key 510 in a step 513 could be obtained by the end user or subscriber accessing a web page associated with a mobile operator for a wireless network 102 associated with the mobile phone and/or SIM card. In an exemplary embodiment where module 101 is a mobile phone and an eUICC 163 is being utilized by a module 101, the shared secret key 510 could be recorded in a received eUICC profile 311, as illustrated in FIG. 3*b*. In another exemplary embodiment where module 101 is a mobile phone and an eUICC 163 is being utilized by a module 101, the shared secret key 510 could comprise an initial key K 325 recorded in a set of received MNO network access credentials 312.

Also note that as contemplated herein, an initial module private key 112*b* and initial module public key 111*b* could be recorded into nonvolatile memory at step 513. For example, a manufacturer, distributor, installer, technician, or end-user could load the initial module private key 112*b* and initial module public key 111*b*, where the initial module public key 111*b* would be utilized to authenticate at step 517 below a subsequent set of public/private keys derived by module 101 at step 515 below. In this case, the initial module public key 111*b* and/or initial module private key 112*b* described in the previous two sentences could comprise the shared secret key 510. In another embodiment, the initial module public key 111b and initial module private key 112b could be recorded in a SIM or UICC, and the SIM or UICC could be either virtual or physical such as, but not limited to, a SIM card, including a Universal Integrated Circuit Card (UICC) or an embedded UICC (eUICC). A set of servers 1010 (as illustrated in FIG. 10) could also record the initial module public key 111b recorded in the SIM (including an eUICC), and the set of servers 1010 could authenticate a message or a subsequent module public key 111b derived by module 101 (such as in a step 515 below) using the initial module public key 111b. In other words, for an exemplary embodiment, an eUICC 163 or a profile within an eUICC 163 could record an initial module public key 111b and initial module private key 112b, and (i) the eUICC 163 could use the initial PKI keys for authenticating a subsequent, derived module public key 111, and (ii) the derived module public key 111 could be recorded within an activated MNO network access credentials 314 associated with an activated eUICC profile 313.

The use of an initial module public key 111b and/or initial module private key 112b are also depicted and described in connection with FIG. 5b of U.S. patent application Ser. No. 14/055,606, filed Oct. 16, 2013 in the name of John Nix, which is hereby incorporated by reference in its entirety. Thus, FIG. 5b also contemplates an embodiment where shared secret key 510 at step 513 comprises an initial public/private key pair for module 101 that is not internally derived by module 101, including keys derived at step 515. Note that the contemplation of the use of shared secret key 510 as a pre-shared secret key 129a within the present invention may be different than the use of a pre-shared secret key within a subscriber identity module (SIM) card as commonly supported by wireless networks 102 with mobile phones in 2013, one reason being the shared secret key 510 can be used by a server 105 and a module 101 to authenticate a derived module public key 111, but conventional technology does not contemplate that a pre-shared secret key within a SIM or UICC could be directly read (i.e. moved into a RAM memory 101e) by a module 101 in order to authenticate a derived module public key 111.

At step 514, module 101 can read module identity 110 using a read-only address. Module 101 can read module identity 110 directly from read-only hardware address by using system bus 101d, including from a ROM 101c, or module 101 can read module identity 110 from a nonvolatile memory such as a flash memory 101w. A step 514 may also be optionally omitted in embodiments where module 101 utilizes an eUICC 163, and in this case the module 101 can read the network module identity 101b from the received eUICC profile 311 acquired in a step 513 above. Step 514 could also take place after step 515 below. At step 515 or a profile activation 316 step, module 101 can derive module private key 112 and a corresponding module public key 111 using (i) random number generator 128, (ii) cryptographic parameters 126, (iii) cryptographic algorithms 141, and/or (iv) a key pair generation algorithm 141e. The derived module private key 112 and module public key 111 can comprise a module PKI key pair 315. As contemplated herein, a step 515 could also comprise a profile activation 316 step, such that a received eUICC profile 311 without a module PKI key pair 315 can be converted or transformed into an activated eUICC profile 313 with a module PKI key pair 315. Module 101 at step 515 or a step 316 and elsewhere in the present invention can be a mobile phone such as, but not limited to, a smartphone, and the mobile phone could include an eUICC 163. Module private key 112 and corresponding module public key 111 can be derived using a key pair generation algorithm 141e according to a wide range of parameters 126, and can utilize different algorithms for different pairs of keys, such as, but not limited to, RSA 153 or ECC 154.

Key derivation at a step 515, including the use of a profile activation step 316, could generate keys of various lengths, such as, but not limited to, 2048 bits with RSA 153 or 283 bits with ECC 154, and other possibilities exist as well. If using ECC 154 to derive a pair of keys for module 101, step 515 could also accommodate the use of different elliptic curves for compatibility with server 105, such as, but not limited to, the use of odd-characteristic curves, Koblitz curves. The use of the set of parameters from a step 513 in a step 515 or step 316 can ensure the derived keys by module 101 use a compatible or identical elliptic curve or defined elliptic curve equation as server 105, etc. In a step 513 or a step 316 in FIG. 5b, module 101 can use ECC parameters 137 or an ECC standard curve 138 in a parameters 126 to derive module private key 112 and/or module public key 111. Note that the use of an eUICC 163 is not required for some embodiments, and a step 515 can be used to derive a module private key 112 and a module public key 112 for the purposes of communicating with a server 105 without using or depending upon an eUICC 163 and related profiles.

Deriving keys in step 515 or a profile activation step 316 could also comprise using values such as constants or variables in a set of cryptographic parameters 126 to define an elliptic curve equation for use with an ECC algorithm 154. For the embodiment where module 101 derives module PKI key pair 315 within an activated network credentials 314, a profile activation step 316 can utilize the set of cryptographic parameters 126 within a received eUICC profile 311, and the set of cryptographic parameters 126 could be used with a key pair generation algorithm 141e to derive the module PKI key pair 315. The values or constants to define an equation for an elliptic curve could be input into a key pair generation algorithms 141e in the form of ECC parameters 137 or an ECC standard curve 138. In alternative embodiments, an RSA algorithm 153 can be used for deriving module PKI keys instead of ECC algorithms 154. In an exemplary embodiment, where a parameters 126 does not include constants and variables for defining an elliptic curve equation, a key pair generation algorithms 141e could use pre-defined elliptic curves with ECC algorithms 154 such as, but not limited to, standardized, named curves in ECC standard curve 138 including exemplary values such as, but not limited to, sect283k1, sect283r1, sect409k1, sect409r1, etc. Exemplary, standardized named curves, as opposed to module 101 and server 105 using an internally generated elliptic curve equation using cryptographic parameters 126, are also identified as example curves in IETF RFC 5480, titled "Elliptic Curve Cryptography Subject Public Key Information". Thus, module 101 could use either standardized elliptic curves, or a separate defined elliptic curve equation as specified in a set of cryptographic parameters 126. Or, module 101 could use RSA algorithms 153 with key pair generation algorithms 141e such that derived keys for module 101 can be used with RSA algorithms 153 within a set of cryptographic algorithms 141. In embodiments where module 101 uses an RSA algorithm 153 to derive a module private key 112 and a module public key 111 in a step 515 or a step 316, the set of cryptographic parameters 126 can include a modulus for the RSA algorithm 153.

For embodiments where elliptic curve cryptography is used by a module 101 instead of RSA-based cryptography, the curve for module 101 to utilize in deriving module public key 111 and module private key 112 at step 515 or a profile activation step 316 could be specified in a set of cryptographic parameters 126. Consequently, the parameters of keys generated by module 101 at step 515 or a profile activation step 316 (including key length or algorithms utilized) may be selected based upon the requirements of the application and can be included in a parameters 126. When deriving keys at step 515 or a profile activation step 316, module 101 may also utilize data from sensor 101*f*, radio 101*z*, a bus 101*d*, a physical interface 101*a*, memory 101*e*, and/or a clock 160 in order to generate a seed 128*b* for random number generator 128, or random number generator 128 could utilize these inputs directly. A random number 128*a* can be input into key pair generation algorithm 141*e* in order to derive the module public key 111 and module private key 112. Note that with ECC algorithms 154, a module private key 112 can be a random number 128*a* in one embodiment, and the module public key 111 can be derived with a key pair generation algorithms 141*e* using the module private key 112 comprising the random number 128*a*.

For embodiments where a module 101 uses an eUICC 163, module 101 could also derive or calculate a key K module token 1103 at a step 316 in FIG. 5*b*, along with the derived module private key 112 and module public key 111. A key K module token 1103 is depicted and described in connection with FIG. 9*b* and FIG. 11 below. Key k module token 1103 could comprise (i) the module public key 111, in embodiments where module 101 and server 105 use an ECDH 159 key exchange, or (ii) another value or number for a server 105 to derive a secret shared network key K 129*d* using a network key K derivation algorithm 1101 (in FIG. 11 below). Other possibilities exist as well for a key K module token 1103 calculated by a module 101 in a step 316 in order for a server 105 to utilize the key K module token 1103 in a network key K derivation algorithm 1101 without departing from the scope of the present invention.

Upon key derivation at step 515 or a profile activation step 316, module private key 112 and module public key 111 can be recorded in a nonvolatile memory 101*w*. For the use of a profile activation step 316 in FIG. 5*b*, the module private key 112 and module public key 111 can also be recorded with a set of activated mobile network operator (MNO) network access credentials 314 for an activated eUICC profile 313, and the activated eUICC profile 313 could be recorded in a eUICC 163. The eUICC could also be recorded in a nonvolatile memory 101*w*. Module private key 112 can preferably not be transmitted or sent outside module 101. Also note that over a potential lifetime of a decade or more of operation of module 101, each time a new module private key 112 may be required (for various potential reasons outlined above), including multiple instances of a profile activation step 316, the external recording and/or transferring of module private key 112 incurs a potential security risk. Security risks can be compounded if the external location records private keys 112 for a plurality of modules 101. Also, by internally generating private key 112 at step 515, which could comprise a profile activation step 316, module 101 can overcome significant limitations and costs requiring the distribution of a pre-shared secret key Ki or K in the form of a SIM card or UICC or similar physical distribution of a pre-shared secret key, after module 101 begins operations.

In comparison with conventional technology, the use of a shared secret key 510 in the present invention does not require physical distribution of a new shared secret key 510 after module 101 begins operations such as, but not limited to, sending a module encrypted data 403, and a shared secret key 510 could be recorded in a received eUICC profile 311 for embodiments that use a eUICC 163. Module 101's key derivation and related steps could also be triggered by either (i) a bootloader program 125, where the bootloader program 125 determines that memory within module 101 does not contain a module private key 112, or (ii) via a module instruction 502 such as, but not limited to, a "key generation" or "derive new keys" command in a response 209 from a server, and other possibilities exist as well. Thus, in accordance with a preferred exemplary embodiment, the derivation of a module public key 111 and a module private key 112 at a step 515 in FIG. 5 does not require the use of a profile activation step 316, and the derivation of the module PKI keys does not require and optionally may not be associated with or depend upon the use of an eUICC 163.

Note that module 101's generation of keys after deployment and installation may create challenges for authentication of a new module public key 111 with module identity 110, since module 101 may be connecting to server 105, wireless network 102, or mobile network operator 108 via the IP Network 107 or an open or public network such as a wireless network 102 that may comprise many modules 101 or mobile phones. After module 101 creates new module public key 111 and module private key 112 at step 515 or a profile activation step 316, at step 516 module 101 can send a message 208 with the module identity 110, the new module public key 111, and cryptographic parameters 126 or 126*a*. In an exemplary embodiment where a module 101 uses a profile activation step 316 with an eUICC 163 in FIG. 5*b*, the server 105 receiving the message 208 with the module identity 110 (possibly in the form of a network module identity 110*b*) and new module public key 111 could reside within or be associated with a mobile network 102. Parameters 126 in message 208 at step 516 can represent the parameters 126 used to generate the module public key 111.

In exemplary embodiments where an eUICC 163 is being utilized in a FIG. 5*b*, module 101 can send a key K module token 1103 to a mobile network operator 108 in a step 516. Key K module token 1103 could be calculated in a step 316 above, although other possibilities exist as well for the timing or sequence when a module 101 calculated a key K module token 1103 without departing from the scope of the present invention. The exemplary used of a key K module token 1103 is also depicted and described below in connection with FIG. 11 and FIG. 9*b* below. Key K module token 1103 could comprise (i) the derived module public key 111, or (ii) another value or number for a server 105 associated with a mobile network operator 108 to derive a secret shared network key K 129*d*. Steps 516 and step 517 illustrated in FIG. 5*b* could be combined into a step 522, and a step 522 can be utilized by a module 101 in embodiments where an eUICC 163 is utilized and a module 101 performs or conducts the steps illustrated in FIG. 9*b*.

Also, as contemplated herein, a step 516 and a step 517 illustrated in FIG. 5*b* may optionally be combined or the order of a step 516 and a step 517 changed. In an exemplary embodiment, the receipt of data within a step 516 could only be possible if a module 101 using a module identity 110 or 110*b* had previously been authenticated before a step 516. In other words, a module 101 and a server 105 could take steps not illustrated in FIG. 5*b* before step 516 to authenticate module 101 before a step 516, including both nodes using a shared secret key 510, which could also comprise an initial key K 325. In this case, where module 101 could be authenticated before a step 516, the authentication of a message 208 in a step 517 could be considered automatic, since the module 101 could be authenticated before a step 516. Other possibilities for a module 101 to authoritatively send data in a step 516 are possible as well without departing from the scope of the present invention.

Parameters 126 in message 208 at step 516 may also be optionally omitted, in an embodiment where a server 105 and a module 101 can pre-agree (before a step 516 illustrated in FIG. 5b) on the set of cryptographic parameters 126 or 126a associated with the module public key 111. The sub-steps for a server 105 to receive a message 208 are also depicted and described in connection with FIG. 2 above. Parameters 126 within a message 208 can comprise descriptive values for new module public key 111. Note that at step 516, server 105 does not need to receive new module public key 111 in the form of a certificate 122 (although it could be in the form of a certificate 122). New module public key 111 could be received by server 105 within a string or field within a body 602 of a TCP/UDP packet 601a, illustrated in FIG. 8 below. As depicted in step 516 shown in FIG. 8 below, message 208 at step 516 can also optionally include a module public key identity 111a, which can be recorded in module database 105k along with module identity 110 and module public key 111a.

According to an exemplary embodiment where an eUICC 163 is not being utilized, a first source (IP:port) number received in a first message 208 at step 516 can be different than a second source IP:port number in a second message 208 at step 518 below, wherein a response 209 send in step 519 below can preferably be sent to the second source IP:port number received in the second message 208 at step 518 in order to traverse a firewall 104 (as depicted and described in connection with packet 209a in FIG. 2). In other words, the proper destination IP:port for a response 209 to a module 101 can change over time, such as the proper destination IP:port changing due to the use of sleep states by module 101 and/or function of a firewall 104. Consequently, according to an exemplary embodiment, a response 209 can utilize a destination IP:port number equal to the source IP:port number received in the last (i.e. most recent) message 208 from module 101 received by server 105.

At step 517, server 105 can authenticate the message 208 received in step 516 using the shared secret key 510 described in a step 513 or profile activation step 316. Server 105 could record the shared secret key 510 before step 517 in a module database 105k. If step 517 occurs for the first time in a lifetime of module 101, then shared secret key 510 could comprise a pre-shared secret key 129a recorded by server 105 in a module database 105k illustrated in FIG. 1a and FIG. 1m. If step 517 occurs at subsequent time, then server 105 could have sent shared secret key 510 in a server encrypted data 504 and recorded shared secret key 510 in a module database 105k for later use (such as at step 517). For the embodiment where a module 101 uses an eUICC and the steps illustrated in FIG. 5b to connect with a wireless network 102, the shared secret key 510 could be recorded in a received eUICC profile 311, and the shared secret key 510 could comprise an initial key K 325 within the received eUICC profile 313 from a step 513. For the embodiment where a module 101 uses an eUICC and the steps illustrated in FIG. 5b to connect with a wireless network 102, the shared secret key 510 in a step 517 can comprise an initial key K 325.

In a step 517, server 105 can authenticate the message 208 according to message digest, or using the shared secret key 510, possibly in the form of a initial key K 325, to process a symmetric key 127 within a symmetric ciphering algorithm 141b, where the successful encryption and decryption of data within message 208 using the shared secret key 510 on both ends could be confirmation that message 208 is authenticated, since both parties would only be able to mutually successfully encrypt and decrypt by sharing the same shared secret key 510. As contemplated herein, the term "authenticating a public key" may refer to "authenticating a message that includes the public key", and both may refer to validating or verifying that a recorded module identity 110, possibly in the form of a network module identity 110b, accessed by server 105 from a module database 105k is associated with a receive module public key 111. In the case where an eUICC 163 is utilized by a module 101 to connect with a wireless network 102, a network module identity 110b may be utilized instead of a module identity 110 (i.e. the server 105 could use a recorded network module identity 110b instead of the module identity 110 for authentication of the derived module public key 111).

Other possibilities exist as well for server 105 to use a shared secret key 510 in order to authenticate a message 208 that contains a new module public key 111 (where module 101 contains a new module private key 112) or a key K module token 1103. In one embodiment, message 208 in step 516 could include a module digital signature 405 using secure hash algorithms 141c, where both the module 101 and the server 105 input a string combing at least a portion of the shared secret key 510 and a portion of the new module public key 111 into the secure hash algorithms 141c in order to obtain the module digital signature 405. Module 101 could send the module digital signature 405 to server 105 in a message 208. Additional embodiments for the authentication of a new module public key 111 or a key K module token 1103 for a step 517 is also depicted and described in a step 1202 of FIG. 12 in U.S. patent application Ser. No. 14/064,618, filed Oct. 28, 2013 in the name of John Nix, which is hereby incorporated by reference in its entirety. Thus, the present invention contemplates the authentication and/or verification of either (i) new module public key 111 or key K module token 1103 or (ii) a message 208 that includes new module public key 111 or key K module token 1103 according to steps that use alternatives to a shared secret key 510 for the authentication.

According to some exemplary embodiments, new module public key 111 or key K module token 1103 from a step 515 or profile activation step 316 can be authenticated and/or verified as being properly associated with a recorded module identity 110 in server 105 (i) without the use of a shared secret key 510, and/or (ii) with alternatives to using shared secret key 510. After receiving authenticated new module public key 111 in steps 516 and 517, according to a preferred exemplary embodiment, server 105 can preferably only accept and process (A) either incoming (i) a symmetric keys 127 ciphered with a asymmetric ciphering algorithm 141a, and/or (ii) incoming server instructions 414, when (B) the next or a subsequent incoming message 208 from module 101 using module identity 110 also includes a valid module digital signature 405 verified by using the new module public key 111, received at step 516.

According to an exemplary embodiment, shared secret key 510 can be associated with a module public key identity 111a, and shared secret key 510 can be used to authenticate a particular value for a module public key identity 111a. In this embodiment, (i) a message 208 with module public key 111 and a first module public key identity 111a may be authenticated using a shared secret key 510, but (ii) a second message with module public key 111 and a second module public key identity 111a may not be authenticated using the same shared secret key 510. Thus, in accordance with an exemplary embodiment, shared secret key 510 can be used for both (i) a single time for authenticating a module public key 111 or a key K module token 1103 received in a step 516, and (ii) authenticating a module public key 111 with a particular value for the module public key identity 111a. Note that module public key identity 111a can be particularly useful with key revocation, such that a key revocation could specify a particular module public key identity 111a (associated with a particular module public key 111) to be revoked, but other module public keys 111 for a module 101 and module identity 110 with different module public key identities 111a could remain valid and not revoked.

Although not illustrated in FIG. 5b, for embodiments where an eUICC 163 is not utilized to authenticate and encrypt data between module 101 and server 105, server 105 could operate with a certificate authority 118 in order to utilize a new module public key 111, as described in this paragraph. In this case, server 105 could bypass the authentication at step 517, but certificate authority 118 may perform step 517 in order to sign the certificate 122, including possibly using shared secret key 510 to authenticate module public key 111. At step 516, new module public key 111 could be received by server 105 in the form of a uniform resource locator (URL) or domain name for download of a certificate 122 corresponding to the new module public key 111. Using a certificate authority 118 in conjunction with step 516 is also depicted and described in connection with FIG. 5b of U.S. patent application Ser. No. 14/055,606, filed Oct. 16, 2013 in the name of John Nix, which is hereby incorporated by reference in its entirety.

After steps 516 and 517, which could be combined into a step 522, server 105 can update a module database 105k using the module identity 110 or network module identity 110b to insert or update the new module public key 111 or key K module token 1103, and parameters 126 associated with new module public key 111. As contemplated herein, a set of servers 1010 (illustrated in FIG. 10 below) could collectively perform the function of a single server 105, and thus multiple separate computers could comprise a server 105. Server 105 may communicate with a plurality of modules 101, and thus could utilize a module database 105k in order to record the new module public key 111 or key K module token 1103 and parameters 126 with the module identity 110. In one embodiment, the module identity 110 could preferably operate as an index within a table of module database 105k in order to speed reads and writes from the table used with module public key 111, parameters 126, and also selecting a symmetric key 127 for a symmetric ciphering algorithm 141b in later messages. As described in FIG. 1d, FIG. 1i, and elsewhere herein, parameters 126 can include data useful for the operation of cryptographic algorithms 141 and module public key 111. According to a preferred exemplary embodiment, some modules 101 in a system 100 could utilize a first elliptic curve, such as, but not limited to, using a first set of ECC parameters 137 or first ECC standard curve 138 within a parameters 126, and other modules 101 could utilize a second and different elliptic curve within a parameters 126, such as, but not limited to, a second set of ECC parameters 137 or second ECC standard curve 138. The different sets of parameters 126 for different modules 101 using different module identities 110 could be recorded in the module database 101k.

After verifying the new module public key 111 in a step 517, at step 518 of FIG. 5b, module 101 could send a second message 208, and the second message 208 can include a module identity 110 and module encrypted data 403. In embodiments where (i) an eUICC 163 is utilized, and (ii) server 105 belongs to a wireless network 102 such as a wireless network operator 108, then the term "module identity 110" as contemplated throughout the present invention can comprise a network module identity 110b. A module identity 110 comprising an identity associated with hardware for module 101 can be used with an eUICC 163 (since the eUICC may use multiple network module identities 110b). Although not illustrated in FIG. 5b, the second message 208 could also include a module digital signature 405, wherein the module digital signature is created with the new module public key 111 received in step 516. Server 105 could then utilize the steps illustrated in FIG. 4 in order to process the incoming message 208 with the new module public key 111, including using the module identity 110 sent by a module 101 in the second message 208 at step 518 to select the new module public key 111 and subsequently verify a module digital signature 405 using the new module public key 111 and digital signature algorithm 141d. Also as discussed in FIG. 4 in connection with processing a message 208, module 101 could encrypt the module encrypted data 403 in the second message 208 in a step 518 by using server public key 114. In one embodiment, the second message 208 as illustrated in FIG. 5b, which could be the next message after authenticating module public key 111 in step 517, could include a symmetric key 127.

The module encrypted data 403 in step 518 could include a symmetric key 127 for utilization with a symmetric cipher 141b, where symmetric key 127 could be ciphered with an asymmetric ciphering algorithm 141a. In another embodiment, module 101 could also send sensor data in a module encrypted data 403 at step 518. Or, at step 518 the second message 208 could be a signal and/or data (such as a random number 128a) for server 105 to use a key derivation function 141f with the server public key 114 and the new module public key 111 (received at step 516) to create a new derived shared key 129b for use with symmetric ciphering algorithms 141b in subsequent messages 208. In other words, in some embodiments derived shared key 129b can function as a symmetric key 127. If the second message 208 in step 518 comprises a signal and/or data for server 105 to derive a new derived shared key 129b, then this second message 208 could then optionally leave off module encrypted data 403 and/or a module digital signature 405. The successful use of a new derived shared key 129b (using the new module public key 111, possible received in step 516, and existing server public key 114) with symmetric ciphering algorithms 141b at subsequent steps by both module 101 and server 105 can indicate to each the communications are mutually authenticated. Second message 208 at a step 518 could also include a server instruction 414, a security token 401, and/or a timestamp value 604, and other possibilities exist as well without departing from the scope of the present invention.

At step 519, module 101 can receive a response 209 from server 105, where the response 209 includes server encrypted data 504 and a module instruction 502. Module 101 could take the steps to receive and process response 209 as depicted and described in connection with FIG. 5a. Response 209 could be formatted according to the exemplary response 209 illustrated in FIG. 6a below. The module instruction 502 could be an acknowledgement 501 that the second message 208 sent in step 518 was received by server 105.

In an exemplary embodiment where module 101 utilizes an eUICC 163 to connect with a wireless network 102, module 101 could use a step 519 to receive second, received eUICC profile 311 at a step 519. The second, received eUICC profile 311 could be included within the server encrypted data 504, but the second, received eUICC profile 311 may also optionally comprise a file or set of files that are encrypted and in this case the encrypted, second, received eUICC profile 311 in a step 519 could optionally be received in a response 209 without a server encrypted data 504 (i.e. the server 105 may optionally not add additional encryption from a FIG. 5a to the profile 311 if the profile 311 is already encrypted). The new, received eUICC profile 311 received by a module 101 in a step 519 could provide information, such as, but not limited to, a set of network parameters 310 and a set of network access credentials 312 for connecting with a second, different wireless network 102 than the wireless network 102 utilized to receive the response 209 at a step 519. The profile 311 received in a step 519 could comprise receiving several sets of related data (possibly in different but related responses 209), such as a first set that includes network access credentials 312 and a second set of data that includes network parameters 310 or cryptographic parameters 126. Module 101 could use the second, received eUICC profile 311 in order to change network access credentials 314 and connect with a different wireless network 102 (or possibly change network access credentials 314 for connecting with the same wireless network 102).

In this embodiment where a module 101 uses an eUICC 163, module 101 could receive the profile 311 from an eUICC subscription manager 164 at a step 519, where the eUICC subscription manager 164 uses a server 105 and sends a response 209 with the profile 311 to the module 101 in a step 519. The message 208 with the module identity 110 from the previous step 518 could be sent to the server 105 associated with the eUICC subscription manager 164. The module 101 could send (a) the module identity 110 read from a hardware address such as a protected memory in a step 514 above to (b) the eUICC subscription manager 164 in the previous step 518 in order to receive the profile 311 in a step 519. Note that (a) the mobile network operator 108 providing connectivity and access to the IP Network 107 in previous steps in FIG. 5b, such as, but not limited to, a previous step 518 could comprise (b) the eUICC subscription manager 164 sending the profile 311 received by a module 101 in a step 519. Or, the eUICC subscription manager 164 receiving the message 208 in a step 518 could be a different entity than MNO 108, such as module provider 109 (where module provider 109 in FIG. 1a is also illustrated as an eUICC subscription manager 164). Other possibilities exist as well for the location/operator of an eUICC subscription manager 164 receiving the message 208 in a step 518 (in order to send the response 209 with the profile 311) without departing from the scope of the present invention.

At step 520, module 101 can send a third message 208 with a confirmation 414 to server 105. Confirmation 414 can be used to signal proper execution of module instruction 502 from a step 519, if module instruction 502 comprised an instruction other than an "ACK" or acknowledgement 501. In the embodiment where a module 101 received a second, received eUICC profile 311 at step 519, the step 520 could comprise a signal from module 101 back to server 105 that the received eUICC profile 311 has been properly received, passes integrity checks, and/or is compatible with module 101, etc. In an embodiment where module instruction 502 in step 519 comprises an acknowledgement 501 from server 105, then the confirmation 414 may omitted and in this case step 520 could be skipped.

At step 521 server 105 can determine or evaluate if (i) a new module public key 111 and/or certificate 122 are required for continued operation, or (ii) the use of the second, received eUICC profile 311 from a step 519 is preferred for connecting to a second wireless network 102.

One reason for the need of new keys could be the expiration of a certificate 122 for module 101, or the desire to utilize a different set of cryptographic parameters 126 such as, but not limited to, a longer key length for increase security or the use of a different ECC parameters 137 or a different ECC standard curve 138 with cryptographic algorithms 141. As described elsewhere herein and above in this FIG. 5b, many other possibilities exist for reasons why module 101 and/or server 105 can prefer for module 101 to utilize a new module public key 111 and new module private key 112. Either server 105 or module 101 may determine that the use of a new module public key 111 and new module private key 112 may be preferred at step 521. If module 101 determines that the use of a new module public key 111 and new module private key 112 is preferred or desirable, module 101 could send server 105 a signal that new keys will be generated either before step 521 or at step 521.

Upon determining at step 521 either (i) new keys are desirable or (ii) the use of the second, received eUICC profile 311 is preferred, then module 101 could derive new private and public keys by returning to step 515 or step 316, as illustrated in FIG. 5b. In the embodiment where an eUICC 163 is used, as described above, a module 101 could activate the second, received eUICC profile 311 upon returning to a step 316 and derive a second module PKI key pair 315 for the second, received eUICC profile 311. The second module PKI key pair 315 can be different than the first module PKI key pair 315 associated with the first received eUICC profile 311 from a step 513. Although not illustrated in FIG. 5b, upon determining "yes" at step 521, server 105 could send a module instruction 502 of "new key generation" and also a new or current set of cryptographic parameters 126 to utilize with the new module private key 112 and module public key 111. In accordance with exemplary embodiments, module instruction 502, including the "new key generation" instruction and set of parameters 126, can be received in a response 209 after module 101 wakes from a sleep or dormant state and sends a message 208 after waking from the sleep or dormant state. If module 101 determines that new keys are not required or desirable at step 521 (including the use of the second received eUICC profile 311 from a step 519 is not required at one instance of a step 521 but the use of a received eUICC profile 311 could be preferred at a subsequent instance of a step 521), module 101 can then proceed to step 309 and wait according to a sleep or idle timer before sending the next message 208 to a server 105.

Although not illustrated in FIG. 5b, in embodiments where module 101 uses an eUICC 163 and receives an eUICC profile 311 in a step 519, upon determining the value "yes" at a step 521, module 101 could proceed to a step 905 depicted and described in connection with FIG. 9b and follow the subsequent set of steps using the received eUICC profile 311 from a step 519. In the embodiment where an eUICC 163 is utilized by module 101 for connecting to a wireless network 102, upon determining the value "no" at a step 521, a step 309 in FIG. 5b could comprise the module 101 waiting to send a periodic "location update" request in order to signal to a wireless network 102 that module 101 continues to be attached in an idle state. In other exemplary embodiments, a module 101 could use a regular SIM or UICC in order to connect with wireless network 102, and module 101 could use the steps illustrated in FIG. 5b to connect with a server 105 without an eUICC 163.

FIG. 6

FIG. 6 is a simplified message flow diagram illustrating an exemplary message sent by a module, and an exemplary response received by the module, in accordance with exemplary embodiments. FIG. 6 illustrates exemplary details within message 208 sent by module 101 and also response 209 received by module 101. Message 208 may comprise a TCP/UDP packet 601*a* sent from module 101 source IP:port 204 to server 105 destination IP:port 207. According to an exemplary embodiment, UDP or UDP Lite formatting for TCP/UDP packet 601*a* may be preferred. Source IP:port 204 and destination IP:port 207 in message 208 may be included within a header in TCP/UDP packet 601*a*. Although a single message 208, response 209, module 101, and server 105 are shown in FIG. 6*a*, system 100 as illustrated in FIG. 2 and other systems depicted herein may comprise a plurality of each of the nodes and datagrams illustrated in FIG. 6. As contemplated herein, the term "datagram" may also refer to a "packet", such that referring to as datagram 601*a* can be equivalent to referring to packet 601*a*. Note that when using TCP protocol, a packet within a series of TCP messages can also be a datagram 601*a*.

TCP/UDP packet 601*a* may include a body 602, which can represent the data payload of TCP/UDP packet 601*a*. The data payload of message 208 can optionally include channel coding 406 as described in FIG. 4 above, if the transport protocol for TCP/UDP packet 601*a* supports the transmission of bit errors in the body 602 (as opposed to entirely dropping the packet), such as, but not limited to, with the UDP Lite protocol. Support for the transmission of bit errors in body 602 by wireless network 102 would be preferred over entirely discarding a packet, since the programs or algorithms used by a module controller 105*x* could include support for and utilization of channel coding 406. Without UDP Lite formatting, message 208 can alternatively sent by module 101 as a UDP datagram, such as if wireless network 102 (or a wired connection) does not support the UDP Lite protocol.

Note that if (A) message 208 comprises (i) regular UDP or TCP formatting (i.e. not UDP Lite or similar variations) within an IPv6 network, or (ii) a UDP or TCP format within an IPv4 network with a checksum 603 enabled (i.e. checksum 603 not equal to zero), then (B) channel coding 406 may optionally be omitted. Checksum 603 can comprise a value to for an integrity check of a packet 601*a*, and the calculation and use of checksum 603 is defined in IETF standards for TCP and UDP packets. In accordance with an exemplary embodiment, including the use of IPv6 for IP Network 107 and a UDP datagram for message 208 and response 209, a checksum 603 sent by module 101 in a message 208 does not equal a checksum 603 in the message 208 received by server 105, in the case where firewall 104 is present and the firewall 104 performs network address translation.

The body 602 can include a module identity 110, module encrypted data 403, and channel coding 406. The module identity 110 in FIG. 6 is illustrated as an encrypted module identity 110*a*, and the encrypted module identity 110*a* could be processed using a ciphering algorithm within a set of cryptographic algorithms 141 to convert the module identity 110 into an encrypted module identity 110*a*. Although not illustrated in FIG. 6, body 602 could also include a module digital signature 405, as illustrated in FIG. 6 of U.S. patent application Ser. No. 14/039,401. Module identity 110 in the form of an encrypted module identity 110*a* is illustrated in FIG. 6 as external to module encrypted data 403, although module identity 110 may optionally only be included in module encrypted data 403, and in this case module identity 110 would not be external to module encrypted data 403 in a body 602. By including module identity 110 as external to module encrypted data 403, server 105 can use the unencrypted module identity 110 in order to select either (i) the appropriate module public key 111 to verify module digital signature 405 if an asymmetric cipher 141*a* is used within cryptographic algorithms 141, or (ii) the appropriate symmetric key 127 for a set of cryptographic algorithms 141 to decrypt the module encrypted data 403. Module public key 111 and symmetric key 127 may preferably be recorded in a module database 105*k*, such that server 105 can access a plurality of public keys 111 or symmetric keys 127 associated with different module identities 110 with different bodies 602 for a plurality of modules 101, which is also illustrated in FIG. 1*m*.

Thus, by including module identity 110 external to module encrypted data 403, server 105 can utilize the module identity 110 to query a module database 105*k* and select the appropriate module public key 111 or symmetric key 127. As noted previously, module identity 110 could comprise a string or number that is uniquely associated with module identity 110, such as, but not limited to, a session identity, as opposed to being a module identity 110 that is read from hardware in module 101 such as, but not limited to, an IMEI number, Ethernet MAC address, etc. Module identity 110 is illustrated in FIG. 6 as a session identity that is a different representation of module identity 110 of a serial number such as in FIG. 2, but in both cases the values can comprise a module identity 110 since the values can be uniquely associated with module 101 at different points in time.

According to an exemplary embodiment where asymmetric ciphering 141*a* of module encrypted data 403 is utilized, such as (i) the first message 208 sent by module 101 and (ii) where a symmetric key 127 had not been previously exchanged, module identity 110 can be (a) within module encrypted data and (b) not external to module encrypted data 403. In this case, server 105 can utilize server private key 105*c* to, in sequence, decrypt module encrypted data 403, extract module identity 110 from the decrypted module encrypted data 403, and then used the module identity 110 to select module public key 111 from module database 105*k* in order to verify a module digital signature 405. In a related embodiment, if a module identity 110 is in body 602 and external to module encrypted data 403, then module identity 110 could be obfuscated or otherwise ciphered according to a pre-agreed algorithm with server 105, such that server 105 can utilize the obfuscated or ciphered module identity 110 to select a module public key 111 from module database 105*k*. The value of "[Encrypted Module Identity]" shown in FIG. 6 could comprise an encrypted module identity 110*a*, and the algorithm token 190 in the form of a random number 128*a* could be used with a secret ciphering algorithm 141*h* illustrated in FIG. 1*g* to convert a module identity 110 to an encrypted module identity 110*a* and also to convert an encrypted module identity 110*a* to a module identity 110. The use of an algorithm token 190 in a message 208 illustrated in FIG. 6 can be optionally omitted in exemplary embodiments. According to an exemplary embodiment where (i) symmetric ciphering 141*b* of module encrypted data 403 is utilized, such as after a first message 208 had already been sent by module 101 and a symmetric key 127 had previously been exchanged, then (ii) module identity 110 can be external to module encrypted data 403 and in body 602 in order for server 105 to utilize module identity 110 and select symmetric key 127 from a module database 105*k*, thereby enabling server 105 to decrypt the module encrypted data 403 using the selected symmetric key 127 and a symmetric ciphering algorithm 141*b*.

In exemplary embodiments, a module digital signature 405 may optionally be omitted from body 602 after module 101 has previously sent symmetric key 127 in a previous message 208 to the message 208 illustrated in FIG. 6. In other words, in a series of messages 208, module 101 can preferably change from (i) using asymmetric ciphering 141*a* with in a previous message 208 that includes symmetric key 127 in a module encrypted data 403 (where the initial message 208 also includes module digital signature 405 and module identity 110) to (ii) using symmetric ciphering 141*b* with subsequent messages 208 without module digital signature 405 in the series (where the subsequent messages 208 can optionally include an encrypted module identity 110*a* external to module encrypted data 403 for server 105 to select the appropriate symmetric key 127). Message 208 illustrated in FIG. 6 can comprise a subsequent message 208 as described in the previous sentence. A series of messages 208 could begin when the initial message 208 is sent by module 101 and end when expiration time 133 of symmetric key 127 has transpired, and subsequently a new series of messages 208 could begin where the first message 208 in the new series of messages changes back to asymmetric ciphering 141*a* with initial message 208 that includes symmetric key 127 in a module encrypted data 403 (where the initial message 208 also includes a new module digital signature 405). An example of the initial message 208 described in this paragraph can comprise message 208 illustrated in FIG. 6 of U.S. patent application Ser. No. 14/039,401, filed Sep. 27, 2013 in the name of John Nix, which is hereby incorporated by reference in its entirety. Other possibilities exist as well without departing from the scope of the present invention.

Using a message 208 with a module digital signature 405 can be both more efficient and overall more secure than digest authentication (such as the digest authentication described in IETF RFC 2069), although using digest-based authentication may be alternatively used. The use of a module digital signature 405 requires only a single packet for message 208 and a single packet for response 209 for secure communication between module 101 and server 105. Module encrypted data 403 illustrated in FIG. 6 can be processed using the steps and algorithms described in FIG. 4. Note that module encrypted data 403 as illustrated in FIG. 6 is shown in a plaintext form for ease of illustration, but actual module encrypted data 403 within body 602 of a packet 601*a* could be transmitted as binary, hexadecimal, Base64 binary-to-text encoding, or other encoding rules, and strings of the actual data within module encrypted data 403 would not normally be human readable.

In an exemplary embodiment, encryption by module 101 may optionally be omitted, and the server instruction 414 with corresponding data could be included within a message 208 without encryption within the body 602, such as if security could be maintained at the network level. As one example for this embodiment without encryption, server instruction 414 could be included in body 602 as plaintext. The encryption and/or security could be applied through other means, such as, but not limited to, the use of symmetric ciphering 141*b* such as AES 155 at the data-link layer, where packets transmitted through a wireless network 102 could be encrypted at the data-link layer, but after conversion to a network-layer message such as the exemplary datagram 601*a* illustrated in FIG. 6, the datagram 601*a* could optionally omit encryption such as a module encrypted data 403.

Module encrypted data 403 can include a server instruction 414, a server identity 206, a module identity 110, a security token 401, a timestamp 604, and a sensor measurement 305. The server instruction 414 can represent the purpose of the message 208 for server 105, and FIG. 6 illustrates an "update" for server instruction 414. An update for server instruction 414 could be used to periodically notify server 105 of regular, periodic sensor measurements 305 acquired by a sensor 101*f* or also data from a plurality of sensors. An update for server instruction 414 may also comprise a periodic report regarding monitored unit 119, and a server instruction 414 is described in FIG. 4. Other server instructions 414 besides an "update" may be included in a module encrypted data 403 within a body 602. The "update" illustrated in message 208 in FIG. 6 can also include a new symmetric key 127, and the module encrypted data 403 illustrated in FIG. 6 may comprise the use of either an asymmetric ciphering 141*a* with public/private keys, or (ii) symmetric ciphering 141*b* with a symmetric key 127.

An initial transmission or negotiation of a symmetric key 127 may preferably utilize asymmetric ciphering 141*a* and the use of a public key as an encryption key and a private key as a decryption key. Subsequent transmission of a new symmetric key 127 may utilize either (i) a symmetric cipher 141*b* with a previously negotiated but still valid symmetric key 127 (i.e. expiration time 133 has not transpired), or (ii) asymmetric ciphering 141*a*. If the data within instruction 414 is longer than the maximum data length supported by a selected asymmetric ciphering algorithm 141*a* and the public/private key pair, then module encrypted data 403 within message 208 can be broken up into several sections, such that the data within each section is less than the maximum data length supported by the asymmetric ciphering algorithm 141*a* and key length. In an exemplary embodiment, a first symmetric key 127 can be used with module encrypted data 403 and a second symmetric key 127 can be used with server encrypted data 504. The first symmetric key 127 and second symmetric key 127 can be different, including using a first symmetric ciphering algorithm 141*b* with the first symmetric key and a second symmetric ciphering algorithm 141*b* with the second symmetric key 127. In another exemplary embodiment, in order to reduce the number of messages required to be transmitted and thus save power usage by a module 101, symmetric key 127 used with module encrypted data 403 and server encrypted data 504 can be the same and rotated periodically such, but not limited to, when expiration time 133 for a symmetric key 127 transpires.

Module identity 110 within module encrypted data 403 can represent the identity of module 110, and could represent a serial number read by module 101 from a read-only hardware address. Module identity 110 is described in FIG. 1*c* and can represent a unique identifier of module 101. Module identity 110, such as an encrypted module identity 110*a*, outside module encrypted data 403 can represent a string or number that is different than a serial number that can be used by module 101 within a module encrypted data 403. Security token 401 within module encrypted data 403 can represent a random string in order to make message 208 reasonably unique and thus system 100 in FIG. 2 and other systems illustrated herein robust against replay attacks. Security token 401 is described in FIG. 5*a*. Timestamp 604 can represent a time value that module 101 sends message 208 or a time value that module 101 acquired sensor data 305. Sensor data 305 is described with the description of a sensor 101*f* in FIG. 1*c*, and sensor data 305 can represent data module 101 acquires using sensor 101*f*. Sensor data 305 within message 208 may be stored by server 105 in a module database 105*k*, or potentially forwarded to another server such as, but not limited to, a module provider 109 for additional processing. Sensor data 305 can comprise a wide range of values for a sensor 101*f* besides the exemplary value of a temperature reading shown in FIG. 6, including raw sensor data, compressed sensor data, and processed or averaged data. The specific sensor data 305 shown in FIG.

6 is illustrated to be exemplary and not limiting for sending and receiving sensor data. Sensor data 305 may also be referred to as a sensor measurement 305.

FIG. 6 also illustrates exemplary details within response 209 sent by server 105. Response 209 may comprise a TCP/UDP packet 601b sent from server 105 IP:port 207 the IP address 210 and port number 605, where IP address 210 represents the external IP address of wireless network firewall 104, if present, and port number 605 is the source port in message 208 as received by server 105 (i.e. the source port in message 208 after traversing the firewall 104 illustrated in FIG. 6a). Thus, IP:port with IP address 210 and port number 605 in response 209 may be different than IP:port 204 in message 208, since the presence of a wireless network firewall 104 may perform NAT routing, which could change the source IP address and source port number from IP:port 204 to IP address 210 and port number 605 in message 208, as received by server 105. The use of wireless network firewall 104 in wireless network 102 may require that response 209 be sent from IP:port 207 to IP address 210 and port number 605 in order to be properly processed by firewall 104 and forwarded to module 101 at IP:port 204. Source IP:port 207 and destination IP address 210 and port number 605 in response 209 may be included within a header in TCP/UDP packet 601b, as illustrated in FIG. 6. TCP/UDP packet 601b could comprise a regular UDP packet, a UDP Lite packet, or a TCP datagram, or similar protocols supported by an IP Network 107. TCP/UDP packets 601a and 601b may utilize the same protocol.

As noted previously, the use of checksums may be mandatory in IPv6 networks, and thus a response 209 comprising a packet 601b can include a checksum value 603 (illustrated in message 208 but not response 209) for the header. The use of firewalls such as firewall 104 can change the header values in a packet 601b. In accordance with a preferred exemplary embodiment, a first checksum value 603 within a response 209 sent by server 105 can be different and/or not equal to a second checksum value 603 within the response 209 received by module 101. Likewise, in an exemplary embodiment, a first checksum value 603 within a message 208 sent by a module 101 can be different and/or not equal to a second checksum value 603 within the message 208 received by server 105, potentially due to the presence of a firewall 104 or other router that performs network address translation, where the destination IP address within a response 209 sent by a server 105 is different than the IP address 204 of a module 101.

A UDP, TCP, or UDP Lite datagram as a TCP/UDP packet 601b within response 209 may include a body 606. Body 606 may comprise the payload or data within a UDP, TCP, or UDP Lite packet. Body 606 can include a server identity 206, a server digital signature 506 (not shown in FIG. 6), server encrypted data 504, and channel coding 406. Server identity 206 is illustrated in FIG. 6 as external to server encrypted data 504 within body 606, but server identity 206 may optionally be included in server encrypted data 504 instead. Module 101 may communicate with a plurality of servers 105, and server identity 206 as external to server encrypted data 504 can allow module 101 to select the appropriate symmetric key 127 to utilize for decrypting server encrypted data 504 (since each of the multiple servers 105 that module 101 communicates with may utilize a different symmetric key 127).

Also note that the server identity 206 can be similar to module identity 110, such that multiple different values for server identity 206 could be utilized in different systems illustrated herein, but each of the different values could preferably be uniquely associated with a server 105. As one example, server identity 206, outside server encrypted data 504 as illustrated in FIG. 6, may comprise a session identity or session identifier, as opposed to a different server identity 206 that could comprise a hardware serial number or domain name for server 105. Thus, server identity 206 outside a server encrypted data 504 may be a different string or representation than server identity 206 within server encrypted data 504, but both strings/numbers used for server identity 206 in response 209 could be associated with server 105. In an exemplary embodiment, a set of servers 105n can collectively use a server identity 206.

Although not illustrated in FIG. 6, a server digital signature 506 in body 606 can comprise a secure hash signature of a subset of body 606, where the subset of body 606 can comprise server encrypted data 504, and/or server identity 206 as illustrated in FIG. 6. The use of a server digital signature 506 in a body 606 is illustrated in FIG. 6 of U.S. patent application Ser. No. 14/039,401, filed Sep. 27, 2013 in the name of John Nix, which is hereby incorporated by reference in its entirety. In this manner, module 101 can utilize server digital signature 506 to authenticate that response 209 was sent by server 105. Channel coding 406 in body 606 is also depicted and described in connection with FIG. 5 above. The server digital signature 506 may optionally be omitted as well.

Body 606 may include server encrypted data 504. Server encrypted data 504 is depicted and described in connection with FIG. 5a above. Server encrypted data 504 may include an acknowledgement 501, wherein acknowledgement 501 can notify module 101 that message 208 has been received by server 105. As illustrated in FIG. 6, server encrypted data 504 may optionally also include a module instruction 502 for module 101. The module instruction 502 could be a string that contains instructions or configuration parameters for module 101, such as an order to change state, parameters regarding the monitoring of monitored unit 119, server names or addresses, radio frequency parameters, timer values, settings for actuator 101y, etc. A module instruction 502 is depicted and described in connection with FIG. 5a above. The exemplary module instruction 502 illustrated in FIG. 6 comprises a "key generation" 608 instruction for module 101 derive a new set of keys, also depicted and described in connection with FIG. 5b above at a step 515 or step 316.

In an embodiment where module 101 uses an eUICC 163, server encrypted data 504 could include a received eUICC profile 311. An example of a server 105 sending a server encrypted data 504 with a received eUICC profile 311 is depicted and described in connection with step 519 of FIG. 5b. In an exemplary embodiment, the server 105 sending the received eUICC profile 311 can be different than a server 105 receiving sensor data 305. In these embodiments where the server 105 sending the received eUICC profile 311 is different than the server 105 receiving sensor data 305, module 101 can send the server 105 (possibly associated with or operated by an eUICC subscription manager 164) a message 208 before receiving the response 209 with the server encrypted data 504 containing the received eUICC profile 311. The message 208 to the server 105 operated by an eUICC subscription manager 164 could include a module digital signature 405 processed by a module 101 using the derived module private key 112 in a module PKI key pair 315. In this manner, the server 105 associated with the eUICC subscription manager 164 can verify the message 208 is sent by the correct and/or authenticated module 101 before sending the received eUICC profile 311 in a response 209. Note that a received eUICC profile 311 may be encrypted with a either (i) a symmetric ciphering algorithm 141*b* or an asymmetric ciphering algorithm 141*a* before encapsulation in a message 208, and in this case the server encrypted data 504 for receiving the received eUICC profile 311 may optionally be omitted. In other words, the received eUICC profile 311 may not need additional encryption by a server 105 for transmission since the received eUICC profile 311 may already be encrypted.

Other possibilities for a module instruction 502 within a response 209 are possible as well without departing from the scope of the present invention. Although not depicted in FIG. 6 or FIG. 2, if response 209 includes a module instruction 502, according to an exemplary embodiment, module 101 can preferably send a second message 208 to server 105, where the second message 208 includes a confirmation that module instruction 502 was successfully executed or implemented by module 101. This confirmation could be included in a server instruction 414 for server 105 within a second message 208, and the confirmation could include a timestamp value 604 for when the module instruction 502 was executed. A timestamp value 604 may be useful for tracking time of actions and data collected, when a module 101 may only periodically have access to a network 102 and also may periodically be dormant or sleep.

Also, although a server encrypted data 504 may be included within a body 606 in exemplary embodiments, body 606 may optionally omit server encrypted data 504 and include data from server 105 or a set of servers 1010 (illustrated in FIG. 10) that is not encrypted, such as, but not limited to, plaintext. As one example in this case, acknowledgement 501 could be included in body 606 as plaintext. Also, although not illustrated in FIG. 6, server encrypted data 504 could include a symmetric key 127 for module 101 to utilize with symmetric ciphering 141*b* in cryptographic algorithms 141 for processing a module encrypted data 403 in subsequent messages 208 and/or responses 209. Server encrypted data 504 in a response 209 may include a security token 401. Security token 401 may be a random string and may also be generated by either server 105 or module 101. If security token 401 is generated by module 101, then security token 401 may be included in message 208 and also utilized by server 105 in response 209, as illustrated in FIG. 6. Other possibilities exist as well without departing from the scope of the present invention.

FIG. 7

Figure 7:
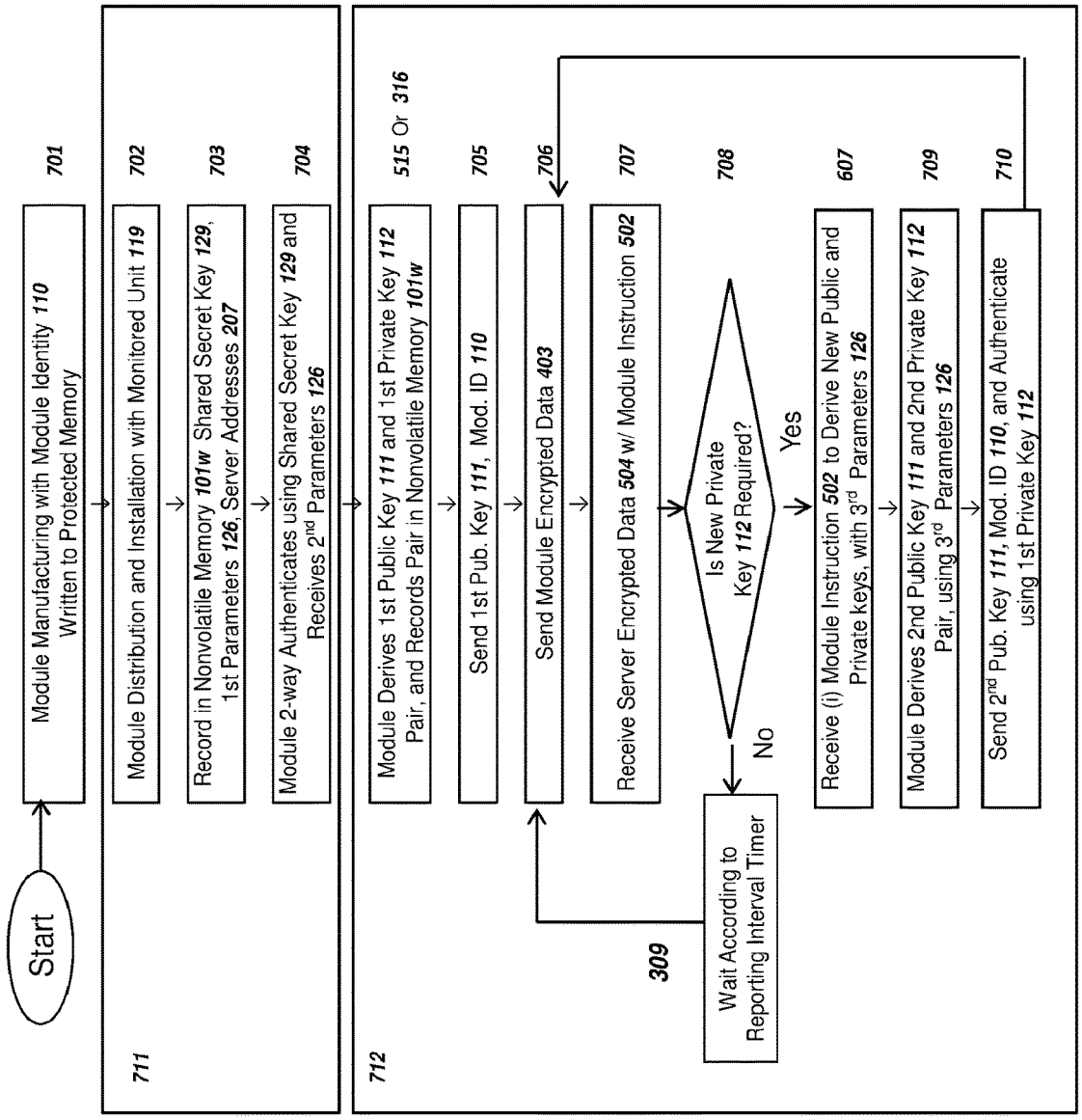
FIG. 7 is a flow chart illustrating exemplary steps for a module to derive a series of public keys and private keys, including sending and authenticating the derived public keys, in accordance with exemplary embodiments.

FIG. 7 is a flow chart illustrating exemplary steps for a module to derive a series of public keys and private keys, including sending and authenticating the derived public keys, in accordance with exemplary embodiments. In order to utilize communications secured with PKI techniques such as private keys, public keys, certificates, and identities, a module 101 may preferably obtain or generate the keys and certificate in a secure manner. Given that a plurality of modules 101 may be deployed in potentially remote places, without frequent contact with end users or technicians, the use of secure PKI techniques for a module 101 can create a significant set of challenges for the generation of module public key 111 and module private key 112, as well as properly and securely obtaining a certificate 122 with an module identity 110. Using conventional technology, significant challenges and costs can be incurred when (i) module 101 has already been deployed, such as collecting data from a monitored unit 119, and (ii) module 101 needs to utilize either (a) a new set of module private key 112 and module public key 111 or (b) a new UICC card. In exemplary embodiments, a module 101 could implement steps within FIG. 7 in order to utilize an eUICC 163 in order to connect with a wireless network 102. The use of an eUICC 163 for connecting with a wireless network 102 is optional, and the steps illustrated in FIG. 7 can be conducted without the use of an eUICC 163.

The proper use of a new set of module private key 112 and module public key 111 may utilize the particular steps and procedures contemplated herein, in order to minimize any potential human intervention (with related costs) while continuing to maintain security. Over a long period of operating time for a module 101, such as a decade or longer, there may be many reasons module 101 may need a new pair of PKI keys, such as (i) expiration of a certificate, or the certificate of a parent signature authority, (ii) the transfer of ownership or control of module 101, where the prior ownership could have direct or indirect access to the module private key 112, (iii) supporting a new server 105 that has different security requirements or a different set of cryptographic parameters 126 (such as, but not limited to longer keys, different ECC curves, etc.), (iv) revocation of a public key in a chain of signatures 123 within a certificate 122, and/or (v) the use of a module PKI key pair 314 within network credentials 314 for activated eUICC profiles 313, where (a) the network credentials 314 are used to access a wireless network 102, and (b) module 101 may prefer to connect with multiple different wireless networks 102 over time using different network credentials 314. In the case of (ii), new ownership of module 101 may require a module 101 to utilize a new module private key 112. In the case of (iii) a new server 105 may require a pair of public/private keys incompatible with a prior set of public/private keys utilized by module 101 and/or a certificate 122 for module 101. For embodiments where module 101 and server 105 derive a new secret shared network key K 129*d*, module 101 may derive a new module private key 112 in order to derive the new secret shared network key K 129*d* for connecting with a different wireless network 102. Other possibilities exist as well for reasons a module 101 may need to derive a new module public key 111 and new module private key 112.

The general approach adopted by most mobile phone networks over the past two decades has been founded upon the use of a pre-shared secret key recorded in SIM cards and UICCs, such as the Ki secret key in 2G/3G networks and shared secret key K in 4G LTE networks. That approach may work for mobile phones, where the SIMs can often be easily replaced, but the use of a pre-shared secret key in a SIM may not be suitable for a module 101 and mobile network operator 108. As one example, significant costs may be incurred by swapping out a SIM card for already deployed modules 101, especially if they are in remote locations or continually moving such as a tracking device on a container or pallet, or a truck or automobile. Next, a module 101 may preferably record multiple pairs of public/private keys 111/112 for various functions, such as connecting to different servers 105, connecting to different wireless networks 102, etc. The number of pairs of public/private keys useful to a module 101 concurrently could be many, such as an exemplary two or more actively used public/private keys. Trying to change or add a new SIM card each time a new security key is required may not be efficient or feasible. FIG. 7 illustrates exemplary steps that can be performed with module 101, including using a module program 101*i*, for generating and/or updating a module public key 111 and module private key 112. The steps illustrated in FIG. 7 include both (i) an "initial" or "startup" case where module 101 has not previously derived keys, and (ii) a subsequent or "follow on" time where module 101 can generate or derive keys after the initial derivation of keys. The steps illustrated for the derivation of new module PKI keys in FIG. 7 can also be used for an eUICC 163.

At step 701, during manufacturing of module 101, including manufacturing of sub-components such as a circuit board or assembly of hardware components illustrated in FIG. 1c, etc., a module identity 110 could be written into the hardware, and could comprise a serial number, International Mobile Equipment Identity (IMEI) number, Ethernet MAC address, etc. For security purposes, a module identity 110 may preferably be written into a read-only location, such as a readable location on a system bus 101d, which could also comprise a ROM 101c. The read-only location could also comprise a protected memory or protected address within module 101. A protected memory could also comprise a memory location within a ROM 101c. Recording and utilizing module identity 110 is also depicted and described in connection with FIG. 1c, FIG. 2, and elsewhere herein. Alternatively, module identity 101 could be recorded in a non-volatile memory such as a flash memory 101w. For embodiments where a module 101 utilizes an eUICC 163 in order to connect with a wireless network 102, the module identity 110 as depicted in FIG. 7 can comprise a network module identity 110b, and the network module identity 110b does not need to be written to a read-only location in module 101, but rather can be written to a nonvolatile memory such as, but not limited to, a flash memory 101w.

At step 702, module 101 can be distributed to end users and also installed with a monitored unit 119. At step 703, parameters 126, and a server address 207 can be recorded in a nonvolatile memory 101w. Parameters 126 may comprise settings or values for a cryptographic algorithms 141 as illustrated in FIG. 1d and FIG. 1i, including (i) key lengths, (ii) algorithms to utilize for key generation or ciphering, such as the specification of an elliptic curve utilized illustrated as parameters 126 in FIG. 1i, (iii) a specific secure hash algorithm 141c to utilize, such as SHA-256 or SHA-3, (iv) an expiration date of the public key 111, and/or (v) a maximum time value for an expiration time 133 associated with symmetric keys 127, etc. The parameters 126 in a step 703 could comprise either a first set of cryptographic parameters 126 or a first subset of cryptographic parameters 126a. Although not illustrated in FIG. 7, at step 702 a configuration file could also be loaded into non-volatile memory, where the configuration file includes a plurality of fields specifying the operation of module 101. The parameters 126, and server address 207 could be included in a configuration file.

Continuing at step 703, server name 206 could be utilized in place of or in addition to server address 207, and in this case module 101 can later perform a DNS or DNSSEC lookup using server identity 206 in order to obtain server address 207 for use in a message 208. Server address 207 (or server identity 206) could also be recorded in a ROM 101c at step 703. Step 703 may also be performed concurrently with step 701 or step 702. Note that step 703 may take place multiple times during the lifetime of a module 101, and in this case (a) the first time step 703 is conducted, step 703 could be conducted concurrent with steps 701 or 702, and (b) a subsequent time step 703 is conducted, step 703 could be conducted after the receipt of a response 209, where the response 209 includes a second server address 207, and also potentially a new module identity 110. In other words, although not illustrated in FIG. 7, a module 101 could return to step 703 from later steps upon the equivalent of a "factory reset", or similar command where flash memory 101w and other nonvolatile memory would be cleared. One example could potentially be the transfer of ownership of module 101, or a second example could be the upload of new firmware that is incompatible with a previous configuration file.

Continuing at step 703, shared secret key 129 may comprise a shared secret key 129c or a pre-shared secret key 129a. Given that module 101 may not derive a private key until a step 515 illustrated below in FIG. 7, a derived shared secret key 129b may not be available from a key derivation function 141f at step 702. A shared secret key 129c could be a value depicted and described in connection with FIG. 1f. Shared secret key 129c can be calculated or processed using input of (i) a set of component parameters 101t and (ii) an algorithm token 190 into a shared secret algorithm 141g, where the output of shared secret algorithm 141g can be the shared secret key 129c. In an exemplary embodiment, shared secret key 129c may be calculated and determined by module 101 (i) without any prior communication with server 105 and also (ii) before module 101 receives a server public key 114. Although step 703 in FIG. 7 illustrates module 101 as recording shared secret key 129 in a nonvolatile memory, module 101 could alternatively record shared secret key 129 (in the form of a key 129c or 129a) and algorithm token 190 in a volatile memory such as RAM 101e. For embodiments where the module 101 utilizes an eUICC 163 to connect with a wireless network 102, the recording of shared secret key 129 and related data in a step 703 can comprise recording a received eUICC profile 311. The shared secret key 129 can comprise a shared secret key 510 as depicted and described in connection with FIG. 3b. In another embodiment, the shared secret key 129 in a step 703 could comprise the initial key K 325 recorded in a received eUICC profile 311, also depicted and described in connection with FIG. 3b. The first set of cryptographic parameters 126 and the server address 207 could also be recorded in the eUICC 163 in the form of a received eUICC profile 311.

In an exemplary embodiment, shared secret key 129 could be obtained and loaded by a distributor, installer, or end user into a nonvolatile memory such as flash memory 101w in the form of a pre-shared secret key 129a, where pre-shared secret key 129a was obtained using a module identity 110 and pre-shared secret key code 134 as depicted and described in connection with FIG. 1c above. Module 101 could also utilize a first pre-shared secret key 129a, including a first pre-shared secret key 129a entered by potentially a distributor, installer, or end-user discussed in FIG. 1c, to derive shared secret key 129. Other possibilities exist as well for shared secret key 129, and shared secret key 129 can be useful for either the authentication of module 101 and/or the proper identification of module 101 upon module 101's generation of a private key 112 and public key 111, as described below, including step 705. For embodiments where the module 101 utilizes an eUICC 163 to connect with a wireless network 102, an initial, received eUICC profile 311 could be loaded into a nonvolatile memory by a manufacturer, distributor, installer, or end-user, and the data for a step 703 could be recorded in the initial, received eUICC profile 311. Or, the module 101 could include both a UICC and an eUICC 163, and the module 101 could use the physical UICC to initially connect with a first wireless network 102, and subsequently use a received eUICC profile 311 and the eUICC 163 to connect with a second, subsequent wireless network 102.

In an exemplary embodiment, an initial module private key 112b and initial module public key 111b could be recorded into nonvolatile memory at step 703. For example, a manufacturer, distributor, installer, technician, or end-user could load the initial module private key 112b and initial module public key 111b, where the initial module public key 111b would be utilized to authenticate at step 705 a subsequent set of public/private keys derived by module 101 at step 704. In this case, the initial module public key 111b and/or initial module private key 112b described in the previous two sentences could comprise the shared secret key 129. One reason the initial module private key 112b with the initial module public key 111b could comprise a shared secret key 129 can be, if the initial module public key 111b and initial module private key 112b are present, (i) the initial module private key 112b and initial module public key 111b together have been "shared" in the sense that the initial module private key 112b has been located outside module 101 and in possession of an entity such as the manufacturer, distributor, installer, technician, or end-user in order to load the initial module private key (and initial module public key 111b is shared with server 105), (ii) the initial module private key 112b and initial module public key 111b can be used to authenticate a subsequent message 208 containing a public key internally derived by the module at step 704 below, and (iii) the initial module private key 112b would remain "secret" and not publicly shared. Thus, FIG. 7 contemplates an embodiment where shared secret key 129 at step 703 comprises an initial public/private key pair that is not internally derived by module 101.

Note that the contemplation of the use of shared secret key 129 as a pre-shared secret key 129a within the present invention may be different than the use of a pre-shared secret key within a SIM card. Specifically, as depicted and described in connection with FIG. 1c and elsewhere herein, the shared secret key 129, comprising any of (i) a pre-shared secret key 129a, (ii) derived from a pre-shared secret key 129a, or (iii) a shared secret key 129c, may be moved by CPU 101b into a volatile memory such as RAM 101e, with subsequent access by cryptographic algorithms 141. In contrast, the pre-shared secret key within a SIM card or UICC for mobile phones is usually designed to prevent movement of the pre-shared secret key within a SIM or UICC into RANI 101e.

At step 704, module 101 can authenticate with a server 105 using the data from a nonvolatile memory recorded in step 703. In the embodiment where a module 101 uses an eUICC 163 to connect with a wireless network 102, the server 105 could be operated by a mobile network operator 108 and also could be associated with or reside in wireless network 102. In an exemplary embodiment, a module 101 can be distributed or installed between steps 703 and steps 704. In order to perform 2-way authentication at a step 704, module 101 can read module identity 110 using a read-only address or a protected address. Module 101 can read module identity 110 directly from read-only hardware address by using system bus 101d, including from a ROM 101c, or module 101 can read module identity 110 from a nonvolatile memory such as a flash memory 101w. Thus, the read-only address or protected address could comprise an address accessible on system bus 101d that is designated read-only for a period of time.

As contemplated herein, a protected address can comprise an address or a memory location that can be read-only (i) for a period of time and/or (ii) upon an elevated set of privileges not normally used in the operation of a module 101. The module identity 110 used in a step 704 for authentication could be recorded into a flash memory 101w by module 110 after a prior read of module identity 110 from a read-only address or a protected address. In this case (module 101 taking the step described in the previous sentence), reading module identity 110 from the nonvolatile memory at step 704 can also comprise module 101 reading module identity 110 using a read-only address or a protected address. Thus, although module 101 may read module identity 110 from a flash memory 101w, if (a) module 101 initially utilized a read-only address to record the module identity 110 into the flash memory 101w, then (b) reading module identity 110 from the flash memory 101w would comprise using a read-only address to read module identity 110. Other possibilities exist as well, such as the address that includes module identity 110 in either (i) a nonvolatile memory such as a ROM 101c or (ii) an address accessible on system bus 101d, could be designated for a period of time as available for a read-only or protected operations.

Note that using a module identity 110 from a read-only address or a protected address within module 101 can be important for the use of an eUICC 163. The module identity 110, possibly in the form of a hardware serial number or IMEI, can serve as the basis for an identifier or identity of module 101 with an eUICC subscription manager 164, since a network module identity 110b can change for the same module 101 over time as different received eUICC profiles 311 can be activated with different network module identities 110b. In other words, a module 101 can use the module identity 110 in order to receive a received eUICC profile 311 from an eUICC subscription manager 164 instead of, or in addition to, a network module identity 110b from the eUICC subscription manager 164 since a network module identity 110b can change for a module 101 over time when using an eUICC 163.

Continuing at step 704, module 101 can take steps to conduct a 2-way authentication with server 105. In order for module 101 to authenticate with server 105, module 101 can send a message 208 with a module identity 110 to the server address 207, which could belong to a server 105. In an exemplary embodiment, module identity 110 at a step 704, or any step where module 101 authenticates or verifies identity with a server 105, can comprise the form of an encrypted module identity 110a using a secret ciphering algorithm 141h as depicted and described in connection with FIG. 1g. In this case, the message 208 with an encrypted module identity 110a would also preferably include the algorithm token 190 used by module 101 to derive the encrypted module identity 110. The server could extract the plaintext module identity 110 using a secret ciphering algorithm deciphering 162. Alternatively, the module identity 110 could be sent as plaintext in a step 704. In order to authenticate module 101 with module identity 110 at step 704, server 105 can utilize the shared secret key 129 to authenticate module 101 at step 704, such that after authentication, the contents of message 208 or additional messages 208 from module 101 can be further processed.

For embodiments where the module 101 utilizes an eUICC 163 to connect with a wireless network 102, the 2-way authentication using shared secret key 129 at a step 704 could comprise module 101 conducting a 2-way authentication with a server 105 associated with a subscription manager 164. The shared secret key 129 and related data in a step 704 could be read from a received eUICC profile 311. The shared secret key 129 can comprise a shared secret key 510 within a received eUICC profile 311. For embodiments where the module 101 utilizes an eUICC 163 to connect with a wireless network 102, the 2-way authentication could be conducted with an initial key K 325 in a step 704 using the standard 2-way authentication for an LTE and related networks where the wireless network 102 sends a RAND and AUTN, and module 101 sends a RES. In this case, the shared secret key 129 could comprise the initial key K 325.

Continuing at step 704, server 105 can authenticate module 101 using the module identity 110 in message 208 and a message digest, such as described in IETF RFC 2617, titled "HTTP Authentication: Basic and Digest Access Authentication". Other reasonably secure authentications techniques using a shared secret key 129 could be utilized without departing from the scope of the present invention. In order to authenticate, module 101 could take steps to demonstrate to server 105 that module 101 holds the same shared secret key 129. Module 101 can properly respond to a challenge/nonce in a message digest authentication by sending a secure hash value calculated using (i) the challenge/nonce and (ii) the shared secret key 129. Or, module 101 could authenticate by generating a module digital signature 405 in message 208 using the shared secret key 129. In addition, module 101 could utilize the shared secret key 129 as a symmetric key 127 to encrypt a module encrypted data 403 with symmetric ciphering 141b, and if server 105 could properly decrypt the module encrypted data 403 using the same shared secret key 129 on the server, then server 105 would know the correct module 101 sent the message 208 and thereby would be authenticated. Other possibilities exist as well for a module 101 to authenticate with a server 105 using a shared secret key 129, or a shared secret key 510 or an initial key K 325 in the case where module 101 uses an eUICC 163 to connect with a wireless network 102, without departing from the scope of the present invention.

Continuing at step 704, module 101 can also preferably authenticate server 105 in order to complete a 2-way authentication. Module 101 can take steps to ensure or verify that server 105 with reasonable assurance also holds the shared secret key 129, or a shared secret key 510 or an initial key K 325 in the case where module 101 uses an eUICC 163 to connect with a wireless network 102. Module 101 could authenticate server 105 using message digest, such that module 101 issues a challenge/nonce, and verifying that server 105 properly responds to the challenge/nonce with a correct secure hash value, such as the output from a secure hash algorithms 141c. Or, server 105 could authenticate with module 101 by the module receiving a server digital signature 506 in a response 209 using the shared secret key 129. In addition, module 101 could utilize the shared secret key 129 as a symmetric key 127 to decrypt a received server encrypted data 504 with symmetric ciphering 141b, and if module 101 could properly decrypt the server encrypted data 504 using the shared secret key 129, then module 101 would know the correct server 105 sent the response 208 and thereby the server 105 would be authenticated. Other possibilities exist as well for a server 105 to authenticate with a module 101 using a shared secret key 129 without departing from the scope of the present invention.

Continuing at step 704, module 101 can receive a set of cryptographic parameters 126, preferably after module 101 completes authentication with server 105 (in order for server 105 to not send the set of cryptographic parameters 126 to $3^{rd}$ parties). A set of cryptographic parameters 126 received in a step 704 can also comprise a second set of cryptographic parameters 126, where the second set of cryptographic parameters 126 could be different or the same as the first set of cryptographic parameters 126 from a step 703. The second set of cryptographic parameters 126 at a step 704 can comprise a subset of cryptographic parameters 126a as depicted and described in connection with FIG. 1i. Module 101 could send the set of cryptographic parameters 126 recorded in step 703 to the server 105, and the server 105 could respond with a subset of cryptographic parameters 126a. In another embodiment, server 105 could send module 101 the second set of cryptographic parameters 126 at step 704, and module 101 could send a subset of the cryptographic parameters 126a to the server. In embodiments where module 101 uses an eUICC 163, receiving the second set of cryptographic parameters 126 at a step 704 could comprise receiving a received eUICC profile 311 that includes the second set of cryptographic parameters 126.

At the conclusion of step 704 the module 101 and server 105 can preferably agree on a set of cryptographic parameters 126 for use with cryptographic algorithms 141 for further communication. Note that a module 101 and a server 105 can communicate a set of cryptographic parameters 126 by using a set of cryptographic parameters token 126c, such that a packet transmitted could contain the token 126c as an identifier for a set of cryptographic parameters 126. For example, a module 101 could send or receive the token 126c with an exemplary value of "Set A" illustrated in FIG. 1i, instead of sending or receiving the complete set of cryptographic parameters 126. In an exemplary embodiment, the transmission of cryptographic parameters 126 or a token 126c at a step 704 comprises encrypting the cryptographic parameters with shared secret key 129 as a symmetric ciphering key 127 in a symmetric ciphering algorithm 141b. Note that receiving a second set of cryptographic parameters 126 could optionally be omitted from a step 704, and in this case the first set of cryptographic parameters 126 or subset of cryptographic parameters 126a from a step 703 could be used by a module 101 in a subsequent step 515 or a step 316 below in FIG. 7. In embodiments where module 101 uses an eUICC 163, the second set of cryptographic parameters in a step 704 could comprise the set of cryptographic parameters 126 within a received eUICC profile 311, and a module 101 could receive the second set of cryptographic parameters 126 using a system bus 101d. In other words, when a module 101 is depicted in FIG. 7 and other Figures herein as receiving data, exemplary embodiments contemplate that a CPU 101b within module 101 receiving the data using a system bus 101d, and thus the received data could also be locally stored or recorded within a module 101.

The module 101 can send cryptographic parameters 126 from step 703 in a module encrypted data 403 and the module 101 can receive cryptographic parameters 126 from the server in a server encrypted data 504. In this manner, module 101 can securely communicate cryptographic parameters 126 without first deriving a module public key 111 and module private key 112. An agreed subset of cryptographic parameters 126a as illustrated in FIG. 1i may be necessary for module 101 to derive a compatible module public key 111 for the server 105. A system 100 and other systems illustrated herein can be flexible for supporting a wide range of modules 101 and servers 105, while remaining reasonably secure, by both (i) encrypting proposed cryptographic parameters 126 using the shared secret key 129 and (ii) agreeing on a subset of cryptographic parameters 126a as illustrated in FIG. 1i.

After step 704, module 101 can then derive a first module public key 111 and a first module private key 112 pair, and record the values in a memory, which could comprise a nonvolatile memory such as flash memory 101w. In this manner, the key pair can be available to module 101 upon recovery from lost power. A module 101 could use (i) a step 515 depicted and described in connection with FIG. 5b or, (ii) a step 316 depicted and described in connection with FIG. 3b and FIG. 5b in order to derive the key pair, and could also use the second set of cryptographic parameters 126 obtained through a step 704 above (which could comprise a subset of cryptographic parameters 126a). In embodiments where a module 101 uses an eUICC 163 to connect with a wireless network 102, a profile activation step 316 can be used in FIG. 7 to populate or record a derived module PKI key pair 315 within an activated MNO network credentials 314 for an activated eUICC profile 313. At step 515, or a step 316 in FIG. 7 for embodiments where a module 101 uses an eUICC profile 313, module 101 can derive module private key 112 and a corresponding module public key 111 using (i) random number generator 128, (ii) the second set of cryptographic parameters 126 or the second subset of cryptographic parameters 126a from a step 704, (iii) cryptographic algorithms 141, and (iv) a key pair generation algorithm 141e. In an embodiment where the set of cryptographic parameters 126 are omitted from a step 704, then (i) in a step 515 in FIG. 7 module 101 could use the first set of cryptographic parameters 126 from step 703, or (ii) in a step 316 in FIG. 7 module 101 could use the set of cryptographic parameters 126 recorded in the activated eUICC profile 313, which could also comprise the same or equivalent set of cryptographic parameters 126 recorded in the received eUICC profile 311. The set of cryptographic parameters 126 recorded in the activated eUICC profile 313 could also comprise a subset of cryptographic parameters 126a as illustrated in FIG. 1i.

Module private key 112 and corresponding module public key 111 can be derived in a step 515 or a step 316 according to a wide range of parameters 126, and can be selected from different algorithms, such as RSA 153 or ECC 154. Key derivation at step 515 could generate keys of different lengths, such as 2048 bits with RSA 153 or 283 bits with ECC 154, and other possibilities exist as well. If using ECC 154 to derive a pair of keys for module 101, a step 515 or a step 316 in FIG. 7 could also accommodate the use of different elliptic curves for compatibility with server 105, such as the use of odd-characteristic curves, Koblitz curves, etc. Additional example elliptic curves utilized in the generation or derivation of a key pair include the curves sect283k1, sect283r1, sect409k1, sect409r1, etc., which are identified as example curves in IETF RFC 5480, titled "Elliptic Curve Cryptography Subject Public Key Information".

The ECC curve for a derived module public key 111 and module private key 112 can be specified in a subset of cryptographic parameters 126a from a step 704. Consequently, the parameters of keys generated by module 101 at a step 515 (including key length or algorithms utilized) may be selected based upon the requirements of the application and can be included in a set of cryptographic parameters 126. When deriving keys at a step 515 or a step 316, in an exemplary embodiment module 101 may also preferably utilize data from sensor 101f, radio 101z, a bus 101d, a physical interface 101a, memory 101e, and/or a clock 160 in order to generate a seed 128b for random number generator 128, or random number generator 128 could utilize these inputs directly. A random number can be input into key pair generation algorithm 141e in order to derive the module public key 111 and module public key 112 (with normally the module private key 112 being derived first with a key pair generation algorithm 141e). Since a module 101 may utilize a plurality of module 101 PKI key pairs during its lifetime, including the possibility of using multiple module private keys 112 concurrently, such as using different module private keys 112 for different purposes, in exemplary embodiments module 101 can also derive a module public key identity 111a for module public key 111 at a step 515 or a step 316 in FIG. 7. At subsequent steps where module 101 sends the module public key 111, the module 101 can also send the module public key identity 111a. In this manner, module 101 and a server 105 can properly track which module public key 111 is being used for any given set of communications with module 101 using PKI.

Upon key derivation at step 515 of FIG. 7, or a profile activation step 316 for embodiments where a module 101 uses an eUICC to connect with a wireless network 102, module private key 112 and module public key 111 can be recorded in a nonvolatile memory 101w. In an exemplary embodiment, module private key 112 is preferably not transmitted or sent outside module 101. Note that module 101's internal derivation, or processing or creation, of module private key 112 and corresponding module public key 111 can have many benefits. First, module private key 112 does not need to be recorded in any other location than within module 101, and thus may also be considered not shared. Recording module private key 112 only within module 101 avoids potential security risks of (i) storing or recording module private key 112 in other locations, such as with module provider 109, mobile network operator 108, or an installer or end user of module 101, and (ii) transferring module private key 112 from these other locations. A primary security risk from storage of module private key 112 outside module 101 is that unauthorized 3rd parties may gain access to the module private key 112.

For embodiments where a module 101 uses an eUICC 163 to connect with a wireless network 102, the derivation of a module PKI key pair in a step 316 can benefit a mobile network operator, since a module private key 112, which can serve as the foundation for subsequent communications with a wireless network 102, does not depend on the transmission of a module private key 112 through $3^{rd}$ parties. In exemplary embodiments where a module 101 uses an eUICC 163 to connect with a wireless network 102, module private key 112 can be derived at other times besides during a profile activation 316 step, but the result of obtaining an activated eUICC profile 313 can include steps associated with a profile activation step 316 such that an activated MNO network credentials 314 includes a module PKI key pair 315 that has been derived by a module 101.

Also note that over a potential lifetime of a decade or more of operation of module 101, each time a new module private key 112 may be required (for various potential reasons outlined above, including the use of new activated eUICC profiles 313 in embodiments where a module 101 uses an eUICC 163 to connect with a wireless network 102), the external recording and/or transferring of module private key 112 incurs a potential security risk. Security risks can be compounded if the external location records private keys 112 for a plurality of modules 101. Also, by internally generating private key 112 at a step 515 or a step 316, module 101 can overcome significant limitations and costs requiring the distribution of a pre-shared secret key Ki or K in the form of a SIM card or similar physical distribution of a pre-shared secret key.

At step 705, module 101 can send the module public key 111, and the module public key 111 could be sent to a server 105 in a message 208 that includes a module identity 110. In embodiments where a module 101 uses an eUICC 163 to connect with a wireless network 102, a module 101 can send the module public key 111 to a server 105 associated with the wireless network 102 in a step 705. The module 101 can also send the module public key identity 111a with the module public key 111 in a step 705. In an embodiment, the module 101 can send the module public key 111 to a server different than server 105 used in a step 704, and the different server could be a server associated with a certificate authority 118 an mobile network operator 108, or a subscription manager 164 if an eUICC 163 is used by module 101 to connect with a wireless network 102. The module identity 110 could be in the form of an encrypted module identity 110a, or a network module identity 110b in embodiments where a module 101 uses an eUICC 163. The module public key 111 could be sent either as plaintext or within a module encrypted data 403, where the shared secret key 129, or shared secret key 510 in embodiments where module 101 uses an eUICC 163, could be used as a symmetric key 127 with a symmetric ciphering algorithm 141b. By sending the module public key 111 in a module encrypted data 403, a system 100 and other systems contemplated herein may be kept more secure, since other nodes besides server 105 would not be able to (i) read the module public key 111 or (ii) use the module public key 111 for sending module 101 unauthorized or fraudulent server encrypted data 504 with an asymmetric ciphering algorithm 141a and the module public key 111.

Although not illustrated in FIG. 7, at step 705 server 105 could authenticate message 208 at step 705 that includes the module public key 111 in order to ensure that module public key 111 is properly associated with module identity 110 and that module public key 111 is not fraudulently submitted by another node or module 101 attempting to send the data. In an exemplary embodiment, at step 705 module 101 could use the steps for authentication of the message 208 containing module public key 111 using the authentication from a step 704. In an exemplary embodiment, module 101 could perform steps to authenticate with a server depicted and described in connection with step 1202 of FIG. 12 in U.S. patent application Ser. No. 14/064,618, filed Oct. 28, 2013 in the name of John Nix. Or, if module 101 sends module public key 111 in a step 705 at a sufficiently short period of time after step 704, such as, but not limited to, less than an exemplary minute after step 704, then the previous authentication from step 704 may still be applicable. In this case, the authentication of module 101 at a step 705 could comprise the authentication of module 101 from the prior step 704. Other possibilities exist as well without departing from the scope of the present invention for a module 101 to securely send a derived module public key 111 to a server 105 in a step 705.

At step 706, module, module 101 can begin utilizing the new module public key 111 and module private key 112 derived in a step 515 or a step 316 in FIG. 7, where new public key 111 was sent to a server 105 and authenticated in Step 705. In exemplary embodiments where module 101 uses an eUICC 163, before step 706 module 101 could also take the additional steps depicted and described in connection with FIG. 9b below in order to obtain a secret shared network key K 129d for communication with wireless network 102. In exemplary embodiments where module 101 communicates with a server 105 independently of an eUICC 163 (other than possibly using an eUICC 163 to obtain access to IP Network 107), then the additional steps illustrated in FIG. 9b to obtain a secure key K may be optionally omitted.

At a step 706, module 101 could begin following normal operations of a data reporting steps 101x illustrated in FIG. 3. At step 706, module 101 can send a module encrypted data 403, where the module encrypted data 403 could include either (i) a symmetric key 127 ciphered with an asymmetric ciphering algorithm 141a and the server public key 114, or (ii) a server instruction 414 that could include a sensor measurement 305 or other data. If module encrypted data 403 at step 706 includes a server instruction 414, such as, but not limited to, an exemplary server instruction 414 depicted and described in connection with FIG. 6, then module 101 could send or receive a symmetric key 127 before step 706 and cipher data in the module encrypted data using the symmetric key 127. Although not illustrated at step 706, module 101 can also send a module identity 110, an encrypted module identity 110a, or a network module identity 110b at a step 706. If module encrypted data 403 at step 706 includes data encrypted with an asymmetric ciphering algorithm 141a, the module 101 may also send a module digital signature 405 at a step 706.

At step 707, module 101 can receive a response 209, where the response 209 includes server encrypted data 504, and the server encrypted data 504 can include a module instruction 502. In this step 707 a server 105 can utilize the new module public key 111, resulting from the key generation by module 101 in a step 515 above in FIG. 7, to encrypt server encrypted data 504 in one of two ways. First, server 105 can encrypt server encrypted data 504 using an asymmetric ciphering algorithm 141a by ciphering with the new module public key 111. Second, server 105 can encrypt server encrypted data 504 using a symmetric ciphering algorithm 141b by utilizing a key derivation function 141f including steps for ECDH 159 and (i) the new module public key 111 and (ii) the server public key 114 in order to derive a commonly shared symmetric key 127, which could comprise a derived shared secret key 129b. In this second instance, module 101 can decrypt server encrypted data 504 in step 707 using a symmetric ciphering algorithm 141b and the commonly shared symmetric key 127 comprising a derived shared secret key 129b. Module instruction 502 at a step 707 could comprise an "acknowledgement" that a message 208 sent in a step 706 was properly received. Other possibilities exist as well for a module 101 to receive and process a server encrypted data 504 with a module instruction 502 in a step 707.

At step 708, module 101 or server 105 can determine or evaluate if a new module private key 112 and module public key 111 are required for continued operation. Another node associated with mobile network operator 108 besides server 105 could also determine if the use of new PKI keys are desirable in a step 708. Exemplary reasons for the generation of new keys by a module 101 were described at the beginning to this FIG. 7. One reason could be the expiration of a certificate 122 for module 101, or equivalently the expiration of a time-to-live value for a module public key 111 if module public key 111 is not recorded in the form of a certificate 122. A second exemplary reason could be that module 101 may wish to connect with a new wireless network 102 that requires the use of PKI techniques for authentication, but also a different set of cryptographic parameters 126 or algorithms in order for module 101 to communicate through a new wireless network 102. In an exemplary embodiment, a set of cryptographic parameters 126 for a server 105 may change or be different than with a previous server 105, such as, but not limited to, (i) using a different elliptic curve or a different set of asymmetric ciphering algorithms 141a, or (ii) requiring longer key lengths. Module 101 may need to derive at a step 708 a new set of a compatible module public key 111 with a corresponding module private key 112. A third exemplary reason could be that module 101 prefers to use a different received eUICC profile 311 in order to connect with a different wireless network 102 than the wireless network 102 utilized for communication in a step 705 or step 706.

Other examples for reasons that a module 101 may need new public/private keys after installation with a monitored unit 119 exist as well, and any could be a reason for module 101 to determine to utilize new public/private keys. If module 101 and/or a server 105 determine that new keys are not required at step 708, module 101 can then proceed to a step 309 and wait for a specified interval before taking further action. As illustrated in FIG. 7, the further action could comprise returning to a step 706 and the module could continue to periodically report data regarding a monitored unit 119 in the form of periodically sending a message 208 to server 105, and the message 208 could contain a sensor data 305, or other data for the remote monitoring and/or control of a monitored unit 119. In an exemplary embodiment, the determination at a step 708 could be made at other times as well, such as before a step 707 or a step 706.

Either a module 101 or a server 105 could determine if the use of new module 101 PKI keys are preferred or desirable in a step 708. As contemplated herein, the term "PKI keys" can refer to a pair of keys comprising a module public key 111 and a module private key 112. In the embodiment where a server 105 or another node associated with mobile network operator 108 determines or evaluates that the use of new module 101 PKI keys are preferred or required in a step 708, then at a step 607 a server 105 could send a signal to module 101 to derive new PKI keys. An exemplary signal for module 101 to derive new PKI keys in a step 607 could be in the form of an exemplary response 209 illustrated in FIG. 6, where the response 209 includes a module instruction 502 of "derive new PKI key pair". If a module 101 determines on its own (i.e. without receiving a signal from a server 105 for deriving new keys), then step 607 may be omitted, and otherwise a step 607 can otherwise be useful or required in order to signal that a module 101 should derive new PKI keys. In an exemplary embodiment, a step 607 may require sending the module instruction 502 of "derive new PKI key pair" within a response 209, where module 101 may previously have sent a message 208. The reason can be that a module 101 may operate behind a firewall 104 or periodically sleep, and in this case a server 105 may not be able to send a module 101 the module instruction 502 at arbitrary times, but must wait until after module 101 first sends a message 208 before sending the module instruction 502 of "derive new PKI key pair" in a response 209.

A step 607 can also comprise a module 101 receiving a third set of cryptographic parameters 126 or a subset of cryptographic parameters 126a. A third set of cryptographic parameters 126 or a subset of cryptographic parameters 126a can also be optionally omitted from a step 607 and in this embodiment a prior set of cryptographic parameters 126 or a subset of cryptographic parameters 126a, such as the parameters 126 (i) received by a module 101 in a step 704 above, or (ii) initially recorded in a step 703 could apply. In a step 607 a module 101 can send a set of cryptographic parameters 126 and receive a third subset of cryptographic parameters 126a. Or, a module can receive a third set of cryptographic parameters 126 and send a subset of cryptographic parameters 126a. The subset of cryptographic parameters 126a could comprise a (i) single value such as specifying a named curve within an ECC standard curve 138, a modulus to use with an RSA algorithm 153, or a time value for a new module public key 112, or (ii) multiple values such as two or more selected from an exemplary subset of cryptographic parameters 126a illustrated in FIG. 1i. Note that in a step 607 the module instruction 502 of "derive new PKI key pair" or a similar signal could be received by a module 101 in a separate packet than either a set of cryptographic parameters 126 or a subset of cryptographic parameters 126a.

In addition, in a step 607 the module instruction 502 of "derive new PKI key pair" or a similar signal could be received by a module 101 either as plaintext in a packet or within a server encrypted data 504. Further, in a step 607 the third set of cryptographic parameters 126 or the subset of cryptographic parameters 126a could be received by a module 101 either as plaintext in a packet or within a server encrypted data 504. As illustrated in FIG. 7, the set of cryptographic parameters 126 or the subset of cryptographic parameters 126a could comprise a $3^{rd}$ set of cryptographic parameters 126, and the $3^{rd}$ set of cryptographic parameters 126 may be the same or different than a $2^{nd}$ set of cryptographic parameters 126 received in a step 704. In an exemplary embodiment, a step 607 comprises receiving the third set of cryptographic parameters 126 and a module instruction 502 in the form of a received eUICC profile 311 for an eUICC 163. The data received by module 101 at a step 607 in FIG. 7 could include a second received eUICC profile 311, for embodiments where a module 101 uses an eUICC 163 to connect with a wireless network 102, where the second received eUICC profile 311 can be different than a first eUICC profile 311 used in a step 316 in FIG. 7.

At step 709 the module 101 can use the third set of cryptographic parameters 126 received in a step 607 to derive a second module private key 112 and a second module public key 111. Module 101 could use a step 515 or a step 316 in order to derive the second module private key 112 and second module public key 111 at a step 709. In embodiments where a module 101 uses an eUICC 163 to connect with a wireless network 102, a step 709 could comprise module 101 deriving a second module PKI key pair 315 for use in a second activated MNO network credentials 314 (different from the first set of activated MNO network credentials 314 from a step 316 above in FIG. 7), and the third set of cryptographic parameters 126 in a step 709 could comprise the set of cryptographic parameters 126 received in the received eUICC profile 311 from a step 607 above. In other embodiments, the use of an eUICC 163 by module 101 is not required in a step 709, and a step 709 to derive new module PKI keys can be independent of the presence or use of an eUICC 163. In other words, a module 101 and a server 105 can use some embodiments of the present invention illustrated in FIG. 7 and other Figures herein independently of the presence of an eUICC 163 and related profiles, while other embodiments may use an eUICC 163 and related profiles.

At step 709, module 101 can derive the second module private key 112 and a corresponding second module public key 111 using (i) random number generator 128, (ii) the third set of cryptographic parameters 126 or the third subset of cryptographic parameters 126a from a step 607, (iii) cryptographic algorithms 141, and (iv) a key pair generation algorithm 141e. In an embodiment where the second set of cryptographic parameters 126 are omitted from a step 607, then in a step 709 module 101 could use either (i) the first set of cryptographic parameters 126 from step 703 or (ii) the second set of cryptographic parameters 126 or 126a from a step 704. In a step 709 a module 101 can also derive and a assign a module public key identity 111a to be associated with the second module public key 111, where the module public key identity 111a can be used to identify and select the second module public key 111 from a first module public key 111 potentially from a step 515 above. In other words, a second module public key 111 can be associated with a second module public key identity 111a and a first module public key identity can be associated with a first module public key identity 111.

According to the set of cryptographic parameters 126 or 126a used in a step 709, in an exemplary embodiment the module PKI keys derived in a step 709 can be associated with a different asymmetric ciphering algorithm 141a than the module PKI keys derived in a step 515 or a step 316 in FIG. 7. For example, the first module PKI keys in a step 515 or step 316 in FIG. 7 could utilize a first ECC standard curve 138, while the second module PKI keys in a step 709 could use a second ECC standard curve 138. Or, the first module PKI keys in a step 515 or a step 316 in FIG. 7 could utilize an RSA algorithm 153, while the second module PKI keys in a step 709 could use an ECC algorithm 154. In another embodiment at step 709, the first module PKI keys in a step 515 or step 316 in FIG. 7 could utilize an RSA algorithm 153 with a shorter key length, such as, but not limited to, an exemplary 1024 bits, while the second module PKI keys in a step 709 could use an RSA algorithm 153 with a longer key length such as, but not limited to, an exemplary 2048 bits. Further, the first module PKI keys in a step 515 or step 316 in FIG. 7 and the second module PKI keys in a step 709 could use the same algorithm and key length. Other possibilities for differences or similarities between the first module PKI keys in a step 515 or step 316 and the second module PKI keys in a step 709 are possible as well without departing from the scope of the present invention.

After deriving the second module PKI keys in a step 709, at step 710 the module 101 can send the second module public key 111 with the module identity 110 to a server 105. In embodiments where a module 101 uses an eUICC 163 to connect with a wireless network 102, the module 101 can send the second module public key 111 associated with an activated eUICC profile 313 with the network module identity 110b to a server 105 associated with (i) wireless network 102 and/or (ii) subscription manager 164. In exemplary embodiments, the second module public key 111 can be sent with the second module public key identity 111a. The module 101 can send the data in a message 208. In an exemplary embodiment the module 101 can send (i) the second module public key 111 and a module identity 110, and (ii) authenticate or verify data sent by module 101 in a step 710 using the first module private key 112 from a step 515 or a step 316 in FIG. 7. The authentication or verification of data sent by module 101 in a step 710 could comprise verifying or authenticating data sent with the second module public key 111, such as verifying or authenticating module identity 110 or a network module identity 110b. Or the authentication or verification of data sent by module 101 in a step 710 could comprise verifying or authenticating the second module public key 111, and other possibilities exist for a module 101 to send the second module public key in an authoritative manner.

In an exemplary embodiment, in a step 710 the module 101 can use the first module private key 112 to verify or authenticate the second module public key 111 sent using at least one of several sub-steps. The sub-steps at a step 710 to verify the second module public key 111 using the first module private key 112 could comprise any of (i) sending the second module public key 111 and a module identity 110 with or in a module encrypted data 403 that uses a symmetric ciphering algorithm 141b, where the symmetric key 127 for encrypting and decrypting the module encrypted data 403 at step 710 could previously be communicated before step 710 using the first module private key 112 (such as, but not limited to, a module 101 receiving the symmetric key 127 from a server 105 in a server encrypted data 504, where the server encrypted data 504 was deciphered with an asymmetric ciphering algorithm 141a and the first module private key 112), (ii) sending the second module public key 111 and module identity 110 with a module digital signature 405 where the module digital signature 405 is calculated or processed by module 101 using the first module private key 112 from a step 515 in FIG. 7, (iii) using a derived shared secret key 129b with a message digest authentication for verifying a sent message 208 with the second module public key 111 at step 710, where the derived shared secret key 129b was processed using a key derivation function 141f and the first module private key 112, and/or (iv) using a derived shared secret key 129b as a symmetric key 127 for encrypting data sent with the second module public key 111, where the derived shared secret key 129b was processed using a key derivation function 141f and the first module private key 112.

Other possibilities exist as well without departing from the scope of the present invention for using the first module private key 112 from a step 515 or a step 316 in order for a module 101 to verify or authenticate data sent with the second module public key 111 at a step 710. As illustrated in FIG. 7, after step 710, the module 101 can return to a step 706 and continue regular operation such as, but not limited to, collecting sensor data 305 and sending the data periodically in a module encrypted data 403. In embodiments where a module 101 uses an eUICC 163, module 101 could send and receive application data with a second wireless network 102 after completing step 710. Upon returning to step 706, the module encrypted data 403 could use the second module PKI keys derived in a step 709. In embodiments where module 101 returns to step 706, depicted values for subsequent steps could increment, such upon returning to step 709 for a second time, then the depicted values for "second module public key" and "3rd parameters" could become "third module public key" and "4$^{th}$ parameters" at the second iteration of step 709, etc.

Benefits of using the first module private key 112 in authentication of the second module public key 111 at a step 710 include a server 105 could use the first module public key 111 received by server 105 in a step 705 in order to authenticate or verify the correct module 101 sends the second module public key 111. In addition, module 101 may communicate with a plurality of servers 105, including servers from different mobile network operators 108 over time. The plurality of servers 105 could share the first module public key 111 such that when a step 710 occurs, module 101 may send the second module public key 111 and module identity 110 to a different server 105 than the server 105 from a step 705 or step 706. In embodiments where a module 101 uses an eUICC 163 in order to connect with a wireless network 102, either (i) different wireless networks 102 or (ii) an eUICC subscription manager 164 could share the first module public key 111 in order to authenticate the second module public key 111 in a step 710 of FIG. 7.

In other words, the substeps described in connection with a step 710 as described in the preceding three paragraphs could be conducted by a server 105 using the first module public key 111 received in a step 705 in order to authenticate the second module public key 111 from a step 709 (and a module 101 could use the first module private key 112 for the authentication of the second module public key 111). By module 101 authenticating or verifying data with the second module public key 111 using the first module private key 112, the different server 105 could access and use the first module public key 111 in authentication or verification steps performed by the different server 105 in order for the server to securely receive the second module public key 111. Security for a server 105 in future steps, such as securely receiving future messages 208 after a step 710 can depend on a server 105 recording the correct second module public key 111 for a module 101, including preventing unauthorized or fraudulent parties from attempting to send the second module public key 111.

In an exemplary embodiment, the module identity 110 in a step 710, and other steps for communication a module identity 110 in FIG. 7, could comprise an encrypted module identity 110a. Module 101 could sent the encrypted module identity 110a with an algorithm token 190, and a server 105 could use a secret ciphering algorithm deciphering 162 in order to convert the encrypted module identity 110a into a plaintext module identity 110. In this manner, the module identity 110 could be securely transmitted across a public network such as the IP Network 107. The second module public key 111 in a step 710 could be sent in a module encrypted data 403, such that third parties may not reasonably be able to read the plaintext second module public key 111. As noted elsewhere herein, any given module public key 111 may not need to be publicly shared and could remain confidential for an mobile network operator 108, and in this manner the security for communications between module 101 and server 105 can be further increased, since a potential attacker could be prevented from having reasonable access to a module public key 111. Further, module 101 could use a plurality of module public keys 111 for different purposes, including different module public keys being associated with different asymmetric ciphering algorithms 141a. A first module public key 111 could be used with a first wireless network 102 (possibly in the form of an activate MNO network credentials 314), a second module public key 111 could be used for verifying module digital signatures 405, and a third module public key 111 could be for a different mobile network operator 108, etc. The use of different module public keys 111 could be specified using a module public key identity 111a. In exemplary embodiments, a first subset of the module public keys 111 may be sent by a module 101 in a module encrypted data 403 and a second subset of the module public keys 111 could be sent by the module 101 as plaintext within a datagram.

As illustrated in FIG. 7, the collection of steps from step 515 through step 710, including loops through a step 309, can collectively comprise individual sub-steps for a step 712 as depicted in FIG. 7. Step 712 can include a plurality of sub-steps including module 101 deriving a first set module PKI keys at a step 515, determining that a new set of module PKI keys are needed in a step 708, receiving a new set of cryptographic parameters 126, and deriving a second set of module PKI keys using the new set of cryptographic parameters 126 in a step 709, and sending the new, second module public key 111 while performing authentication in a step 710, etc. In addition, the collection of steps from step 702 through step 704 can comprise sub-steps for a step 711. A step 712, comprising the collection of sub-steps as depicted and described FIG. 7, may be utilized in FIG. 9a below. A step 711 may be utilized in FIG. 10 below.

FIG. 8

Figure 8:
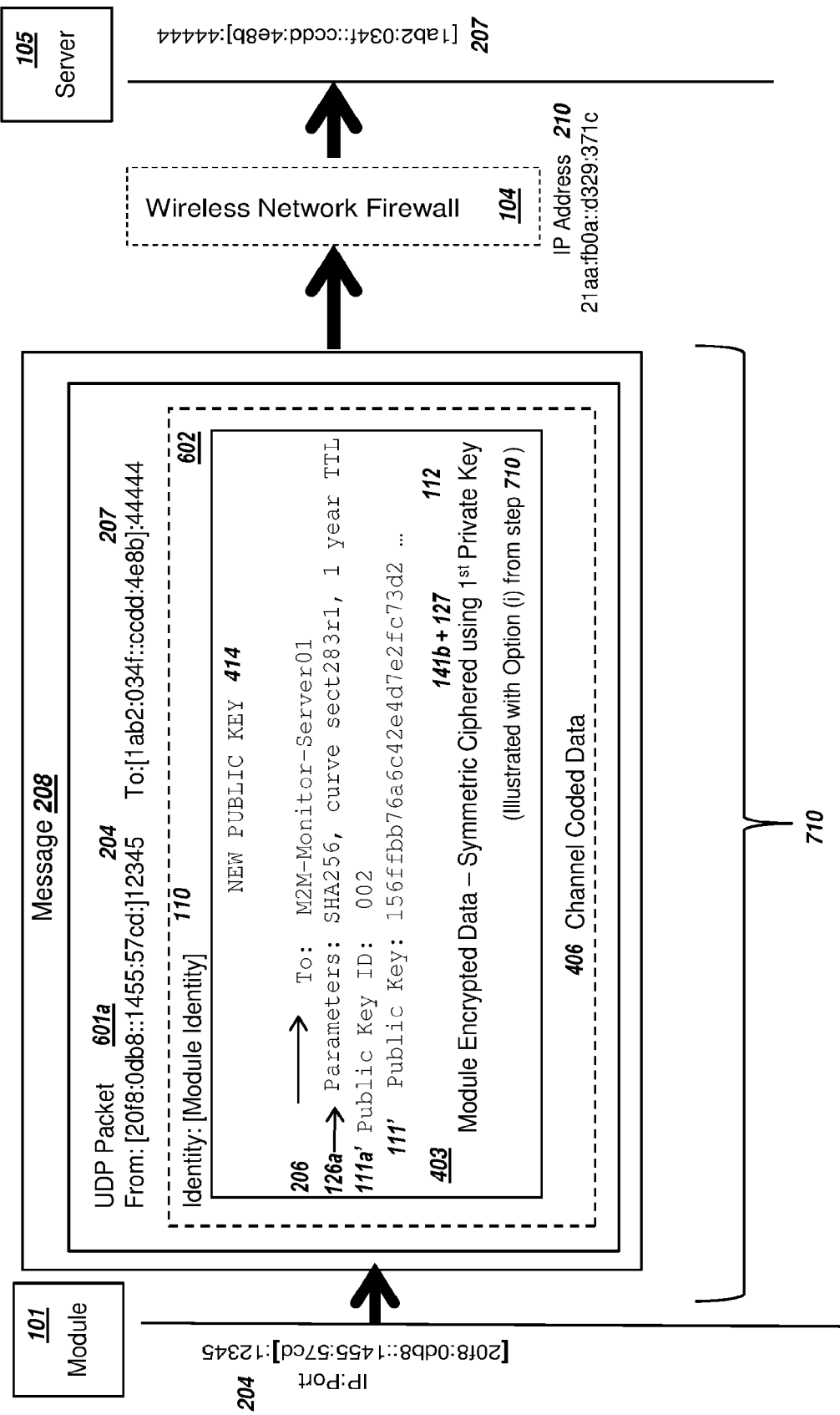
FIG. 8 is a simplified message flow diagram illustrating an exemplary message sent by a module, wherein the message includes a derived module public key, in accordance with exemplary embodiments.

FIG. 8 is a simplified message flow diagram illustrating an exemplary message sent by a module, wherein the message includes a derived module public key, in accordance with exemplary embodiments. As discussed in FIG. 5b, there can be cases where module 101 derives a new module public key 111 and new module private key 112. On example would be the initial creation of the key pairs by module 101, and many other examples could exist as well. FIG. 8 can illustrate an exemplary format and contents of a message 208 for steps 710 of FIG. 7. This exemplary message 208 can also help to illustrate the significant differences from conventional technology and improvements for efficient and secure communications by utilizing embodiments contemplated herein. Since a message 208 illustrated in FIG. 8 could be related to more than one module public key 111, as depicted and described herein the new module public key 111 can be referred to as new module public key 111' and the prior applicable module public key 111 can be referred to as module public key 111. Likewise, a new module public key identity 111a can be referred to as a new module public key identity 111a', and the prior applicable module public key identity 111a can be referred to as module public key identity 111a.

A message 208 illustrated in FIG. 8 using a step 710 from FIG. 7 can include (i) sending new module public key 111', a module public key identity 111a', a module identity 110, a server instruction 414, a security token 401, a subset of cryptographic parameters 126a associated with (i) the new module public key 111' and/(ii) or cryptographic algorithms 141 for using the new module public key 111'. Exemplary cryptographic parameters 126a illustrated in FIG. 8 include (i) a secure hash algorithm 141c to utilize in signatures, which could comprise the SHA 256 algorithm as shown (which may also be known as the SHA-2 algorithm), (ii) a selected elliptic curve for use with ECC algorithms 154 or a modulus to use with RSA algorithms 153, and (iii) a time-to-live value for the new module public key 111', such as, but not limited to, the illustrated "time to live" value of 1 year shown in FIG. 8. The time value for the validity of new module public key 111' could alternatively be specified in a set expiration date. Other values associated with cryptographic algorithms 141 could be included in a set of cryptographic parameters 126 as well, and the illustrated values are intended to be exemplary instead of limiting. In exemplary embodiments, the set of cryptographic parameters 126 in a message 208 could comprise a set of cryptographic parameters 126 depicted and described in connection with FIG. 1i. Or, module 101 could send a set of cryptographic parameters token 126c to identify a set of cryptographic parameters 126 instead of sending the complete list of cryptographic parameters 126. Note that a set of cryptographic parameters 126 or 126a or token 126c could be optionally omitted in the message 208 illustrated in FIG. 8 when a prior message 208 or step had negotiated or established the set of cryptographic parameters 126 or 126a to use with the new module public key 111'.

Additional values or fields within a message 208 associated with communicating a new module public key 111' with a server 105 could include a server instruction 414 of "new public key". This server instruction 414 could inform server 105 to utilize the new module public key 111' within the message 208. Module public key identity 111a' can include a sequence number or identity for the new module public key 111', such that module 101 or server 105 can properly reference and/or record the key from a plurality of module public keys 111 that could be associated with module identity 110. Although module public key identity 111a' is illustrated as a separate field in server instruction 414, module public key identity 111a' could optionally be included in a set of cryptographic parameters 126, such that the value within cryptographic parameters 126 specifies a current sequence number of module public key identity 111a' for the new module public key 111' included in a message 208. In addition, although the module public key identity 111a' illustrated in FIG. 8 could be a sequence number, the module public key identity 111a' could also optionally be globally unique. For example, the module public key identity 111a' could comprise a combination of a unique serial number from a module 101 and then a sequence number. With a globally unique module public key identity 111a, a server 105 reading the module public key identity 111a could determine a module 101 with a module identity 110 associated with any given module public key identity 111a.

Other fields and features within a message 208 as illustrated in a FIG. 8 can be similar or equivalent to the fields presented in FIG. 6. In an exemplary embodiment, the new module public key 111' can be transmitted by a module 101 using at least one of (i) channel coding 406 for a body 602 of message 208 and/or (ii) forward error correction such that message 208 could be transmitted multiple times concurrently in order to increase the probability of receipt by a server 105. In an exemplary embodiment, a message 208 containing the new module public key 111' could be sent by module 101 three times concurrently, and other possibilities exist as well. In an exemplary embodiment, the module identity 110 could be included within an encrypted module identity 110a. Module 101 could use a secret symmetric ciphering algorithm 161 to encrypt the module identity 110. In another embodiment illustrated in FIG. 8, module identity 110 could be sent as plaintext within the message 208 that includes the new module public key 111'.

For a message 208 in FIG. 8 comprising a message for a step 710 in FIG. 7, each of (i) destination IP:port number 207, (ii) parameters 126, and (iii) shared secret key 510 could be updated by server 105 using a module instruction 502 within a server encrypted data 504 before message 208 illustrated in FIG. 8 is transmitted or sent by module 101. After receiving message 208, server 105 can use the module identity 110 illustrated in a body 602 of FIG. 8 to select at least one of (i) a symmetric key 127 associated with module identity 110, where the symmetric key 127 could comprise a session key, and/or (ii) a prior module public key 111 associated with the module identity 110. The symmetric key 127 could be established in steps such as a step 706 or the prior module public key 111 (i.e. not the new module public key 111' in FIG. 8) sent in a step 705. The server 105 can use the selected symmetric key 127 or selected prior module public key 111 to authenticate message 208. As described in step 710 of FIG. 7 and elsewhere herein, a server 105 may preferably authenticate message 208 that includes new module public key 111' in order to confirm that module public key 111 originated from physical module 101 with a hardware module identity 110 (as opposed to being an imposter submitting the new module public key 111'). In one example, successfully decryption the module encrypted data 403 using the symmetric key 127 would authenticate or verify the message 208, since only the valid and correct module 101 could reasonably have access to the symmetric key 127 to encrypt the new module public key 111'. Other possibilities exist as well for a module 101 to authenticate a message 208.

Although not illustrated in FIG. 8, in an exemplary embodiment new module public key 111' could also be sent in a message 208, where the new module public key 111' and parameters 126 (if present) can be included in plaintext format within a datagram 601a. The security of a system 100 and other systems illustrated herein can be further increased by both (i) ciphering new module public key 111' and the set of cryptographic parameters 126, and (ii) only sharing the new module public key 111' in a confidential manner with server 105 and/or a set of servers 1010. If module 101 needed a module public key 111 for other purposes, such as, but not limited to, obtaining a certificate 122, then a second, publicly disclosed module public key 111 could be utilized to authenticate a message 208 from FIG. 8 that is sent as plaintext without symmetric ciphering 141b, where the second module public key 111 is different than and sent before the new module public key 111' that is sent to a server 105 in a module encrypted data 403.

Although not illustrated in FIG. 8, in an exemplary embodiment, new module public key 111' can be authenticated with server 105 using a module digital signature 405. When message 208 illustrated in FIG. 8 comprises a message for a step 710 illustrated in FIG. 7, such that a prior module public key 111 has previously been sent to server 105 such as in a step 705, then message 208 could include a module digital signature 405 using the previous module private key 112 (i.e. not the new module private key 112 associated with the new module public key 111' in the message 208 shown in FIG. 8). In another embodiment, module digital signature 405 could be omitted, and message 208 with new module public key 111' could be authenticated using a message digest algorithm and a shared secret key 129, where the shared secret key could be sent using a step 706 or 707 from FIG. 7. Other possibilities for a module 101 to send a new module public key 111' in a message exist as well without departing from the scope of the present invention.

FIG. 9a

Figure 9A:
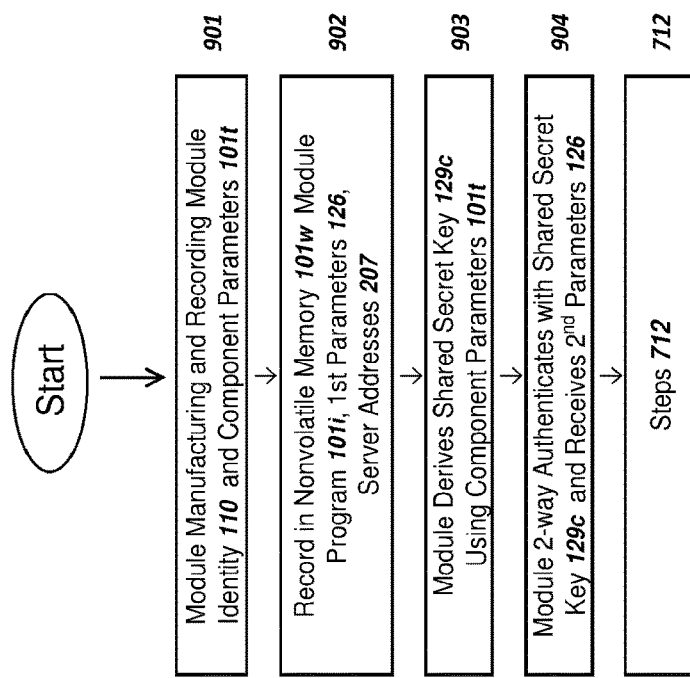
FIG. 9*a* is a flow chart illustrating exemplary steps for a module to use a shared secret key to authenticate with a server, in accordance with exemplary embodiments.

FIG. 9a is a flow chart illustrating exemplary steps for a module to use a shared secret key to authenticate with a server, in accordance with exemplary embodiments. In order to utilize communications secured with PKI techniques such as private keys, public keys, certificates, and identities, a module 101 may preferably obtain or generate these keys and certificate in a secure manner. In exemplary embodiments, the distribution of module 101 may include the possession or control of module 101 passing through entities outside of the control of a module provider 109 and/or a mobile network operator 108. Consequently, module 101 may need a secure method of authenticating with a server 105 after distribution and upon the initiation of operation with a monitored unit 119. Note that securely initiating communications after distribution, potentially through third parties outside the control of module provider 109 and/or mobile network operator 108 can be a challenge with conventional technology since keys such as a pre-shared secret key 129a (such as a traditional key K in a SIM) or private keys not internally derived may need to also pass through the distribution channel in order to initiate secure communication with conventional technology. FIG. 9a illustrates an embodiment of the present invention, where a module 101 can begin secure communication with a server 105 without passing any keying material through a distribution channel. In this manner, (i) a system such as system 100 and other exemplary systems 100 can be made more secure, and (ii) the additional handling costs of passing keying material through a distribution channel, possibly in the form of a secret key in a SIM card or UICC, can be avoided.

At step 901, a manufacturer can complete manufacturing of a module 101, including assembling the hardware, software, and/or firmware components illustrated in FIG. 1b and FIG. 1c. A module identity 110 and component parameters 101t can be recorded in a step 901. The module identity 110 could be recorded in a protected address, such as, but not limited to a ROM 101c or other address on a system bus 101*d*. A protected address is also described in connection with FIG. 7 and elsewhere herein. The component parameters 101*t* could be recorded with each of the exemplary components illustrated in FIG. 1*b*, FIG. 1*c*, and FIG. 1*e*. Exemplary component parameters 101*t* are depicted and described in connection with FIG. 1*e*. The component parameters 101*t* could be read using a system bus 101*d* and recorded into nonvolatile memory such as, but not limited to, flash memory 101*w* in a module 101. Or, the module manufacturer could read or specify the individual component parameters 101*t* before assembly of module 101 and record the collection of component parameters 101*t* into a file. At a step 901 the component parameters 101*t* could be recorded into a file for storage in module 101 and a server 105. In exemplary embodiments, both module 101 and server 105 can record the module identity 110 and component parameters 101*t*.

At step 902, a module program 101*i*, a first set of cryptographic parameters 126, and a server address 207 can be recorded into a nonvolatile memory such as, but not limited to, a flash memory 101*w*. Step 902 can occur at one of several possible points in time between module 101 manufacturing and installation with a monitored unit 119. Step 902 could be performed by the manufacturer during manufacturing. Step 902 could be performed by a distributor during distribution. Step 902 could be performed by a technician or end-user upon installation of module 101 with a monitored unit, and other possibilities exist as well for the time when a step 902 could occur. The server address 207 could comprise a server name 206 instead of an IP address, and module 101 could use the server name 206 at a later step to lookup a server IP address 207 using DNS or DNSSEC. A set of cryptographic parameters 126 are depicted and described in connection with FIG. 1*d* and FIG. 1*i* and elsewhere herein. A module program 101*i* is depicted and described in connection with FIG. 1*b*. Note that many other parameters and values may be loaded into a non-volatile memory 101*t* besides the ones illustrated in step 902 of FIG. 9*a*, including data for connecting with a wireless network 102, and FIG. 9*a* illustrates an exemplary set of steps in order to utilize the efficient and secure systems and methods for communication contemplated herein. As one example, a module 101 could also include a SIM card, a UICC, or an embedded UICC 163 (eUICC), in addition to recording in a module 101 the data illustrated at step 902 of FIG. 9*a*. In accordance with an exemplary embodiment, the data illustrated at a step 902 of FIG. 9*a* can be recorded in a SIM card, UICC, or eUICC 163. For embodiments with an eUICC 163, the data recorded in a step 902 could be included within a received eUICC profile 311. Thus, although other embodiments of the present invention illustrated in FIG. 9*a* (other embodiments contemplated in the previous two sentences) allows a module 101 to securely initiate communication with a server 105 without depending on pre-shared security keys such as a SIM card or eUICC 163, the pre-shared materials in traditional mobile networks such as SIM cards and a eUICC could include the data and techniques contemplated herein.

At step 903, the module 101 can derive a shared secret key 129*c* using the component parameters 101*t*. In an exemplary embodiment, the module 101 can derive the shared secret key 129*c* using the steps depicted and described in connection with FIG. 1*f* and FIG. 1*h*. Module 101 could use the set of component parameters 101*t* and an algorithm token 190 as input into a shared secret algorithm 141*g*, with an output of the shared secret key 129*c*. Although not illustrated in FIG. 9*a*, a server 105 could record or could query a module database 105*k* for the same set of component parameters 101*t* with the module identity 110 and shared secret algorithm 141*g*, and upon receipt of the module identity 110 and algorithm token 190, then the server 105 could derive the same shared secret key 129*c*.

After step 903, upon connection to the IP Network 107, possibly through a wireless network 102, module 101 could conduct a step 904. In step 904, module 101 can perform a 2-way authentication with a server 105 using the shared secret key 129*c*, where the shared secret key 129*c* in a step 904 could be derived in a step 903. The server address 207 as the destination of outbound packets, such as a message 208 to initiate the authentication, could be recorded in a step 902 above. Module 101 can send the algorithm token 190 used to derive the shared secret key 129*c* in a step 903 to the server 105 in a message 208, in order for the server 105 to derive the same shared secret key 129*c*, where the server 105 can use the same set of component parameters 101*t* and shared secret algorithm 141*g* as depicted and described in connection with FIG. 1*f*. Note that a benefit of both nodes deriving the same or equal shared secret key 129*c* is that only the algorithm token 190 may need to be sent from module 101 to server 105 at a step 904, and the algorithm token 190 may also be sent as plaintext. Upon both nodes accessing the same shared secret key 129*c*, sub-steps can be taken by both nodes in order to conduct the 2-way authentication using the shared secret key 129*c*. In an exemplary embodiment, module 101 can conduct the 2-way authentication using wireless network standards such as, but not limited to, ETSI standard TR 131 900 v.10.0.0 and related documents.

At step 904, server 105 can authenticate module 101 using the module identity 110 received in a message 208 and a message digest algorithm, such as described in IETF RFC 2617, titled "HTTP Authentication: Basic and Digest Access Authentication", and other reasonably secure authentications techniques using a shared secret key 129*c* could be utilized without departing from the scope of the present invention. In order to authenticate, module 101 could take steps to demonstrate to server 105 that module 101 holds the same shared secret key 129*c* as server 105. Module 101 can properly respond to a challenge/nonce in the steps for a message digest by sending a secure hash value using (i) the challenge/nonce from a server 105 and (ii) the shared secret key 129*c*. Or, module 101 could authenticate by generating a module digital signature 405 in a message 208 using the shared secret key 129*c*. In addition, module 101 could utilize the shared secret key 129*c* as a symmetric key 127 to encrypt a module encrypted data 403 with symmetric ciphering 141*b*, and if server 105 could properly decrypt the module encrypted data 403 using the same shared secret key 129*c* on the server, then server 105 would know the correct module 101 sent the message 208 and thereby would be authenticated. Other possibilities exist as well for a module 101 to authenticate with a server 105 using a shared secret key 129*c* and a step 904 in FIG. 9*a* without departing from the scope of the present invention.

Continuing at step 904, module 101 can also preferably authenticate server 105 in order to complete a 2-way authentication. Module 101 can take steps to ensure or verify that server 105 with reasonable assurance also holds the shared secret key 129*c*. Module 101 could authenticate server 105 using message digest, such that module 101 issues a challenge/nonce, and verifying that server 105 properly responds to the challenge/nonce with a correct secure hash value, such as the output from a secure hash algorithms 141*c*. Or, server 105 could authenticate with module 101 by the module receiving a server digital signature 506 in a response 209 using the shared secret key 129c. In addition, module 101 could utilize the shared secret key 129c as a symmetric key 127 to decrypt a received server encrypted data 504 with symmetric ciphering 141b, and if module 101 could properly decrypt the server encrypted data 504 using the shared secret key 129c, then module 101 would reasonably know the correct server 105 sent the response 208 and thereby the server 105 would be authenticated. Other possibilities exist as well for a server 105 to authenticate with a module 101 using a shared secret key 129c without departing from the scope of the present invention.

Continuing at step 904, module 101 can receive a set of cryptographic parameters 126, preferably after module 101 completes authentication with server 105 (in order for server 105 to not send the set of cryptographic parameters 126 to unauthenticated 3$^{rd}$ parties). A set of cryptographic parameters 126 received in a step 904 can also comprise a second set of cryptographic parameters 126, where the second set of cryptographic parameters 126 could be different or the same as the first set of cryptographic parameters 126 from a step 902. The set of cryptographic parameters 126 at step 904 can comprise a subset of cryptographic parameters 126a as depicted and described in connection with FIG. 1i. Module 101 could send the set of cryptographic parameters 126 recorded in step 902 to the server 105, and the server 105 could respond with a subset of cryptographic parameters 126a. In another embodiment, server 105 could send module 101 a set of cryptographic parameters 126 at step 904, and module 101 could send a subset of the cryptographic parameters 126a to the server. At step 904 either module 101 or server 105 could send the subset of cryptographic parameters 126a. In either case, at the conclusion of step 904 the module 101 and server 105 can preferably agree on a set of cryptographic parameters 126 for use with cryptographic algorithms 141 for further communication. In an exemplary preferred embodiment, a set of cryptographic parameters 126 sent and/or received at a step 904 may preferably be encrypted using the shared secret key 129c, such as using the shared secret key 129c as a symmetric ciphering key 127. In this manner, module 101 and server 105 can encrypt the set of cryptographic parameters 126 received in a step 904, without requiring the secure transmission of a different key other than the mutually derived shared secret key 129c.

After step 904, module 101 can then proceed to a step 712, where a step 712 is depicted and described in connection with FIG. 7. As depicted and described in connection with FIG. 7, step 712 can include a plurality of sub-steps including module 101 (i) deriving a first set module PKI keys at a step 515, (ii) determining that a new set of module PKI keys are needed in a step 708, (iii) receiving a new set of cryptographic parameters 126 in a step 607, and (iv) deriving a second set of module PKI keys using the new set of cryptographic parameters 126 in a step 709, and (v) sending the new, second module public key 111 with authentication in a step 710, etc. In this manner, module 101 can use a secret shared key 129c to initially establish secure communication with a server 105, and subsequently use the other steps illustrated in the present invention, such as, but not limited to, the steps illustrated in FIG. 7, in order to securely derive a series of module PKI key pairs and authoritatively send a derived module public key 111.

Although not illustrated in FIG. 9, in exemplary embodiments, there can be cases where a module 101 would return from step 712 back to prior steps, including steps 902, 903, and/or, 904. After module 101 begins operation, such as, but not limited to, collecting sensor data 305 associated with a monitored unit 119, module 101 could return to a step 904 upon connection with a new set of servers 1010 (illustrated in FIG. 10 below) where module 101 may prefer to conduct a 2-way authentication of the set of servers 1010 in a step 904. In an exemplary embodiment, module 101 could utilize DNS and a server name 206 or a server identity 206 in order to query or lookup a destination IP address 106 in order to send a message 208. Since DNS records can change over time, and a mobile network operator 108 could utilize different servers 105 or set of servers 1010 over time, module 101 may determine that a destination IP address 106 associated with a DNS response can change. Upon a change in the IP address 106 associated with a server 105, in an exemplary embodiment, module 101 could return to a step 904 upon a change in IP address 106 in order to conduct the authentication of server 105 a second time. In this exemplary subsequent return to step 904, the module could also receive another set of cryptographic parameters 126 or 126a and use this set of cryptographic parameters 126 or 126a upon a subsequent return to step 712.

In another exemplary embodiment, module 101 could return to either a step 903 or step 902 upon a reset or equivalent operation of module 101. After module 101 begins operation, such as, but not limited to, collecting sensor data 305 associated with a monitored unit 119, module 101 could return to a step 903 or 902 upon receiving a reset command. The reset command could be received locally at module 101 by an end-user or technician, or remotely from a server 105 via a response 209 with a module instruction 502 of "reset" or a similar command. The reset command could comprise a "factory reset" command in order to wipe confidential data from module 101. A "reset" command could be received by a module 101 for many different purposes, including (i) a change in ownership of module 101, (ii) a lack of payment from an end-user to mobile network operator 108, such that mobile network operator 108 determines that operation of module 101 (and associated variable costs such as the costs of using a network 102) should cease, (iii) a firmware upgrade of module 101 where the new firmware requires a new configuration, and other possibilities exist as well for a module 101 to receive a reset command. Upon receiving a reset command and returning to a step 902, module 101 could complete step 902 and subsequent steps. Upon receiving a reset command and returning to a step 903, module 101 could complete step 903 and subsequent steps.

FIG. 9b

FIG. 9b is a flow chart illustrating exemplary steps for a module to derive a shared secret key K using a derived module PKI key, in accordance with exemplary embodiments. Although the use of an embedded universal integrated circuit card (eUICC) such as an eUICC 163 depicted and described in FIG. 1c and other Figures herein can provide significant benefits of reducing the costs and complexities associated with the physical distribution of media or units such as a physical SIM card or UICC, significant challenges and requirements have impeded the development and adoption of eUICC standards as of 2013, such as those proposed in ETSI TS 103 383 and related standards. One primary challenge has been the secure distribution of shared secret key K for operation with a wireless network 102 that functions as a PLMN based on ETSI standards, such as, but not limited to, 4G LTE networks and also networks using 4G LTE Advanced. Shared secret key K for a regular SIM or UICC can comprise the key K contemplated for a SIM in 3GPP TS 33.401 V12.9.0 and related standards, and shared secret key K can be used to derive session keys such as the cipher key (CK) and the integrity key (IK) as described in ETSI and 3GPP standards in order to a module 101 such as a mobile phone, mobile station, or user equipment to access a wireless network 102. Shared secret key K is normally recorded by both the wireless network 102 and a UICC within a module 101 using conventional technology.

FIG. 9b illustrates and embodiment of the present invention where a module 101 can securely derive shared secret network key K 129d using a derived module private key 112. As described below in FIG. 11, a network 102 can also derive the same shared secret network key K 129d, without requiring the recording or distribution of shared secret network key K 129d in a eUICC profile 311. Note that (i) an eUICC profile 311 could include an initial key K 325, which can comprise a shared secret key K contemplated in 3GPP TS 33.401 V12.9.0 and related standards, and (ii) the initial key K 325 could be used for an initial connection with wireless network 102 and the initial key K 325 could comprise a secret shared key 510 in FIG. 9b, but module 101 and a mobile network operator 108 can use change from using the initial key K 325 in an first connection by module 101 to wireless network 102 to using the derived shared secret network key K 129d in a second and subsequent connection by module 101 to wireless network 102. Using the steps depicted and described in FIG. 9b, the derived shared secret network key K 129d does not need to be transmitted to or from a module 101, thereby increasing security. Further, the secure derivation of a shared secret network key K 129d by both a module 101 and a wireless network 102 can provide compatibility with the the well established and incumbent PLMN infrastructure that utilizes a pre-shared secret key K as currently recorded in a SIM card or UICC with conventional technology. In this manner, the use of an eUICC 163 by a module 101, where network credentials 314 could include or be associated with a derived module private key 112 as contemplated in the present invention, can remain compatible with incumbent PLMN infrastructure while achieving the security benefits of a module 101 and mobile operator network 108 mutually deriving shared secret key K.

At a step 905, a module 101 with an eUICC 163 can read a received eUICC profile 311. The received eUICC profile 311 could be recorded in a nonvolatile memory such as, but not limited to, a flash memory 101w. A module 101 could have previously received the received eUICC profile 311 from an eUICC subscription manager 164 or another entity, including a first wireless network 102. Or, the received eUICC profile 311 in a step 905 could be loaded into module 101 by a manufacturer, distributor, or end user. At a profile activation 316 step, a module 101 using the eUICC 163 can convert the received eUICC profile 311 into an activated eUICC profile 313. As contemplated herein and throughout the present invention, an activated eUICC profile 313 can comprise a selected and enabled network access application state as illustrated in Figure D.1 of ETSI TS 103 383 v.2013-02 for the activated eUICC profile 313, and other possibilities exist as well. In exemplary embodiments, the step 316 illustrated in FIG. 9b can be performed concurrently with a step 906 below.

At a step 316, a module 101 can derive a module private key 112 and a module public key 111. Module 101 could use a step 316 in order to derive the module PKI key pair 315, and a module 101 can use sub-steps depicted and described in connection with a step 316 in FIG. 3b, FIG. 5b, and FIG. 7. A module 101 could also use a step 515 as depicted and described in connection with FIG. 5b and FIG. 7 in order to derive the module private key 112 and module public key 111. Module 101 could also use a set of cryptographic algorithms 141, a key pair generation algorithm 141e, a random number generator 128, and a set of cryptographic parameters 126 to process or derive the module PKI key pair 315 at a step 316 in FIG. 9b. Module private key 112 and module public key 111 could be processed and formatted according to either an RSA algorithm 153 or an ECC algorithm 154. The set of cryptographic parameters 126 could comprise a subset of cryptographic parameters 126a as illustrated in FIG. 1i. A set of cryptographic parameters 126 used in a step 316 in FIG. 9b for deriving the module PKI key pair 315 could be included in the received eUICC profile 311, as illustrated in FIG. 3b. Or, the set of cryptographic parameters 126 used in a step 316 in FIG. 9b for deriving the module PKI key pair 315 could be included in the eUICC 163. In exemplary embodiments, module private key 112 and module public key 111 may utilize an ECC algorithm 154 in order to provide a higher level of security for a given key length. Module 101 could also calculate or process a key K module token 1103 at a step 316 in FIG. 9b, and the use and function of a key K module token 1103 is depicted and described in connection with FIG. 11 below.

Note that the actual step of key derivation could be performed independently of a profile activation step 316, such that a module 101 derives the module PKI key pair 315 before a profile activation 316 step, but upon completion of a profile activation step 316, an activated eUICC profile 313 can preferably include or be associated with a derived module private key 112 and derived module public key 111 in exemplary embodiments. In other words, in order for a module 101 to use an activated eUICC profile 311 (which could also comprise a selected and/or enabled profile) to connect with a wireless network 102, the activated eUICC profile 311 can preferably be associated with a derived module private key 112 and derived module public key 111, where the derived keys could be processed by module 101 using a key pair generation algorithm 141e. Module 101 could use a set of cryptographic parameters 126 recorded in a received eUICC profile 311 to derive the module PKI key pair 315.

At a step 906, the derived module public key 111 and derived module private key 112, which could be associated with an activated eUICC profile 313, resulting from a step 316 above in FIG. 9b, can be recorded in a nonvolatile memory, such as, but not limited to, a flash memory 101w. In this manner, PKI keys could be later read by module 101 after a power off state or similar state where a RAM 101e could be flushed. Although not illustrated in FIG. 9b, module 101 could also send the derived module public key 111 to the wireless network 102 and/or a server 105, such that other entities besides module 101 can use the derived module public key 111 for communication with module 101. Module 101 could use a step 517 to authenticate the derived module public key 111 sent. After a successful sending of the derived module public key 111 to the wireless network 102 and/or a server 105, module 101 could optionally choose to no longer record derived module public key 111 associated with a step 316 within nonvolatile memory of module 101.

At a step 907, module 101 could connect with a wireless network 102. The connection procedure could include an LTE attachment procedure and a series of steps for LTE authentication. A module 101 at a step 907 could promote from a detached state to an "radio resource connected" state using attachment and promotion procedures outlined in 3GPP specification TS 24.301 v12, entitled "Non-Access-Stratum (NAS) protocol for Evolved Packet System (EPS); Stage 3". In a first exemplary embodiment, module 101 could attach and authenticate with wireless network 102 in a step 907 using the initial key K 325 recorded in a received eUICC profile 311, where the initial key K 325 recorded in a received eUICC profile 311 could comprise a first shared secret network K key (such as a pre-shared secret key K described in 3GPP TS 33.401 V12.9.0). Module 101 could also connect with and authenticate at a step 907 using the network module identity 101b recorded in a received eUICC profile 311. In the embodiment where an initial key K 325 comprises a first shared secret network K key, module 101 could authenticate with the network 102 using the standard procedure or receiving a RAND 912 and processing and sending a response RES 913, as described at step 910 below for FIG. 9b. In an exemplary embodiment, a difference with authentication at a step 907 from authentication at a step 910 is that authentication at a step 907 could utilized the initial key K 325 recorded in a received eUICC profile 311, while a later authentication at a step 910 can utilize a different key.

Although not illustrated in FIG. 9b, in another exemplary embodiment, module 101 can connect or complete an attachment procedure with wireless network 102 at a step 907 without a valid key K and network module identity 110b (or equivalently a "null" value for the key K and also possibly a "null" value for the network module identity 110b), and this case would also be synonymous or equivalent to a module 101 attaching to wireless network 102 without a valid SIM card or UICC. Note that both standards and deployed, operational wireless networks widely support the attachment of mobile phones without a valid SIM/UICC in order to support emergency services. Or, in an exemplary alternative embodiment for a step 907 module 101 could connect with wireless network 102 using a key K and network module identity 110b that are not valid, and/or not authenticated by a wireless network 102 or mobile network operator 108. This feature to support emergency calls/emergency services without a valid SIM card or UICC (or a valid or activated SIM/UICC with authenticated network access credentials) is also mandated by regulatory authorities in different countries, such as the Federal Communication Commission (FCC) in the US.

Consequently for this alternative embodiment contemplated for a step 907 in FIG. 9b but not illustrated in FIG. 9b, module 101 in a step 907 illustrated in FIG. 9b could attach to a wireless network 102, where the module 101 and the network 102 use a null or invalid values for key K and/or network module identity 110b at a step 907. Module 101 at a step 907 could identify itself to wireless network 102 using either (i) a module identity 110 recorded in a non-volatile memory or (ii) a network module identity 110b recorded in a received eUICC profile 311, and other possibilities for the identity of module 101 in a step 907 when attaching to a wireless network 102 in an unauthenticated manner are possible as well for a step 907 without departing from the scope of the present invention. In this alternative exemplary embodiment for a step 907 (as one alternative to the step 907 depicted in FIG. 9b), a module 101 at a step 907 could complete an attachment procedure as outlined in 3GPP specification TS 24.301 v12 without successfully completing an authentication procedure using a shared secret network K key or an initial key K 325 recorded in a received eUICC profile 311. In other words, the initial key K 325 for a step 907 does not have to be a valid, acceptable, and/or authenticated key K in order to use the steps illustrated in FIG. 9b, although in some embodiments of the present invention the initial key K 325 can be a proper and authenticated key K for wireless network 102. The initial key K 325 used in a step 907 could also comprise a "null" value, and a "null" value for a key K is contemplated in LTE and related wireless network standards (in order to support mandated emergency services for module network operator 108).

After connecting with wireless network 107 in a step 907, at a step 908, module 101 can send wireless network 102 a key K module token 1103, where a key K module token 1103 is depicted and described in connection with FIG. 11 below. The key K module token 1103 could be calculated or processed by module 101 in a step 316, although the key K module token 1103 could be derived at other times or steps as well. A message or packet sent from a module 101 to a server 105 associated with network 102 in a step 908 can also include any of (i) a module identity 110, (ii) an encrypted module identity 110a, and/or (iii) a network module identity 110b. A key K module token 1103 in a step 907 can comprise any of (i) a derived module public key 111, where the derived module public key 111 could be calculated in a step 906 above, (ii) a value processed by a module 101 for a Diffie Hellman key exchange, (iii) an algorithm token 190 for a shared secret algorithm 141g, and/or (iv) a number or string for a server 105 to use in a network key K derivation algorithm 1101 in order for mobile network operator 108 to derive a secret shared network key K 129d. In an exemplary embodiment, module 101 can send the key K module token 1103 to a server 105 such as, but not limited to, a home subscriber server (HSS) using a step 522 at a step 908.

At a step 908, module 101 can send a message 208 with a key K module token 1103 and authenticate data associated within the message, such as, but not limited to, a module identity 110. However, a separate authentication of a message with key K module token 1103 using a step 522 may optionally be omitted (thus depicting "908 And/Or 522" in FIG. 9b), for embodiments where module 101 uses a valid, authenticated initial key K 325 for a step 907 above. In the embodiment described in the previous sentence, the steps for "And/Or 522" depicted in FIG. 9b may be omitted, and thus the optional additional steps for 522 could be omitted with a step 908 for a FIG. 9b. In other words, when module 101 uses a valid, authenticated initial key K 325 for a step 907, module 101 can send key K module token 1103 in a step 908, and separate, additional steps for authenticating the key K module token 1103 may not be required.

For other embodiments where module 101 connects with wireless network 102 using an invalid, unauthenticated, or "null" initial key K 325 (such as attaching in a manner for supporting emergency services but not regular subscriber service as described at Step 907), the steps for "And/Or 522" depicted in FIG. 9b can be included, in order for a mobile network operator 108 to receive the key k module token 1103 in a secure manner. A module 101 sending the key K module token 1103 at a step 908 and 522 in FIG. 9b could authenticate the message, or data associated with the message, in a step 908 using a step 522. In exemplary embodiments, module 101 can attach to the wireless network 102 without successfully completing authentication (such as the data-link and network layer of the OSI stack not being authenticated), and send a message 208 with key K module token 1103 in a step 908 with a step 522 in FIG. 9b. The message 208 with key K module token 1102 could be authenticated by a server 105 using a shared secret key 510, as depicted and described in connection with a step 517 of FIG. 5b. In this manner, module 101 could use an eUICC 163 with a received eUICC profile 311 that contains both an initial key K 325 and a shared secret key 510. The initial key K 325 may not be valid and/or authenticated (or could comprise a "null" value). Module 101 could attach to the wireless network 102 in a manner that supports emergency services. Module 101 could send the key K module token 1103, and authenticate data associated with key K module token 1103 using a step 517 and the shared secret key 510. Note that the same value or number could be used for both initial key K 325 and shared secret key 510, although the values or numbers for the two keys could also be different.

In another embodiment for FIG. 9b, a valid initial key K 325 can be utilized to authenticate a module 101 with a wireless network 102, where initial key K 325 comprises a pre-shared secret key K contemplated in 3GPP TS 33.401 V12.9.0 and used in a step 907. A separate shared secret key 510 can be used for authentication of application data such as sending key K module token 1103 in a message 208 to a server 105 in a step 908 with a step 522, where the authentication could use (i) a step 517 in step 522 and (ii) the shared secret key 510.

In exemplary embodiments, shared secret key 510 can be used by both module 101 and a mobile network operator 108 in a step 908 with a step 522 in order to verify and authenticate that a key K module token 1103 (or related data such as a module identity 110 and/or a network module identity 110b) is properly authenticated at a step 908 using a step 522, such that imposters or fraudulent submissions of key K module token 1103 could be reasonably be prevented or excluded from using a step 908. As noted above, the use of a step 522 with a shared secret key 510 can be optionally omitted, and the submission or sending of key K module token 1103 could be secured by using a valid, authenticated initial key K 325. Other possibilities for a module 101 to send a key K module token 1103 to a server 105 associated with a mobile network operator 108 are possible as well without departing from the scope of the present invention. Although not illustrated in FIG. 9b, after sending the module key K token 1103 in a step 908, module 101 can detach from the wireless network 102. A subsequent re-attachment of module 101 at later steps, such as step 909 below, could utilize a different key K than the initial key K 325 used in a step 907, such as module 101 using the derived shared secret network key K 129c in a second attachment and connection procedure with the same wireless network 102.

At a step 909, a module 101 can derive a shared secret network key K 129d using the derived module private key 112 and a key derivation function 141f. The key derivation function 141f could use a Diffie-Hellman key exchange plus a set of cryptographic parameters 126 with the derived module private key 112 in order to derive the shared secret key K 129d. A key derivation function 141f could also use alternative algorithms to Diffie-Hellman, such as, but not limited to, ECDH 159, ANSI-X.9.63 160, or similar key exchange protocols, such that a module 101 could use the derived module private key 112 from a step 316 in order to derive a secret shared network key K 129d that is also shared with a wireless network 102. As contemplated herein, a step 909 can also comprise a module key K derivation algorithm 909, and a module key K derivation algorithm 909 is depicted and described below in FIG. 11. As depicted in FIG. 11, a step 909 comprising a module key K derivation algorithm 909 could also use input of a network key K token 1102. A key K network token 1102 for a step 909 can comprise any of (i) a network public key 165b, (ii) a value from MNO 108 for a Diffie Hellman key exchange, (iii) a server public key 114, and/or (iv) a number or string for a module 101 to use in a module key K derivation algorithm 909 in order for module 101 to derive a secret shared network key K 129d. The key K network token 1102 could be recorded in a received eUICC profile 311 or received by module 101 in a response 209 (not shown in FIG. 9b) prior to step 909.

The output of a key derivation function 141f in a step 909 (also depicted and described in connection with FIG. 11 below), using input at least in part of (i) the module private key 112, (ii) a set of cryptographic parameters 126 or 126a, and (iii) the key K network token 1102, could comprise a derived shared secret key 129b that is different than shared secret network key K 129d. As one example, the derived shared secret key 129b could have a different number of bits for derived shared secret key 129b than the 128 bit long key length for shared secret key K compatible with ETSI standards for LTE networks in 2013. In this exemplary case, a module 101 and a server 105 could perform additional key processing 141i to convert (A) a derived shared secret key 129b output by a key derivation function 141f in a step 909 into (B) a mutually derived shared secret network key K 129d.

The function of a shared secret network key K 129d (in the form of a key "K") is described in 3GPP TS 33.401 V12.9.0 and related standards, where shared secret key K is used to derive session keys such as a session cipher key (CK) and a session integrity key (IK) as described in ETSI and 3GPP standards. Conventional technology for the use of a shared secret key K contemplates that shared secret key K comprises a pre-shared secret key K recorded in (i) physical media such as a SIM or (ii) transferred electronic media such as an eUICC profile that would be delivered to a module 101 with an eUICC 163. In exemplary embodiments of the present invention, the shared secret network key K 129d is internally derived by a module 101 using (i) the derived module private key 112 from a step 316 and (ii) a step 909, which could also comprise the use of a module key K derivation algorithm 909. In this manner, module 101 can process or obtain the shared secret network key K 129d without having the shared secret network key K 129d pass through $3^{rd}$ parties (even in an encrypted electronic form), and thereby increase the security, convenience, and flexibility of a system 100 and other systems contemplated herein that utilize an eUICC 163 for a module 101 to connect with a wireless network 102. As depicted and described in connection with FIG. 11 below, concurrent with step 909 a wireless network 102 or a mobile network operator 108 could also derive the same shared secret network key K 129d using a network key K derivation algorithm 1101. After mutual derivation of the same shared secret network key K 129d, module 101 and wireless network 102 can initiate regular communications on legacy and widely deployed wireless networks 102. Establishing regular communications with the widely deployed wireless networks 102 includes the derivation of subsequent session keys, after mutually obtaining a secure shared secret network key K 129d. Additional details for a step 909 are depicted and described in connection with FIG. 11 below.

At step 910, after deriving shared secret network key K 129d from a step 909, where shared secret network key K 129d can also be derived by a mobile network operator 108, module 101 can use an eUICC 163 to reconnect with the wireless network 102 associated with the activated eUICC profile 313. The activated eUICC profile 313 could be obtained in a step 316 above. Module 101 can send the network module identity 110b to the wireless network 102, where the network module identity 110b can be recorded in the activated eUICC profile 313. Module 101 can use the derived shared secret network key K 129d from a step 909 to authenticate with wireless network 102 and/or mobile network operator 109 in a step 910, where the derived shared secret network key K 129d is different than the initial key K 325 used in a step 907 for a prior authentication with wireless network 102.

This exemplary change in a key K used with wireless network 102 in FIG. 9b illustrates several important differences with conventional technology. First, the module 101 can use two different key Ks (comprising shared secret network key K 129d and initial key K 325) with the same wireless network 102 without physically changing a SIM or UICC. Second, module 101 can use an eUICC 163 and steps in FIG. 9b with same activated eUICC profile 313 and two different key Ks in order to communicate with wireless network 102. Using conventional technology as of 2013, a change for a key K is not contemplated for the same activated eUICC profile 313 or a physical UICC. Further, conventional technology for an eUICC 163 does not contemplate that module 101 could derive a key K (in the form of a shared secret network key K 129d described herein) for use with an eUICC 163 that also can be mutually shared with MNO 108, without requiring the electronic distribution of key K, even in an encrypted or ciphered form.

Continuing at step 910, wireless network 102 and/or mobile operator network 108 can use ETSI standards for PLMN networks, including LTE and LTE advanced networks and standards such as 3GPP TS 24.301v10+, in order to authenticate, module 101 in a step 910. Upon reconnecting to wireless network 102, module 101 can receive a random number in the form of a RAND 912 from the wireless network 102. The algorithm for authentication of module 101 with the wireless network 102 can comprise a form of message digest authentication. Module 101 can input the received RAND 912 and derived shared secret network key K 129d into a set of cryptographic algorithms 141 in order to obtain the response RES 913. An exemplary calculation of a RES 913 using a key K and RAND 912 is described in ETSI standard TR 131 900 v.10.0.0 and related documents. For exemplary embodiments that utilize FIG. 9b, the set of cryptographic algorithms 141 for processing the response RES 913 can operate within an eUICC 163 within module 101.

Continuing with a step 910, as specified in ETSI/3GPP standards, the RAND 912 and an internally recorded key K (which could be the derived shared secret network key K 129d for a step 910 in the present invention) can also be subsequently used with a set of cryptographic algorithms 141 for the derivation of additional keys such as, but not limited to, a cipher key (CK) and an integrity key (IK) (described in a step 911 below). Exemplary embodiments of the present invention can utilize the derived secret shared network key K 129d instead of the key K recorded in a SIM or UICC in order to perform the same operations to derive CK, IK and related keys, thereby maintaining secure compatibility with the significant installed infrastructure in PLMN networks for supporting the use of key K in SIM/UICC cards for mobile phones in 2013 and future networks using a key K. Upon conclusion of a step 910, module 101 can send the response RES 913 to the wireless network 102 in order to authenticate. Wireless network 102 or MNO 108 could calculate the same RES 913 for the same RAND 912 using the shared secret network key K 129d mutually derived by wireless network 102 or MNO 108 (possibly using a network key K derivation algorithm 1101 illustrated in FIG. 11 below), and thereby compare the RES 913 received from module 101 in a step 910 with the RES 913 internally calculated by MNO 108 using the same set of cryptographic algorithms 141 as module 101. Module 101 could be authenticated with network 102 using the network module identity 110b in the case the two RES 913 values match for network 102 (i.e. the received RES 913 matches the internally calculated RES 913).

After the internal, secure derivation of a shared secret network key K 129d in a step 909 and the authentication of module 101 with a wireless network 102 in a step 910, at a step 911 module 101 can begin the process of generating additional keys in order to securely transmit and receive application data with or through a wireless network 102. At step 911, module 101 can derive a cipher key (CK) 914 by inputting into a set of cryptographic algorithms 141 both RAND 912 and the derived shared secret network key K 129d. The RAND 912 and the derived shared secret network key K 129d could also be input into a key derivation function 141f within a set of cryptographic algorithms 141. An output of a key derivation function 141f in a step 911 can be CK 914, which could comprise a session key. The key derivation function 141f in a step 911 can utilize relevant algorithms for generating CK 914 specified in ETSI, 3GPP, or similar standards for wireless networks, including WiMAX, such that module 101 can independently derive the same value for CK 914 at wireless network 102. CK 914 can subsequently be used with or for further deriving a symmetric key 127 with a symmetric ciphering algorithm 141b for encrypting data transmitted or sent to wireless network 102 by module 101 and decrypting data received. As one example, CK 914 could be used to derive a key Kupenc, where Kupenc is used to cipher data transmitted by a module 101 from a radio 101z to a base station 103.

Although not illustrated in FIG. 9b, both module 101 and a wireless network 102 could derive several additional secret keys using the derived and mutually shared secret network key K 129d, and the additional keys could comprise values for an integrity key (IK), Kasme, Knasenc, Knasint, Kenb, and/or Kupenc. In this manner, and as illustrated in FIG. 9b, the derivation of a module private key 112 can be used for the derivation of a shared secret network key K 129d, and shared secret network key K 129d can be the basis for secure communications between a module 101 and a mobile network 102, while keeping compatibility with existing and future standards for both mobile phones and deployed wireless networks 102.

FIG. 10

FIG. 10 is a simplified message flow diagram illustrating an exemplary system with exemplary data transferred between a module and a set of servers, in accordance with exemplary embodiments. System 1000 may comprise a module 101 and a set of servers 1010, where the set of servers 1010 can include a plurality of servers 105 and a shared module database 105k. FIG. 10 illustrates module 101 communicating with a server 105, depicted as "server A" 105, although a module 101 could communicate with other servers within a set of servers 1010 as well. The set of servers 1010 could be associated with a mobile network operator 108 and the set of servers 1010 could operate in a coordinated manner through a network. In exemplary embodiments where a module 101 and a wireless network 102 mutually derive a shared secret network key K 129d, then the set of servers 1010 illustrated in FIG. 10 could be (i) operated by a mobile network operator 108 and also be (ii) associated with a home subscriber server (HSS). Although not illustrated in FIG. 10, module 101 could access a wireless network 102 and the IP Network 107 illustrated in FIG. 1a in order to send data to and receive data from a server 105 within a set of servers 1010.

As illustrated in FIG. 10, a module 101 can communicate with a server 105 using the steps and datagrams illustrated in other figures, including sending a message 208, receiving a response 209, using steps 711, 607, 709, and/or 710 as depicted and described in connection with FIG. 7, and/or steps 316 and 516 from FIG. 5b. FIG. 10 illustrates some of many potential combinations of using these individual steps for an efficient and secure system. Other messages 208 may potentially flow before and/or after a "first message" 208. This terminology of "first message", "second response", "second public key", etc. contemplated in various Figures herein may refer to the "first message", "second response", "second public key", "first set of parameters", etc. described in the illustrated flows within each Figure. Other messages, responses, keys, and parameters may be communicated before and/or after a depicted "first message", "second response", "second public key", etc. The depicted elements for Figures herein can comprise subsets of all messages, responses, keys, etc. that may also flow, and the subsets can depict various embodiments contemplated herein.

In exemplary embodiments, FIG. 10 illustrates the establishment of secure communication between a module 101 and a set of servers 1010 for the case where (i) an existing, authenticated module public key 111 is available from external servers, and (ii) the existing module public key 111 can be used to send parameters for the module 101 to derive a new module PKI key pair. As one example, the optional step 711, before a step 1001, could be used to authoritatively record a module public key 111 with external servers such as those external servers shown in a step 1002 in FIG. 10. The optional step 711 could include module 101 recording an initial module public key 111b that is not derived by module 101, but rather loaded into module 101 by a manufacturer, distributor, or end user, and the initial module public key 111b could be used by a module 101 and a server 105 to authenticate and/or encrypted subsequent communications related to a derived module public key 111. After the derived module public key 111 has been successfully authenticated or recorded by a server 105 or a set of servers 1010, then a server 105 or set of servers 1010 can begin using the derived module public key 111 for subsequent authentication and/or encryption for communication with a module 101, instead of continuing to use the initial module public key 111b.

In exemplary embodiments, (i) an initial module private key 112b could be recorded in a nonvolatile memory for module 101 prior to a step 1001 illustrated in FIG. 10, possibly using a step 711, and (ii) a set of servers 1010 could use an initial module public key 111b associated with the initial module private key 112b in order to establish initial secure communications with a module 101 such as using a step 1004 to transfer a symmetric key 127 for ciphering a new, second set of cryptographic parameters 126, and then (iii) a module 101 could receive the ciphered second set of cryptographic parameters 126 with subsequent exemplary steps illustrated in FIG. 10 to derive additional module PKI keys, and (iv) establish secure communication with a set of servers 1010 using the second set of cryptographic parameters 126 and the derived module PKI keys.

In an embodiment where module 101 records a "base" certificate 122 (with a corresponding "base" module private key 112) which are included with a module 101 by a manufacturer. A mobile network operator 108 can use the "base" certificate 122 to communicate further sets of cryptographic parameters 126 for deriving additional module PKI keys. The initial set of cryptographic parameters 126 and an initial module public key 111b could be recorded in the "base" certificate 122, and the exemplary use of cryptographic parameters 126 in a certificate 122 is illustrated in FIG. 1j. The initial set of cryptographic parameters 126 could also be referred to as a "base" set of cryptographic parameters 126. The module manufacturer, module provider 109, mobile network operator 108, and/or wireless network 102 could agree on a common initial set of cryptographic parameters 126 (such as, but not limited to, agreeing that initial module PKI keys could be based on RSA and a length of 2048 bits). By agreeing to a common initial set of cryptographic parameters 126, different modules 101 from different manufactures could initially interoperate with different module providers 109 and/or M2M service providers 108 using the initial, "base" parameters. The entities such as the mobile network operator 108 and/or wireless network 102 could use the "base" or initial set of cryptographic parameters 126 with the "base" certificate 122 to establish secure communications where subsequent, different sets of cryptographic parameters 126 for deriving new module PKI keys could be securely communicated and/or negotiated.

A first optional step 711 can comprise series of sub-steps comprising a step 702, 703, and 704 as depicted and described in connection with FIG. 7. Note that the use of an optional step 711 can be omitted, and other preliminary steps and communications could take place between a module 101 and a set of servers 1010 before a module 101 performs a step 1001. In another exemplary embodiment, a module 101 may have used the data from a step 711 in communicating with a different set of servers (not shown) than the set of servers 1010 illustrated in FIG. 10, and the set of servers 1010 illustrated in FIG. 10 may not have access to data from the different set of servers (not shown). The sub-steps for a step 711 can include a module distribution and installation step 702. As contemplated herein, the term "installation" can also refer to a subset of steps conducted by an end user or technician for activation, such that a module 101 performs initial steps to become operable upon completion of the "installation" or activation. In one embodiment, module 101 can comprise a mobile phone such as a smartphone and in this case "installation" in a step 702 within a step 711 can comprise an end user powers up the mobile phone or smartphone for an initial time. Also, in an exemplary embodiment where the optional step 711 is omitted, no data flows between a module 101 and a set of servers 1010 until the first message 208 at a step 1001 illustrated in FIG. 10.

After a sub-step 702 in an optional step 711 in FIG. 10, the next sub-step can comprise a sub-step 703 as depicted and described in FIG. 7. In this sub-step 703, a module 101 can record in nonvolatile memory a shared secret key 129, a first set of cryptographic parameters 126, and a server address 207. As discussed above, a server address 207 could comprise a server name 206 in a step 703, which could subsequently be resolved via DNS into an IP address 106 for a server 106 (or a plurality of IP addresses 106 for a set of servers 1010). The use of a shared secret key 129 for a step 703 is depicted and described in connection with FIG. 7. Note that for the purposes of the present invention contemplated herein, a shared secret key can comprise any of a pre-shared secret key 129a, a derived shared secret key 129b, or a shared secret key 129c processed using a shared secret algorithm 141g. In addition, and as described in a step 703 in FIG. 7, in an exemplary embodiment a shared secret key 129 can comprise the combination of an initial module private key 112b and an initial module public key 111b, and the use of the two initial keys can comprises a shared secret key 129 for a sub-step 703 in an optional step 711 in FIG. 10. Also as described in FIG. 7, a sub-step 703 could take place concurrently with a sub-step 702 or possibly concurrently with a sub-step 701, such as during manufacturing or before a module 101 leaves a manufacturing facility.

After a sub-step 703 in an optional step 711 in FIG. 10, the next sub-step can comprise a sub-step 704 as depicted and described in FIG. 7. In this sub-step 704, a module 101 can conduct a 2-way authentication with a set of servers 105 using the shared secret key 129. Upon mutual authentication, a module 101 can record a second set of cryptographic parameters 126. The second set of cryptographic parameters 126 could comprise a subset of cryptographic parameters 126a as illustrated in FIG. 1i. Or, the second set of cryptographic parameters 126 could be equal to the first set of cryptographic parameters 126 from a sub-step 703. The details for a module 101 to perform a mutual authentication using shared secret key 129 and receiving a second set of cryptographic parameters 126 are depicted and described in connection with step 704 in FIG. 7. In this manner, by using an optional step 711 before a step 1001, module 101 and a server 105 can be mutually authenticated before a step 1001.

At a step 1001 of FIG. 10, a module 101 can send a first message 208, where the first message 208 can include a module identity 110 and a first public key identity 111a. As received by a server 105 within a set of servers 1010, the first message 208 in a step 1001 could include a first source IP:port number equal to IP address 210 and source port number 605. As sent by module 101, the first message 208 in a step 1001 could include a first source IP:port number equal to IP:port number 204. Although firewall 104 is illustrated in FIG. 10 as operating as a "NAT Firewall", a firewall 104 in a system 1000 could also operate as a symmetric firewall without NAT functionality and in this case the first message 208 in a step 1001 as received by a set of servers 1010 could include a source IP:port number equal to IP:port 204. Note that module identity 110 in a step 1001 could be in the form of an encrypted module identity 110a, and a module 101 could use a secret ciphering algorithm 141h to convert the module identity 110 into an encrypted module identity 110a using a secret ciphering algorithm ciphering 162. If a first message 208 in a step 1001 includes an encrypted module identity 110a, then the first message 208 in a step 1001 could also optionally include an algorithm token 190. In an exemplary embodiment, within a system 1000 where a module 101 optionally used a step 711 before a step 1001, many messages could have previously flowed between module 101 and a set of servers 1010 before the first message 208 in a step 1001.

At a step 1002, a set of servers 1010 can use the module identity 110 and/or module public key identity 111a in order to query other servers such as a server associated with a certificate authority 118, a module provider 109, or an eUICC subscription manager 164 in order to receive a first module public key 111 or certificate 122 for the module identity 110 and/or module public key identity 111a. Note than in an exemplary preferred embodiment, module 101 may use a plurality of module public keys 111 and/or certificates within a relatively short period of time (such as, but not limited to, using more than one module public key 111 within the same month). Different exemplary multiple module public keys 111 used concurrently by a module 101 are described elsewhere herein. In this embodiment where module 101 uses multiple module public keys 111 and/or certificates 122 in a relatively short period of time, the module public key identity 111a can serve as a useful index or pointer to a particular module public key 111 that a module 101 prefers to utilize with a set of servers 1010.

In an exemplary embodiment for a step 1002, a module 101 could also optionally send the relevant module public key 111 in a step 1001, but a step 1002 may be conducted by a set of servers 1010 in order to verify, query, or obtain the module public key 111 and/or certificate 122 from other servers. For example, if a module 101 had not previously conducted the optional step 711 in a FIG. 10, and no authoritative information is available about a module 101 to a set of servers 1010 (such as not having a shared secret key 129 available in the case where a step 711 was omitted), then a set of servers 1010 may preferably use the information in a message 208 received in a step 1001 to query the other servers illustrated in FIG. 10 (i.e. servers for 118, 109, or 164) in a step 1002 in order to obtain verification of the module identity 110 and/or a module public key 111 received in a step 1001, including obtaining a certificate 122.

In an embodiment where module 101 sends the module public key 111 in a step 1001, the module 101 preferably includes the module identity 111a. Module 101 could also send a certificate 122 in a step 1001, but the set of servers 1010 can independently query other servers for the certificate 122 or module public key 111 (query using the module identity 110 or module public key identity 111a from a step 1001). The query to other servers can be used to independently and separately receive the module public key 111, in order for a set of servers 1010 verify or compare that a received module public key 111, which could comprise an initial module public key 111b loaded by a manufacturer, matches the module public key 111, possibly in the form of a certificate 122, received from an independent and authoritative third party.

In an exemplary embodiments for a step 1002, a set of servers 1010 can also query other servers such as a certificate authority 118, an mobile network operator 108, an eUICC subscription manager 164, and/or a shared module database 105k in order to receive a first set of cryptographic parameters 126. A set of cryptographic parameters 126 is depicted and described in connection with FIG. 1d, FIG. 1i, and FIG. 7, and elsewhere herein. The first set of cryptographic parameters 126 in a step 1002 could comprise the parameters 126a within a certificate 122 illustrated in a FIG. 1j. Within a step 1002 a set of servers 1010 could receive a certificate 122 for a module 101 with the module identity 110 from another server illustrated, where the certificate 122 could include (i) the module public key 111, (ii) the module identity 110, (iii) a module public key identity 111a, and (iv) a signature 123 from a certificate authority 118. Within a step 1002, a set of servers 1010 could also verify a chain of signatures 123 within a certificate 122 for a module 101. A set of servers 1010 could use a different IP:port number than IP:port 207 to query external servers for information pertaining to a first module public key 111 and a first set of cryptographic parameters 126.

After a step 1002, at a step 1003 a set of servers 1010 could send a module 101 a response 209. In an exemplary embodiment, the response 209 can include a server digital signature 506, where module 101 can verify the server digital signature 506 using the server public key 114. In this manner, module 101 can authenticate the server identity 206 and verify or confirm that the module 101 is communicating with a correct server 105 (such as not receiving data from an imposter or a "man in the middle" attack). The server 105 preferably sends the response 209 to the source IP:port received in the first message 208 in step 1001. Note that for embodiments which utilize an eUICC 163 and the mutual derivation of a secret shared network key K 129d, then the server digital signature 506 in a step 1003 could comprise a an authorization number "AUTN" associated with a RAND 912 depicted and described in connection with FIG. 9b.

Server digital signature 506 could be optionally omitted in a step 1003 in embodiments where module 101 performs a step 711 before a step 1001, as illustrated in FIG. 10.

At a step 1004, a symmetric key 127 could be sent either from (i) a set of servers 1010 or (ii) a module 101 using an asymmetric ciphering algorithm 141a and either (i) the module public key 111 from a step 1002 or (ii) the server public key 114, respectively. Values for using an asymmetric ciphering algorithm 141a could be specified from the first set of cryptographic parameters 126 at either a step 1002 or a step 1001. The set of servers 1010 could record the symmetric key 127 from a step 1004 in a shared module database 105k, such that different servers 105 within a set of servers 1010 could use the symmetric key 127 in communication with the module 101. An exemplary datagram 601a that includes a symmetric key 127 within an encrypted data that uses asymmetric ciphering 141a is illustrated in element 701a of FIG. 7 of U.S. patent application Ser. No. 14/039,401, filed Sep. 27, 2013 in the name of John Nix, which is hereby incorporated by reference in its entirety. Note that for embodiments which utilize an eUICC 163 and the mutual derivation of a secret shared network key K 129d, then the use of asymmetric ciphering for communicating a symmetric key 127 in a step 1004 may be optionally omitted, and each side (i.e. module 101 and a set of servers 1010 associated with a wireless network 102) could mutually derive the secret shared network key K 129d instead of sending or receiving a symmetric key 127 across a network.

At a step 1005, a set of servers 1010 could record that the use of a second set of cryptographic parameters 126 for a module 101 may be preferred. A step 1005 could take place earlier in the sequence of message flow illustrated in FIG. 10, such as even before a step 1001. An example of the case in the previous sentence could be where a set of servers 1010 needs to initially communicate with a module 101 using a "base" set of cryptographic parameters 126 with an initial module public key 111b, and after initial secure communication is established, then the set of servers 1010 could use a different set of cryptographic parameters 126 and request that the module 101 derive a new set of module PKI keys using the different set of cryptographic parameters 126. In another embodiment, a relatively long period of time such as several years could transpire between a step 1004 and a step 1005 (with many additional messages not shown in a FIG. 10 communicated between a module 101 and a server 105 in the time between a step 1004 and a step 1005). Over time and for various commercial and security needs, a preferred set of cryptographic parameters 126 can change, such as the use of longer key lengths, or adoption of new asymmetric ciphering algorithms 141a, including the use of new ECC curves. Consequently, in a step 1005, a set of servers 1010 could record a second set of cryptographic parameters 126.

At a step 607 in FIG. 10, a module 101 could receive the second set of cryptographic parameters 126 from the set of servers 1010. Although not illustrated in FIG. 10, a module 101 preferably sends a message 208 with the module identity 110 to the set of servers 1010 after a step 1004 and before a step 607, with the result that firewall 104 ports will be temporarily opened and bound so that a server 105 in a set of servers 1010 can send a response 209 back to the module 101. A step 607 with a response 209 is also depicted and described in connection with FIG. 6 and FIG. 7. The terminology depicted for a response 209 at a step 607 of "209:504: . . . " can refer from left to right as the structure for an exemplary response 209 illustrated in FIG. 6, where the response 209 can include server encrypted data 504, and the server encrypted data can include either (i) a second set of cryptographic parameters 126, or (ii) a eUICC profile 311. The second set of cryptographic parameters 126 in a response 209 can be included in a server encrypted data 504. In this manner, the second set of cryptographic parameters 126 can remain confidential and reasonably securely received by a module 101.

Note that the symmetric key 127, or session key, used to cipher the second set of cryptographic parameters 126 in a step 607 in FIG. 10 could be communicated in a step 1004 above or a similar step using an asymmetric ciphering algorithm 141a. In an exemplary embodiment, the second set of cryptographic parameters 126 in a step 607 in FIG. 10 may not be encrypted and can also be sent as plaintext within a response 209. In addition, the set of cryptographic parameters 126 in a step 607 in FIG. 10 may be communicated in the form of a reference to a set of cryptographic parameters 126 from the use of a set of cryptographic parameters token 126c (and thus a name or identity of the set of parameters 126 could be communicated instead of the full set of cryptographic parameters 126). As contemplated herein, for any reference to a set of cryptographic parameters 126 in FIG. 5b through FIG. 10, the use of a set of cryptographic parameters token 126c can be substituted for communicating a complete list of cryptographic parameters 126.

For embodiments where a module 101 uses an eUICC 163, a step 607 illustrated in FIG. 10 could comprise module 101 receiving a received eUICC profile 311, which could also contain the second set of cryptographic parameters 126. The inclusion of a received eUICC profile 311 within a step 607 is also described for a step 607 in connection with FIG. 7. The received eUICC profile 311 could be included in a server encrypted data 504, and the server encrypted data 504 could be ciphered using a symmetric key 127 communicated in a step 1004. Or, the server encrypted data 504 for a step 607 could be ciphered with a different symmetric key 127. The set of servers 1010 could obtain the received eUICC profile 311 from an eUICC subscription manager 164. Note that a response 209 which includes a received eUICC profile 311 in a step 607 in FIG. 10 can utilize a source IP:port number 207 that is different than a source IP:port number 207 in a response 209 in a step 1003 above. In other words, as contemplated herein, the numeric value for an IP:port number 207 can change over time, but a pair of datagrams comprising a message 208 and an resulting response 209 can utilize the same numeric value for an IP:port number 207.

At step 1006, a module 101 can send a subset of cryptographic parameters 126a, where the subset of cryptographic parameters 126a can be a subset of the cryptographic parameters 126 received in a step 607. FIG. 1i above illustrates an exemplary "handshake" or "negotiation" of a set of cryptographic parameters 126 between a server 105 and a module 101, and the data illustrated in FIG. 1i can apply to step 607 and step 1006 in FIG. 10. Alternatively, the subset of cryptographic parameters 126a could be omitted, and the set of cryptographic parameters 126 received by a module 101 in a step 607 could be specific enough that module 101 does not need to select any options within the set of cryptographic parameters 126. In this case (where a step 1006 is optionally omitted), then a set of cryptographic parameters 126 in a step 607 could also comprise a subset of cryptographic parameters 126a. In addition, the terminology depicted for a message 208 at a step 1006 of "208:110:403: with Subset 2nd Parameters 126a" can refer from left to right as the structure for an exemplary message 208 illustrated in FIG. 6, with a message 208 containing a module identity 110 and a module encrypted data 403, where "Subset 2nd Parameters 126*a*" would be inside the module encrypted data 403.

Other data such as, but not limited to, source and destination IP:ports, a datagram packet header, and a checksum 603, plus optional channel coding 406 could be included in a packet comprising a message 208 sent by module 101 at a step 1006 and other messages 208 illustrated in FIG. 10. In an exemplary embodiment, the second subset of cryptographic parameters 126*a* in a step 1006 in FIG. 10 may not be encrypted and can also be sent as plaintext within a message 208. In general, where the use of encrypted data in the form of a module encrypted data 403 or server encrypted data 504 is illustrated in various Figures, including FIG. 10, the present invention contemplates that encryption may also be optionally omitted at the network layer and application layer and the data can be communicated as plaintext in these layers (but encryption could be performed at the data-link layer, such as ciphering data over a public wireless network 102). In an exemplary embodiment, module 101 can also use forward error correction at a step 1006, or other steps illustrated in FIG. 10 and related Figures where a module 101 sends data, such that a module 101 can send multiple copies of the same or equivalent datagram comprising a message 208 in order to increase the probability that a server 105 or set of servers 1010 receives at least one datagram comprising a message 208.

At a step 709 or a step 316 in FIG. 10, a module 101 can derive a new module public key 111 and a new module private key 112 using the parameters 126 negotiated or communicated between steps 607 and 1006. A step 316 in FIG. 10 can include the use of an eUICC 163 for module 101, and a step 709 for FIG. 10 can include embodiments that do not depend on the presence of an eUICC 163. The use of a step 709 is depicted and described in connection with FIG. 7 above. Although the text for a step 709 is depicted in FIG. 7 as "Module Derives 2nd Public Key 111 and 2nd Private Key 112 Pair, using 3rd Parameters 126", in the context of FIG. 10, the second key pair would be derived using the second set of parameters 126 negotiated between steps 607 and 1006. In other words, the set of cryptographic parameters 126 used for a step 709 either in FIG. 7 or FIG. 10 can comprise the most recent set of cryptographic parameters communicated between a module 101 and a server 105. The module 101 PKI key pair resulting from a step 709 could comprise either a module PKI key pair that uses either ECC algorithms 154 or RSA algorithm 153. The key lengths and other parameters for a module 101 to process the module 101 PKI key pairs can be specified in the set of cryptographic parameters 126 negotiated or communicated between steps 607 and 1006.

At a step 709 in FIG. 10, the module 101 could use a set of key pair generation algorithms 141*e* in a set of cryptographic algorithms 141*a* in order to derive a second module private key 112 and a corresponding second module public key 111. The first module public key 111 can be previously used in a step 1002 and the first module private key 112 can be previously used in a step 1004, although these first module 101 PKI keys could also be used in communication that is not shown (i) after a step 1004 within FIG. 10 (such as the case where an extended period of time transpired between step 1004 and step 709 in FIG. 10), and (ii) before a step 709 in FIG. 10. A module 101 could determine that new module 101 PKI keys are preferred or desirable for many reasons before or upon a step 709, including the receipt of new cryptographic parameters 126 in a step 607, the transfer of ownership or control of module 101, the opening of an enclosure for a module 101 where the first module private key 112 could be compromised, the receipt of a module instruction 502 of "derive new keys", and other reasons exist as well.

In the embodiments where either (i) an eUICC 163 is used by a module 101 to record a derived module private key 112 and a derived module public key 111, and/or (ii) module 101 and a wireless network 102 derive a shared secret key network key K 129*d*, a step 316 in FIG. 10 could comprise the activation of a received eUICC profile 311, or similarly the derivation of a module PKI key pair 315 for an activated eUICC profile 313. The received eUICC profile 311 activated in a step 316 in FIG. 10 could be received by a module 101 in a step 607 above. At a step 316 in FIG. 10, a module 101 could use a step 316 as depicted and described in connection with a step 316 in FIG. 9*b*, FIG. 7, and FIG. 5*b*, and FIG. 3*b*. A module 101 could derive a new module private key 112 and a new module public key 111 at a step 316 using (i) a set of cryptographic algorithms 141, (ii) a set of cryptographic parameters 126 or 126*a* (and the set of cryptographic parameters 126*a* could be recorded in a receiving eUICC profile 311 being activated in a step 316 in FIG. 10), (iii) a key pair generation algorithm 141*e*, and (iv) a random number generator 128. The derived module private key 112 and module public key 111 could be recorded in memory at a step 316 for further processing in additional subsequent steps.

At a step 710 within FIG. 10, the module 101 can send a message 208 that includes the second module public key 111 derived at a step 709. The terminology depicted for a message 208 at a step 710 of "208:110:403: 2nd 111*a*: 2nd 111" can refer from left to right as the structure for an exemplary message 208 illustrated in FIG. 6, with a message 208 containing a module identity 110 and a module encrypted data 403, where the second module public key identity 111*a* and second module public key 111 could be inside the module encrypted data 403. In exemplary embodiments, the module public key identity 111*a* could optionally be omitted in a step 710 and the data within a message 208 could also optionally be sent as plaintext. In the embodiment where module 101 sends a message 208 with the derived module public key 111 at a step 710 and also encrypts the module public key 111 in a module encrypted data 403, the symmetric key 127 used with a symmetric ciphering algorithm 141*b* could be communicated between module 101 and a set of servers 1010 in a prior communication, such as, but not limited to, the transfers of a symmetric key 127 in a step 1004. Also, although a single instance of the transfer of a symmetric key 127 in a step 1004 is illustrated in FIG. 10, over time multiple different symmetric keys 127 could be communicated between a module 101 and a set of servers 1010 using a step 1004 or similar secure transfer, before module 101 sends the derived, second module public key 111 in a step 710. In an exemplary embodiment, module 101 could use the most recent symmetric key 127 communicated between module 101 and a set of servers 1010 in order to send a module encrypted data 403 with the derived, second module public key 111 at a step 710 in FIG. 10.

As illustrated in FIG. 10, a step 516 from FIG. 5*b* could also be utilized in FIG. 10 for a module 101 to send the second module public key 111 or a key K module token 1103. In the embodiments where either (i) an eUICC 163 is used by a module 101 to record a derived module private key 112 and a derived module public key 111, or (ii) module 101 and a wireless network 102 derive a shared secret key network key K 129*d*, a step 516 in FIG. 10 could comprise the module 101 sending a key K module token 1103 within a message 208, where a key K module token 1103 is depicted and described in connection with FIG. 11 below. A key K module token 1103 could comprise the module public key 111 or could comprise other data for a wireless network 102 or MNO 108 to derive a secret shared network key K 129d, using a network key K derivation algorithm 1101 illustrated in FIG. 11.

In an exemplary embodiment, the derived, second module public key 111 in a step 709 of FIG. 10 could be sent outside the module encrypted data 403 (such as plaintext) in a message 208 at a step 710, but module encrypted data 403 could be used with the message 208 for either (i) sending other potentially sensitive data along with the module public key 111, such as, but not limited to, cryptographic parameters 126, or (ii) sending encrypted data using a symmetric key 127 such that a server 105 or set of servers 1010 could verify that module 101 has access to the symmetric key 127. Thus, the module encrypted data 403 in a message 208 at a step 710 could be used to authenticate or verify that the module public key 111 received in a message 208 properly belongs to a module 101 with a module identity 110. In other words, the proper processing of a module encrypted data 403 using a symmetric key 127 in a message 208 at step 710 can prevent imposters or the fraudulent submission of a module public key 111 in a step 710.

Note that a step 710 as depicted and described in connection with FIG. 7 includes the authentication of the derived, second module public key 111, and a step 710 in FIG. 10 can also include the steps for a module 101 to authoritatively send the derived, second module public key 111. For the embodiment where a server 105 uses a first module public key 111 (possibly from a step 1002) to authenticate a derived, second module public key 111 from a step 710, a server 105 that did not previously have or record the first module public key 111 could use the module identity 110 query other servers such as, but not limited to, a shared module database 105k, a certificate authority 118, or a mobile network operator 108 in order to obtain the first module public key 111 to authenticate or verify the derived, second module public key 112 received in a step 710.

The module identity 110 in a message 208 at a step 710 could be sent as an encrypted module identity 110a, such that the module identity 110 is ciphered or obfuscated. A module 101 could use a secret ciphering algorithm ciphering 162 or other techniques such as a symmetric ciphering algorithm 141b in order to send the module identity 110 as an encrypted module identity 110a. For and embodiment where module 101 sends module identity 110 as an encrypted module identity 110a where the encrypted module identity 110a is ciphered using a symmetric ciphering algorithm 141b, a key such as a symmetric key 127 to encrypt the module identity 110 into an encrypted module identity 110a could be communicated at a prior step such as, but not limited to, a step 1004. In general, the present invention contemplates that an encrypted module identity 110a can be used in place of a module identity 110 in Figures where a module 101 is depicted and described as sending a module identity 110.

The message 208 in a step 710 in FIG. 10, as received by a server 105 can include a second source IP:port 210:605 that is different than the first source IP:port in a message 208 at a step 1001. The source IP:port 210:605 could change reasons including, but not limited to, (i) firewall 104 operating as a NAT firewall changes port bindings over time, (ii) the packets from module 101 to a set of servers 1010 route through different firewalls 104 over time, such as module 101 connecting to different networks 102 over time and a first network 102 is used by module 101 in a step 1001 and a second network 102 is used by a module 101 in a step 710, and (iii) a module 101 could use a different source IP:port number 204 for a step 1001 and a step 710. The present invention contemplates that module 101 can use a different source IP:port for sending the various messages 208 depicted and described in various Figures throughout the present invention (an correspondingly use the different IP:port numbers to receive various responses 209 to the message 208). The IP address 202 for a module 101 to use in an IP:port number 204 can change over time, such as if a module 101 uses different networks 102 for sending messages 208 over time.

Although a message 208 at a step 710 in a FIG. 10 depicts a module 101 sending the message 208 at a step 710 to a server 105 within a set of servers 1010, a module 101 can send the message 208 at a step 710 to a different server than the server 105 illustrated in FIG. 10. In other words, according to exemplary embodiments, a module 101 can send any of the messages 208 depicted in various Figures to different servers 105 over time, and the different servers 105 could communicate with other servers 105 such that the multiple servers 105 operate in a coordinated manner using a network, and the multiple servers 105 could function as a set of servers 1010. As one example, the first message 208 in a step 1001 could be sent to a first server 105, and the message 208 in a step 710 could be sent to a second server 105. The use of different servers 105 for a module 101 to send a message 208 could be identified by the use of a different destination IP address within the message 208. Other possibilities exist as well for the use of multiple servers 105 in a set of servers 1010 without departing from the scope of the present invention.

At a step 1007, after completing of a step 710 in FIG. 10, a server 105 or set of servers 1010 can record the new, authenticated second module public key 111 with other servers illustrated. The data recorded by a server 105 could include the module identity 110, a module public key identity 111a, and a second module public key 111, plus an additional, optional subset of cryptographic parameters 126a. The data recorded by a server 105 in a step 1007 could be in the form of a certificate 122. In this manner, the second module public key 111, possibly in the form of a certificate 122, can be made available to other servers 105 within a set of servers 1010 over time, and the other servers 105 could also use the subset of cryptographic parameters 126a in order to securely communicate with a module 101. The use of a step 1007 could also result in the second module public key 111 (with associated data such as a certificate 122, module identity 110, module public key identity 111a, and a subset of cryptographic parameters 126a for the second module public key 111) being made available to other servers outside of the set of servers 1010, such as a server 105 belonging to a different MNO 108 than a MNO 108 operating the set of servers 1010. Note that a step 1007 could be optionally omitted, and a set of servers 1010 could record the second module public key 111 internally, and the second module public key 111 could also be kept confidential and not shared with other servers, thereby further increasing the security of a system 100 and other systems illustrated herein.

At a step 1008, after sending a message 208 (which could comprise the message 208 in step 710 in FIG. 10, or could comprise a different message 208 after a step 710 where the different message 208 after a step 710 is not illustrated in FIG. 10), module 101 could receive a response 209 that includes a second symmetric key 127 that is ciphered using an asymmetric ciphering algorithm 141a. The response 209 in a step 1008 could include a server encrypted data 504. The server encrypted data 504 in a response 209 for a step 1008 that includes a second symmetric key 127 could be ciphered using the derived, authenticated, second module public key 111 sent by module 101 in a step 710. At a step 1008 the module 101 can decipher the server encrypted data 504 containing the second symmetric key 127 using the derived, second module private key 112 and an asymmetric ciphering algorithm 141a. A module 101 can use the second subset of cryptographic parameters 126a from a step 1006 with an asymmetric ciphering algorithm 141a in order to (i) decrypt the server encrypted data 504 received in a step 1008, and (ii) read the plaintext second symmetric key 127. An exemplary datagram 601a that includes a symmetric key 127 within an encrypted data that uses asymmetric ciphering 141a is illustrated in element 701a of FIG. 7 of U.S. patent application Ser. No. 14/039,401, filed Sep. 27, 2013 in the name of John Nix, which is hereby incorporated by reference in its entirety. Note that in a step 1008, although the set of servers 105 are illustrated as sending the second symmetric key 127 in a response 209, the module 101 could alternatively send the second symmetric key 127 in a message 208, where the second symmetric key 127 could be within a module encrypted data 403 that is ciphered with an asymmetric ciphering algorithm 141a and the server public key 114 and also uses the second subset of cryptographic parameters 126 from a step 1006.

In another embodiment, a module 101 and a set of servers 1010 could conduct a key exchange such as Diffie Hellman, ANSI-X.9.63 160, or ECDH 159 in a step 1008 instead of transmitting and/or receiving the full second symmetric key 127. The key exchange could involve sending numbers or values, possibly including a random number 128a or a RAND 912, instead of the actual symmetric key 127, and a key derivation function 141f could be used with the numbers or values sent to derive a shared secret key 129b. The shared secret key 129b could comprise the second symmetric key 127 for a step 1008 and a step 1009. As contemplated herein, in Figures such as FIG. 10 where a symmetric key 127 is illustrated as communicated between two nodes, instead of a symmetric key 127 being directly communicated, values for a key derivation function 141f could communicated as a proxy for the symmetric keys 127 illustrated, and the nodes can use the values with a key derivation function 141f to determine the symmetric key 127. In other words, in various figures illustrated herein, where a symmetric key 127 is illustrated as communicated, values to determine a shared symmetric key 127 could be communicated instead, such as values input into a key derivation function 141f in order to output a derived shared secret key 129b that could comprise a symmetric key 127. As contemplated herein, the term "establish a symmetric key" can comprise either (i) sending or receiving the symmetric key 127 using an asymmetric ciphering algorithm 141a and PKI keys, or (ii) sending or receiving data for a key derivation function 141f such that a symmetric key 127 (possibly in the form of a derived shared key 129b) could be determined from the data sent or received for the key derivation function 141f.

At a step 1009, a module 101 can send a message 208 that includes a module encrypted data 403, where the module encrypted data 403 is ciphered using the second symmetric key 127. The second symmetric key 127 (or values for a key derivation function 141f to determine the second symmetric key 127) could be sent or received in a prior step 1008. The module encrypted data 403 using the second symmetric key 127 could include a server instruction 414, sensor data 305, a timestamp 604, and a security token 401. Security token 401 and timestamp 604 can prevent replay attacks. If a timestamp 604 is included in a module encrypted data 403, then a security token 401 could optionally be omitted in a step 1009. The message 208 in a step 1009 could contain data for a message 208 as depicted and described in connection with FIG. 6. The module identity 110 could comprise an encrypted module identity 110a, although the module identity 110 could also be sent as plaintext or as a session identity such that the session identity (or temporary module identity 110) within a message 208 at a step 1009 can change over time but also be uniquely associated with a module identity 110 persistently associated with a module 101.

FIG. 11

FIG. 11 is a graphical illustration for a module and a network to mutually derive a shared secret key K, in accordance with exemplary embodiments. As described in FIG. 9b, exemplary embodiments of the present invention can utilize a combination of an embedded UICC 163 with a module 101's derivation of a module private key 112 and module public key 111 in order to obtain a shared secret network key K 129d, such that shared secret network key K 129d can be utilized with existing and/or legacy mobile network operator infrastructure, including at least one of a plurality of wireless networks 102. The shared secret network key K 129d depicted and described in this FIG. 11 could comprise the shared secret key K used by a module 101 to authenticate and encrypt/decrypt data with a PLMN such as, but not limited to, mobile network operator networks of AT&T® and Verizon® that utilize LTE wireless WAN technology in 2013, and future networks as well that utilize a shared secret key K.

The eUICC 163 in a module 101 illustrated in FIG. 1c could utilize a plurality of received eUICC profiles 311 in order to connect with multiple different wireless networks 102 without roaming (i.e. use an activated eUICC profile 313 with a corresponding activated MNO network access credentials 314 for different wireless networks 102 that a module 101 connects with). An activated eUICC profile 313 could be utilized to connect with several different base stations 103 across a wide geographical area that are associated with the same mobile network operator 108. A different connection to a second wireless network 102 could be associated with a different mobile network operator 108 that utilizes different network access credentials 314 for a different activated eUICC profile 313.

As illustrated in FIG. 11, a module 101 could utilize a module key K derivation algorithm 909 in order to derive a secret shared network key K 129d in order connect and/or authenticate with a wireless network 102 operated by a mobile network operator 108, and the wireless network 102 could utilize a network key K derivation algorithm 1101 in order to share a common key K and support communication with a module 101. In this manner, a module 101 can utilize an eUICC 163 to share a key K with a network 102 without requiring (i) the physical distribution of a shared secret key K as specified and contemplated in current ETSI standards as of 2013, such as contemplated in 3GPP TS 33.401 V12.9.0 and related standards for a physical SIM or UICC or (ii) the electronic distribution of a shared secret key K as contemplated in ETSI TS 103 383 V12.0.0 and related standards for an eUICC. Future modules 101, wireless networks 102, and MNOs 108 could incorporate or support the internal derivation of a secret shared network key K 129d in order for a module 101 and a mobile network operator 108 to obtain the same shared key K without requiring the electronic transmission or physical distribution of a shared secret key K.

A module key K derivation algorithm 909 can comprise a series of steps and logic to input at least (i) a derived module private key 1102, and (ii) a key K network token 1102 and output at least a derived secret shared network key K 129d. The format and/or data for a key K network token 1102 as one input into a key derivation function 141f within a module key K derivation algorithm 909 can depend on the key derivation function 141f and embodiments for a key K network token 1102, which are described below. The secret shared network key 129d can be fully compatible with existing and/or future mobile network standards that utilize a shared secret key K, such that module 101 and MNO 108 could use the mutually derived secret shared network key K 129d for all necessary steps in order to establish authenticated and secured communication with a wireless network 102.

A subset of the steps for using conventional technology with a key K in both authentication of a module 101 and deriving session keys for encryption are depicted and described in connection with FIG. 9b, including (i) a step 910 of processing a RES 913 in response to a RAND 912 received by module 101, (ii) a step 911 of deriving a cipher key CK 914 using the RAND 912 and the derived secret shared network key K 129d, and also (iii) deriving additional keys using the RAND 912 and a key K, such as, but not limited to, values for an integrity key (IK), Kasme, Knasenc, Knasint, Kenb, and/or Kupenc. In other words, conventional technology contemplated using a pre-shared secret key K for the various steps listed in the prior sentence, but the present invention contemplates using a mutually derived secret shared network key K 129d in order to perform the same steps (and thus the present invention supports widely deployed wireless networks 102 and also future planned networks that continue to use a key K). In the present invention, a derived secret shared network key K 129d could be used to process or derive additional keys using a RAND 912, such as using a step 911 in FIG. 9b. The derived additional keys could comprise symmetric keys 127 for use with symmetric ciphering algorithms 141b such as, but not limited to, an AES 155 ciphering. A module 101 could also use derived secret shared network key K 129d illustrated in a module key K derivation algorithm 909 with future wireless networks 102 that utilize different symmetric keys 127 than those listed above within this paragraph, where the different symmetric keys 127 are also derived from a shared secret key K.

The derived module private key 112 used for input by a module 101 in a module key K derivation algorithm 909 can be derived using a step 515 as depicted and described in connection with FIG. 5b and/or FIG. 7, or a profile activation step 316 as depicted and described in connection with FIG. 3b, FIG. 5b, and/or FIG. 7. Module 101 could use at least a set of cryptographic algorithms 141, a key pair generation algorithm 141e, a random number generator 128, and a set of cryptographic parameters 126 to process or derive the module private key 112. Although not illustrated in FIG. 11, module 101 could also derive a corresponding module public key 111 as well. The derived module private key 112 could utilize or be associated with an RSA algorithm 153 or an ECC algorithm 154, and the use of a set of cryptographic algorithms 141 for a module private key 112 can be specified in the set of cryptographic parameters 126 or a subset of cryptographic parameters 126a. An exemplary set of cryptographic parameters 126 and an exemplary subset of cryptographic parameters 126a are depicted and described in connection with FIG. 1i and additional Figures herein. The subset of cryptographic parameters 126a illustrated in FIG. 11 could comprise a set of cryptographic parameters 126. An exemplary set of cryptographic algorithms 141, including a key derivation function 141f, are depicted and described in connection with FIG. 1d, FIG. 1i, and other Figures herein.

In exemplary embodiments, including the embodiments illustrated in FIG. 11, the set of cryptographic parameters 126 for a key derivation function 141f in a module key K derivation algorithm 909 could be recorded in a received eUICC profile 311. Alternatively, the set of cryptographic parameters 126 could be recorded in an eUICC 163, or the set of cryptographic parameters 126 could be shared between a received eUICC profile 311 and an eUICC 163. The set of cryptographic algorithms 141, including (i) a key pair generation algorithms 141e used to process the module private key 112 in FIG. 11, and (ii) a key derivation function 141f used in algorithm 909 in FIG. 11, could be recorded in an eUICC 163, or a module program 101i, or shared between an eUICC 163 and a module program 101i. In exemplary embodiments, (i) the set of cryptographic algorithms 141, including key pair generation algorithms 141e and key derivation function 141f, (ii) the eUICC 163, (iii) the set of cryptographic parameters 126, and (iv) module key K derivation algorithm 909 can be recorded in a nonvolatile memory, such as, but not limited to, a nonvolatile memory 101w. In this manner, module 101 can store the algorithms and values when the module 101 is in a dormant or powered-off state. Other possibilities exist as well without departing from the scope of the present invention for the use and location of a set of cryptographic parameters 126 and a set of cryptographic algorithms 141 for (i) deriving a module private key 112 for a module 101 and (ii) utilizing a module key K derivation algorithm 909, without departing from the scope of the present invention.

As illustrated in FIG. 11, the derived module private key 112 and key K network token 1102 can be input into a key derivation function 141f. The key derivation function 141f can use a subset of cryptographic parameters 126a and the inputs in order to output a derived shared secret key 129b. The use and function of a key derivation function 141f, as well as a derived shared secret key 129b is also depicted and described in connection with FIG. 1d above. A key derivation function 141f in a module key K derivation algorithm 909 could comprise any of (i) a Diffie-Hellman key exchange, (ii) an ANSI-X.9.63 160 key derivation where an ECC algorithm is used with derived module private key 112, (iii) an ECDH 159 key derivation when an ECC algorithm is used with derived module private key 112, (iv) an ANSI-X.9.42 key derivation, or (v) similar and related algorithms for the derivation of a shared secret key 129b using a private key and a subset of cryptographic parameters 126a.

For an embodiment illustrated in FIG. 11, a key derivation function 141f could use a Diffie-Hellman key exchange where the subset of cryptographic parameters 126a includes a multiplicative group of integers modulo p, where p is prime, and g is a primitive root mod p. In exemplary embodiments, p can be sufficiently large, such as, but not limited to, and exemplary prime number of at least 250 digits, and g can be a small number, such as, but not limited to, the number 5. In this embodiment where a key derivation function 141f within a module key K derivation algorithm 909 uses a Diffie-Hellman key exchange, the key K network token 1102 could comprise a value received from network 102 associated with network private key 165a. In a Diffie-Hellman key exchange, key K network token 1102 could comprise a value equal to g^b mod p, where b equals the network private key 165a. Key K network token 1102 could be received by module 101 from network 102 either (i) after an authentication step 907 in FIG. 9b using an initial key K 325, or (ii) key K network token 1102 could be recorded within a received eUICC profile 311 and module 101 could receive key K network token 1102 via a system bus 101d. Key K network token 1102 could also be received by module 101 in other steps as well, such as, but not limited to, a step 519, a step 607, and/or a step 707. As noted above in this FIG. 11, the subset of cryptographic parameters 126a of p, g for a Diffie-Hellman key exchange can also be written to a received eUICC profile 311.

For another embodiment illustrated in FIG. 11, a key derivation function 141f could use an ECDH 159 key exchange with elliptic curve cryptography, where the subset of cryptographic parameters 126a includes a common base point G. An ECDH 159 with common base point G is also described in FIG. 1d. For this embodiment of a key derivation function 141f in a module key K derivation algorithm 909, module private key 111 and module public key 112 could comprise keys processed with an ECC algorithm 154, and module 101 could likewise derive the module PKI keys using a step 515 or a step 316. Key K network token 1102 could comprise a network public key 165b. The network private key 165a and network public key 165b could also be processed with an ECC algorithm 154 using the same or equivalent elliptic curve as module PKI keys. Key K network token 1102 could be received by module 101 from network 102 either (i) after an authentication step 907 using initial key K 325, or (ii) key K network token 1102 could be recorded within a received eUICC profile 311 and module 101 could receive key K network token 1102 via a system bus 101d. Key K network token 1102 could also be received by module 101 in other steps as well, such as, but not limited to, a step 519, a step 607, and/or a step 707

Other possibilities exist as well for the use of a key derivation function 141f and a subset of cryptographic parameters 126a within a module key K derivation algorithm 909 without departing from the scope of the present invention. Note a key exchange or a key derivation algorithm 141f other than (i) Diffie Hellman and/or (ii) ECDH 159 could utilize a different subset of cryptographic parameters 126a. For embodiments where a different algorithm than Diffie Hellman or ECDH 159 is utilized for a key derivation function 141f in a module key K derivation algorithm 909, then (i) a different subset of cryptographic parameters 126a and (ii) different or additional data than that depicted in FIG. 11 could be utilized as well. With a different algorithm for a key derivation function 141f used in a module key K derivation algorithm 909, in exemplary embodiments the key derivation function 141f could utilize as a minimum input of a derived module private key 112 and a key K network token 1102. Key K network token 1102 for this alternative embodiment could represent data for the key derivation function 141f that is different than the exemplary values for a key K network token 1102 described above with Diffi-Hellman or ECDH 159 for the key derivation function 141f.

In an exemplary embodiment, the use of a module private key 112 input into a key derivation function 141f within a module key K derivation algorithm 909 could be optionally omitted, and the derived shared secret key 129b within a module key K derivation algorithm 909 could comprise a shared secret key 129c processed with a shared secret algorithm 141g, using a set of component parameters 101t. As noted above in connection with FIG. 1f and FIG. 1g, a shared secret key 129c can be derived without input of data from a network 102 into the shared secret algorithm 141g, and thus in an exemplary embodiment module 101 could calculate a derived shared secret key 129b within a module key K derivation algorithm 909 without inputting data received from wireless network 102 into the key derivation function 141f. In other words, module 101 could use a shared secret key 129c as a derived shared secret key 129b in order to derive a shared secret network key K 129d without receiving data from wireless network 102. An algorithm token 190 for use with a shared secret algorithm 141g in a module key K derivation algorithm 909 can be included in a subset of cryptographic parameters 126a.

In preferred embodiments, a module key K derivation algorithm 909 and a network key K derivation algorithm 1101 can utilize the same or related key derivation functions 141f and the same or related subsets of cryptographic parameters 126a in order to obtain the same or equal value for the derived shared secret key 129b. In another embodiment, a key K network token 1102 for the key derivation function 141f that is different than Diffi Hellman or ECDH 159 could comprise a shared secret key 129c processed with a shared secret algorithm 141g, using a set of component parameters 101t.

In an exemplary embodiment, module 101 could derive a first module private key 112, where the first module private key 112 may optionally not be associated with a corresponding module public key 111. For this exemplary embodiment, module 101 could optionally derive a second module private key 112 that is associated with a corresponding module public key 111, and the second module private key 112 and corresponding module public key 111 could comprise a module PKI key pair 315. The derivation of a module PKI key pair 315 could optionally be omitted and still utilize the module key K derivation algorithm 909 illustrated in FIG. 11. The first module private key 112 that is not associated with a corresponding module public key 111 could be utilized as the derived module private key 112 input into a key derivation function 141f within a module key K derivation algorithm 909. In this embodiment where the first module private key 112 that is not associated with a corresponding module public key 111 is utilized in a module key K derivation algorithm 909, then key K module token 1103 below in a network key K derivation algorithm 1101 can be data associated with the first module private key 112 as described in this paragraph as opposed to a first module public key 111 (since the first module public key 111 can be optionally omitted).

The output of a key derivation function 141f in a module key K derivation algorithm 909 can be a number comprising a derived shared secret key 129b, which is also depicted and described in connection with FIG. 1d and FIG. 1c. In exemplary embodiments, the use of a key derivation function 141f such as, but not limited to, a Diffie Hellman key exchange or ECDH 159, can output a key that is a different length than a key K for a wireless network 102 (or key Ki for use with 3G networks). As currently specified in ETSI/3GPP standards for LTE networks, the shared secret key K, (i) recorded in a SIM or UICC, and a MNO 108 HSS, and (ii) described in 3GPP TS 33.401 V12.9.0 and related standards, comprises a random number with a length of 128 bits. The length of key K for standards-based wireless networks 102 may be extended in the future. The use of shared secret key K for authentication of a module 101, and also for ciphering and data integrity, with a wireless network 102 that implements ETSI and/or 3GPP standards is also defined in the specifications ETSI TS 135 205-209 and related standards.

A key processing algorithm 141*i* within a module key K derivation algorithm 909 can (i) use as input the output of the key derivation function 141*f* in the form of a derived shared secret key 129*b*, and (ii) transform the derived shared secret key 129*b* into a number that is 128 bits in length (or other key lengths for key K supported by wireless network 102). In an exemplary embodiment, (i) the length of derived module private key 112, (ii) the length of parameters 126*a*, and (iii) an algorithm for key derivation function 141*f* in a module key K derivation algorithm 909 are selected such that the length of derived shared secret key 129*b* can be greater than the length of key K specified for wireless network 102. In this embodiment, the key processing algorithm 141*i* can take steps to (i) truncate derived shared secret key 129*b*, (ii) select a subset of bits within derived shared secret key 129*b*, and/or (iii) take steps to securely and/or randomly reduce the size of derived shared secret key 129*b* to match the key length of key K specified for wireless network 102. In exemplary embodiments, the key processing algorithm 141*i* within a module key K derivation algorithm 909 (or at least cryptographic parameters 126 for the key processing algorithm 141*i* in a module key K derivation algorithm 909) can be included in a received eUICC profile 311.

For embodiments where the derived shared secret key 129*b* in a module key K derivation algorithm 909 can be less than the key length of key K specified for wireless network 102, then key processing algorithm 141*i* can perform a key lengthening function, such as, but not limited to, using a secure hash algorithm 141*c* with input of at least the derived shared secret key 129*b*. The secure hash algorithm 141*c* could be selected such that the length of output of the secure hash algorithm 141*c* matches the length of key K specified for wireless network 102. The secure hash algorithm 141*c* for use in a module key K derivation algorithm 909 could be specified in a set of cryptographic parameters 126. Other possibilities exist as well for a key processing algorithm 141*i* to lengthen a derived shared secret key 129*b* without departing from the scope of the present invention.

In an exemplary embodiment where the length of key K specified for wireless network 102 in the future equals 256 bits, key processing algorithm 141*i* could comprise an SHA-256 156 algorithm, such that the output of key processing algorithm 141*i* comprises a number with 256 bits in length, with input using a derived shared secret key 129*b* that could comprise a number less than, equal to, or greater than a length of 256 bits, and other possibilities for a key processing algorithm 141*i* exists as well. In exemplary embodiments, key processing algorithm 141*i* includes a secure hash algorithm 141*c*, such that the derived shared secret key 129*b* in a module key K derivation algorithm 909 is input into the secure hash algorithm 141*c*. Although not illustrated in FIG. 1*d* above, a key processing algorithm 141*i* could be included in a set of cryptographic algorithms 141.

As depicted in FIG. 11, the output of key processing algorithm 141*i* within a module key K derivation algorithm 909 can comprise a shared secret network key K 129*d*. A shared secret network key K 129*d* is also described in a step 909 depicted and described in connection with FIG. 9*b*. Upon deriving the shared secret network key K 129*d*, module 101 could record the value in either an activated eUICC profile 313 or also possibly a received eUICC profile 311 (where the received eUICC profile 311 is not activated) within an eUICC 163. A wireless network 102 could utilize a network key K derivation algorithm 1101 in order to securely obtain the same value for shared secret network key K 129*d*. Module 101 and/or an eUICC 163 could then utilize the shared secret network key K 129*d* to connect with and/or authenticate with a wireless network 102 using the steps 910 and 911 depicted and described in connection with FIG. 9*b*. In exemplary embodiments, module 101 and wireless network 102 could utilize the shared secret network key K 129*d* with the algorithms specified in ETSI TS 135 205-209, as well as subsequent and related standards, in order for module 101 to authenticate and/or connect with wireless network 102. Other possibilities exist as well without departing from the scope of the present invention.

A network key K derivation algorithm 1101 can be used by a wireless network 102 in order to derive a secret shared network key K 129*d* that is the same or equals the derived secret shared network key K 129*d* processed by a module 101 using a module key K derivation algorithm 909. In this manner, wireless network 102 and module 101 can both utilize the same, derived secret shared network key K 129*d* for communication. The commonly shared secret shared network key K 129*d* can be used by both module 101 and wireless network 102/mobile network operator 108 for (i) authentication and (i) the subsequent derivation of additional symmetric keys 127, where the additional symmetric keys 127 could be derived from a key derivation function 141*f* (where a key derivation function 141*f* would be used to derive symmetric keys 127 in the form of derived shared secret keys 129*b* in a manner illustrated in FIG. 1*d* that can be different than the use of a key derivation function 141*f* illustrated in FIG. 11).

A server 105 as depicted and described in connection with FIG. 1*k* and FIG. 1*m* could reside in the network for a mobile network operator 108, where the wireless network 102 as illustrated in FIG. 1*a* could comprise a radio access segment for the mobile network operator 108. The server 105 could also be part of a set of servers 1010, and the set of servers 1010 could also be within a network for a mobile network operator. The server 105 or set of servers 1010 could utilize the components depicted and described in connection with FIG. 1*k* and FIG. 1*m* in order to process and/or perform a network key K derivation algorithm 1101, including using (i) a storage 105*m* to record the key derivation function 141*f* and associated cryptographic parameters 126, (ii) a processor 105*b* to perform calculations in order to implement the key derivation function 141*f*, (iii) a system bus 105*d* in order to move data from storage into a RAM 105*e* for further processing, (iv) a physical interface 105*a* such as Ethernet to send and receive data, and (v) a module database 105*k* to record a network module identity 101*b* and a shared secret network key K 129*d* for each of a plurality of modules 101 that could connect to a wireless network 102. In exemplary embodiments, a home subscriber server (HSS) within an LTE network and subsequent, related networks including wireless networks based on LTE Advanced could operate or process a network key K derivation algorithm 1101, and the HSS could also function as a server 105 or a set of servers 1010 as contemplated herein.

A network key K derivation algorithm 1101 operating on a server 105, HSS, and/or set of servers 1010 can include a key derivation function 141*f* and a key processing algorithm 141*i*. The key derivation function 141*f* within a network key K derivation algorithm 1101 can be equivalent or the same algorithm as a key derivation function 141*f* used within a module key K derivation algorithm 909, as depicted and described in connection with this FIG. 11 above. As illustrated in FIG. 11, (i) a network private key 165*a* and (ii) a module key K token 1103 can be input into a key derivation function 141*f* within a network key K derivation algorithm 1101. The key derivation function 141*f* can use a subset of cryptographic parameters 126a and the input in order to output a derived shared secret key 129b. For an embodiment illustrated in FIG. 11, a key derivation function 141f in a network key K derivation algorithm 1101 could use a Diffie-Hellman key exchange where the subset of cryptographic parameters 126a includes a multiplicative group of integers modulo p, where p is prime, and g is a primitive root mod p. In this embodiment where a key derivation function 141f within a network key K derivation algorithm 1101 uses a Diffie-Hellman key exchange (or similar key exchange protocols), the key K module token 1103 could comprise a value received from module 101 associated with module private key 112. The set of servers 1010 could receive the key K module token 1103 in a step 908 in FIG. 9b or a step 516 in FIG. 5b, and other possibilities exist as well for a server 1010 to receive the key K module token 1103.

In a Diffie-Hellman key exchange for a key derivation function 141f within a network key K derivation algorithm 1101, key K module token 1103 could comprise a value equal to g^a mod p, where a equals the module private key 112. Key K module token 1103 could be received from module 101 after an authentication step 907 using initial key K 325, and other possibilities exist as well without departing from the scope of the present invention. The subset of cryptographic parameters 126a of p, g for a Diffie-Hellman key exchange with a module 101 using a network module identity 101b can also be written to a module database 105k and also the received eUICC profile 311. In exemplary embodiments, a module database 105k can also record a plurality of received eUICC profiles 311 for a plurality of modules 101, where each module 101 uses either module identity 110 or network module identity 101b. In exemplary embodiments a different subset of cryptographic parameters 126a for a key derivation function 141f in a network key K derivation algorithm 1101 can be used for each module 101 in order to increase security.

For another embodiment illustrated in FIG. 11, a key derivation function 141f could use an ECDH 159 key exchange with elliptic curve cryptography, where the subset of cryptographic parameters 126a includes a common base point G. For this embodiment where a key derivation function 141f in a network key K derivation algorithm 1101 comprises an ECDH 159 key exchange, network private key 165a and network public key 165b could comprise keys processed with an ECC algorithm 154. A server 105 or set of servers 1010 could derive the network private key 165a and network public key 165b using a key pair generation algorithm 141e. Key K module token 1103 could comprise a module public key 111, where the module private key 112 and module public key 111 could also be processed with an ECC algorithm 154 using the same or elliptic curve as the network PKI keys 165a and 165b. Key K module token 1103, in the form of a module public key 111 with an ECDH 159 for a key derivation function 141f in a network key K derivation algorithm 1101, could be received from module 101 after an authentication step 907 using an initial key K 325. Other possibilities exist as well for the use of a key derivation function 141f, key K module token 1103, and a subset of cryptographic parameters 126a both (i) within a network key K derivation algorithm 1101 and (ii) to derive a shared secret network key K 129d without departing from the scope of the present invention.

In an exemplary embodiment, the use of a network private key 165a input into a key derivation function 141f within a network key K derivation algorithm 1101 could be optionally omitted, and the derived shared secret key 129b within a network key K derivation algorithm 1101 could comprise a shared secret key 129c processed with a shared secret algorithm 141g, using a set of component parameters 101t. As noted above in connection with FIG. 1f and FIG. 1g, a shared secret key 129c can be derived without input of data from a module 101 into the shared secret algorithm 141g, and thus in an exemplary embodiment MNO 108 could calculate a derived shared secret key 129b within a network key K derivation algorithm 1101 without inputting data received from module 101 into the key derivation function 141f. In other words, MNO 108 (using a server 105) could use a shared secret key 129c as a derived shared secret key 129b in a network key K derivation algorithm 1101 in order to derive a shared secret network key K 129d without receiving data from module 101. An algorithm token 190 for use with a shared secret algorithm 141g in a network key K derivation algorithm 1101 can be included in a subset of cryptographic parameters 126a, and the subset of cryptographic parameters 126a could be included in the received eUICC profile 311 for a module 101. An HSS for a network 102 could process or create information for the received eUICC profile 311. As depicted and described in connection with FIG. 1f, (i) a server 105, which could be operated by MNO 108, or (ii) MNO 108 could calculate shared secret key 129c using component parameters 101t for a module 101 with module identity 110 in a module database 105k.

For embodiments that do not use a shared secret key 129c in a network key K derivation algorithm 1101, the output of a key derivation function 141f in a network key K derivation algorithm 1101 can be a number or string comprising a derived shared secret key 129b, which is also depicted and described in connection with FIG. 1d and FIG. 1c. The derived shared secret key 129b in a network key K derivation algorithm 1101 can be the same or equivalent for a derived shared secret key 129b as described in a module key K derivation algorithm 909. The sub-steps and description for a derived shared secret key 129b in a module key K derivation algorithm 909 can apply for a derived shared secret key 129b in a network key K derivation algorithm 1101.

A key processing algorithm 141i within a network key K derivation algorithm 1101 can take the same or equivalent steps as described for a key processing algorithm 141i within a module key K derivation algorithm 909 described above in this FIG. 11. For embodiments where the derived shared secret key 129b can be less than the key length of key K specified for wireless network 102, then key processing algorithm 141i can perform a key lengthening function, such as, but not limited to, using a secure hash algorithm 141c with at least input of the derived shared secret key 129b. The secure hash algorithm 141c could be selected such that the length of output of the secure hash algorithm 141c matches the length of key K specified for wireless network 102. The secure hash algorithm 141c for use in a network key K derivation algorithm 1101 could be specified in a set of cryptographic parameters 126. For embodiments where the length of derived shared secret key 129b in a network key K derivation algorithm 1101 can be greater than the length of key K specified for wireless network 102, the key processing algorithm 141i can take steps to (i) truncate derived shared secret key 129b, (ii) select a subset of bits within derived shared secret key 129b, and/or (iii) take steps to securely and/or randomly reduce the size of derived shared secret key 129b to match the key length of key K specified for wireless network 102. In exemplary embodiments, key processing algorithm 141i includes a secure hash algorithm 141c, such that the derived shared secret key 129b in a network key K derivation algorithm 1101 is input into the secure hash algorithm 141c in order to output the secret shared network key K 129d.

In exemplary embodiments, the key processing algorithm 141i for a network key K derivation function 1101 can take the same or equal value for a derived shared secret key 129b in a module key K derivation function 909 and output the same or equal value for shared secret network key K 129d. One difference between a key processing algorithm 141i for a network key K derivation function 1101 and a a key processing algorithm 141i for a module key K derivation function 909 is that the a key processing algorithm 141i for a network key K derivation function 1101 can optionally include logic to detect a "collision", where the shared secret network key K 129d may already be used by a different module 101 using a different module identity 110 or network module identity 110b. In this case of a "collision" network 102 could take steps such as (i) requesting the module 101 derive a new and different shared secret key 129b (which could involve the use of a different random number 128a by module 101), or (ii) network 102 could take steps such that the same shared secret network key K 129d (in the case of a "collision) could be supported by two different modules 101 using two different module identities 110 or network module identities 110b.

As depicted in FIG. 11, the output of key processing algorithm 141i within a network key K derivation algorithm 1101 can comprise a shared secret network key K 129d. A shared secret network key K 129d is also described in a step 909 depicted and described in connection with FIG. 9b. Upon deriving the shared secret network key K 129d, MNO 108, using a server 105 or set of servers 1010 could record the value in within a module database 105k. The module database 105k could reside within an HSS or similar servers for an LTE and related networks. A module 101 could utilize a module key K derivation algorithm 909 in order to securely obtain the same value for shared secret network key K 129d. MNO 108 and wireless network 102 could then utilize the shared secret network key K 129d to connect with and/or authenticate a module 101 using the steps for a network in steps 910 and 911 depicted and described in connection with FIG. 9b. In exemplary embodiments, module 101 and wireless network 102 could utilize the shared secret network key K 129d with the algorithms specified in ETSI TS 135 205-209, as well as subsequent and related standards, in order for module 101 to authenticate and/or connect with wireless network 102. Other possibilities exist as well without departing from the scope of the present invention.

CONCLUSION

Various exemplary embodiments have been described above. Those skilled in the art will understand, however, that changes and modifications may be made to those examples without departing from the scope of the claims.

What is claimed is:

1. A module with an embedded Universal Integrated Circuit Card (eUICC) comprising:
    (a) at least one processor; and
    (b) a memory operatively connected to the at least one processor, the memory including processor executable code that, when executed by the at least one processor, performs the steps of:
        (1) recording, in the memory of the module, (i) a module public key and a corresponding module private key, (ii) a pre-shared secret key, (iii) a set of cryptographic parameters, and (iv) a module identity,
        (2) generating, by the module, module encrypted data associated with a first set of servers using the pre-shared secret key which is also separately accessible by the first set of servers, wherein the module encrypted data includes at least a portion of the set of cryptographic parameters;
        (3) storing, by the module in the memory, a network public key, wherein the network public key is associated with (i) a second set of servers and (ii) a network private key;
        (4) generating, by the module in the memory, a mutually derived shared key using Elliptical Curve Diffie Hellman, wherein the mutually derived shared key is derived by the module based on at least:
            (i) the module private key; and
            (ii) the network public key,
            wherein the mutually derived shared key can be derived by the second set of servers based on at least:
                (A) the module public key associated with the module private key; and
                (B) the network private key associated with the network public key;
        (5) receiving from the second set of servers an encrypted profile for the eUICC; and
        (6) decrypting the encrypted profile with the mutually derived shared key in order to store network access credentials.

2. The module of claim 1,
wherein the memory is a nonvolatile memory.

3. The module of claim 1,
wherein the memory is a volatile memory.

4. The module of claim 1,
wherein the processor executable code, when executed by the at least one processor, performs a step of sending the module encrypted data to the first set of servers.

5. The module of claim 1,
wherein the module comprises a wireless module adapted to communicate over a wireless network using a radio and an antenna.

6. The module of claim 1,
wherein the module comprises a sensor configured to collect data regarding a monitored unit.

7. The module of claim 1,
wherein the module comprises a controller configured to change a state of an actuator associated with a monitored unit.

8. The module of claim 1,
wherein the module comprises a wired communication module adapted to connect to a network over a wired connection.

9. The module of claim 1,
wherein the set of cryptographic parameters comprise settings for one or more cryptographic algorithms.

10. The module of claim 9,
wherein the one or more cryptographic algorithms includes an Elliptic Curve Integrated Encryption Scheme.

11. The module of claim 1,
wherein the module encrypted data includes only the portion of the set of cryptographic parameters.

12. The module of claim 1,
wherein the module encrypted data includes all cryptographic parameters of the set of cryptographic parameters.

13. The module of claim 1, wherein the second set of servers comprises one server.

14. The module of claim 1, wherein the second set of servers comprises a plurality of servers.

15. The module of claim 1, wherein the processor executable instructions, when executed by the at least one processor, perform a step of:
- (h) connecting to a wireless network using a decrypted profile for the eUICC,
    - wherein the decrypted profile is provided in step (b)(6) and includes the network access credentials, and
    - wherein the network access credentials include at least a key K and a network module identity.

* * * * *